United States Patent [19]
Uchida et al.

[11] Patent Number: 5,805,581
[45] Date of Patent: Sep. 8, 1998

[54] MOBILE COMMUNICATION SYSTEM USING VARIOUS MULTIPLE ACCESS METHODS

[75] Inventors: Yoshinori Uchida; Kenichi Ishida; Takashi Kashiwagi, all of Amagasaki, Japan

[73] Assignee: Mitsubishi Denki Kabushiki Kaisha, Tokyo, Japan

[21] Appl. No.: 524,974

[22] Filed: Sep. 8, 1995

[30] Foreign Application Priority Data

Sep. 9, 1994 [JP] Japan ................................. 6-216184
Sep. 1, 1995 [JP] Japan ................................. 7-224898

[51] Int. Cl.⁶ ............................... H04J 4/00; H04J 13/02
[52] U.S. Cl. ......................... 370/35; 370/337; 370/342; 370/344; 370/347; 375/376; 455/451
[58] Field of Search ........................ 370/18, 95.3, 95.1, 370/328, 329, 335, 336, 337, 342, 345, 347, 348; 375/200, 205–207, 371, 373, 376, 201; 455/33.1, 51.1, 56.1, 422, 426, 450, 452, 451, 500, 507, 509, 517, 524

[56] References Cited

U.S. PATENT DOCUMENTS

| | | | |
|---|---|---|---|
| 4,799,252 | 1/1989 | Eizenhöffer et al. | 370/50 |
| 5,170,412 | 12/1992 | Massey | 375/206 |
| 5,260,967 | 11/1993 | Schilling | 375/205 |
| 5,299,226 | 3/1994 | Schilling | D13/103 |
| 5,311,542 | 5/1994 | Eder | 375/200 |
| 5,319,634 | 6/1994 | Bartholomew et al. | 375/205 |
| 5,319,672 | 6/1994 | Sumiya et al. | 375/208 |
| 5,345,439 | 9/1994 | Marston | 370/321 |
| 5,345,467 | 9/1994 | Lomp et al. | 375/205 |
| 5,373,502 | 12/1994 | Turban | 370/18 |
| 5,452,328 | 9/1995 | Rice | 375/210 |
| 5,481,533 | 1/1996 | Honig et al. | 370/18 |
| 5,488,631 | 1/1996 | Gold et al. | 375/206 |
| 5,511,068 | 4/1996 | Sato | 370/18 |
| 5,533,013 | 7/1996 | Leppanen | 370/18 |
| 5,539,730 | 7/1996 | Dent | 370/330 |
| 5,572,516 | 11/1996 | Miya et al. | 370/342 |

FOREIGN PATENT DOCUMENTS

| | | |
|---|---|---|
| 0600713 | 6/1994 | European Pat. Off. . |
| 5145470 | 6/1993 | Japan . |
| 6120886 | 4/1994 | Japan . |
| 6216836 | 8/1994 | Japan . |
| 7154859 | 6/1995 | Japan . |
| 9421056 | 9/1994 | WIPO . |

*Primary Examiner*—Benedict V. Safourek
*Assistant Examiner*—Seema S. Rao
*Attorney, Agent, or Firm*—Rothwell, Figg, Ernst & Kurz

[57] ABSTRACT

A mobile communication system in which various access methods may be selected according to the user's priority. In the mobile communication system, each of mobile stations and radio base stations has a radio processor, which has TDMA, CDMA and FDMA communication units. The CDMA communication unit comprises channel coders each for performing a primary modulation to a transmitting signal, spread-spectrum code generators for respectively generating different spread-spectrum signals, a clock generator/controller for controlling the generation of chip clocks to control the generation of the spread-spectrum codes, oscillators for setting different carrier frequencies to outputs calculated as products, and a CPU for generally controlling various parts or elements to control the assignment of a CDMA signal or a TDMA signal to an arbitrary time slot transmitted from the TDMA communication unit. The radio processor transmits different signals of different access methods existing in each time slot of the same frame different signals.

25 Claims, 133 Drawing Sheets

RADIO BASE STATION MODEL WITH SPRED-SPECTRUM CODE
GENERATORS ASSOCIATED WITH TIME SLOTS

HEAD POSITION OF INITIAL VALUE OF TIME SLOT ON TRANSMITTING SIDE IN A MULTI FRAME ( TDD )

POSITION OF INITIAL VALUE OF SS CODE
(HEAD OF THE MULTI FRAME)

AN EXAMPLE OF TIME SLOT ON RECEIVING SIDE

IN A MULTI FRAME

POSITION OF INITIAL VALUE OF SS CODE ( TDD )

RADIO BASE STATION MODEL WITH SS CODE
GENERATOR ASSOCIATED WITH TIME SLOT

RADIO BASE STATION MODEL WITH MECHANISM FOR SETTING GENERATING POLYNOMIAL OF SS CODE GENERATOR

NONCOHERENT DELAY LOCK LOOP WITH
MULTI SS CODE GENERATOR

RELATIONSHIP BETWEEN TIME SLOT IN A MULTI FRAME
AND A RECEIVING CORRELATION CODE SHIFT REGISTOR

Fig.42

AN EXAMPLE OF CHIP RATE

| SLOT NO. | DATA RATE $R_D$ (bps) | TRANSMITTING TYPE | CHIP RATE $1/t_{SP}$ (cps) |
|---|---|---|---|
| 1 | 19.2K | CDMA | 12.288M |
| 2 | 9.6K | CDMA | 6.144M |
| 3 | 192K | TDMA | 0 |
| 4 | 19.2K | CDMA | 12.288M |

Fig.61

S211: PUBLIC SWITCHED MOBILE STATION INITIATES A CALL TO PRIVATE SYSYTEM

S212: THE MOBILE STATION SENDS THE CALLING OUT SIGNAL VIA THE PRIVATE SYSTEM CONT. CH. BY THE ACCESS METHOD ADAPTABLE FOR THE RECEIVED RADIO BASE STATION OF THE PRIVATE SYSTEM AMONG AVAILABLE ACCESS METHODS.(e.g.,FDMA / TDMA / CDMA ON TABLE 2)

S213: RECEPTION OF CALL FROM BASE STATION?
- NO (CALLING OUT AGAIN BY ANOTHER ACCESS METHOD)
- YES

S215: PBX CONFIRMS IF THE CALLING OUT MOBILE STATION HAS A MECHANISM OF REALIZING THE METHOD ON TABLE 1 AT THE MOBILE STATION INFOR. CENTER.

S216: THE n TH PRIORITY?
- NO (CALLING OUT AGAIN BY ANOTHER ACCESS METHOD)
- YES

S218: PBX INDICATES TIME SLOT, FREQ. SLOTS, SS CODES, SPEECH CODING SPEED etc. OF THE n TH PRIORITY. AND INFORMS BASE STATION OF THE INDICATED PARAMETER. BASE STATION INDICATES MOBILE STATION TO MOVE TO THE TALKING CH. HAVING THE INDICATED PARAMETER VIA THE PRIVATE SYSTEM CONT.CH. WHEN THE MOVEMENT IS CONFIRMED, THE PROCESS ENDS

Fig.68

| INFORMATION INPUT NO. | SLOT NO. | DATA RATE $R_D$ (bps) | TX TYPE | CHIP RATE $1/t_{SP}$ (cps) | NO. OF SIMULTANEOUS TALKING CHS |
|---|---|---|---|---|---|
| 1 | 1 | 384K | TDMA | 0 | 1 |
| 2 - 37 | 2 | 19.2K | CDMA | 12.288M | 36 |
| 38 | 3 | 192K | TDMA | 0 | 1 |
| 39 - 52 | 4 | 9.6K | CDMA | 6.144M | 14 |

THE NUMBER OF CHANNELS AT EACH TIME SLOT OF RADIO BASE STATION 6

Fig.71 A

| INFO. INPUT NO. | BUFF NO. | CH/SS CORDER NO. | SLOT NO. | DATA RATE $R_D$(bps) | TX TYPE | CHIP RATE $1/t_{SP}$(cps) |
|---|---|---|---|---|---|---|
| 1 | 1 | 1 | 1 | 384k | TDMA | 0 |
| 2 | 2 | | 2 | 19.2k | CDMA | 12.288M |
| 38 | 3 | | 3 | 192k | TDMA | 0 |
| 39 | 4 | | 4 | 9.6K | CDMA | 6.144M |
| 3 | 6 | 2 | 2 | 19.2k | CDMA | 12.288M |
| 40 | 8 | | 4 | 9.6K | CDMA | 6.144M |
| 4 | 10 | 3 | 2 | 19.2k | CDMA | 12.288M |
| 41 | 12 | | 4 | 9.6K | CDMA | 6.144M |
| 5 | 14 | 4 | 2 | 19.2k | CDMA | 12.288M |
| 42 | 16 | | 4 | 9.6K | CDMA | 6.144M |
| 6 | 18 | 5 | 2 | 19.2k | CDMA | 12.288M |
| 43 | 20 | | 4 | 9.6K | CDMA | 6.144M |
| 7 | 22 | 6 | 2 | 19.2k | CDMA | 12.288M |
| 44 | 24 | | 4 | 9.6K | CDMA | 6.144M |
| 8 | 26 | 7 | 2 | 19.2k | CDMA | 12.288M |
| 45 | 28 | | 4 | 9.6K | CDMA | 6.144M |
| 9 | 30 | 8 | 2 | 19.2k | CDMA | 12.288M |
| 46 | 32 | | 4 | 9.6K | CDMA | 6.144M |
| 10 | 34 | 9 | 2 | 19.2k | CDMA | 12.288M |
| 47 | 36 | | 4 | 9.6K | CDMA | 6.144M |
| 11 | 38 | 10 | 2 | 19.2k | CDMA | 12.288M |
| 48 | 40 | | 4 | 9.6K | CDMA | 6.144M |
| 12 | 42 | 11 | 2 | 19.2k | CDMA | 12.288M |
| 49 | 44 | | 4 | 9.6K | CDMA | 6.144M |
| 13 | 46 | 12 | 2 | 19.2k | CDMA | 12.288M |
| 50 | 48 | | 4 | 9.6K | CDMA | 6.144M |
| 14 | 50 | 13 | 2 | 19.2k | CDMA | 12.288M |
| 51 | 52 | | 4 | 9.6K | CDMA | 6.144M |
| 15 | 54 | 14 | 2 | 19.2k | CDMA | 12.288M |
| 52 | 56 | | 4 | 9.6K | CDMA | 6.144M |

Fig. 71 B

| INFO. INPUT NO. | BUFF NO. | CH/SS CORDER NO. | SLOT NO. | DATA RATE $R_D$(bps) | TX TYPE | CHIP RATE $1/t_{SP}$ (cps) |
|---|---|---|---|---|---|---|
| 16 | 58 | 15 | 2 | 19.2k | CDMA | 12.288M |
| 17 | 62 | 16 | 2 | 19.2k | CDMA | 12.288M |
| 18 | 66 | 17 | 2 | 19.2k | CDMA | 12.288M |
| 19 | 70 | 18 | 2 | 19.2k | CDMA | 12.288M |
| 20 | 74 | 19 | 2 | 19.2k | CDMA | 12.288M |
| 21 | 78 | 20 | 2 | 19.2k | CDMA | 12.288M |
| 22 | 82 | 21 | 2 | 19.2k | CDMA | 12.288M |
| 23 | 86 | 22 | 2 | 19.2k | CDMA | 12.288M |
| 24 | 90 | 23 | 2 | 19.2k | CDMA | 12.288M |
| 25 | 94 | 24 | 2 | 19.2k | CDMA | 12.288M |
| 26 | 98 | 25 | 2 | 19.2k | CDMA | 12.288M |
| 27 | 102 | 26 | 2 | 19.2k | CDMA | 12.288M |
| 28 | 106 | 27 | 2 | 19.2k | CDMA | 12.288M |
| 29 | 110 | 28 | 2 | 19.2k | CDMA | 12.288M |
| 30 | 114 | 29 | 2 | 19.2k | CDMA | 12.288M |
| 31 | 118 | 30 | 2 | 19.2k | CDMA | 12.288M |
| 32 | 122 | 31 | 2 | 19.2k | CDMA | 12.288M |
| 33 | 126 | 32 | 2 | 19.2k | CDMA | 12.288M |
| 34 | 130 | 33 | 2 | 19.2k | CDMA | 12.288M |
| 35 | 134 | 34 | 2 | 19.2k | CDMA | 12.288M |
| 36 | 138 | 35 | 2 | 19.2k | CDMA | 12.288M |
| 37 | 142 | 36 | 2 | 19.2k | CDMA | 12.288M |

Fig.74 A

| INFO. INPUT NO. | BUFF NO. | CH/SS CORDER NO. | SLOT NO. | DATA RATE $R_D$(bps) | TX TYPE | CHIP RATE $1/t_{SP}$ (cps) |
|---|---|---|---|---|---|---|
| SYNC.CONT. | 1 | 1 | 1 | 9.6k | TDMA | 0 |
| 2 | 2 | | 2 | 19.2k | CDMA | 12.288M |
| 38 | 3 | | 3 | 192k | TDMA | 0 |
| 39 | 4 | | 4 | 9.6K | CDMA | 6.144M |
| 3 | 6 | 2 | 2 | 19.2k | CDMA | 12.288M |
| 40 | 8 | | 4 | 9.6K | CDMA | 6.144M |
| 4 | 10 | 3 | 2 | 19.2k | CDMA | 12.288M |
| 41 | 12 | | 4 | 9.6K | CDMA | 6.144M |
| 5 | 14 | 4 | 2 | 19.2k | CDMA | 12.288M |
| 42 | 16 | | 4 | 9.6K | CDMA | 6.144M |
| 6 | 18 | 5 | 2 | 19.2k | CDMA | 12.288M |
| 43 | 20 | | 4 | 9.6K | CDMA | 6.144M |
| 7 | 22 | 6 | 2 | 19.2k | CDMA | 12.288M |
| 44 | 24 | | 4 | 9.6K | CDMA | 6.144M |
| 8 | 26 | 7 | 2 | 19.2k | CDMA | 12.288M |
| 45 | 28 | | 4 | 9.6K | CDMA | 6.144M |
| 9 | 30 | 8 | 2 | 19.2k | CDMA | 12.288M |
| 46 | 32 | | 4 | 9.6K | CDMA | 6.144M |
| 10 | 34 | 9 | 2 | 19.2k | CDMA | 12.288M |
| 47 | 36 | | 4 | 9.6K | CDMA | 6.144M |
| 11 | 38 | 10 | 2 | 19.2k | CDMA | 12.288M |
| 48 | 40 | | 4 | 9.6K | CDMA | 6.144M |
| 12 | 42 | 11 | 2 | 19.2k | CDMA | 12.288M |
| 49 | 44 | | 4 | 9.6K | CDMA | 6.144M |
| 13 | 46 | 12 | 2 | 19.2k | CDMA | 12.288M |
| 50 | 48 | | 4 | 9.6K | CDMA | 6.144M |
| 14 | 50 | 13 | 2 | 19.2k | CDMA | 12.288M |
| 51 | 52 | | 4 | 9.6K | CDMA | 6.144M |
| 15 | 54 | 14 | 2 | 19.2k | CDMA | 12.288M |
| 52 | 56 | | 4 | 9.6K | CDMA | 6.144M |

Fig.74 B

| INFO. INPUT NO. | BUFF NO. | CH/SS CORDER NO. | SLOT NO. | DATA RATE $R_D$(bps) | TX TYPE | CHIP RATE $1/t_{SP}$(cps) |
|---|---|---|---|---|---|---|
| 16 | 58 | 15 | 2 | 19.2k | CDMA | 12.288M |
| 17 | 62 | 16 | 2 | 19.2k | CDMA | 12.288M |
| 18 | 66 | 17 | 2 | 19.2k | CDMA | 12.288M |
| 19 | 70 | 18 | 2 | 19.2k | CDMA | 12.288M |
| 20 | 74 | 19 | 2 | 19.2k | CDMA | 12.288M |
| 21 | 78 | 20 | 2 | 19.2k | CDMA | 12.288M |
| 22 | 82 | 21 | 2 | 19.2k | CDMA | 12.288M |
| 23 | 86 | 22 | 2 | 19.2k | CDMA | 12.288M |
| 24 | 90 | 23 | 2 | 19.2k | CDMA | 12.288M |
| 25 | 94 | 24 | 2 | 19.2k | CDMA | 12.288M |
| 26 | 98 | 25 | 2 | 19.2k | CDMA | 12.288M |
| 27 | 102 | 26 | 2 | 19.2k | CDMA | 12.288M |
| 28 | 106 | 27 | 2 | 19.2k | CDMA | 12.288M |
| 29 | 110 | 28 | 2 | 19.2k | CDMA | 12.288M |
| 30 | 114 | 29 | 2 | 19.2k | CDMA | 12.288M |
| 31 | 118 | 30 | 2 | 19.2k | CDMA | 12.288M |
| 32 | 122 | 31 | 2 | 19.2k | CDMA | 12.288M |
| 33 | 126 | 32 | 2 | 19.2k | CDMA | 12.288M |
| 34 | 130 | 33 | 2 | 19.2k | CDMA | 12.288M |
| 35 | 134 | 34 | 2 | 19.2k | CDMA | 12.288M |
| 36 | 138 | 35 | 2 | 19.2k | CDMA | 12.288M |
| 37 | 142 | 36 | 2 | 19.2k | CDMA | 12.288M |

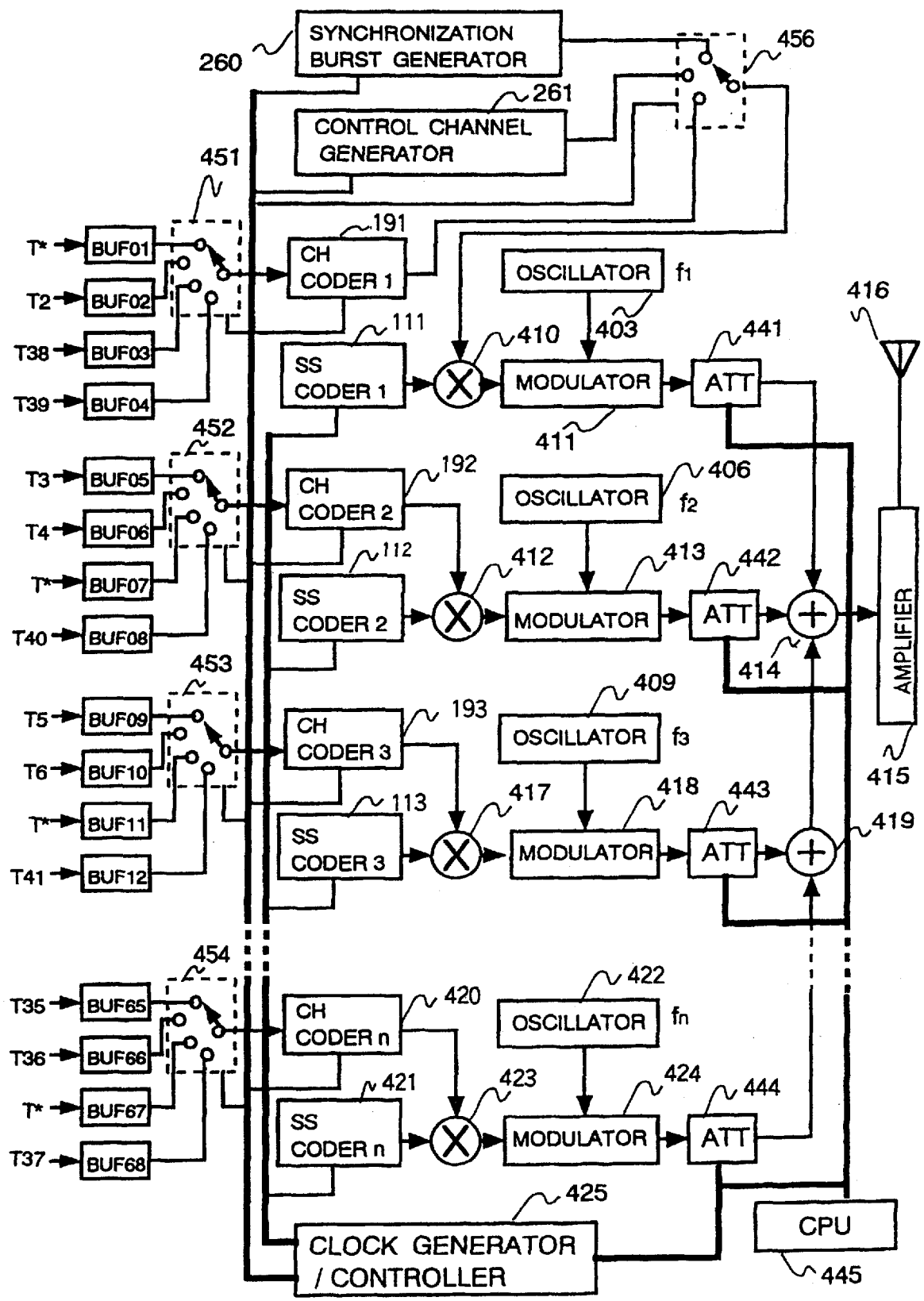

Fig. 77A

| INFO. INPUT NO. | BUFF NO. | CH/SS CORDER NO. | SLOT NO. | DATA RATE $R_D$(bps) | TX TYPE | CHIP RATE $1/t_{SP}$(cps) |
|---|---|---|---|---|---|---|
| SYNC.CONT. | 1 | 1 | 1 | 9.6k | CDMA | 6.144M |
| 2 | 2 | | 2 | 19.2k | CDMA | 12.288M |
| 38 | 3 | | 3 | 192k | TDMA | 0 |
| 39 | 4 | | 4 | 9.6K | CDMA | 6.144M |
| 3 | 5 | 2 | 1 | 19.2k | CDMA | 12.288M |
| 4 | 6 | | 2 | 19.2k | CDMA | 12.288M |
| 40 | 8 | | 4 | 9.6K | CDMA | 6.144M |
| 5 | 9 | 3 | 1 | 19.2k | CDMA | 12.288M |
| 6 | 10 | | 2 | 19.2k | CDMA | 12.288M |
| 41 | 12 | | 4 | 9.6K | CDMA | 6.144M |
| 7 | 13 | 4 | 1 | 19.2k | CDMA | 12.288M |
| 8 | 14 | | 2 | 19.2k | CDMA | 12.288M |
| 42 | 16 | | 4 | 9.6K | CDMA | 6.144M |
| 9 | 17 | 5 | 1 | 19.2k | CDMA | 12.288M |
| 10 | 18 | | 2 | 19.2k | CDMA | 12.288M |
| 43 | 20 | | 4 | 9.6K | CDMA | 6.144M |
| 11 | 21 | 6 | 1 | 19.2k | CDMA | 12.288M |
| 12 | 22 | | 2 | 19.2k | CDMA | 12.288M |
| 44 | 24 | | 4 | 9.6K | CDMA | 6.144M |
| 13 | 25 | 7 | 1 | 19.2k | CDMA | 12.288M |
| 14 | 26 | | 2 | 19.2k | CDMA | 12.288M |
| 45 | 28 | | 4 | 9.6K | CDMA | 6.144M |
| 15 | 29 | 8 | 1 | 19.2k | CDMA | 12.288M |
| 16 | 30 | | 2 | 19.2k | CDMA | 12.288M |
| 46 | 32 | | 4 | 9.6K | CDMA | 6.144M |
| 17 | 33 | 9 | 1 | 19.2k | CDMA | 12.288M |
| 18 | 34 | | 2 | 19.2k | CDMA | 12.288M |
| 47 | 36 | | 4 | 9.6K | CDMA | 6.144M |
| 19 | 37 | 10 | 1 | 19.2k | CDMA | 12.288M |
| 20 | 38 | | 2 | 19.2k | CDMA | 12.288M |
| 48 | 40 | | 4 | 9.6K | CDMA | 6.144M |

Fig. 77 B

| INFO. INPUT NO. | BUFF NO. | CH/SS CORDER NO. | SLOT NO. | DATA RATE $R_D$(bps) | TX TYPE | CHIP RATE $1/t_{SP}$(cps) |
|---|---|---|---|---|---|---|
| 21 | 41 | 11 | 1 | 19.2k | CDMA | 12.288M |
| 22 | 42 |    | 2 | 19.2k | CDMA | 12.288M |
| 49 | 44 |    | 4 | 9.6K  | CDMA | 6.144M  |
| 23 | 45 | 12 | 1 | 19.2k | CDMA | 12.288M |
| 24 | 46 |    | 2 | 19.2k | CDMA | 12.288M |
| 50 | 48 |    | 4 | 9.6K  | CDMA | 6.144M  |
| 25 | 49 | 13 | 1 | 19.2k | CDMA | 12.288M |
| 26 | 50 |    | 2 | 19.2k | CDMA | 12.288M |
| 51 | 52 |    | 4 | 9.6K  | CDMA | 6.144M  |
| 27 | 53 | 14 | 1 | 19.2k | CDMA | 12.288M |
| 28 | 54 |    | 2 | 19.2k | CDMA | 12.288M |
| 52 | 56 |    | 4 | 9.6K  | CDMA | 6.144M  |
| 29 | 57 | 15 | 1 | 19.2k | CDMA | 12.288M |
| 30 | 58 |    | 2 | 19.2k | CDMA | 12.288M |
| 31 | 60 |    | 4 | 19.2k | CDMA | 12.288M |
| 32 | 61 | 16 | 1 | 19.2k | CDMA | 12.288M |
| 33 | 62 |    | 2 | 19.2k | CDMA | 12.288M |
| 34 | 64 |    | 4 | 19.2k | CDMA | 12.288M |
| 35 | 65 | 17 | 1 | 19.2k | CDMA | 12.288M |
| 36 | 66 |    | 2 | 19.2k | CDMA | 12.288M |
| 37 | 68 |    | 4 | 19.2k | CDMA | 12.288M |

Fig. 80

| SLOT NO. | FREQ. MHz | TX TYPE | DATA RATE $R_D$ | CHIP RATE $1/t_{SP}$ | CHIP CODE POLYNOMIAL | CHIP CODE INITIAL VALUE |
|---|---|---|---|---|---|---|
| 1 | $f_6$ | CDMA | $R_{D1}$ | $R_{C1}=N_1 R_{D1}$ | 61 | 3328 |
| 2 | $f_3$ | CDMA | $R_{D2}$ | $R_{C2}=N_2 R_{D2}$ | 12 | 2635 |
| 3 | $f_{11}$ | TDMA | $R_{D3}$ | 0 | 34 | 9013 |
| 4 | $f_{12}$ | CDMA | $R_{D4}$ | $R_{C4}=N_4 R_{D4}$ | 07 | 7540 |
| | CARRIER FREQ. CONT. | | | CHIP RATE CONTROLLER | GENERATING POLYNOMIAL & INITIAL VALUE SETTING UNIT | |

Fig. 82

| SLOT NO. | FREQ. MHz | TX TYPE | DATA RATE $R_D$ | CHIP RATE $1/t_{SP}$ | CHIP CODE POLYNOMIAL | CHIP CODE INITIAL VALUE |
|---|---|---|---|---|---|---|
| 1 | $f_6$ | CDMA | $R_{D1}$ | $R_{C1}=N_1 R_{D1}$ | 61 | 3328 |
| 2 | $f_3$ | CDMA | $R_{D2}$ | $R_{C2}=N_2 R_{D2}$ | 12 | 2635 |
| 3 | $f_{11}$ | TDMA | $R_{D3}$ | 0 | 34 | 9013 |
| 4 | $f_{12}$ | CDMA | $R_{D4}$ | $R_{C4}=N_4 R_{D4}$ | 07 | 7540 |
| CPU SELECTS THE DESIGNATED SLOT | CARRIER FREQ. CONT. | | | CHIP RATE CONTROLLER | | GENERATING POLYNOMIAL & INITIAL VALUE SETTING CONTROLLER |

CHANGING PROCEDURE OF THE ACCESS METHOD

Fig. 87

TABLE 1

AN EXAMPLE OF #1 MEMORY FORMAT OF THE PRIORITY
BASED ON EFFICIENCY OF AVAILABLE ACCESS METHODS

| CELL No. | BASE STATION NUMBER | LEVEL | ACCESS METHOD | MODULATION METHOD | SS CODE | SPEECH CODING |
|---|---|---|---|---|---|---|
| 110 | 110A | 1 | TDMA/TDD | π/4-QPSK | B3654 | 16K |
|  | 110B | 2 | CDMA/TDD | GMSK |  | 16K |
|  | 110C | 3 | FDMA/TDD | GMSK |  | 12K |
|  |  | 4 | FDMA/FDD | FM |  | ANALOG |
| 111 | 111A | 1 | CDMA/TDD | GMSK | B3624 | 8K |
|  |  | 2 | TDMA/TDD | π/4-QPSK |  | 16K |
|  |  | 3 | FDMA/TDD | GMSK |  | 12K |
|  |  | 4 | FDMA/FDD | FM |  | ANALOG |
| 112 | 112A | 1 | TDMA/TDD | π/4-QPSK | B3679 | 16K |
|  | 112B | 2 | CDMA/TDD | GMSK |  | 16K |
|  | 112C | 3 | FDMA/TDD | GMSK |  | 12K |
|  |  | 4 | FDMA/TDD | π/4-QPSK |  | 32K |
|  |  | 5 | FDMA/FDD | FM |  | ANALOG |
| 113 | 113A | 1 | CDMA/TDD | GMSK | B3681 | 8K |
|  |  | 2 | TDMA/TDD | π/4-QPSK |  | 16K |
|  |  | 3 | FDMA/TDD | GMSK |  | 12K |
|  |  | 4 | FDMA/FDD | FM |  | ANALOG |
| 135 | 135A | 1 | TDMA/TDD | π/4-QPSK | B3622 | 16K |
|  | 135B | 2 | CDMA/TDD | GMSK |  | 16K |
|  |  | 3 | FDMA/TDD | GMSK |  | 12K |
|  |  | 4 | FDMA/FDD | FM |  | ANALOG |

Fig. 88

TABLE 2

2 MEMORY FORMAT OF MOBILE STATIONS FOR EACH OF CELLS

| CELL No. | MOBILE STATION NUMBER | LEVEL | ACCESS METHOD | MODULATION METHOD | SS CODE | SPEECH CODING |
|---|---|---|---|---|---|---|
| 110 | 2110 (PORTABLE) | 1 | TDMA/TDD | π/4-QPSK |  | 16K |
|  |  | 2 | CDMA/TDD | GMSK | B3654 | 16K |
|  |  | 3 | FDMA/FDD | FM |  | ANALOG |
|  | 2111 (MOBILE) | 1 | CDMA/TDD | GMSK | B3624 | 8K |
|  |  | 2 | TDMA/TDD | π/4-QPSK |  | 16K |
|  |  | 3 | FDMA/TDD | GMSK |  | 12K |
|  |  | 4 | FDMA/FDD | FM |  | ANALOG |
|  | 2113 (MOBILE) | 1 | TDMA/TDD | π/4-QPSK |  | 16K |
|  |  | 2 | CDMA/TDD | π/4-QPSK | B3679 | 16K |
|  |  | 3 | FDMA/TDD | π/4-QPSK |  | 32K |
|  |  | 4 | FDMA/FDD | FM |  | ANALOG |
| 111 | 2114 (PORTABLE) | 1 | CDMA/TDD | GMSK | B3681 | 8K |
|  |  | 2 | FDMA/TDD | GMSK |  | 12K |
|  |  | 3 | FDMA/FDD | FM |  | ANALOG |
| 135 | 2135 (PORTABLE) | 1 | TDMA/TDD | π/4-QPSK |  | 16K |
|  |  | 3 | FDMA/TDD | π/4-QPSK |  | 32K |
|  |  | 4 | FDMA/FDD | FM |  | ANALOG |

PROCEDURE OF CHANGING ACCESS METHOD BASED ON THE PRIORITY

Fig. 91

TABLE 3

CONTROL CHANNEL INFORMATION TO BE
NOTIFIED THROUGH CONTROL CHANNEL

| CELL No. | FREQ. | ACCESS METHOD | MODULATION METHOD | SS CODE | REMARKS |
|---|---|---|---|---|---|
| 110 | $f_1$      | TDMA/TDD | $\pi/4$-QPSK | B3654-7 | Slotted Aloh |
|     | $f_6$      | CDMA/TDD | GMSK         |         | CODE DIVISION |
|     | $f_{31}$   | FDMA/TDD | FSK          |         | Slotted Aloh |
|     | $f_{41/86}$| FDMA/FDD | SPEECH FSK   |         | Slotted Aloh |
| 111 | $f_2$      | CDMA/TDD | GMSK         | B3621-8 | CODE DIVISION |
|     | $f_7$      | TDMA/TDD | $\pi/4$-QPSK |         | Slotted Aloh |
|     | $f_{32}$   | FDMA/TDD | FSK          |         | Slotted Aloh |
|     | $f_{10/86}$| FDMA/FDD | SPEECH FSK   |         | Slotted Aloh |
| 112 | $f_0$      | TDMA/TDD | $\pi/4$-QPSK | B3675-8 | Slotted Aloh |
|     | $f_{13}$   | CDMA/TDD | GMSK         |         | CODE DIVISION |
|     | $f_{36}$   | FDMA/TDD | FSK          |         | Slotted Aloh |
|     | $f_{43/86}$| FDMA/FDD | SPEECH FSK   |         | Slotted Aloh |
| 113 | $f_{11}$   | CDMA/TDD | GMSK         | B3681-4 | CODE DIVISION |
|     | $f_{16}$   | TDMA/TDD | $\pi/4$-QPSK |         | Slotted Aloh |
|     | $f_{37}$   | FDMA/TDD | FSK          |         | Slotted Aloh |
|     | $f_{20/87}$| FDMA/FDD | SPEECH FSK   |         | Slotted Aloh |
| ≈ | ≈ | ≈ | ≈ | ≈ | ≈ |
| 135 | $f_2$      | TDMA/TDD | $\pi/4$-QPSK | B3622-5 | Slotted Aloh |
|     | $f_4$      | CDMA/TDD | GMSK         |         | CODE DIVISION |
|     | $f_{32}$   | FDMA/TDD | FSK          |         | Slotted Aloh |
|     | $f_{22/60}$| FDMA/FDD | SPEECH FSK   |         | Slotted Aloh |

Fig. 92

TABLE 4  INFORMATION CHANNEL INFORMATION TO BE NOTIFIED FROM CONTROL CHANNEL

| CELL No. | VA-CAN-CY? | FREQ. | ACCESS METHOD | MODULATION METHOD | SS CODE | REMARKS |
|---|---|---|---|---|---|---|
| 110 | YES<br>YES<br>NO<br>YES | $f_4$<br>$f_{16}$<br>$f_{24}$<br>$f_{31/75}$ | TDMA/TDD<br>CDMA/TDD<br>FDMA/TDD<br>FDMA/FDD | $\pi/4$-QPSK<br>GMSK<br>FSK<br>FM | B4654-7 | CODE DIVISION |
| 111 | YES<br>YES<br>YES<br>YES | $f_{14}$<br>$f_{26}$<br>$f_{36}$<br>$f_{6/57}$ | CDMA/TDD<br>TDMA/TDD<br>FDMA/TDD<br>FDMA/FDD | GMSK<br>$\pi/4$-QPSK<br>FSK<br>FM | B4621-8 | CODE DIVISION |
| 112 | YES<br>YES<br>YES<br>YES | $f_{24}$<br>$f_{36}$<br>$f_{44}$<br>$f_{20/60}$ | TDMA/TDD<br>CDMA/TDD<br>FDMA/TDD<br>FDMA/FDD | $\pi/4$-QPSK<br>GMSK<br>FSK<br>FM | B4675-8 | CODE DIVISION |
| 113 | YES<br>YES<br>YES<br>YES | $f_6$<br>$f_{23}$<br>$f_{26}$<br>$f_{45/77}$ | CDMA/TDD<br>TDMA/TDD<br>FDMA/TDD<br>FDMA/FDD | GMSK<br>$\pi/4$-QPSK<br>FSK<br>FM | B4681-4 | CODE DIVISION |
| | | | | | | |
| 135 | YES<br>YES<br>NO<br>YES | $f_{13}$<br>$f_{26}$<br>$f_{35}$<br>$f_{56/70}$ | TDMA/TDD<br>CDMA/TDD<br>FDMA/TDD<br>FDMA/FDD | $\pi/4$-QPSK<br>GMSK<br>FSK<br>FM | B4622-5 | CODE DIVISION |

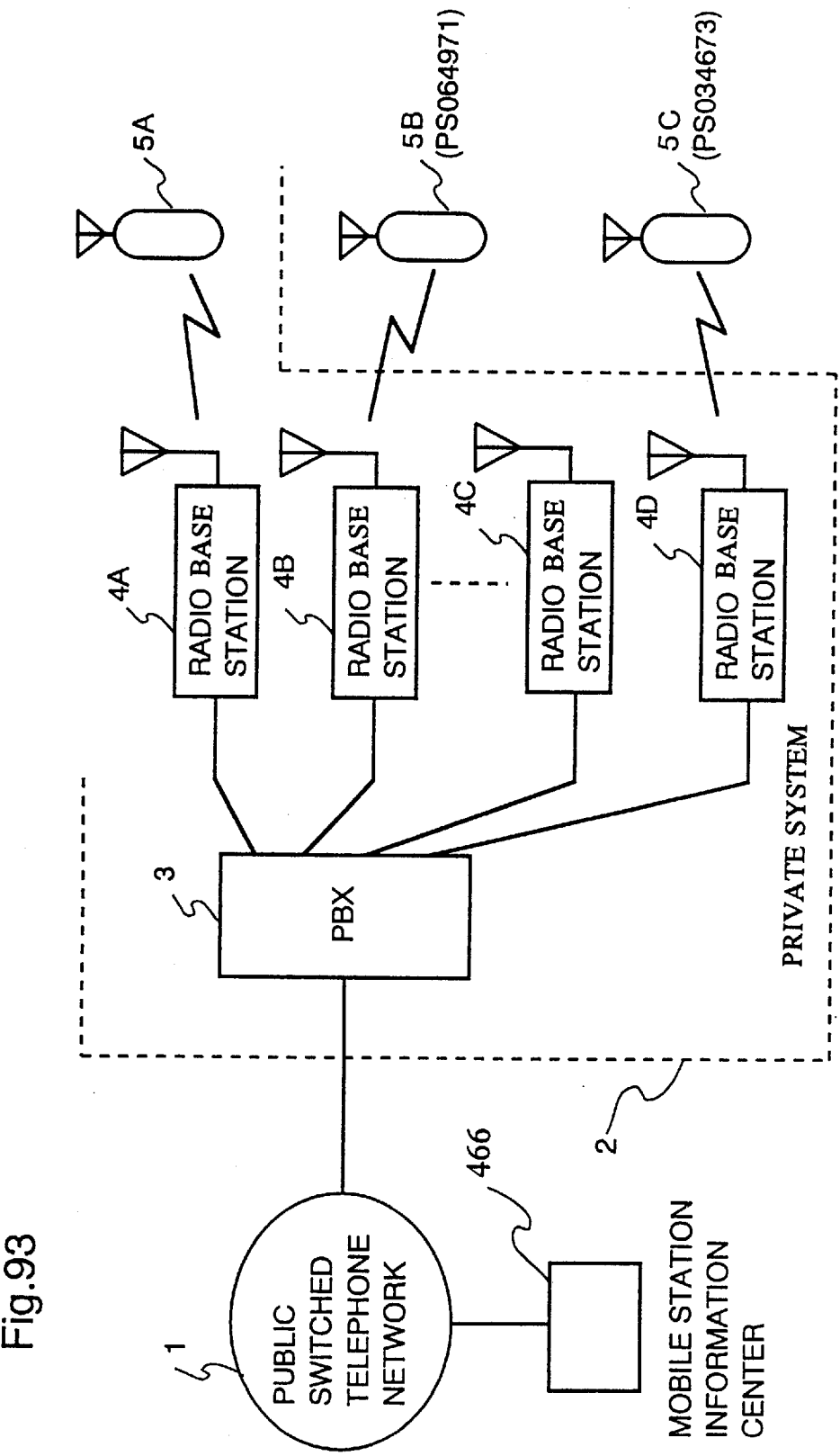

ACCESS PROCEDURE OF LINK LEVEL
WHEN CALLING OUT FROM MOBILE STATION

EXAMPLE OF ACCOUNTING (COMMUICATION CHANNEL EFFICIENCY COMMUNICATION TIME) MEMORY FORMAT OF PBX

FDMA-$f_9$ COMMUNICATION CHANNEL EFFICIENCY : $\Delta F_9 \times \Delta T_x$
TDMA-$f_1$ COMMUNICATION CHANNEL EFFICIENCY : $\Delta F_1 \times \Delta T_1$
CDMA-$f_6$ COMMUNICATION CHANNEL EFFICIENCY : $\Delta F_6 \times \Delta T_1/N$ EXAMPLE OF SETTING COMMUNICATION CHANNEL EFFICIENCY BASED ON TIME SLOT AND OCCUPIED FREQUENCY Fig. 100 AN EXAMPLE OF ACCOUNTING SYSTEM CONSIDERING RELIABILITY OF COMMUNICATION CHANNEL FDMA-$f_9$ COMMUNICATION CHANNEL EFFICIENCY : $\Delta F_9 \times \Delta T_X$
TDMA-$f_1$ COMMUNICATION CHANNEL EFFICIENCY : $\Delta F_1 \times \Delta T_1$
CDMA-$f_6$ COMMUNICATION CHANNEL EFFICIENCY : $\Delta F_6 \times \Delta T_1/N$ CDMA COMMUNICATION
    CHANNEL RELIABILITY = S/n THE CURRENT NUMBER OF
COMMUNICATION CHANNELS IN USE : n
(THE RELIABILITY IS HIGH WHEN n ≥ 1)

Fig.106

TABLE 5    AN EXAMPLE OF SETTING THE METHOD OF MOBILE STATION (SELECTION OF THE UNDERLINED METHOD)

| CELL No. | MOBILE STATION NUMBER | LEVEL | ACCESS METHOD | MODULATION METHOD | SS CODE | SPEECH CODING |
|---|---|---|---|---|---|---|
| 110 | PS046971 (PORTABLE) | <u>1</u> | <u>TDMA/TDD</u> | <u>π/4-QPSK</u> |  | <u>16K</u> |
|  |  | 2 | CDMA/TDD | GMSK | B3654 | 16K |
|  |  | 3 | FDMA/FDD | FM |  | ANALOG |
|  | 2111 (MOBILE) | 1 | CDMA/TDD | GMSK | B3624 | 8K |
|  |  | 2 | TDMA/TDD | π/4-QPSK |  | 16K |
|  |  | 3 | FDMA/TDD | GMSK |  | 12K |
|  |  | 4 | FDMA/FDD | FM |  | ANALOG |
|  | 2113 (MOBILE) | 1 | TDMA/TDD | π/4-QPSK |  | 16K |
|  |  | 2 | CDMA/TDD | π/4-QPSK | B3679 | 16K |
|  |  | 3 | FDMA/TDD | π/4-QPSK |  | 32K |
|  |  | 4 | FDMA/FDD | FM |  | ANALOG |
| 111 | PS034673 (PORTABLE) | 3 | CDMA/TDD | GMSK | B3681 | 8K |
|  |  | 2 | FDMA/TDD | GMSK |  | 12K |
|  |  | <u>1</u> | <u>FDMA/FDD</u> | <u>FM</u> |  | <u>ANALOG</u> |
| 135 | PS092373 (PORTABLE) | <u>1</u> | <u>CDMA/TDD</u> | <u>GMSK</u> | B3692 | <u>8K</u> |
|  |  | 3 | FDMA/TDD | π/4-QPSK |  | 32K |
|  |  | 4 | FDMA/FDD | FM |  | ANALOG |

A FLOW-CHART OF SETTING PRIORITY ASSIGNMENT

FDMA-$f_9$ COMMUNICATION CHANNEL EFFICIENCY : $\Delta F_9 \times \Delta T_X$
TDMA-$f_1$ COMMUNICATION CHANNEL EFFICIENCY : $\Delta F_1 \times \Delta T_1$
CDMA-$f_6$ COMMUNICATION CHANNEL EFFICIENCY : $\Delta F_6 \times \Delta T_1/N$ CDMA COMMUNICATION
    CHANNEL RELIABILITY = S/n THE CURRENT NUMBER OF
COMMUNICATION CHANNELS IN USE : n
(THE RELIABILITY IS HIGH WHEN n ≧ 1)

HAND OFF PROCEDURE TO THE ADJACENT SYSTEM

Fig. 113

TABLE 6

CONTROL CHANNEL INFORMATION IN THE ADJACENT SYSTEMS

| TITLE OF THE SYSTEM | CELL No. | FREQ. | ACCESS METHOD | MODULATION METHOD | SS CODE | REMARKS |
|---|---|---|---|---|---|---|
| TU-KA ASHIYA | 110 | $f_1$ | TDMA/TDD | $\pi/4$-QPSK | B3654-7 | Slotted Aloh |
| | | $f_6$ | CDMA/TDD | GMSK | | CODE DIVISION |
| | | $f_{31}$ | FDMA/TDD | FSK | | Slotted Aloh |
| | | $f_{41/65}$ | FDMA/FDD | SPEECH FSK | | Slotted Aloh |
| | 111 | $f_3$ | CDMA/TDD | GMSK | B3621-8 | CODE DIVISION |
| | | $f_7$ | TDMA/TDD | $\pi/4$-QPSK | | Slotted Aloh |
| | | $f_{33}$ | FDMA/TDD | FSK | | Slotted Aloh |
| | | $f_{16/65}$ | FDMA/FDD | SPEECH FSK | | Slotted Aloh |
| | 112 | $f_9$ | TDMA/TDD | $\pi/4$-QPSK | B3675-8 | Slotted Aloh |
| | | $f_{13}$ | CDMA/TDD | GMSK | | CODE DIVISION |
| | | $f_{35}$ | FDMA/TDD | FSK | | Slotted Aloh |
| | | $f_{43/65}$ | FDMA/FDD | SPEECH FSK | | Slotted Aloh |
| CELLULAR NISHINOMIYA | 213 | $f_{11}$ | CDMA/TDD | GMSK | B3681-4 | CODE DIVISION |
| | | $f_{15}$ | TDMA/TDD | $\pi/4$-QPSK | | Slotted Aloh |
| | | $f_{37}$ | FDMA/TDD | FSK | | Slotted Aloh |
| | | $f_{20/57}$ | FDMA/FDD | SPEECH FSK | | Slotted Aloh |
| DOCOMO TAKARAZUKA | 435 | $f_2$ | TDMA/TDD | $\pi/4$-QPSK | B3622-5 | Slotted Aloh |
| | | $f_6$ | CDMA/TDD | GMSK | | CODE DIVISION |
| | | $f_{32}$ | FDMA/TDD | FSK | | Slotted Aloh |
| | | $f_{22/69}$ | FDMA/FDD | SPEECH FSK | | Slotted Aloh |

Fig.114

TABLE 7

CONTROL CHANNEL INFORMATION IN THE ADJACENT SYSTEMS

| TITLE OF THE SYSTEM | CELL No. | VA-CAN-CY? | FREQ. | ACCESS METHOD | MODULATION METHOD | SS CODE | REMARKS |
|---|---|---|---|---|---|---|---|
| TU-KA ASHIYA | 110 | YES<br>YES<br>NO<br>YES | $f_4$<br>$f_{16}$<br>$f_{24}$<br>$f_{31/75}$ | TDMA/TDD<br>CDMA/TDD<br>FDMA/TDD<br>FDMA/FDD | $\pi/4$-QPSK<br>GMSK<br>FSK<br>FM | B4654-7 | CODE DIVISION |
| TU-KA ASHIYA | 111 | YES<br>YES<br>YES<br>YES | $f_{14}$<br>$f_{26}$<br>$f_{36}$<br>$f_{6/57}$ | CDMA/TDD<br>TDMA/TDD<br>FDMA/TDD<br>FDMA/FDD | GMSK<br>$\pi/4$-QPSK<br>FSK<br>FM | B4621-8 | CODE DIVISION |
| TU-KA ASHIYA | 112 | YES<br>YES<br>YES<br>YES | $f_{24}$<br>$f_{36}$<br>$f_{44}$<br>$f_{20/56}$ | TDMA/TDD<br>CDMA/TDD<br>FDMA/TDD<br>FDMA/FDD | $\pi/4$-QPSK<br>GMSK<br>FSK<br>FM | B4675-8 | CODE DIVISION |
| CELLULAR NISHINOMIYA | 213 | YES<br>YES<br>YES<br>YES | $f_6$<br>$f_{23}$<br>$f_{26}$<br>$f_{45/77}$ | CDMA/TDD<br>TDMA/TDD<br>FDMA/TDD<br>FDMA/FDD | GMSK<br>$\pi/4$-QPSK<br>FSK<br>FM | B4681-4 | CODE DIVISION |
| DOCOMO TAKARAZUKA | 435 | YES<br>YES<br>NO<br>YES | $f_{13}$<br>$f_{26}$<br>$f_{35}$<br>$f_{55/70}$ | TDMA/TDD<br>CDMA/TDD<br>FDMA/TDD<br>FDMA/FDD | $\pi/4$-QPSK<br>GMSK<br>FSK<br>FM | B4622-5 | CODE DIVISION |

HANDOFF PROCEDURE TO THE
ADJACENT SYSTEM OF THE MOBILE
STATION HAVING PRIORITY

FLOW-CHART OF SETTING
PRIORITY ASSIGNMENT

Fig. 119

| SLOT NO. | FREQ. MHz | TRANSMITTING ELECTRIC POWER | TX TYPE | DATA RATE $R_D$ | CHIP RATE $1/t_{SP}$ | CHIP CODE POLYNOMIAL | CHIP CODE INITIAL VALUE |
|---|---|---|---|---|---|---|---|
| 1 | $f_6$ | $ATT_1$ | CDMA | $R_{D1}$ | $R_{C1}=N_1 R_{D1}$ | 61 | 3328 |
| 2 | $f_3$ | $ATT_2$ | CDMA | $R_{D2}$ | $R_{C2}=N_2 R_{D2}$ | 12 | 2635 |
| 3 | $f_{11}$ | $ATT_3$ | TDMA | $R_{D3}$ | 0 | 34 | 9013 |
| 4 | $f_{12}$ | $ATT_4$ | CDMA | $R_{D4}$ | $R_{C4}=N_4 R_{D4}$ | 07 | 7540 |
| CPU SELECTS THE DESIGNATED SLOT | FREQ. CONT. | TRANSMITTING ELECTRIC POWER CONTROLLER | | | CHIP RATE CONTROLLER | POLYNOMIAL & INITIAL VALUE SETTING CONTROLLER | |

Fig. 120

| | SLOT NO. | DATA RATE $R_D$ (bps) | TRANSMITTING TYPE | CHIP RATE $1/t_{SP}$ (cps) |
|---|---|---|---|---|
| ELECTRIC WAVE OF RADIO BASE STATION OF PUBLIC SYSTEM | 1 | 19.2K | TDMA | 0 |
| | 2 | 19.2K | CDMA | 12.288M |
| | 3 | 192K | TDMA | 0 |
| | 4 | 9.6K | CDMA | 6.144M |
| ELECTRIC WAVE OF RADIO BASE STATION OF PRIVATE SYSTEM | 1 | 19.2K | CDMA | 12.288M |
| | 2 | 9.6K | CDMA | 6.144M |
| | 3 | 192K | TDMA | 0 |
| | 4 | 19.2K | CDMA | 12.288M |

477
478
479

| | MOBILE STATION NO. | SLOT NO. | DATA RATE $R_D$ (bps) | TX TYPE | CHIP RATE $1/t_{SP}$ (cps) | RECEIVING ELECTRIC FIELD STRENGTH | NUMBER OF SIMULTANEOUS INFORMATION CHS |
|---|---|---|---|---|---|---|---|
| REC. ELEC. FIELD STRENGTH FROM MOBILE ST. IN BASE ST. OF PUBLIC SYS. | 322 | 1 | 19.2K | TDMA | 0 | - | 1 |
| | 101 | 2 | 19.2K | CDMA | 12.288M | $RSS_{101}$ | 36 |
| | 479 | 3 | 192K | TDMA | 0 | - | 1 |
| | - | 4 | 9.6K | CDMA | 6.144M | - | 14 |
| REC. ELEC. FIELD STRENGTH FROM MOBILE ST. IN BASE ST. OF PRIVATE SYS. | - | 1 | 19.2K | CDMA | 12.288M | $RSS_{101}$ | 7 |
| | - | 2 | 9.6K | CDMA | 6.144M | - | 15 |
| | 328 | 3 | 192K | TDMA | 0 | - | 1 |
| | 101 | 4 | 19.2K | CDMA | 12.288M | $RSS_{101}$ | 31 |

CLASSIFICATION OF MULTIPLE ACCESS METHOD

| METHOD | | TRANSMITTING SIGNAL | MULTIPLEXING | AN EXAMPLE OF MODULATION METHOD | THE NUMBER OF CARRIER OF SIMULTANEOUS AMPLIFICATION / REPEATER |
|---|---|---|---|---|---|
| FDMA | SCPC | ANALOG / DIGITAL | — | LOW SPEED FM/PSK (CONSECUTIVE OR BURST MODE)* | A LARGE NUMBER |
| | MCPC | ANALOG / DIGITAL | FDM / TDM | LOW SPEED FM/PSK (CONSECUTIVE OR BURST MODE)* | |
| TDMA | | DIGITAL | TDM | HIGH SPEED PSK (BURST MODE) | 1 |
| CDMA | | DIGITAL | — | PSK (CONSECUTIVE MODE) | A LARGE NUMBER (SOMETIMES THERE OCCURS AN OVERLAP OF SPECTRUM) |

* FREQUENCY DIVISIONAL SIGNAL IS SOMETIMES TRANSMITTED AS BURST MODE FOR EFFECTIVE USE OF THE ELECTRIC POWER OF THE REPEATER

Fig.128 PRIOR ART

CHARACTERISTICS OF MULTIPLE ACCESS METHODS

| METHOD | ADVANTAGE | DISADVANTAGE |
|---|---|---|
| TDMA | (1) EFFECTIVE USE OF ELECTRIC POWER OF REPEATER.<br>(2) TRANSMISSION OF DIGITAL SIGNAL BY VARIOUS SPEEDS.<br>(3) FLEXIBLE CHANGE OF COMMU. CHANNEL CAPACITY FOR EACH STATION<br>(4) EASY CONNECTION BETWEEN BEAMS IN MULTI BEAM COMMU. METHOD | (1) TX CAPACITY OF A REPEATER IS SMALL (AS INCREASING THE NUMBER OF CARRIES, TX EFFICIENCY LOWERS.)<br>(2) LACKING AFFINITY WITH DIGITAL SIGNAL TRANSMISSION OF VARIOUS SPEEDS. |
| FDMA | (1) THE OPERATION SPEED OF MODULATOR & DEMODULATOR CAN BE SLOW.<br>(2) NO COMPLICATED SYNCH. TO AVOID INTERFERENCE WITH OTHER TX SIGNAL. MULTIPLE ACCESS CAN BE EASILY ACCOMPLISHED.<br>(3) COMM. BY A SMALL EARTH STATION. | (1) NEED SYNC. TO AVOID COLLISION WITH OTHER TX SIGNAL. BASEBAND PROC. IS COMPLICATED<br>(2) NEED ELECTRIC POWER OF EARTH STATION CORRESPONDING TO THE SPEED OF A REPEATER |
| CDMA | (1) CH. (CODE) IS FIXEDLY ASSIGNED TO EACH STATION. DEMAND ASSIGNED TO EACH STATION. DEMAND ASSIGNMENT IS POSSIBLE.<br>(2) STRONG FOR INTERFERENCE | (1) WIDE BAND REPEATER IS REQUIRED<br>(2) FREQ. USE RATE [bit/s/Hz] IS LOW |

THE NUMBER OF ACCESS STATIONS

AN EXAMPLE OF TRANSMISSION CAPACITY [/REPEATER] FOR THE NUMBER OF CARRIERS IN EACH MULTIPLE ACCESS METHOD (A REPEATER OF 120 MHZ IS ASSUMED TO BE USED. TRANSMISSION SPEED IS 120Mbit/s IN CASE OF 1 CARRIER. IN FDMA METHOD, 1 CARRIER WAVE / STATION IS ASSUMED)

ENVELOPE CORRELATION NETWORK

MOBILE COMMUNICATION SYSTEM USING VARIOUS MULTIPLE ACCESS METHODS

BACKGROUND OF THE INVENTION

1. Field of the Invention

This invention relates to a mobile communication system which includes, a plurality of mobile and/or portable radio stations, radio base stations and at least an exchange system and which can cope with a radio communication system applying variable access methods, modulation methods and transmission methods. More particularly the invention relates to a mobile communication system which includes, a plurality of mobile and/or portable radio station, a radio base stations and at least an exchange and which realizes roaming and handover between systems using different access methods.

2. Description of the Related Art

There is currently known a mobile communication system connected wirelessly between automobile communication apparatus or a portable mobile communication apparatuses (hereinafter called "mobile stations") and plurality of radio base stations of a private communication system or a public communication system. The radio base station is connected to an exchange.

As multiple access methods, there are a Frequency Division Multiple Access (FDMA) method, a Time Division Multiple Access (TDMA) method, and a Code Division Multiple Access (CDMA) method.

As modulation methods, there are digital modulation methods such as a Gaussian Minimum Shift Keying (GMSK), a π/4-quarter differential phase shift keying (π/4-QDPSK), a 16-value quadrature amplitude modulation (16QAM), and a multi-subcarrier 16-value quadrature amplitude modulation (M16QAM). In addition, as the modulation method, there are analog modulation methods (e.g., an FM modulation method).

Further, in order to realize bidirectional communication, a Time Division Duplex (TDD) method, which has a time-divided transmission and reception, and a Frequency Division Duplex (FDD) method, which has a frequency-divided transmission and reception, are utilized.

FIGS. 127 through 129 are explanatory views of conventional multiple access methods shown in Electric In formation Communication Handbook (page 2449, satellite communication system, the fourth section, issued Mar. 30, 1988). FIG. 127 shows a classification of the multiple access methods. FIG. 128 shows characteristics of the multiple access methods. FIG. 129 shows one example of transmission volume of the multiple access methods in case of satellite communication system.

The FDMA method is a multiple access method which divides a frequency band for transmitting and receiving signals. The TDMA method is a multiple access method which divides time for transmitting and receiving signals with a common frequency. The CDMA method is a multiple access method, in which a specific code is used to identify a communication channel. In the CDMA method, in case of transmitting signals, a specific code is allocated to each communication channel and the spread-spectrum encoding is carried out for the same frequency carrier as the one for receiving being modulated by the code. On the receiving side, the communication channel is identified by applying a code synchronization. The CDMA method may be referred to as a spread spectrum multiple access method. The FDMA method has an advantage in that an antenna, a power amplifier, and a common carrier adapter of the land station are more simplified, compared to the TDMA method. On the other hand, the FDMA method has a disadvantage in that linearity is required in a repeater. In the CDMA method, the transmission capacity of each repeater is rather small, compared to that in the FDMA method or the TDMA method. This is due to the fact that enough gain cannot be obtained because the bandwidth of the repeater, which is installed communication satellite, is narrow and the number of channels is limited because of interference noise between carrier waves. In an automobile communication system requiring no relay, however, since there is no limit in process gain due to the narrow band of large-output relays, the CDMA method can increase the transmission capacity. Further, because the CDMA method uses a specific code, it is excellent in keeping the communication secret and interference-proof.

As related art, the following technical documents are identified:

1. Japanese Patent Laid-Open Publication No. Hei 6-120886, for "Mobile Communication System", filed Oct. 5, 1992. Inventors: Takahashi and Uchida.
2. Japanese Patent Laid-Open Publication No. Hei 6-216836, for "Mobile Communication System", filed Jan. 20, 1993. Inventors: Uchida and Kimura.
3. Japanese Patent Laid-Open Publication No. Hei 7-154859, for "Mobile Station, Exchange and Mobile Communication System", filed Nov. 29, 1993. Inventors: Uchida and Mimura.

In each of the above three documents, only one type of multiple access method is employed in the mobile communication system. Further, only one type of modulation method is employed in the communication system.

4. WO 90/13212, for "Digital Radio Communication System and Two-Way Radio". Applicant: Motorola.

The invention disclosed in this Motorola patent may be considered as based on the same problem as the present invention.

5. U.S. Pat. No. 5,260,967, for CDMA/TDMA Spread Spectrum Communications System and Method", filed Jan. 13, 1992 by D. L. Schilling and assigned to IDC Inc.

This U.S. Patent discloses a system in which time division multiple access (TDMA) is carried out for the synchronization code and plural data and then the spread-spectrum is performed with a chip code. According to claims 52 and 56 of the U.S. Patent, the TDMA is carried out for the spread-spectrum-processed-synchronization-code and the combined-spread-spectrum signals.

6. U.S. Pat. No. 5,299,266, for "Adaptive Power Control for a Spread Spectrum Communications System and Method", filed Nov. 19, 1991 by D. L. Schilling and assigned to IDC Inc. discloses a mobile station which receives the spread spectrum electric wave from one land station and has a transmitter to transmit the second spread-spectrum signal corresponding to a strength of the receiving signal (AGC (Auto Gain Control) signal).

7. Japanese Patent Laid-Open Publication No. Hei 5-145470, for "Multiple Access Mobile Communication System", filed Nov. 18, 1991 by NTT (Inventors: Hata Seiji, et al) discloses a system which is characterized in that the electric wave of the CDMA method of different time slots is assigned to each of the different sector cells.

8. U.S. Pat. No. 5,345,467, for CDMA Cellular Hand-Off Apparatus and Method", filed Oct. 8, 1992 by G. R. Lomp, et al and assigned to IDC Inc. discloses the mobile station which received the first spread spectrum electric wave from the first land station provides another correlation receiver, such as a matching filter, to receive the second spread-spectrum signal from the second land station.

9. U.S. Pat. No. 5,311,542, for "Spread Spectrum Communication System", filed Oct. 9, 1992 by Kenneth C. Eder and assigned to Honeywell Inc. discloses a system in which time multiplication is performed for the plural time division information having preambles and then the spread-spectrum is then performed.

10. U.S. Pat. No. 5,319,672, for Spread Spectrum Communication System", filed Mar. 1, 1993 by M. Sumiya, et al and assigned to KDD Co. discloses a system in which the land station transmits plural spread-spectrum electric waves and has a plurality of transmitters whose transmitting frequencies are different each other.

11. WO 94/21056, for "Random Access Communication Method by Use of CDMA and System for Mobile Stations which Use the Method", filed Mar. 5, 1993 by NTT Docomo (Inventors: Umeda, et al) describes that "spread-spectrum code selection is performed by each burst" in claim 19 and subsequent claims and shows "multiple random access" in FIGS. 9 and 14.

12. WO 93/19537, for "Bidirectional Communication Method in Cellular System, filed Mar. 3, 1995 by ERICSSON.

13. WO 93/03558, for "Communication System with Channel Selection", filed Feb. 18, 1993 by MOTOROLA 14. EP 471656, for "Cellular Mobile Radio Telephone System Reliability Enhancement", filed Feb. 19, 1992 by ERICSSON.

15. EP 209185, for "Free-channel Search for Cellular Mobile Radio having Mobile Station Comparing Common-channel Reception with Interference Threshold and Identifying Interfering Fixed Station", filed Jan. 21, 1987 by PHILIP.

Patent Family JP62015941 filed Jan. 24, 1987.

FIG. 130 of the accompanying drawings shows a conventional correlator to be used on the receiving side of the CDMA method. In FIG. 130, the portion enclosed by dotted lines is an envelope correlation network for detecting the correlation between the spread-spectrum code and the received signal. The correlator forms a noncoherent delay-lock loop using the envelope correlation network and judges the correlation with the received spread-spectrum code using the formed loop.

However, in the conventional mobile communication system, there was a problem that the user could not select the most suitable access method among various access methods. Even if any of the foregoing related art publications proposes any similar means, it is totally silent about a more detailed configuration and method in order to realize it.

For example, the above publication 5 is silent about a time multiplication of the information of the constantly divided time slot of the TDMA method in which the spread-spectrum is not performed and the information in which the spread-spectrum is performed. It still silent that the information in which the spread-spectrum is performed by CDMA method is divided by a definite time section.

Further, in the above publication 6, two sets of receivers and transmitters are required in the mobile station when two information channels of the CDMA method are simultaneously set between two land stations and one mobile station in order to realize the seamless hand-off.

In the above publication 7, it is not realized that the electric wave of the CDMA method is set to be the same time slot of the TDMA method.

In the above publication 8, two sets of receivers, such as correlation receivers, and two sets of transmitters are required in the mobile station when two information channels of the CDMA method are simultaneously set between two land stations and one mobile station in order to realize the seamless hand-off.

In the above publication 9, compared to the above publication 5, it is new only in that the time division information has preamble.

In the above publication 10, two sets of receivers, such as correlation receivers, and two sets of transmitters are required in the mobile station when two information channels of the CDMA method are simultaneously set between two land stations and one mobile station in order to realize the seamless hand-off.

The above publication 11 is totally silent about the coexistence of the TDMA method and the CDMA method, the coexistence of different data rates, the coexistence of different chip rates, the sharing of the time frame configuration of the TDMA method and the CDMA method, and the shoring of the channel configuration of the TDMA method and the CDMA method.

SUMMARY OF THE INVENTION

With the foregoing problems in view, it is an object of this invention to provide a mobile communication system in which various access methods may be selected according to the user's priority.

In order to accomplish the above object, according to a first aspect of the invention, there is provided a mobile communication system which includes mobile stations and radio base stations for performing wireless communication between the stations using a predetermined method selected from a number of multiple access methods, wherein each of the stations comprises: TDMA communication means for assigning TDMA signals to time slots, which are contained in a frame, to perform communication based on a TDMA method; CDMA communication means having at least one spread-spectrum code generator and adapted for communication of CDMA signals based on a CDMA method; the CDMA communication means being adapted for assigning spread-spectrum codes, which are generated by the spread-spectrum code generator, to the time slot.

According to a second aspect of the invention, there is provided mobile communication system which includes a mobile stations and radio base stations for performing wireless communication between the stations using a predetermined method selected from a number of multiple access methods, wherein each of the stations comprising: TDMA communication means for assigning TDMA signals to time slots, which are contained in a frame, to perform communication based on a TDMA method; and CDMA communication means having a spread-spectrum code generator, which generates a number of spread-spectrum codes, and adapted for communication of CDMA signals based on a CDMA method; the CDMA communication means being adapted for assigning different spread-spectrum signals, which are generated by the spread-spectrum code generators, respectively to the time slots.

According to a third aspect of the invention, there is provided a mobile communication system which includes mobile stations and radio base stations for performing wireless communication between the stations using a predetermined method selected from a number of multiple access methods, wherein each of the stations comprising: TDMA communication means for assigning TDMA signals to time slots, which are contained in a frame, based on a TDMA method; and CDMA communication means having a number of spread-spectrum code generators, which generate different spread-spectrum codes, and adapted for communication of CDMA signals based on a CDMA method; the CDMA communication means being adapted for assigning the different spread-spectrum signals, which are generated by the spread-spectrum code generators, respectively to the time slots.

In the foregoing invention, when transmitting and receiving the time-divided CDMA signal, the time slot to be generated by the TDMA communication means may be effectively utilized.

According to a fourth aspect of the invention, there is provided a mobile communication system which includes mobile station and radio base stations for performing wireless communication between the stations using a predetermined method selected from a number of multiple access methods, wherein each of the stations comprises: TDMA communication means for assigning TDMA signals to time slots, which are contained in a frame, to perform communication based on a TDMA method; CDMA communication means having at least one spread-spectrum code generator and adapted for communication of CDMA signals based on a CDMA method; and control means for controlling each station to selectively assign the TDMA signal or the CDMA signal to each of the time slots; the CDMA communication means being adapted for assigning spread-spectrum signals, which are generated by the spread-spectrum code generator, to the time slot in such a manner that both the TDMA and CDMA signals exist in the time slots.

According to a fifth aspect of the invention, there is provided a mobile communication system which includes mobile stations and radio base stations for performing wireless communication between the stations using a predetermined method selected from a number of multiple access methods, wherein each of the stations comprises: TDMA communication means for assigning TDMA signals to time slots, which are contained in a frame, to perform communication based on a TDMA method; CDMA communication means having a spread-spectrum code generator, which generates a number of spread-spectrum codes, and adapted for communication of CDMA signals based on a CDMA method; and control means for controlling each station to selectively assign the TDMA signal or the CDMA signal to each of the time slots; the CDMA communication means being adapted for assigning different spread-spectrum codes, which are generated by the spread-spectrum code generator, respectively to the time slots in such a manner that both the TDMA and CDMA signals exist in the time slots.

According to a sixth aspect of the invention, there is provided a mobile communication system which includes mobile stations and radio base stations for performing wireless communication between the stations using a predetermined method selected from a number of multiple access methods, wherein each of the stations comprises: TDMA communication means for assigning TDMA signals to time slots, which are contained in a frame, to perform communication based on a TDMA method; CDMA communication means having a number of spread-spectrum code generators, which generate different spread-spectrum codes, and adapted for communication of CDMA signals based on a CDMA method; and control means for controlling each station to selectively assign the TDMA signal or the CDMA signal to each of the time slots; the CDMA communication means being adapted for assigning the different spread-spectrum codes, which are generated by the spread-spectrum code generators, respectively to the time slots in such a manner that both the TDMA and CDMA signals exist in the time slots.

According to a seventh aspect of the invention, in each of the fourth, fifth and sixth aspects, the control means controls both the communication means in such a manner that both the TDMA and CDMA signals exist in one frame. In this seventh embodiment of the invention, even when a talking connection is provided in a certain access method, it is possible to change the access method, without cutting off the channel, by using another time slot by a different access method.

According to an eighth aspect of the invention, in each of the fourth, fifth and sixth embodiment of the invention, the control means controls the generation of the spread-spectrum codes by the spread-spectrum code generator.

According to a ninth aspect of the invention, in each of the fourth, fifth and sixth embodiments of the invention, the control means decides an access method to be used for communication with another station based on an access method deciding condition and assigns signal, which are according to the decided access method, to a predetermined time slot.

According to a tenth aspect of the invention, in the ninth aspect of the invention, the mobile communication system further includes an exchange for controlling communications between the mobile stations and the radio base stations, the exchange having storage means for storing the access method deciding condition.

In each of the ninth and tenth embodiments of the invention, when the mobile station is in communication with the radio station in an access method, it is possible to change the communication into another mode by another access method based on an access method deciding condition, such as channel efficiency, channel reliability or the user's demand.

According to an eleventh aspect of the invention, in each of the fourth, fifth and sixth invention, the CDMA communication means at each radio base station has channel coders located in association with the respective time slots for performing a primary modulation to transmitted information, and the spread-spectrum code generator for generating different spread-spectrum codes one for each of the time slots, and wherein the control means assigns the CDMA signals generated based on product information of an output of each channel coder associated with the respective time slot and the corresponding spread-spectrum code.

According to a twelfth aspect of the invention, in each of the fourth, fifth and sixth embodiments of the invention, the CDMA communication means has a number of channel coders in association with each of the time slots for performing a primary modulation to transmitted information, and the spread-spectrum code generator for generating different spread-spectrum codes one for each of the time slots, and wherein the control means assigns the CDMA signals generated based on product information of an output of each channel coder and each spread-spectrum code to the time slots to assign a number of channels to one of the time slots.

According to a thirteenth aspect of the invention, in the twelfth embodiment of the invention, the control means sets a number of the channels of the same access method for the same time slot.

According to a fourteenth aspect of the invention, in each of the fourth, fifth and sixth embodiments of the inventions, the mobile station has receiving-state detecting means for detecting a state of receiving signals from a number of the radio base stations, and the control means sets, based on the detected state of receiving signals, a separate channel between the mobile station and another radio base station using a time slot different from the time slot presently occupied by the channel. With this arrangement, even while the mobile station is in communication with one radio base station, it is possible to realize the seamless hand-off without discontinuing communication between the mobile station and another radio base station.

According to a fifteenth aspect of the invention, in any of the first through sixth embodiments of the invention, the CDMA communication means has means for generating empty time slot.

According to a sixteenth aspect of the invention, in any of the first through sixth inventions, the CDMA communication means has an initial value setting unit for arbitrarily setting an initial value of the spread-spectrum code generated by each spread-spectrum code generator.

According to a seventeenth aspect of the invention, there is provided a mobile communication system which includes mobile stations and radio base stations for performing wireless communication between the stations using a predetermined method selected from a number of multiple access methods, wherein each of the stations is loaded with a spread-spectrum code generator for generating a number of spread-spectrum codes and has a noncoherent delay lock loop for detecting the spread-spectrum code assigned to the CDMA signal contained in each time slot received based on the TDMA method. With this arrangement, it is possible to detect the spread-spectrum code, which is contained in the received time slot, by a single set of receivers.

According to an eighteenth aspect of the invention, in any of the first through sixth and seventeenth embodiments of the invention, the CDMA communication means has a spread-spectrum code value setting unit for arbitrarily setting a value of the spread-spectrum code, which is generated by the spread-spectrum code generator, by a generating polynomial.

According to a nineteenth aspect of the invention, in the eighteenth embodiments of the invention, the spread-spectrum code value setting unit has a group of switches for freely changing a feedback loop including a shift register. With this arrangement, since it is possible to render the spread-spectrum code generator to generate different spread-spectrum codes, only a single set of receiver and transmitter is required even when handling plural spread-spectrum codes.

According to a twentieth aspect of the invention, in each of the fourth, fifth and sixth embodiments of the invention, the CDMA communication means has a chip clock control unit for controlling a chip clock of the spread-spectrum code generator. With this arrangement, when assigning the TDMA signals to the time slots, the generation of any chip clock is stopped so that any spread-spectrum code is prevented from being generated. On the other hand, when assigning the CDMA signals to the time slots, chip clocks are generated and are then supplied to the spread-spectrum code generator to cause the latter to generate spread-spectrum codes.

According to a twenty-first aspect of the invention, in each of the fourth, fifth and sixth embodiments of the invention, the CDMA communication means has a chip rate control unit for controlling a chip rate of the spread-spectrum code generator. Accordingly it is possible to adjust the width of frequency band of spread-spectrum in the case of communication in the CDMA method.

According to a twenty-second aspect of the invention, in each of the fourth, fifth and sixth embodiments of the invention, each station has a carrier frequency control unit for controlling a carrier frequency of each time slot. Accordingly it is possible to supply a different carrier frequency for every time slot.

BRIEF DESCRIPTION OF THE DRAWINGS

FIG. 42 is a table showing an example of setting chip rates in a chip rate setting memory of FIG. 41;

FIG. 61 is a flowchart showing the procedure in which the mobile station secures a link level in the mobile communication system of FIG. 58;

FIG. 68 is a table showing an example in which a TDMA or CDMA signal to be transmitted from the transmitter of FIG. 67 is assigned to each time slot;

FIGS. 71A and 71B are a table showing an example of combination of information input No., buffer memory No., channel coder/spread-spectrum code generator No., time slot No., data rate, transmission type and chip rate in the radio base station of FIG. 70;

FIGS. 74A and 74B are a table showing an example of combination of information input No., buffer memory No., channel coder/spread-spectrum code generator No., time slot No., data rate, transmission type and chip rate in the radio base station of FIG. 73;

FIG. 76 is a fragmentary block diagram showing a transmitter of a CDMA communication unit in a radio base station of a mobile communication system according to a seventh embodiment of the invention;

FIGS. 77A and 77B are a table showing an example of combination of information input No., buffer memory No., channel coder/spread-spectrum code generator No., time slot No., data rate, transmission type and chip rate in the radio base station of FIG. 76;

FIG. 80 is a table showing an example of setting control information possessed by a CPU of FIG. 79;

FIG. 82 is a table showing an example of setting control information possessed by a CPU of FIG. 80;

FIG. 87 is a table showing an example in which the priority of efficiency of available access methods associated with the cells of FIG. 86 is set;

FIG. 88 is a table showing an example in which the priority of efficiency of both mobile stations associated with the cells of FIG. 86 and access methods available to the mobile stations;

FIG. 91 is a table showing control channel information to be notified to the mobile station from the radio base station via a control channel in the twelfth embodiment;

FIG. 92 is a table showing information channel information to be notified to the radio base station from the mobile station via the control channel in the twelfth embodiment;

FIG. 93 is a block diagram of a mobile communication system according to a thirteenth embodiment of the invention, showing the system when a position registration request is made from the mobile station to the radio base station;

FIG. 106 is a block diagram showing methods selected by three mobile stations of FIG. 105;

FIG. 113 is a table showing control channel information in the adjacent system in the twenty-second embodiment;

FIG. 114 is a table showing information channel information of the adjacent system in the twenty-second embodiment;

FIG. 119 is a table showing control information possessed by CPU of FIG. 118;

FIG. 120 is a table showing examples of combinations of data rate per time slot, transmission type and chip rate, which are of electric waves from adjacent stations in the twenty-fourth embodiment;

FIG. 121 is a diagram showing an example of configuration of time slot of the electric wave from the radio base station of the public system in the twenty-fourth embodiment;

FIG. 122 is a diagram showing an example of configuration of time slot of TDMA/CDMA waves from two adjacent radio base stations in the twenty-fourth embodiment;

FIG. 123 is a table showing an example of electric intensity of the TDMA/CDMA radio wave received in the plural radio base stations from the mobile station in the twenty-fourth embodiment;

FIG. 124 is a diagram showing an example of the number of mobile stations in simultaneous communication for each time slot of the TDMA/CDMA radio wave with two adjacent radio base stations (in case of CDMA) in the twenty-fifth embodiment;

FIG. 125 is a diagram showing an example of the number of mobile stations in simultaneous communication for each time slot with the radio base station of the private system, in the twenty-fifth embodiment;

FIG. 126 is a graph showing an example of electric intensity variation of the TDMA/CDMA radio wave received in the mobile station from two adjacent cells of radio stations, in the twenty-fifth embodiment;

FIG. 127 is a table showing a classification of prior art multi access methods;

FIG. 128 is a table of characteristics of prior art multi access methods;

FIG. 129 is a graph showing a transmission capacity of each of prior art multi access methods; and FIG. 130 is a block diagram of a prior art correlator to be used on the receiving side of CDMA method, the correlator forming a noncoherent delay-lock loop.

DETAILED DESCRIPTION OF PREFERRED EMBODIMENTS

Figure 1:
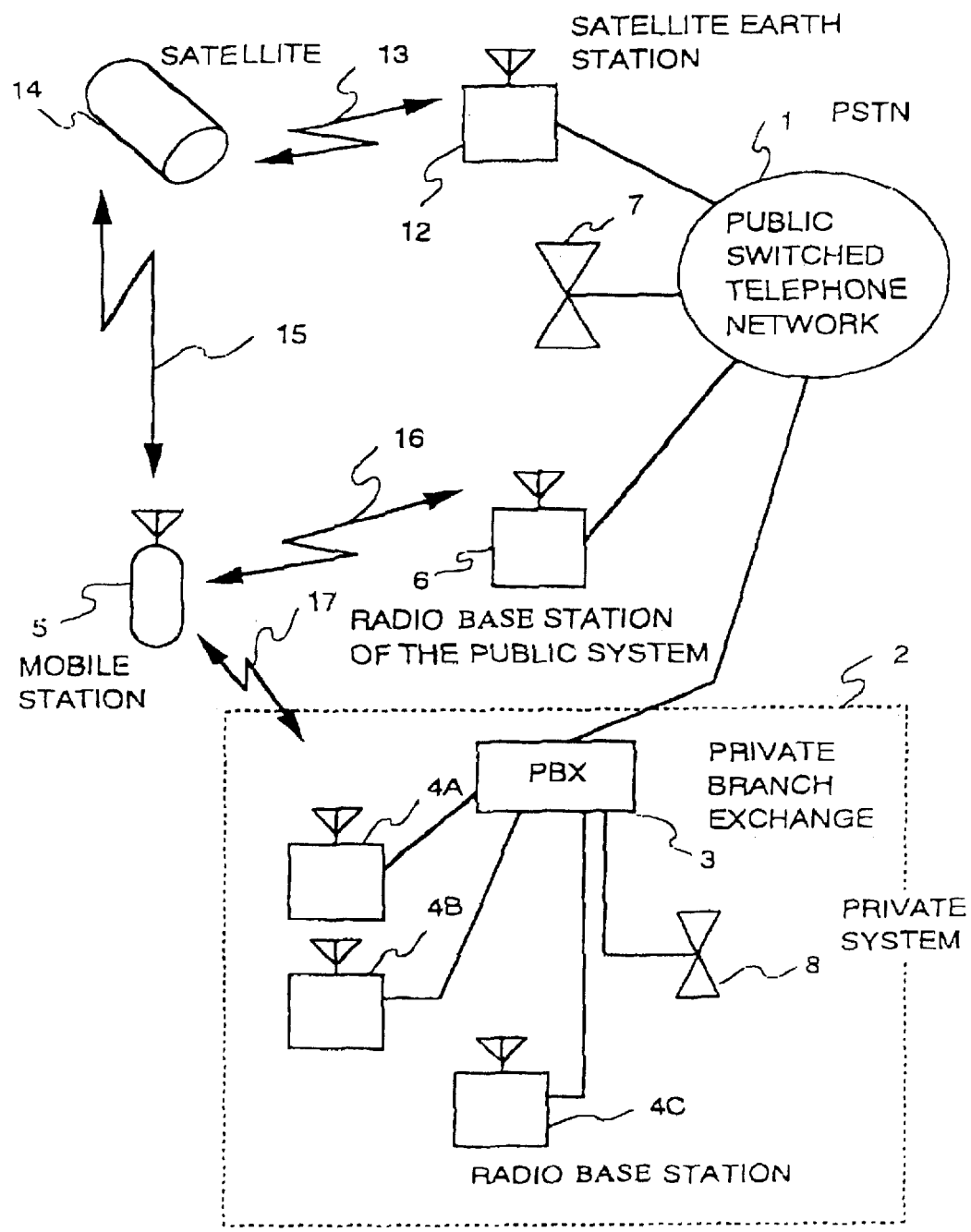
FIG. 1 is a diagram showing an entire mobile communication system according to a first embodiment of this invention.

Various preferred embodiments of this invention will now be described with reference to the accompanying drawings; each embodiment is explained separately in itemized features. Like reference numerals designate similar parts or elements throughout different embodiments, and their description is omitted.

Embodiment 1

General Construction of Mobile Communication System

FIG. 1 is a whole system diagram showing a mobile communication system according to a first embodiment of this invention. In FIG. 1, the mobile communication system generally comprises a public switched telephone network (PSTN) 1, a private system 2, which usually gives services to the mobile stations, a mobile station 5 of the private system, a satellite 14 such as a geostationary communication satellite. The private system 2 includes an exchange (private branch exchange: PBX) 3, radio base stations 4A, 4B, 4C, and a wired telephone set (subscriber) 8. To the public switched telephone network 1, a public system radio base station (hereinafter called the radio base station) 6 of the public system, a fixed telephone set (subscriber) 7 to the public system, and a satellite earth station 12 are connected.

The mobile communication system further comprises a satellite communication link channel 13 for connection between the satellite 14 and the satellite earth station 12, a channel for connection between the mobile station 5 and the satellite 14, a channel for connection between the mobile station 5 and the radio base station 6 of the public system, channels (radio communication channels) 15, 16, 17 for connecting the mobile station 5 to the satellite 14, the radio base station 6 of the public system and the radio base station 4A, 4B, 4C of the private system 2, respectively. In this embodiment, communication takes place between the radio base stations 4A, 4B, 4C of the private system 2 connected to the public switched telephone network 1 or the radio base station 6 of the public system and the mobile station 5 wirelessly connected to the radio base station directly or via the satellite 14.

The private system 2 has a means for synchronizing a data transmission frame with that of the public system to which the private system 2 is connected.

Figure 2:
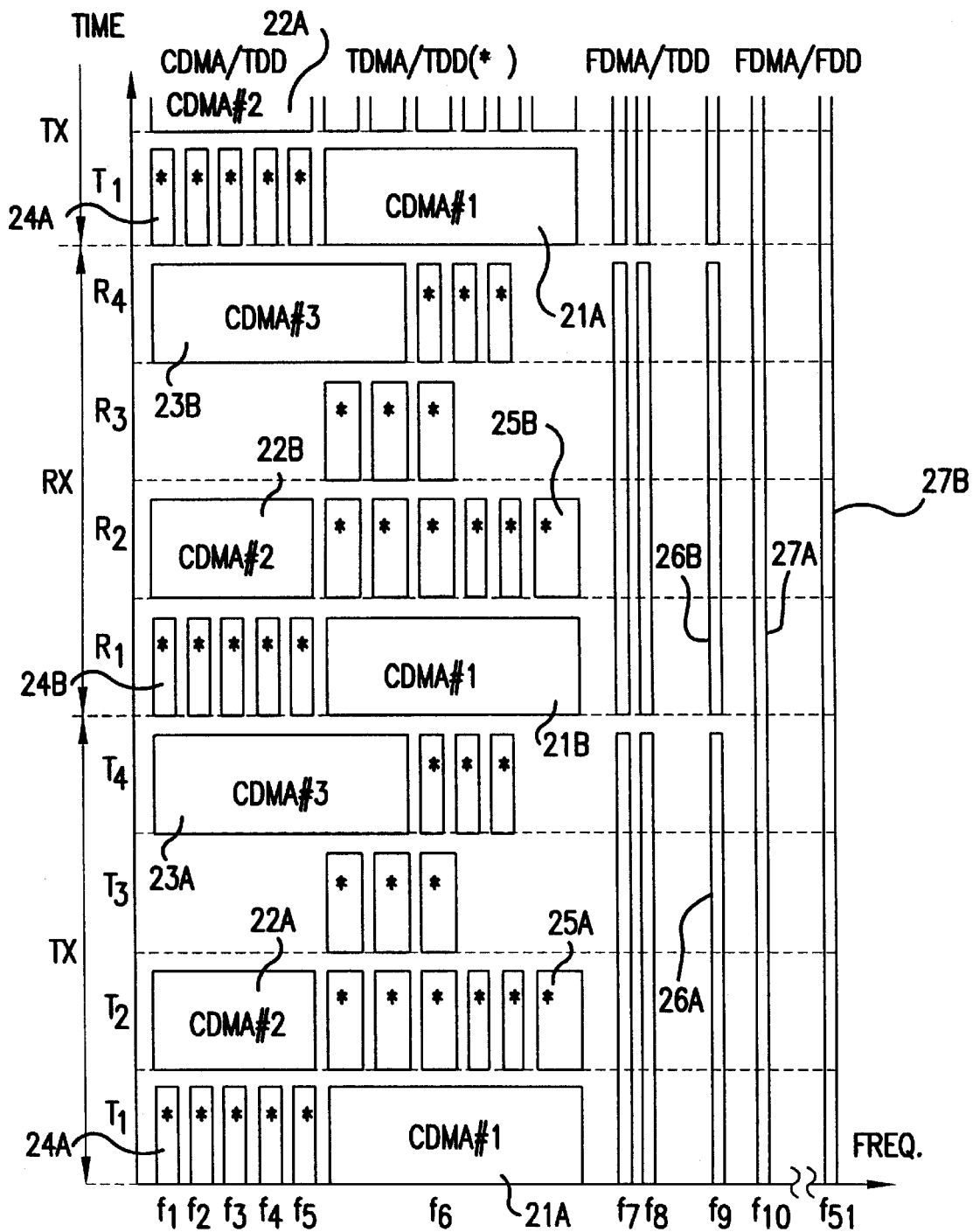
FIG. 2 is a diagram showing the manner in which frequencies are employed in various multiple access methods in the first embodiment.

This mobile communication system can deal with a plurality of multi access methods, i.e. the FDMA method, the TDMA method and the CDMA method. FIG. 2 shows one example of frequency allocation. In FIG. 2, Frequency is the dependent variable taken along the horizontal axis, and time is the dependent variable taken along the vertical axis. $f_1$ to $f_{51}$ on the horizontal axis represent frequencies. On the vertical axis, TX stands for time of transmission, and RX stands for time of reception. $T_1$ to $T_4$ within the range TX represent four time-divided sections. $R_1$ to $R_4$ within the range RX represent four time-divided sections. In the TDMA method, a set of TX and RX forms a single frame. Thus, in this embodiment, a single frame is time-divided into transmitting and receiving ½ frames in such a manner that each ½ frame forms 4 time slots. The number of time slots should by no means be limited to 4.

A slot 21A is a transmitting time slot of the time-divided CDMA method, and a slot 21B is a receiving time slot of the CDMA method. In this mobile communication system, the CDMA signal is divided by time slots. Alternatively, like the usual CDMA signal, the entire time period may be assigned to one CDMA wave. In this case, the CDMA wave is assigned to time sections $T_2$, $T_3$ and $T_4$ in addition to the time section $T_1$.

Slots 22A, 22B, 23A and 23B are time-divided slots just like the slots 21A and 21B. Slots 22A and 23A are transmitting time slots, and slots 22B and 23B are receiving time slots. Slots 24A and 24B are time slots to be used in the TDMA method, and slots 25A and 25B are also time slots to be used in the TDMA method. Slots 26A and 26B are time slots to be used in the FDMA/TDD method and serving as voice channels or control channels. Slots 27A and 27B are frequency slots to be used in the FDMA/FDD method.

Figure 3:
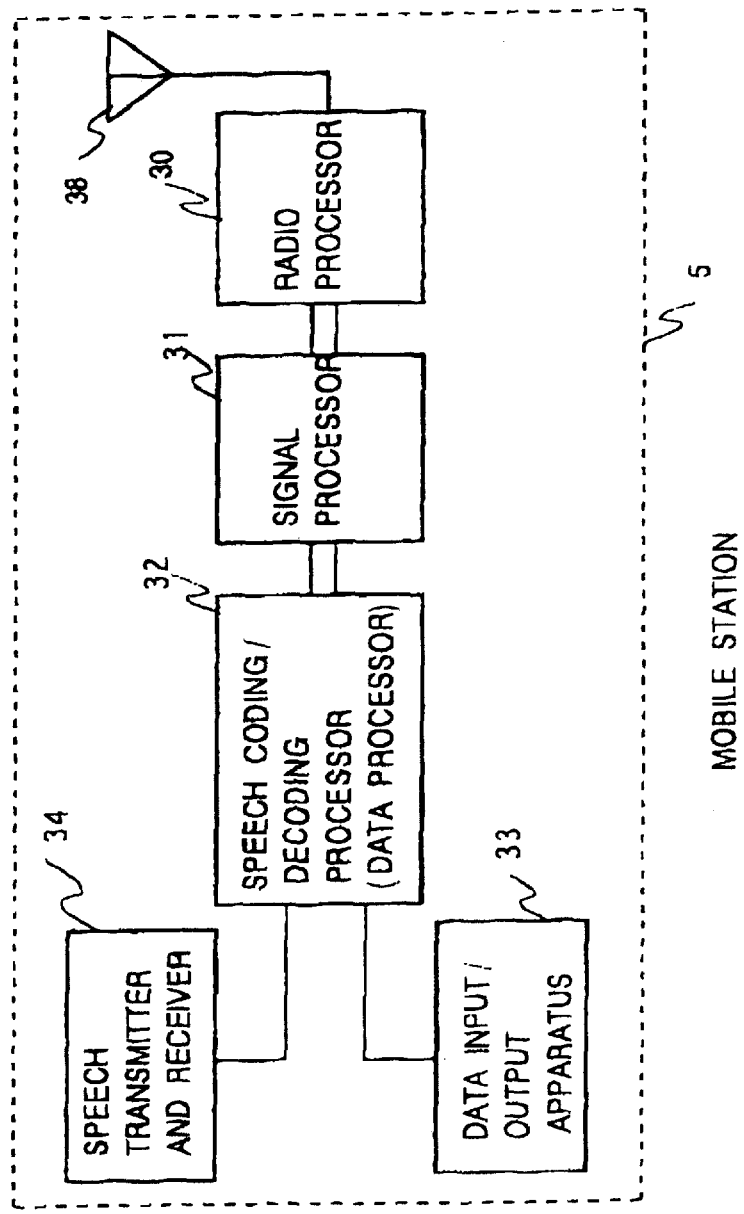
FIG. 3 is a block diagram showing the function of a mobile station in the first embodiment.

FIG. 3 shows a block diagram showing the functions of the mobile station 5. A radio processor 30 is a low power consuming type. A signal processor 31 has a function of processing protocol information for the radio base stations 4A, 4B, 4C and the radio base station 6. The signal processor 31 has also a function of processing protocol information for wirelessly connecting to the communication channel 15. A speech coding/decoding processor 32 has a function for converting speech signals into a digital code and for converting digital information into speech information. The speech coding/decoding processor (data processor) 32 may carry out coding and decoding with an error correction code for digital information from a data input-output device 33. A speech transmitter and receiver 34 consist of a microphone and a sound receiver. The data input/output apparatus may be a facsimile, an image processing terminal, or like device capable of generating digital information.

Figure 4:
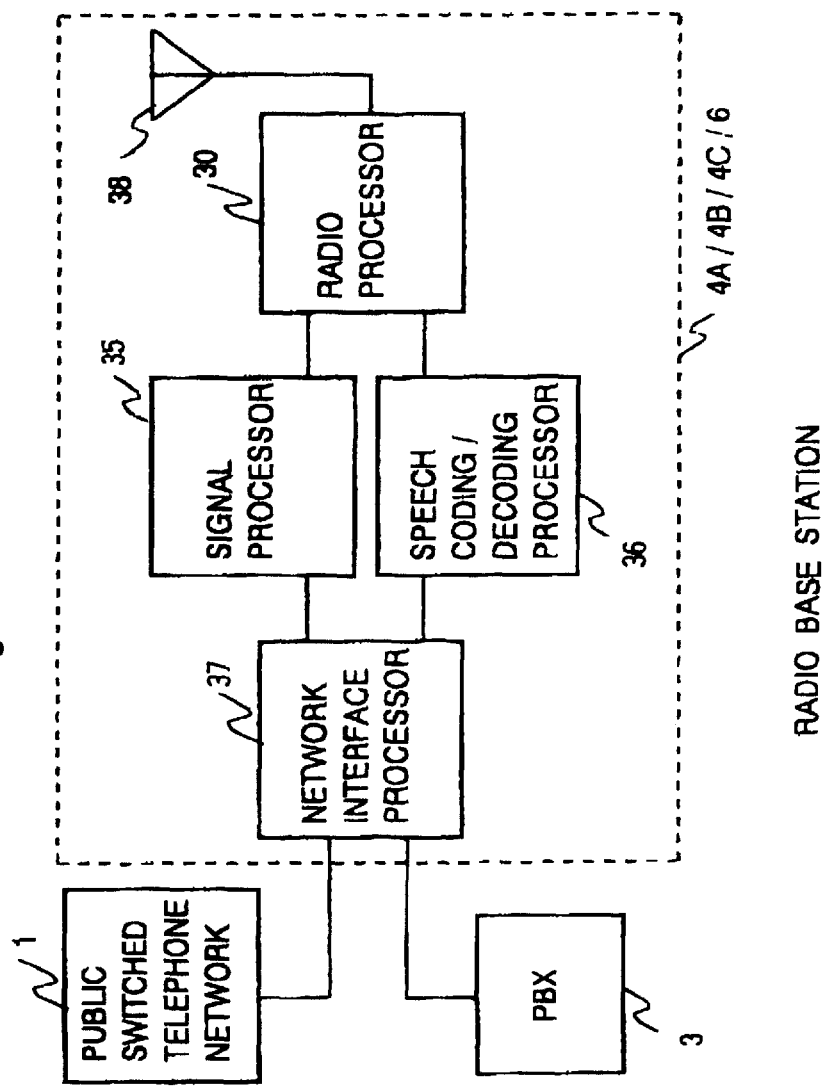
FIG. 4 is a block diagram showing the function of a radio base station in the mobile station of the first embodiment.

FIG. 4 is a block diagram showing the functions of the radio base stations 4A, 4B, 4C as well as the function of the radio base station 6. A signal processor 35 has a function for processing protocol information for wireless communication. The signal processor 35 processes protocol information for the public switched telephone network 1 or the PBX 3 of the private system 2. A speech coding/decoding processor 36 converts standard speech digital information into compressed speech code and also converts compressed speech code into standard speech digital information. In this case compressed speech code is transmitted on the radio communication channel. A network interface processor 37 provides an interface for the public switched telephone network 1 and the PBX 3.

Figure 5:
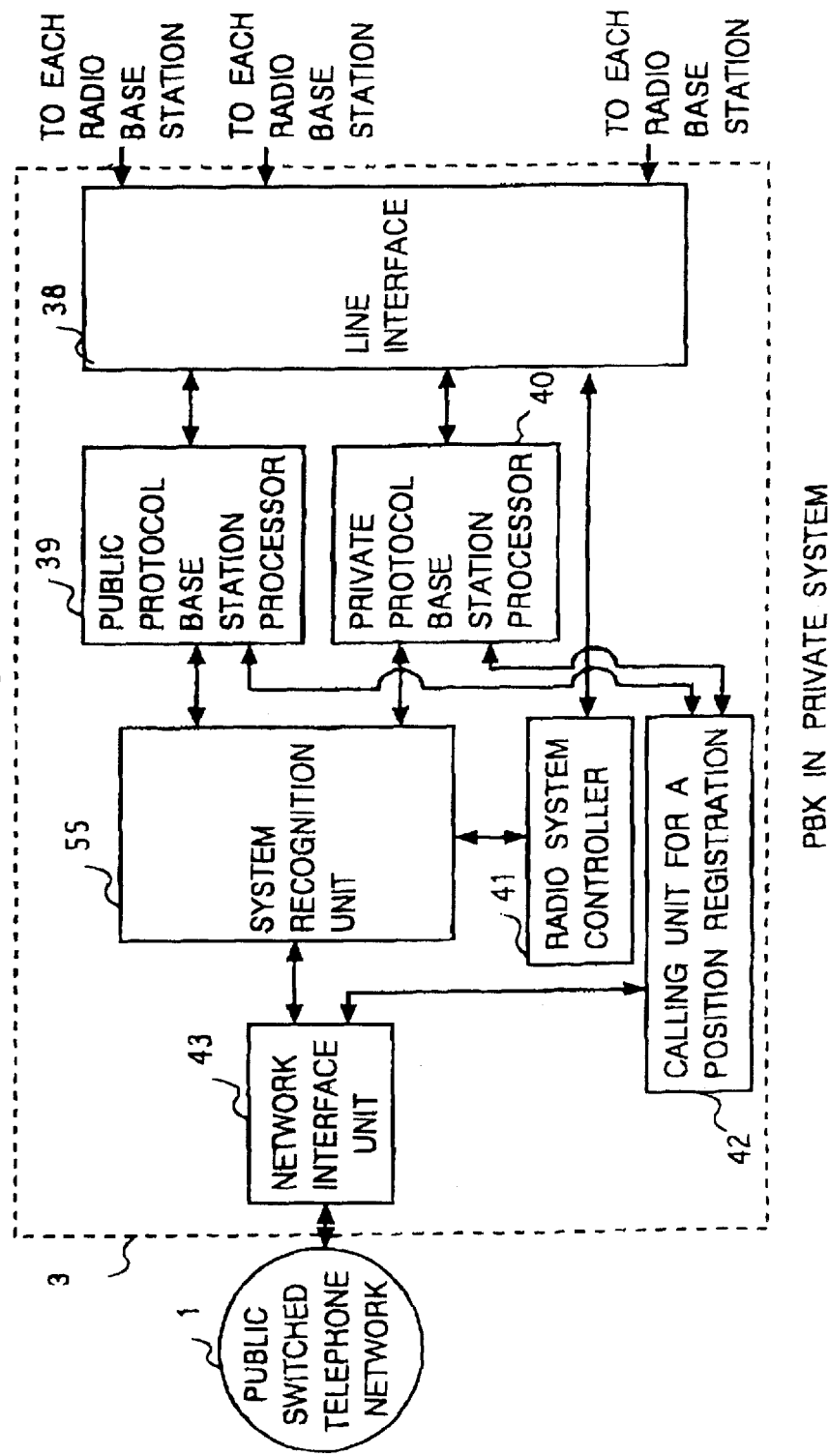
FIG. 5 is a block diagram showing the function of a PBX of a private system in the first embodiment.

FIG. 5 is a block diagram showing a function of the PBX 3 in the private system 2. A line interface 38 is connected to each radio base station 4A, 4B and 4C. In the private system 2, when the mobile station 5 connected wirelessly to the radio base station 4A requests connection to the public switched telephone network 1, the public protocol land station processor 39 of the PBX 3 processes protocol information for the connection to the public switched telephone network 1. When the mobile station 5 requests communication with the subscriber 8 in the private system 2, the PBX 3 processes information of the connection by using a private protocol base station processor 40. A radio system controller 41 stores whether the signal being transmitted on the radio channel in use is based on the FDMA method, the TDMA method or the CDMA method. The stored information is downloaded in advance to the other base stations in neighboring cells. When the mobile station changes the connecting base station from one radio base station to another radio base station by a handover and so forth, the downloaded information can be utilized by the other land station.

Figure 6:
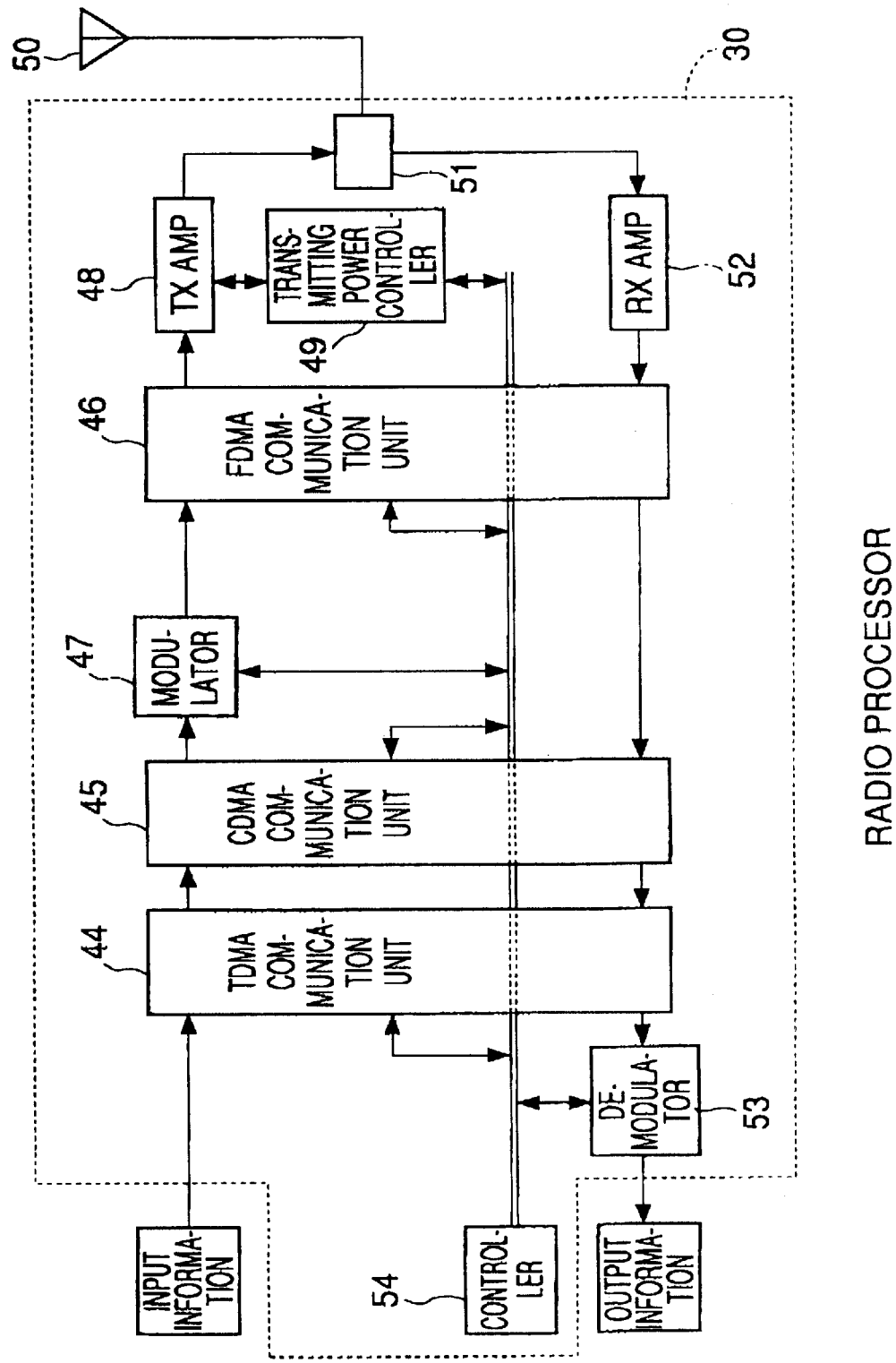
FIG. 6 is a block diagram showing the general function of a radio processor in the first embodiment.

FIG. 6 shows a general construction of the radio processor included in each of the radio base stations 4A, 4B, 4C, the radio base station 6 and the mobile station 5. A TDMA communication unit 44 is a TDMA communication means for communication based on the TDMA method. A CDMA communication unit 45 is a CDMA communication means for communication based on the CDMA method. An FDMA communication unit 46 is an FDMA communication means for communication based on the FDMA method. A modulator 47 modulates the input signal and generates a digital-modulated signal having an intermediate frequency. A high frequency amplifier 48 amplifies the signal being transmitted to an antenna 50 based on the control of a transmitting power controller 49. A switch 51 switches between a transmitting signal to the antenna 50 and a receiving signal from the antenna 50 during the times TX and RX. A high frequency amplifier 52 amplifier signals received by the antenna 50. A demodulator 53 demodulates the received signal and outputs it as output information. A controller 54 controls each section in radio processor 30.

Figure 7:
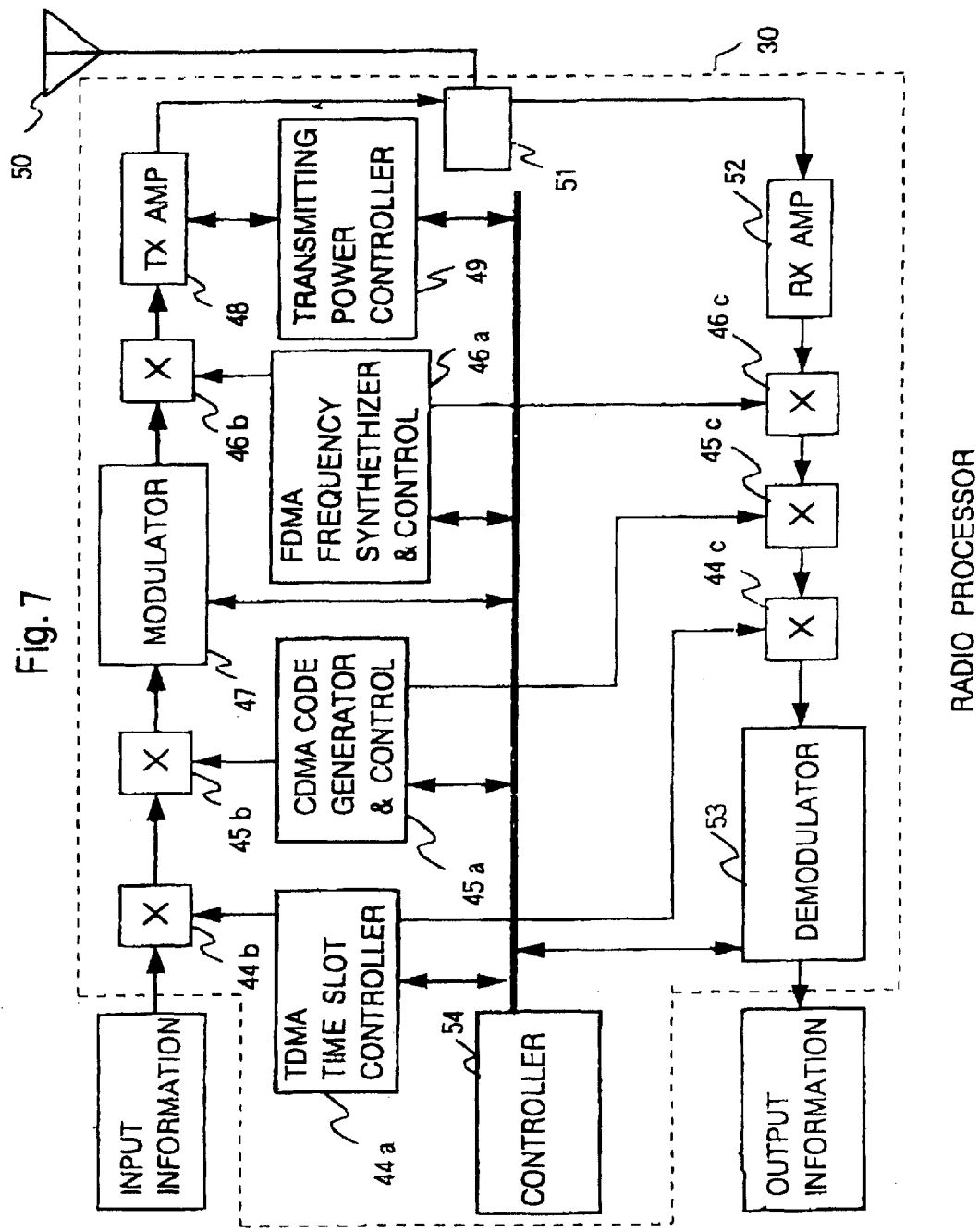
FIG. 7 is a block diagram showing the detailed function of the radio processor of FIG. 6.

FIG. 7 is a view similar to FIG. 6, but showing each of the TDMA communication unit 44, the CDMA communication unit 45 and the FDMA communication unit 46 as divided into the transmitting section and the receiving section. A TDMA time slot controller 44a generates time slots which compresses input information. A time slot multiplier 44b inputs input information which is a continuous digital signal and divides the input information and stores the divided input information into time slots. A CDMA code generator 45a generates a code for the CDMA for the input information. A code multiplier 45b multiplies the input information by the code generated by the CDMA code generator 45a. An FDMA frequency synthesizer 46a generates a modulation signal having a frequency allocated for communication. A converter 46b mixes the digital-modulated signal output from the modulator 47 in the modulation signal output from the FDMA frequency synthesizer 46a. A converter 46c extracts signals in the specific band among the received signals by using signals generated by the FDMA frequency synthesizer 46a. A code multiplier 45c detects a correlation between the code generated by the CDMA code generator 45a and the received signal, and extracts the signal which is the highest correlation. A time slot multiplier 44c extends the signal compressed in each time slot based on the control of the TDMA time slot controller 44a and generates a continuous digital signal.

Generally, the controller 54 of FIG. 7 selects one of the TDMA method, the CDMA method and the FDMA method for communication, based on the accessible method of the other end of communication.

As mentioned above, the mobile communication system of this embodiment generally comprises the mobile stations, the radio base stations, and the exchange. The mobile station measures the received electric intensity of the radio signal received from the radio base station. When the intensity is below a threshold, the mobile station requests the handover process for exchanging the radio base station to another to which the mobile station is wirelessly connected, and requests a roaming process via the radio base station to the exchange. The radio base station is connected either wirelessly or through cables to the exchange and connected wirelessly to the mobile station according to various multiple access methods and modulation methods. The radio base station not only relays the communication between the mobile station and the exchange but also measures the received electric intensity of the radio signal emitted from the mobile station. When the intensity is below a threshold, the radio base station requests the handover process for exchanging the radio base station to another to which the mobile station is connected, and requests a roaming process to the exchange. The exchange has corresponding protocols for communicating with the present private system, another private system, the public system and the satellite public system.

Further, the mobile communication system of this embodiment is characterized in that the frame synchronization of the Time Division Duplex (TDD) between various multiple access methods, i.e. the FDMA method, the TDMA method and the CDMA method, is constructed in the same way. In the CDMA method, the Time Slotted CDMA method is performed with synchronizing of the time divided slot of the TDMA method. This embodiment will now be described more in detail separately in itemized features.

Assignment of Spread-spectrum code to Time Slot

Figure 8:
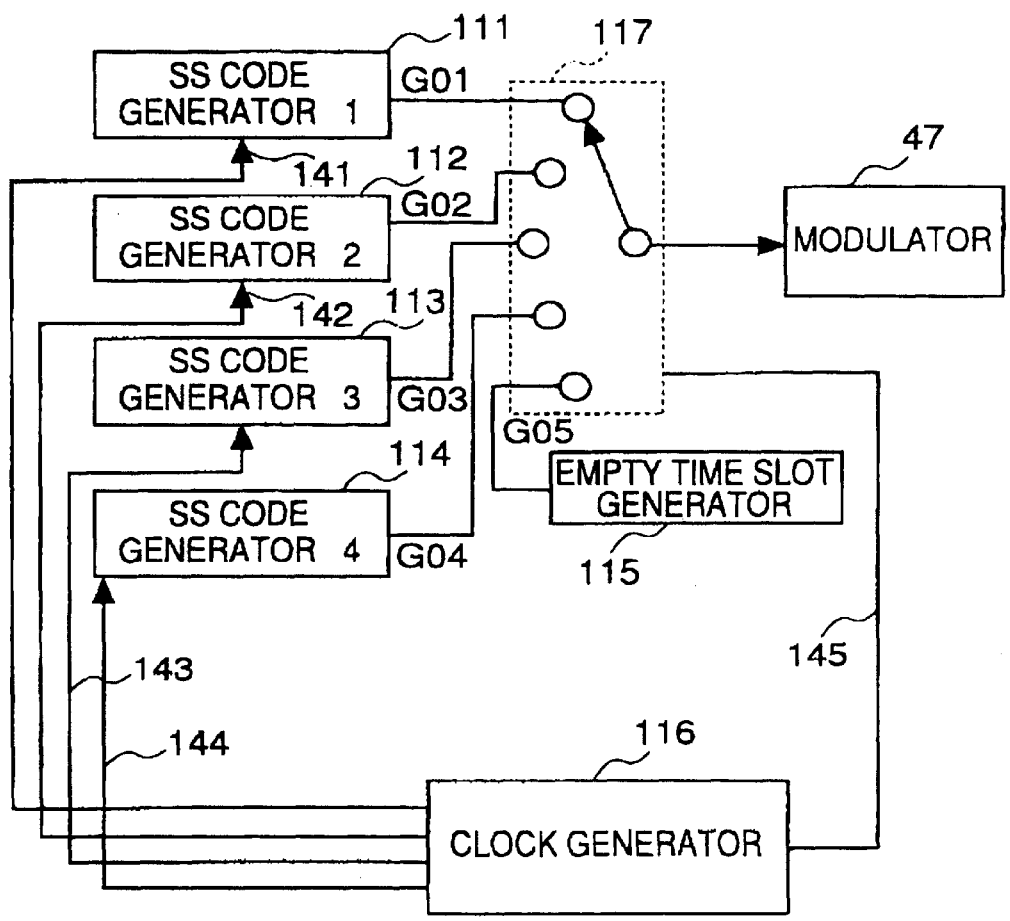
FIG. 8 is a block diagram showing a transmission processing part of a CDMA communication unit of FIG. 6.

FIG. 8 is a block diagram showing a transmission processing part of the CDMA communication unit of FIG. 6; the transmission processing part has a function of generating spread-spectrum codes (SS codes). In FIG. 8, there are shown four spread-spectrum code generators 111, 112, 113, 114, a clock generator 116 for supplying clocks to these spread-spectrum code generators 111–114, an empty time slot generator 115 for generating an empty time slot as the result of no spread-spectrum code generated, and a switch 117 for switching the spread-spectrum code generator 111–114 and the empty code generator 115 with one another to send the signal to the modulator 118. The spread-spectrum code generators 111–114 and the switch 117 are connected to the clock generator 116 via the respective signal lines 141, 142, 143, 144, 145. The modulator 118 of FIG. 8 corresponds to the modulator 47 of FIG. 7.

This embodiment is characterized by that the spread-spectrum codes generated by the spread-spectrum code generators 111–114 are assigned to the time slots sent from the TDMA communication unit. Namely, the time-divided CDMA signal is transmitted by utilizing the time slot of the TDMA method.

In this embodiment, the individual spread-spectrum code generators 111–114 are provided in association with the respective time slots to assign the generated different spread-spectrum codes one to each time slot.

The CDMA signal is a signal encoded by a spread-spectrum code. Therefore, assignment of the spread-spectrum codes to the individual time slots does not mean that the spread-spectrum code itself is inserted into each time slot but that the CDMA signal encoded by the spread-spectrum codes assigned to each time slot is time-divided for insertion.

Figure 9:
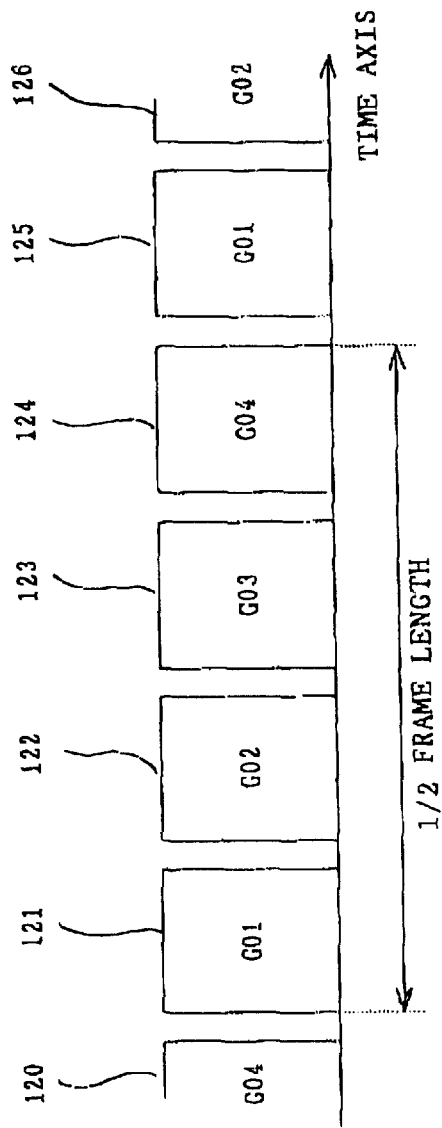
FIG. 9 is a diagram showing an example in which time-divided spread-spectrum codes are assigned to time slots in the first embodiment.
Figure 10:
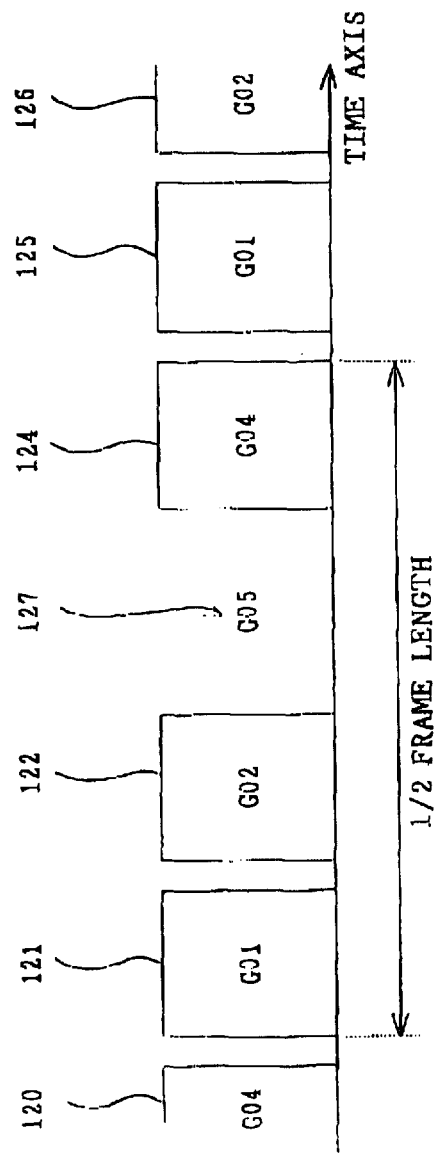
FIG. 10 is a diagram showing another example in which time-divided spread-spectrum codes are assigned to time slots in the first embodiment.
Figure 11:
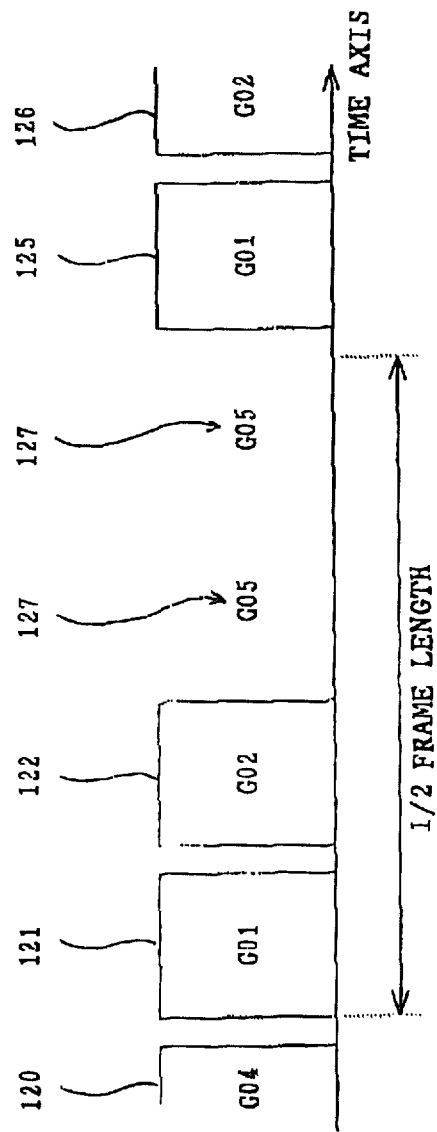
FIG. 11 is a diagram showing still another example in which time-divided spread-spectrum codes are assigned to time slots in the first embodiment.
Figure 12:
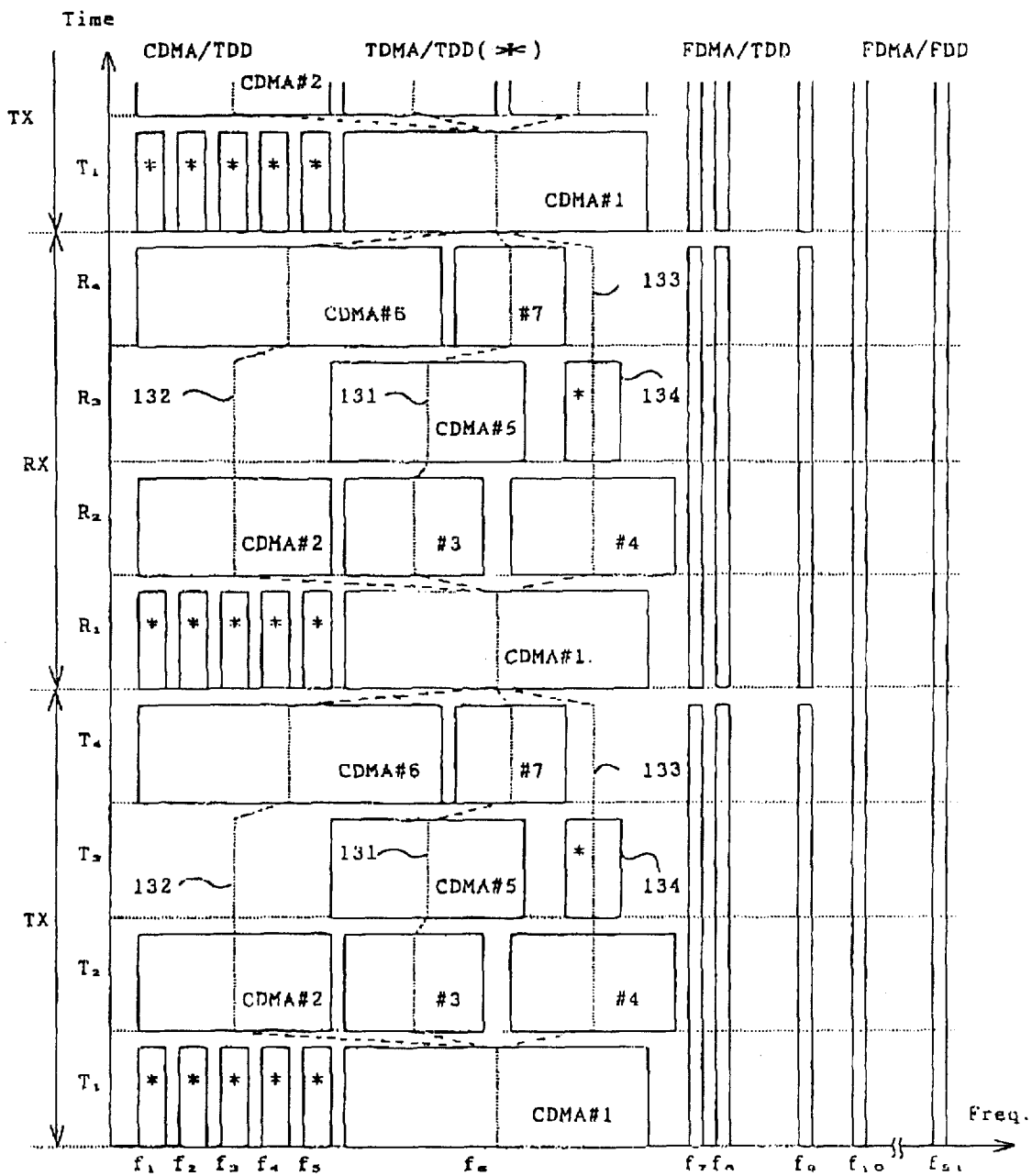
FIG. 12 is a diagram showing the manner in which frequencies are employed in various multiple access methods in the first embodiment.

FIGS. 9, 10 and 11 show examples in which G01, G02, G03, G04, which have been output from the CDMA communication unit 45 shown in FIG. 6 and corresponding to the whole scheme shown in FIG. 8 and encoded by the spread-spectrum, are assigned to time slots. FIG. 12 shows a relationship between the time slot and the occupied frequency. The way of looking at the diagrams of FIGS. 9, 10 and 11 are similar to that of FIG. 2, so their detailed explanation is omitted here.

Figure 30:
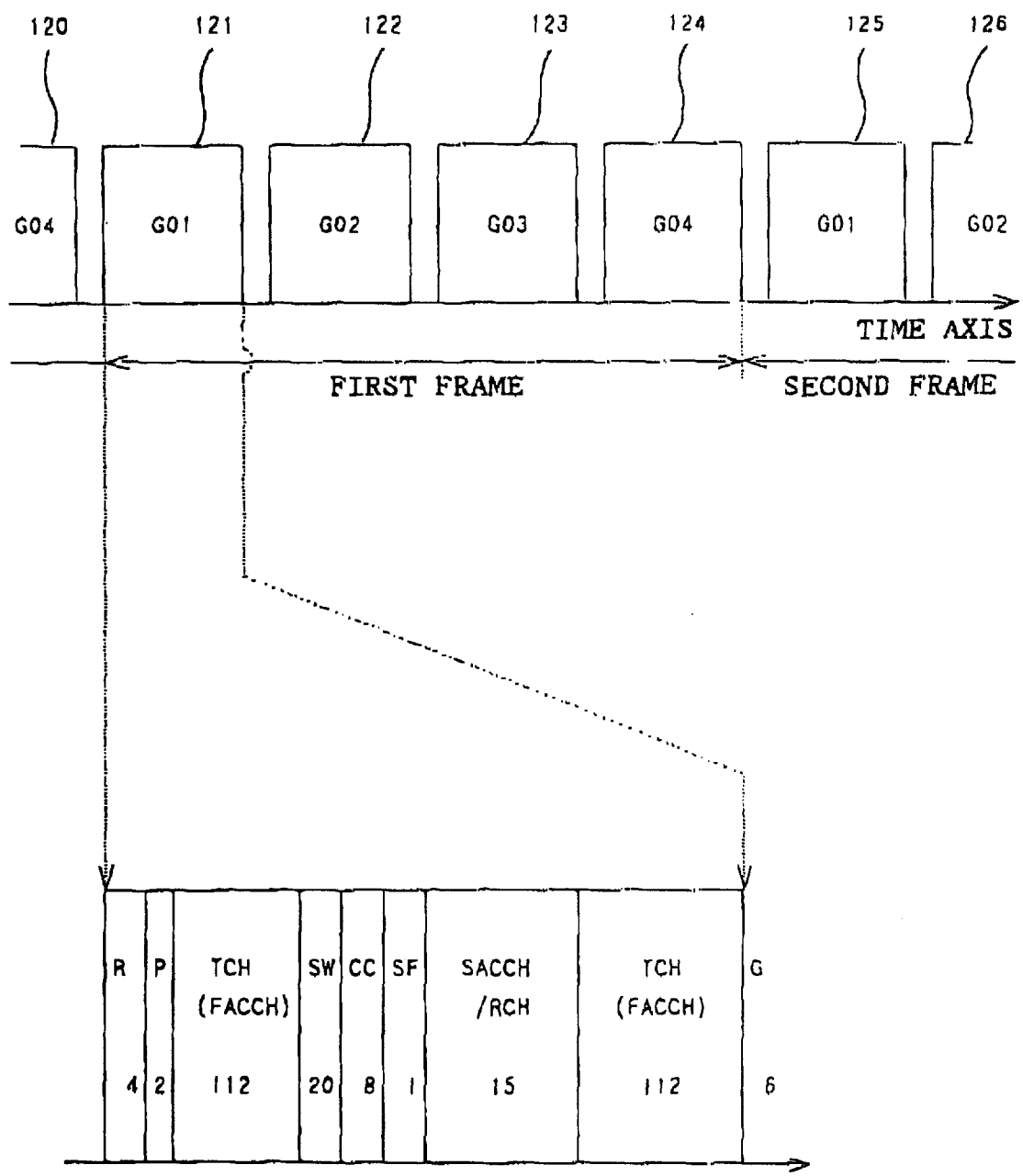
FIG. 30 is a diagram showing the content of an output of the CDMA communication unit of FIG. 28.
Figure 34:
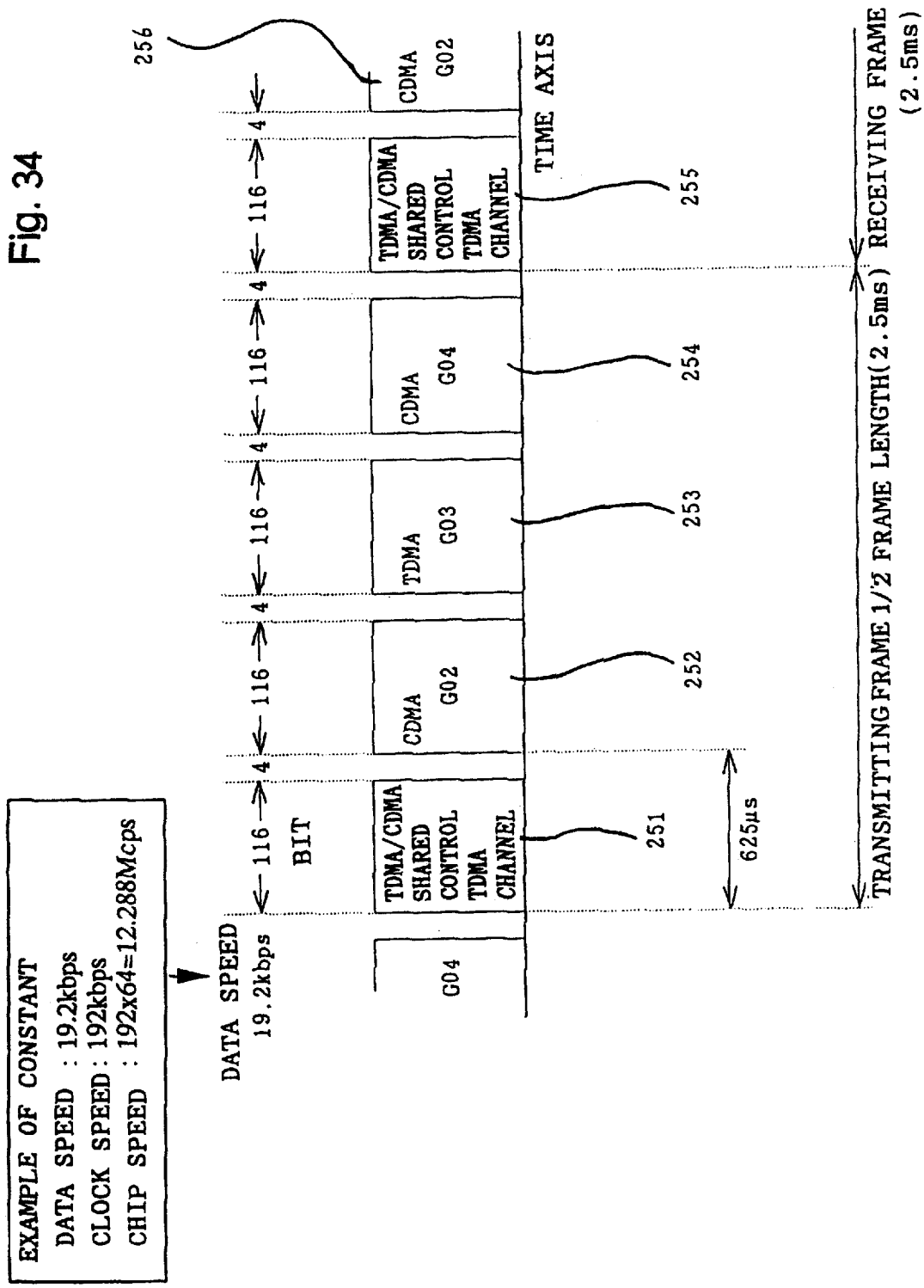
FIG. 34 is a diagram showing an example in which a first time slot of the transmitting frame is used as a common channel for both the CDMA method and the TDMA method, in the first embodiment.
Figure 35:
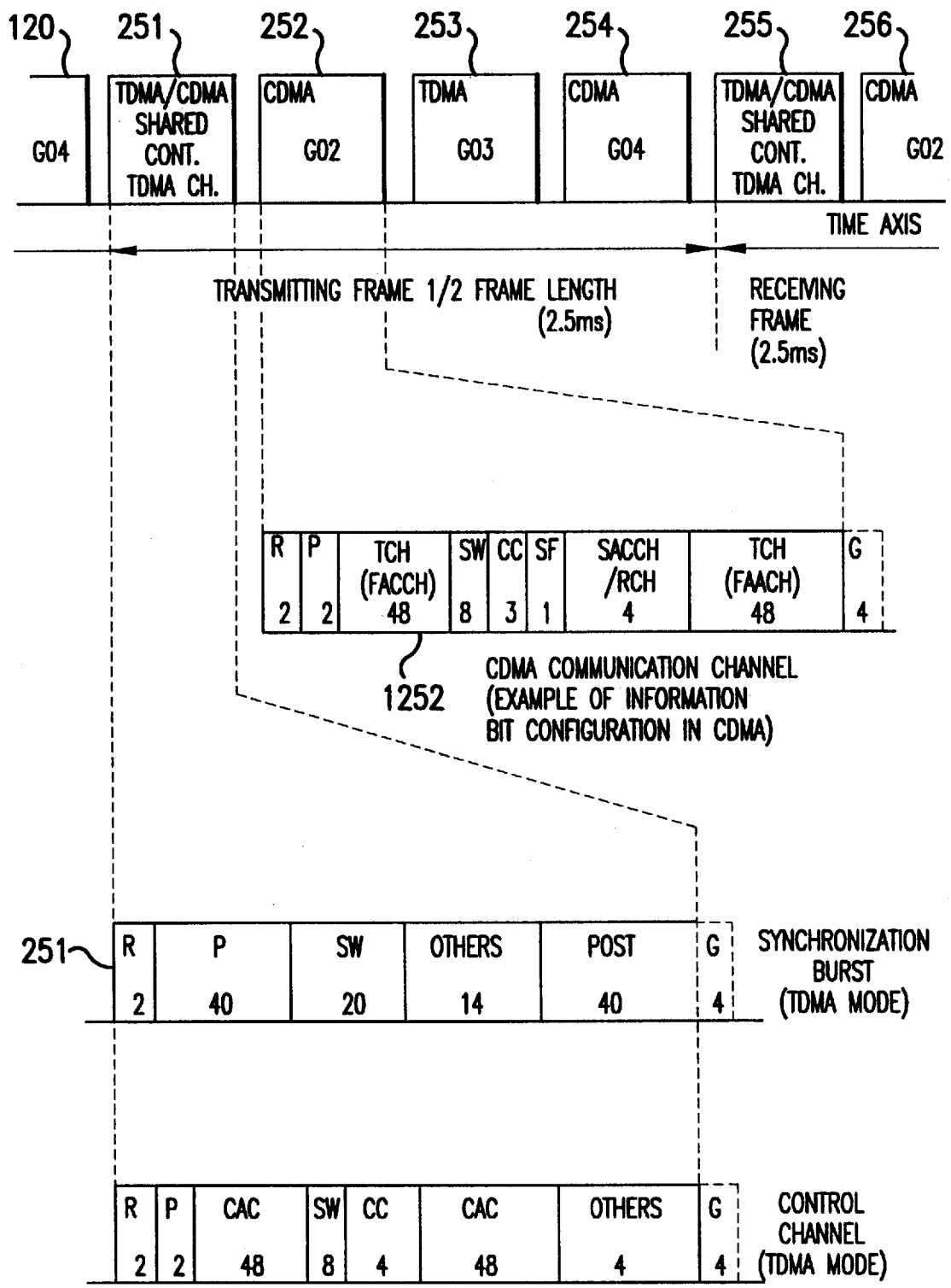
FIG. 35 is a diagram showing a frame in which a TDMA signal and a CDMA signal are assigned to the first and second time slots, respectively, in the first embodiment.

The example of spread-spectrum code assignment of FIG. 9 is an example in which CDMA signals are assigned to all of four time slots. The slot between the burst G01 (121) and the next burst G02 (122) is the guard time which prevents the collision that may occur because of the variation of the propagation delays of the bursts G01 (121) and G02 (122). The guard time in FIG. 30 is the 6 bits time length. The samples of the guard times shown in FIG. 34 and FIG. 35 are the 4 bits lengths. FIG. 12 shows the same ideas of the guard times which are set between the burst CDMA#1 in the time slot T1 and the burst CDMA#3 in the time slot T2. The ideas concerning the guard time are well known in the technologies of TDMA and are therefore used in the following descriptions without further detailed discussion. In FIG. 12, a spectrum locus 131 indicates an example of radio base station which employs four CDMA multi access methods, i.e. CDMA#1, #3, #5, #7 and in which G01, G02, G03, G04 outputted from the four spread-spectrum code generators 111–114 are assigned to the corresponding time slots. In this case, the switch 117 of FIG. 8 does not select the output G05 of the empty time slot generator 115.

The example of spread-spectrum code assignment of FIG. 10 is an example in which CDMA signals are assigned to the leading two time slots and the fourth time slot. In FIG. 12, a spectrum locus 132 indicates an example of radio base station which employs three CDMA multi access methods, i.e. CDMA#1, #2, #6 and in which the outputs GO, G02, G04 of the three spread-spectrum code generators 111, 112, 114 and the output G05 of the empty time slot generator 115 are assigned to the corresponding time slots. In this case, the switch 117 selects the output G05 for the third time slot.

The example of spread-spectrum code assignment of FIG. 11 is an example in which CDMA signals are assigned to only the leading two time slots. In FIG. 12, a spectrum locus 133 indicates an example of radio base station which employs two CDMA multi access methods, i.e. CDMA#1, #4 and in which the outputs G01, G02 of the two spread-spectrum code generators 111, 112 are assigned to the respective time slots. In this case, the switch 117 selects the output G05 for the third and fourth time slots. In this case, in FIG. 12, the TDMA signal is assigned to the third time slot 134 by the modulator 118.

According to this embodiment, by using the TDMA communication unit and the CDMA communication unit simultaneously, it is possible to assign the spread-spectrum codes, which are generated by any of the spread-spectrum code generators in the CDMA communication unit, to the time slots based on the TDMA method for transmission.

Further, it is possible to assign the TDMA signal to the time slot, to which the CDMA signal is not assigned, for simultaneous transmission.

The clock generator 116 supplies four kinds of clocks to the four spread-spectrum code generators 111–114 via the signal lines 141–144. The clock speed is a spread-spectrum code speed, and for example, four time sections 121, 122, 123, 124 of FIG. 9 are supplied to the respective spread-spectrum code generators 111–114. Accordingly the supplied sections are shifted timewise from one another, and such time slip is associated with a time slot of radio wave to be emitted into air. A spread-spectrum code generator associated with this time slot is selected by the switch 117, based on the switch control timing information that is outputted from the clock generator 116 via the signal line 145. The modulator 47 modulates a high frequency signal according to the output of the switch 117.

These three kinds of spectrum loci 131, 132, 133 of FIG. 12 indicate the frequencies of radio waves to be emitted from three radio base stations and the spreading of spectra. For example, the variation of center of the CDMA spectrum of the spectrum locus 131 from CDMA#1 to #3 indicates the variation of radio wave frequency, thus showing emitted radio wave frequencies different depending on the time slot. FIG. 12 shows the manner in which the mobile communication system operates in the radio wave environment of FDMA/TDMA/CDMA method.

Setting Initial Values of Spread-spectrum codes

As described above, each spread-spectrum code generator 111–144 generates different codes within the same frame. The setting of an initial value of the spread-spectrum code will now be described.

Firstly, a head position of the spread-spectrum code of time sharing CDMA method is defined in the following manner.

Figure 13:
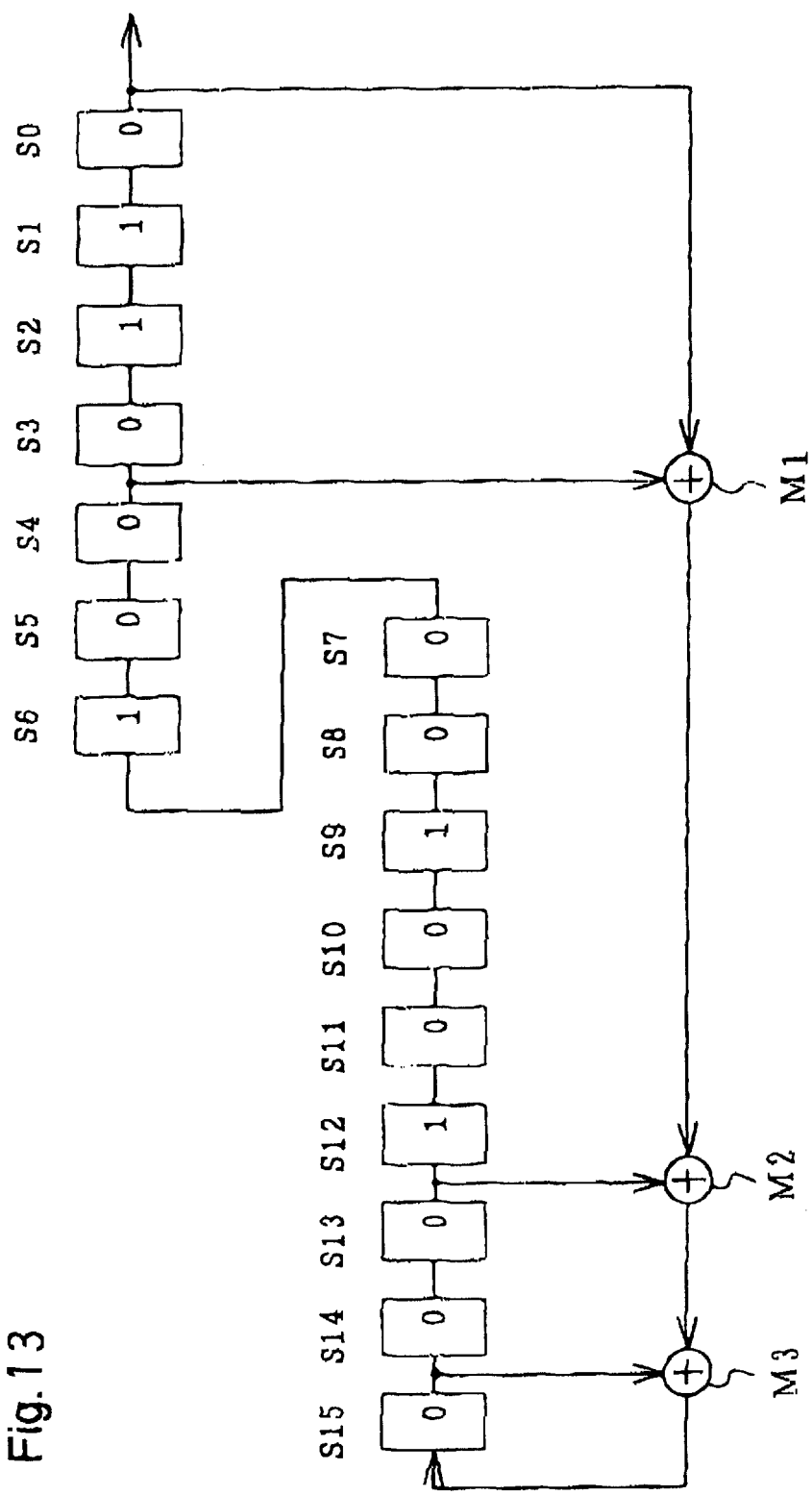
FIG. 13 is a diagram showing a shift register constituting part of a spread-spectrum code generator in the first embodiment.

FIG. 13 shows a set of shift registers constituting a part of the spread-spectrum code generator. The spread-spectrum code generator is equipped with shift registers S0–S15 and generates spread-spectrum codes by using multipliers M1–M3 and the shift action of the shift registers S0–S15.

Figure 14:
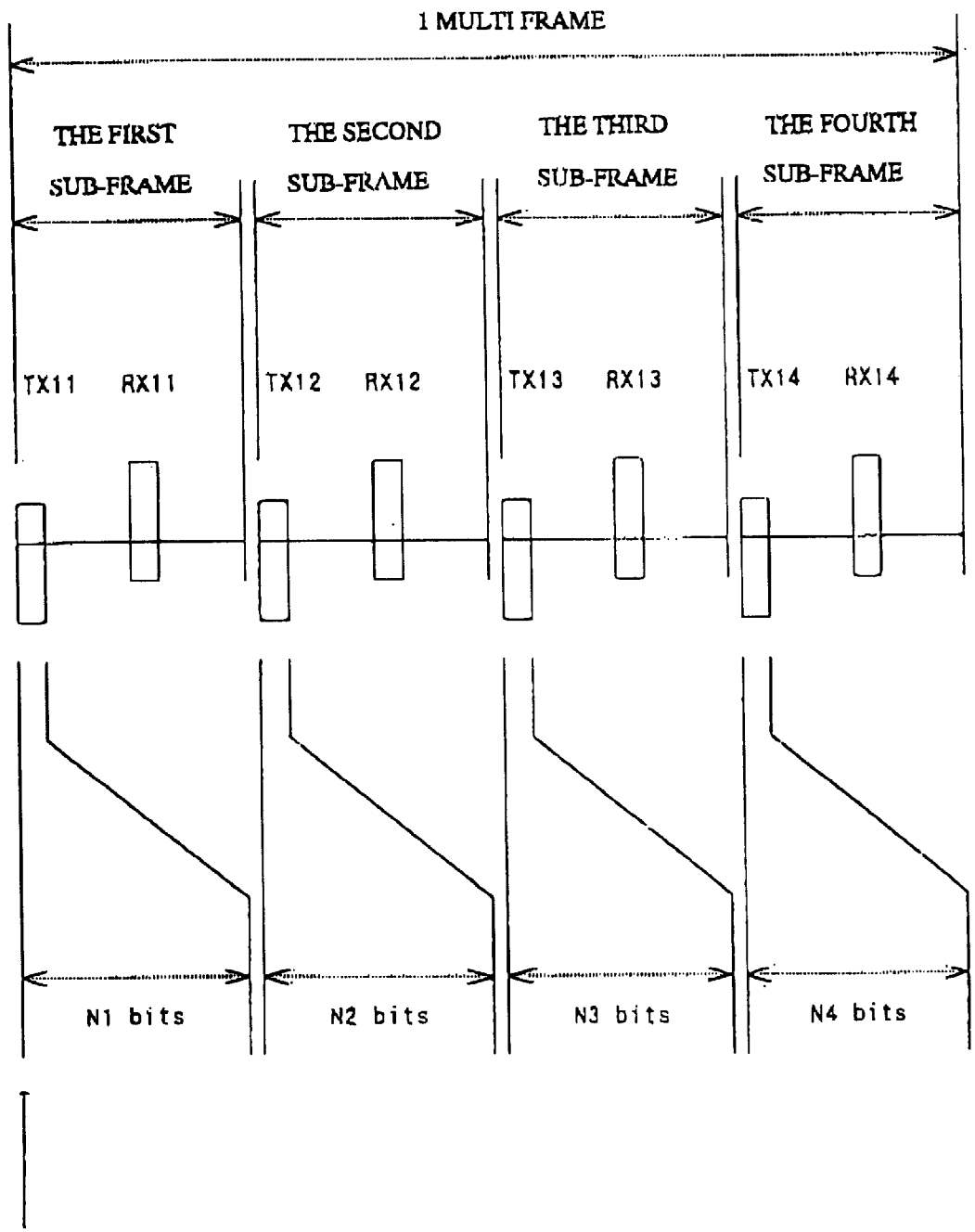
FIG. 14 is a diagram showing a CDMA signal head position of the time slot on the transmitting side in a multi frame in the first embodiment.
Figure 15:
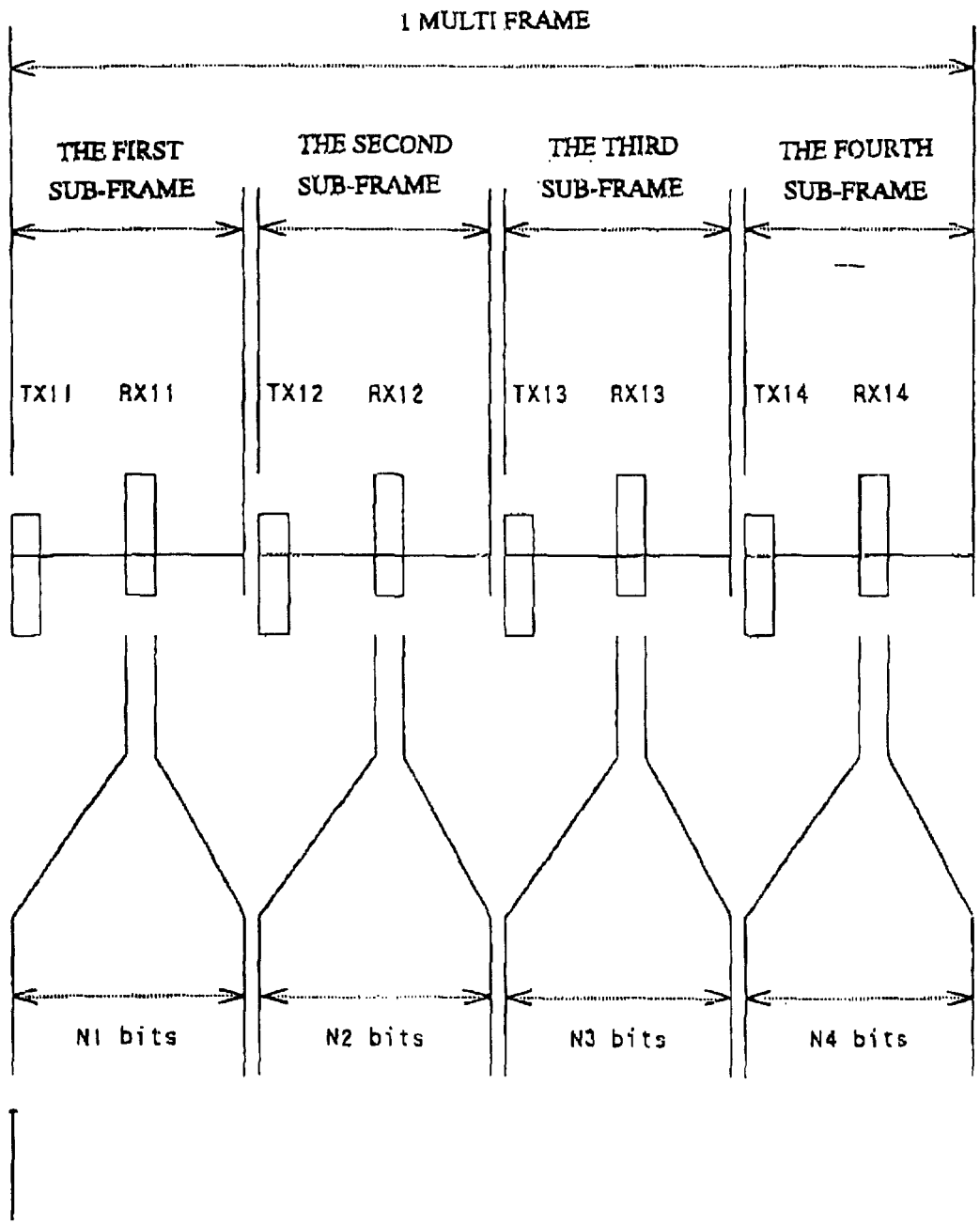
FIG. 15 is a diagram showing a CDMA signal head position of the time slot on the receiving side in a multi frame in the first embodiment.

FIG. 14 shows a head position of the CDMA signals of the time slot on the transmitting side in a multi frame. FIG. 15 shows an initial value position of the spread-spectrum code of the time slot on the receiving side in a multi frame.

In the spread-spectrum code generator of FIG. 13, the bit "0" stored in the shift register S0 corresponds to a head bit of the initial value of the spread-spectrum code. In the time sharing CDMA method, the CDMA signal contained in sub-frames or a multi frame and encoded into separate time slots as shown in FIG. 2, based on the spread-spectrum codes. In the case of FIG. 2, a head bit of the initial value is assigned to a head position of the first sub-frame. Further, in the case of FIG. 15, a head bit of the initial value of the spread-spectrum code is assigned to a head position of the CDMA time slot RX 11 relating the first sub-frame. For example, if a spread-spectrum code is to be generated using a shift register as shown in FIG. 13, a reset state is treated as the initial value. And a head bit of the initial value generated by the shift register S0 is assigned to the head position of the time slot 21A of FIG. 2.

However, in the conventional time-non-divided CDMA method, a head position of the CDMA spread-spectrum code is not always the same position for every CDMA radio wave emitted into air. In this embodiment employing the time-divided CDMA signal, a head position of the CDMA spread-spectrum code is defined by using a common time frame with the TDMA method. If the conventional method is regarded as a non-synchronizing type, the method of this embodiment may be regarded as a synchronizing type. Given that the head position is thus defined, it is possible to facilitate synchronous supplementing the initial value of the spread-spectrum code of the CDMA method. However, defining the head position somehow deteriorates the privacy of radio wave itself of the conventional CDMA method. Although this method may yet have a problem from a military communications view point, it can meet the ordinary purposes of the public system, as long as the privacy of contents of communication is secured, so that the poor degree of privacy proofness of radio wave itself may be ignored. The proofness of privacy of communication contents is realized by superposing a privacy code over communication data itself; this is totally different from the privacy proofness of radio wave itself. This embodiment is characterized by that the synchronizing-type CDMA method is employed by synchronizing the first bit of the CDMA spread-spectrum code with the leading bit of the first time frame in a multi frame. It is also characterized by that the synchronized CDMA signal is assigned to the time slot of TDMA method.

The setting of initial values of all spread-spectrum codes to be assigned to the time slots will now be described.

Figure 16:
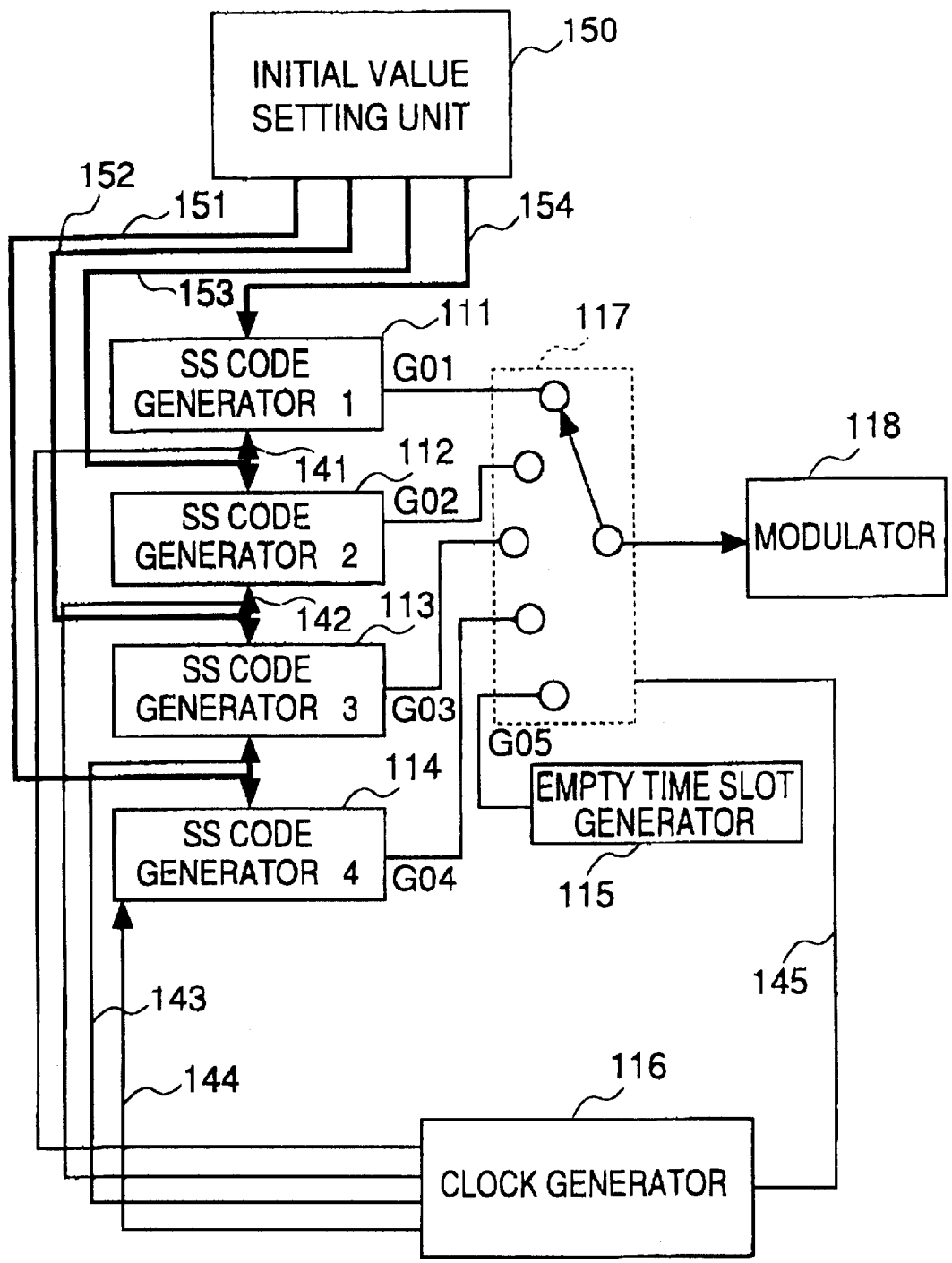
FIG. 16 is a block diagram showing a main part of the CDMA communication unit in the first embodiment.
Figure 17:
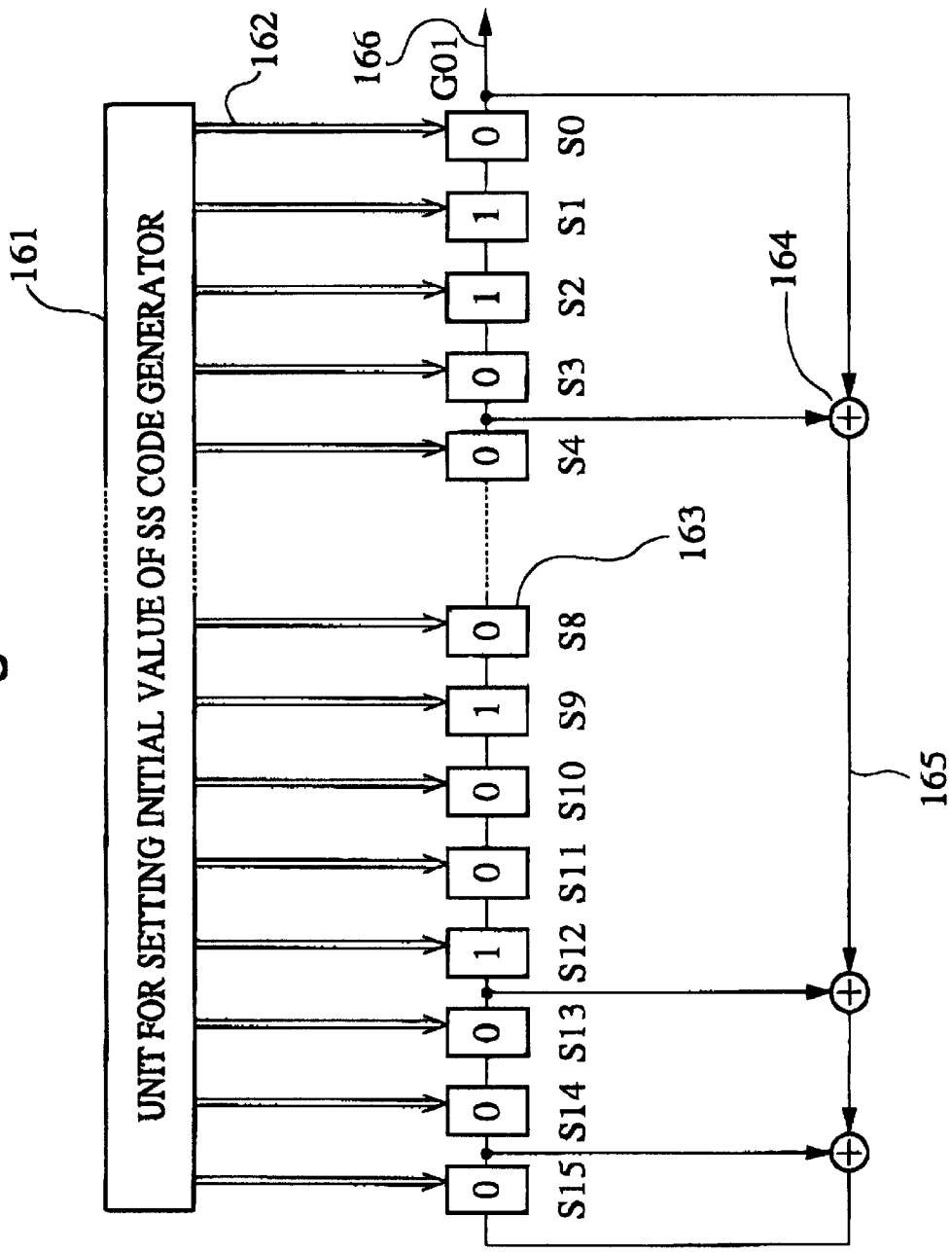
FIG. 17 is a diagram showing an interior structure of the spread-spectrum code generator of FIG. 16.

FIG. 16 is a fragmentary block diagram of the CDMA communication unit equipped with an initial value setting unit 150 for setting the initial values of the spread-spectrum codes, which are generated by the four spread-spectrum code generators 111–114, to arbitrary values. FIG. 17 is an initial-value-of-spread-spectrum-code-generator setting unit 161 for setting the initial values of the spread-spectrum code generators in shift registers 163 carried by the respective spread-spectrum code generators. The shift registers 163 are in the form of flip-flops.

Each spread-spectrum code generator 111–114 receives a set initial value from the initial value setting unit 150 via a respective signal line 151, 152, 153, 154. The initial-value-of-spread-spectrum-code-generator setting unit 161 shown in FIG. 17 sets the initial values to the respective shift registers for every bit. Thus the setting of initial values of spread-spectrum codes is achieved by an initial value setting means that is constituted by the initial value setting unit 150 as well as the shift registers 163, adders 164 and feedback circuit 165 which are carried by the spread-spectrum code generators.

Figure 18:
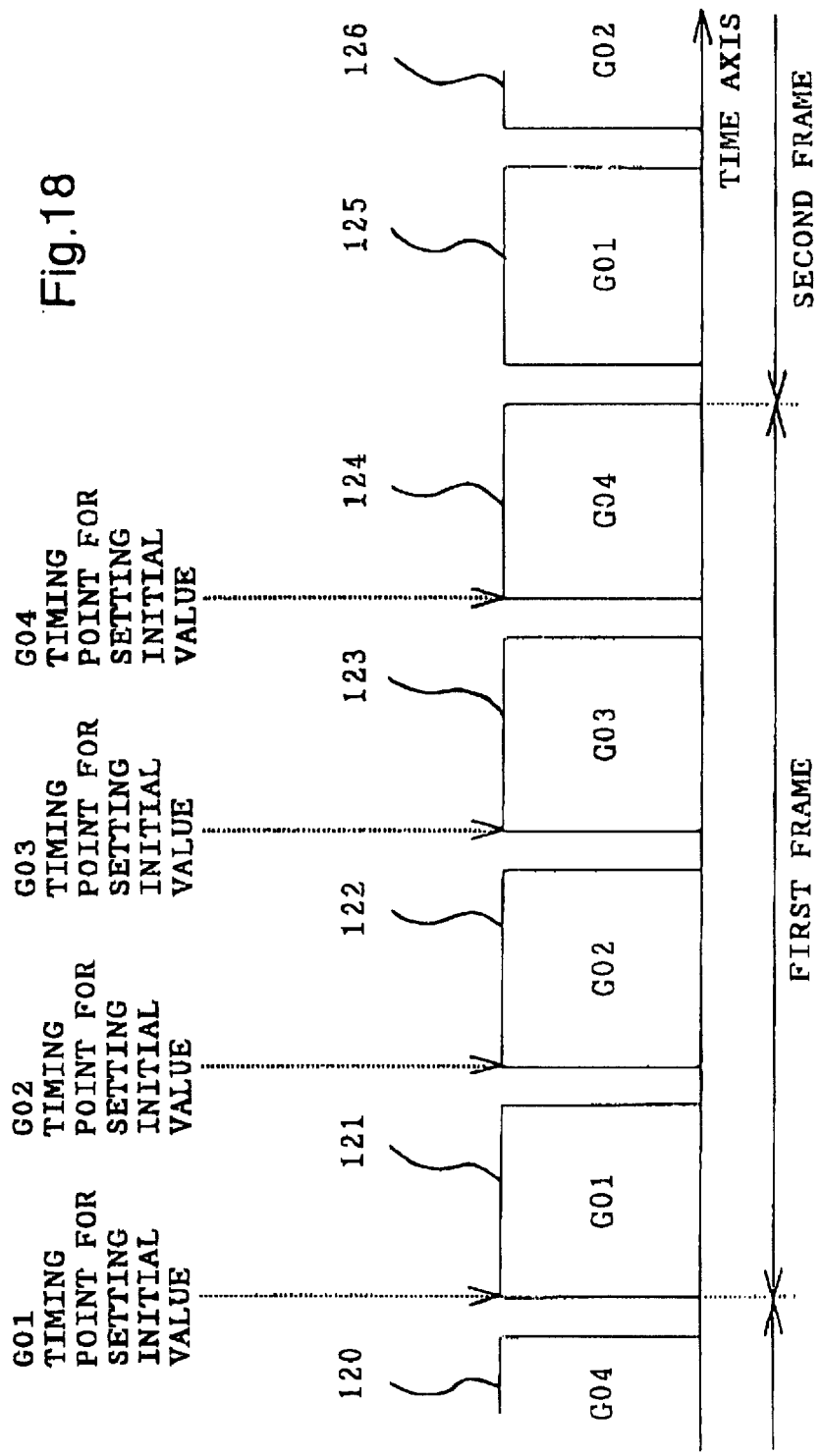
FIG. 18 is a diagram showing an example of the manner in which initial values are set to the respective time slots at respective timing points in the first embodiment.
Figure 19:
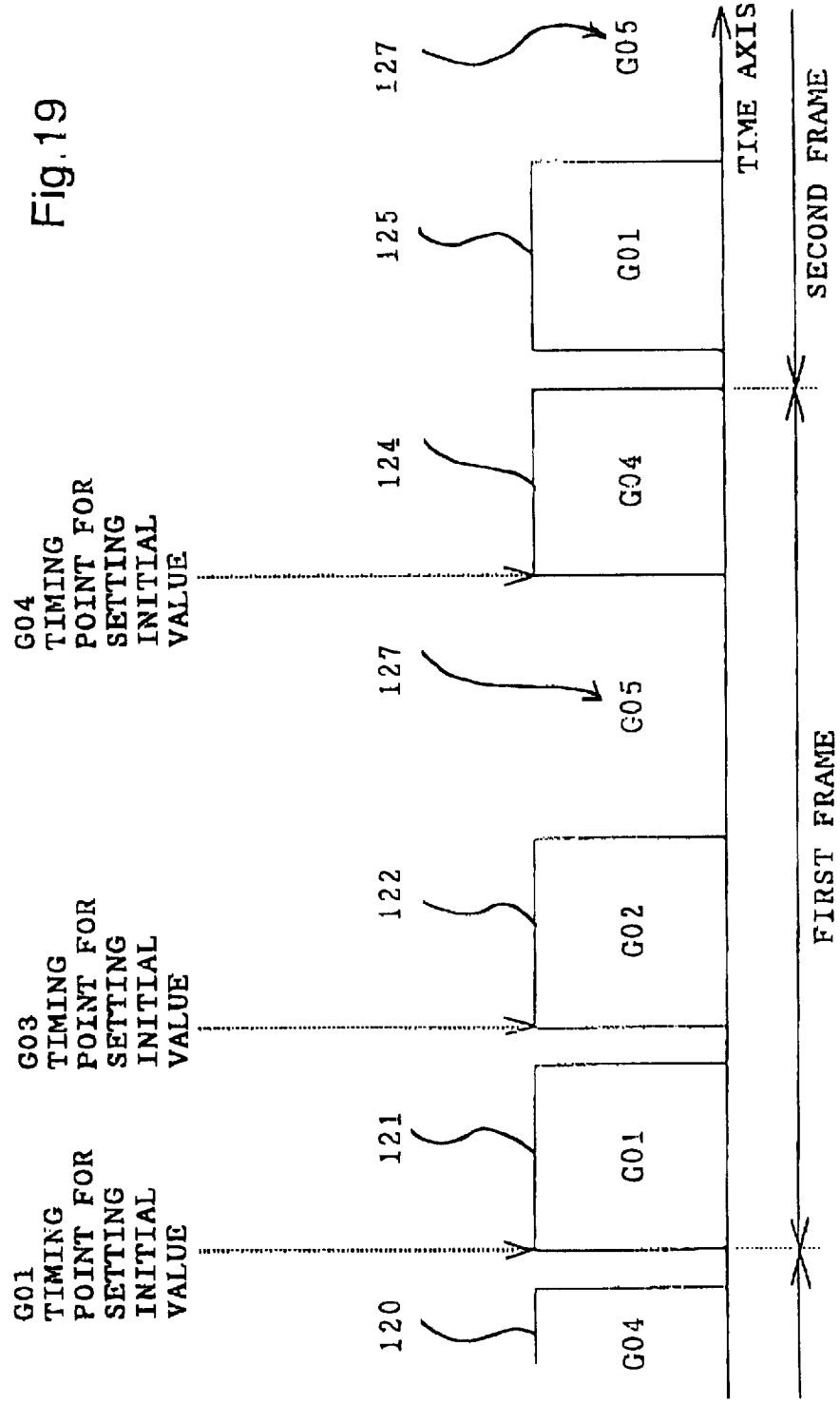
FIG. 19 is a diagram showing another example of the manner in which initial values are set to the respective time slots at respective timing points in the first embodiment.

FIGS. 18 and 19 are diagrams showing the setting of initial values to the respective time slots and their time points. When such figures as FIGS. 18 and 19 are shown, it is not always clearly described whether the type is applied for the TDD (time division duplex) type or the FDD (frequency division duplex) type. As is apparent from FIGS. 18 and 19, each initial value is set to a head position of the corresponding time slot. FIG. 19 in particular shows an example in which an empty time slot 127 exists; in this case, no initial value is set.

Thus, according to this embodiment, it is possible to assign a spread-spectrum code, whose initial value is set arbitrarily, to a head position of the respective time slot.

The initial value setting function to be performed by the initial value setting unit 150 of FIG. 16 and the construction of FIG. 17 may be realized alternatively not only by hardware having CPU, memories, etc. as built-in components but by software. Specifically the four spread-spectrum code generators 111–114 may be constituted by software.

Setting Spread-spectrum code Values

Figure 20:
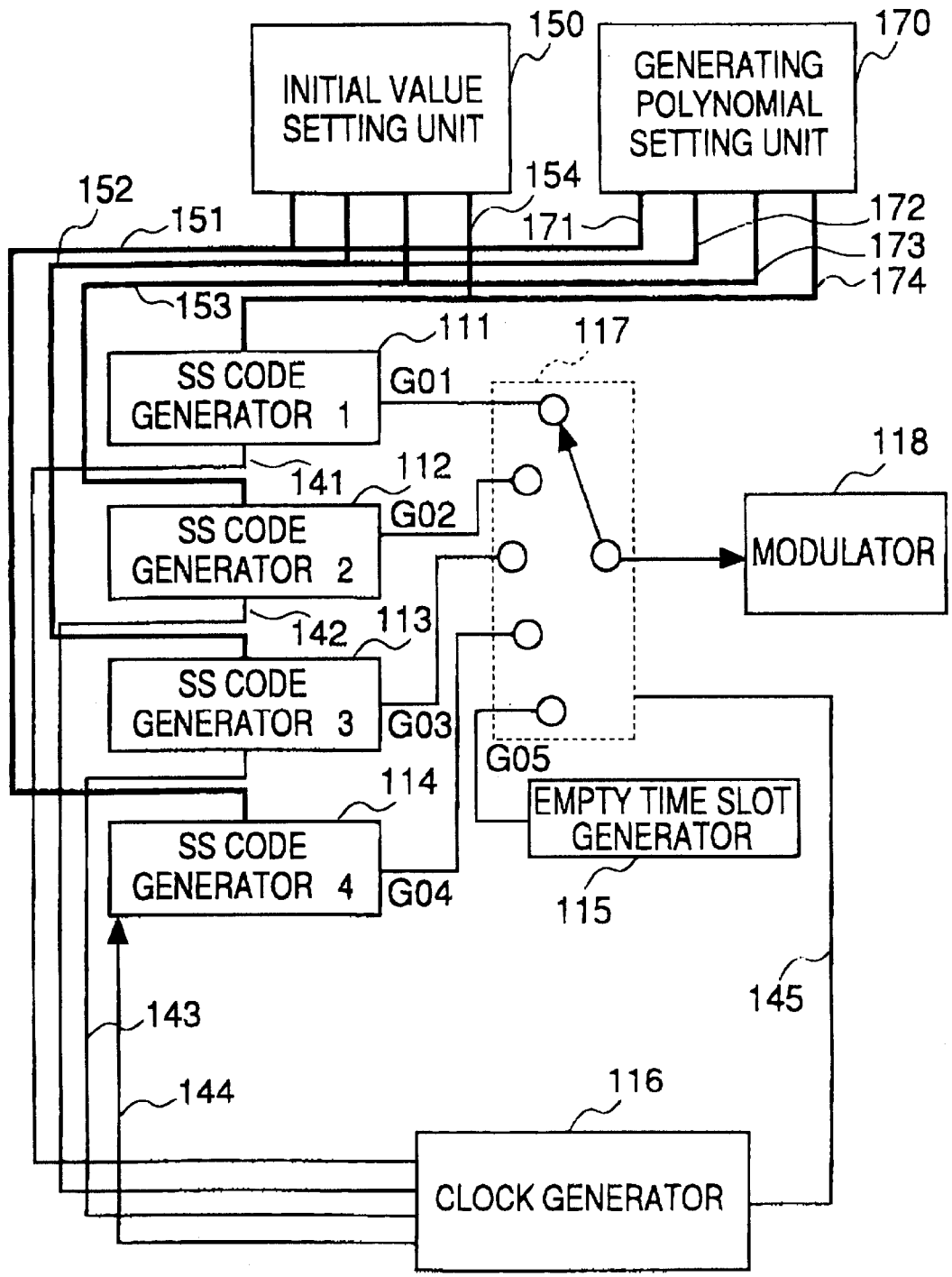
FIG. 20 is a block diagram showing only the main part of the CDMA communication unit in the first embodiment.

FIG. 20 is a block diagram showing only a main part of the CDMA communication unit in which each spread-spectrum code generator generates different spread-spectrum codes arbitrarily. The CDMA communication unit is characterized by a generating polynomial setting unit 170 for arbitrarily setting a value of the spread-spectrum code, which is generated by each spread-spectrum code generator 111–114, by a predetermined generating polynomial.

Figure 21:
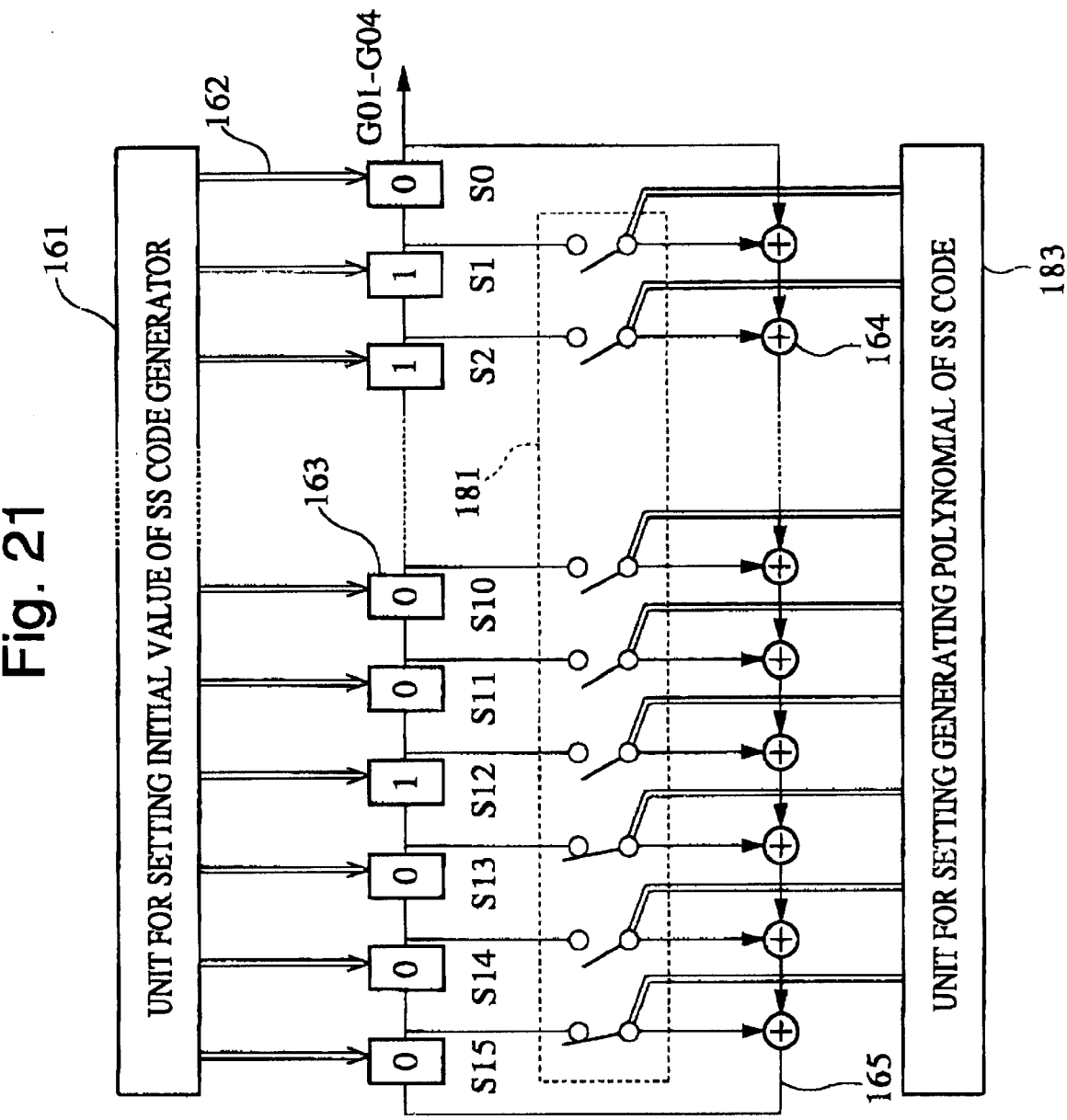
FIG. 21 is a diagram showing the interior structure of the spread-spectrum code generator of FIG. 20.

FIG. 21 is a diagram of a spread-spectrum code setting mechanism carried by the spread-spectrum code generator, showing a set of switches 181 for freely changing the feedback loop including the shift registers 163 and also a generating-polynomial-of-spread-spectrum-code setting unit 183 for setting a generating polynomial by the switches 181 to set a predetermined bit value in the shift registers 163. In this embodiment, the spread-spectrum code setting unit, in which each spread-spectrum code generator 111–114 generates a spread-spectrum code arbitrarily by a designated generating polynomial, is constituted by the generating polynomial setting unit 170 and the spread-spectrum code setting mechanism of FIG. 21.

The individual spread-spectrum code generators 111–114 receive generating polynomials from the generating polynomial setting unit 170 via the respective signal lines 171, 172, 173, 174. The generating-polynomial-of-spread-spectrum-code setting unit 183 in each spread-spectrum code generator sets a bit value in each shift register by the switches 181, based on the designated generating polynomial, so as to generate a predetermined spread-spectrum code. Thus, the generating-polynomial-of-spread-spectrum-code setting unit 183 sets a generating polynomial by controlling the opening and closing of each switch 181 to generate a predetermined spread-spectrum code value. If a generating polynomial has once been generated, the switches 181 is fixed inoperative until communication terminates.

Figure 22:
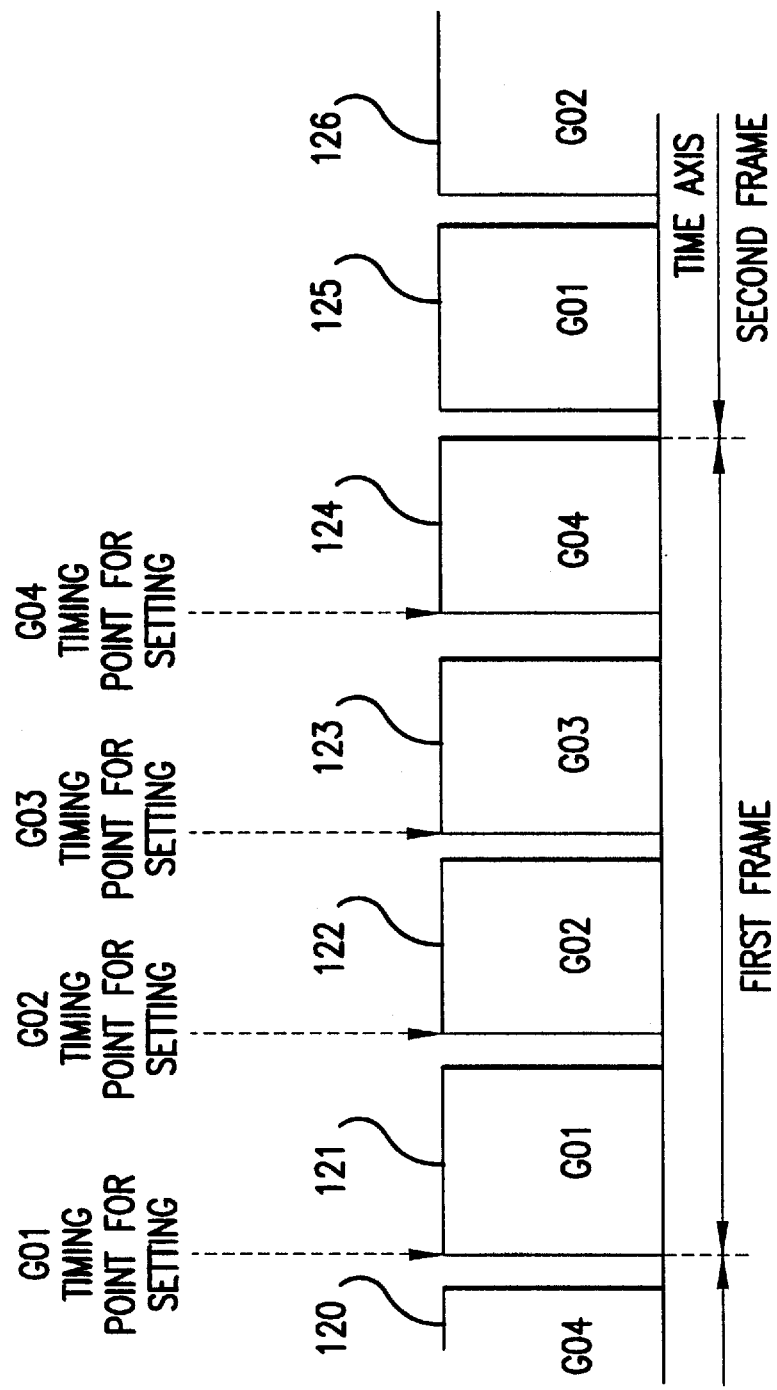
FIG. 22 is a diagram showing an example of the manner in which initial values are set to the respective time slots at respective timing points in the first embodiment.
Figure 23:
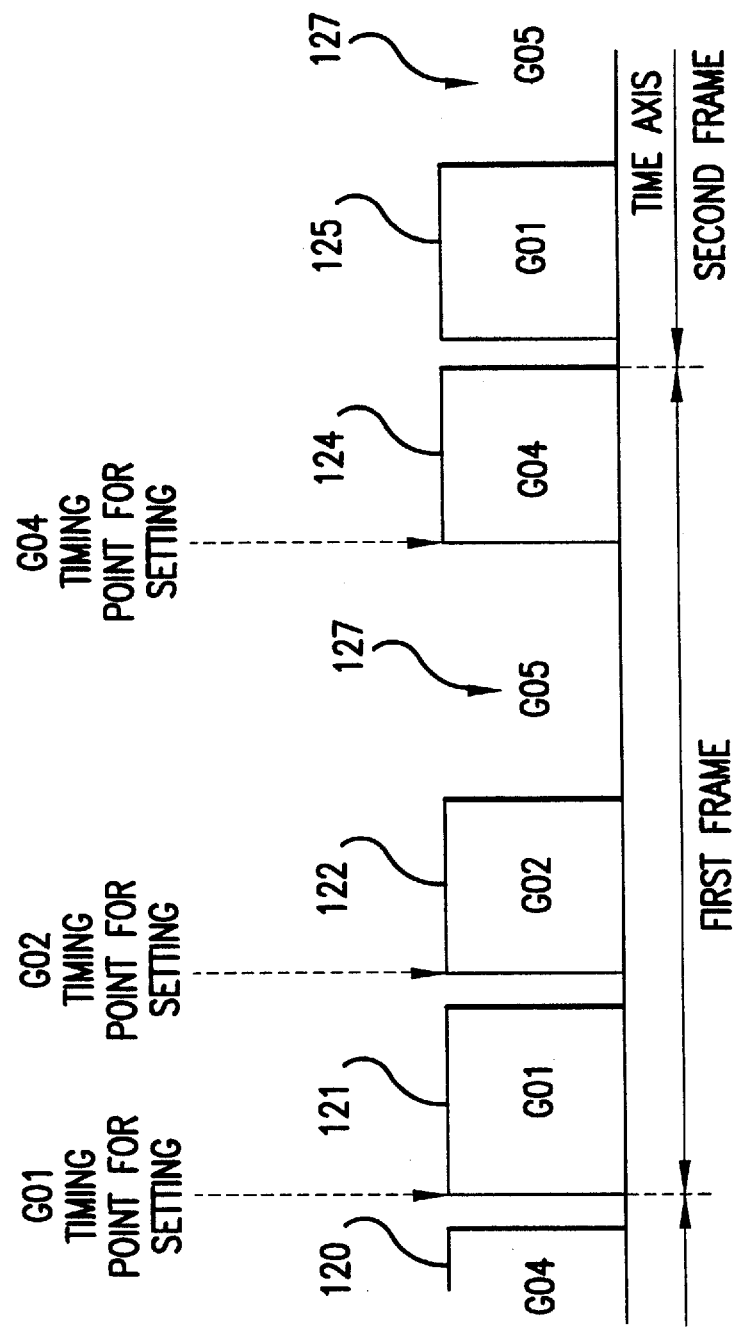
FIG. 23 is a diagram showing another example of the manner in which initial values are set to the respective time slots at respective timing points in the first embodiment.

FIGS. 22 and 23 are diagrams showing the setting of spread-spectrum codes to the respective time slots and their time points. As is apparent from FIGS. 22 and 23, a spread-spectrum code is set to a head position of each time slot. FIG. 23 in particular shows an example in which an empty time slot 127 exists; in this case, no spread-spectrum code is set.

Thus, according to this embodiment, it is possible to assign a spread-spectrum code, whose initial value is set arbitrarily, to a head position of the respective time slot; this is, it is possible to assign a different spread-spectrum code to each time slot.

Alternatively, the initial value setting function may be realized not only by hardware having CPU, memories, etc. as built-in components but by software. Specifically the four spread-spectrum code generators 111–114 may be constituted by software.

Further, if a general polynomial is set such that an initial value is generated by the general polynomial setting unit 170 of FIG. 20, the initial value setting unit 150 may not be provided independently.

Receiving CDMA Signals Assigned to Time Slots

Figure 24:
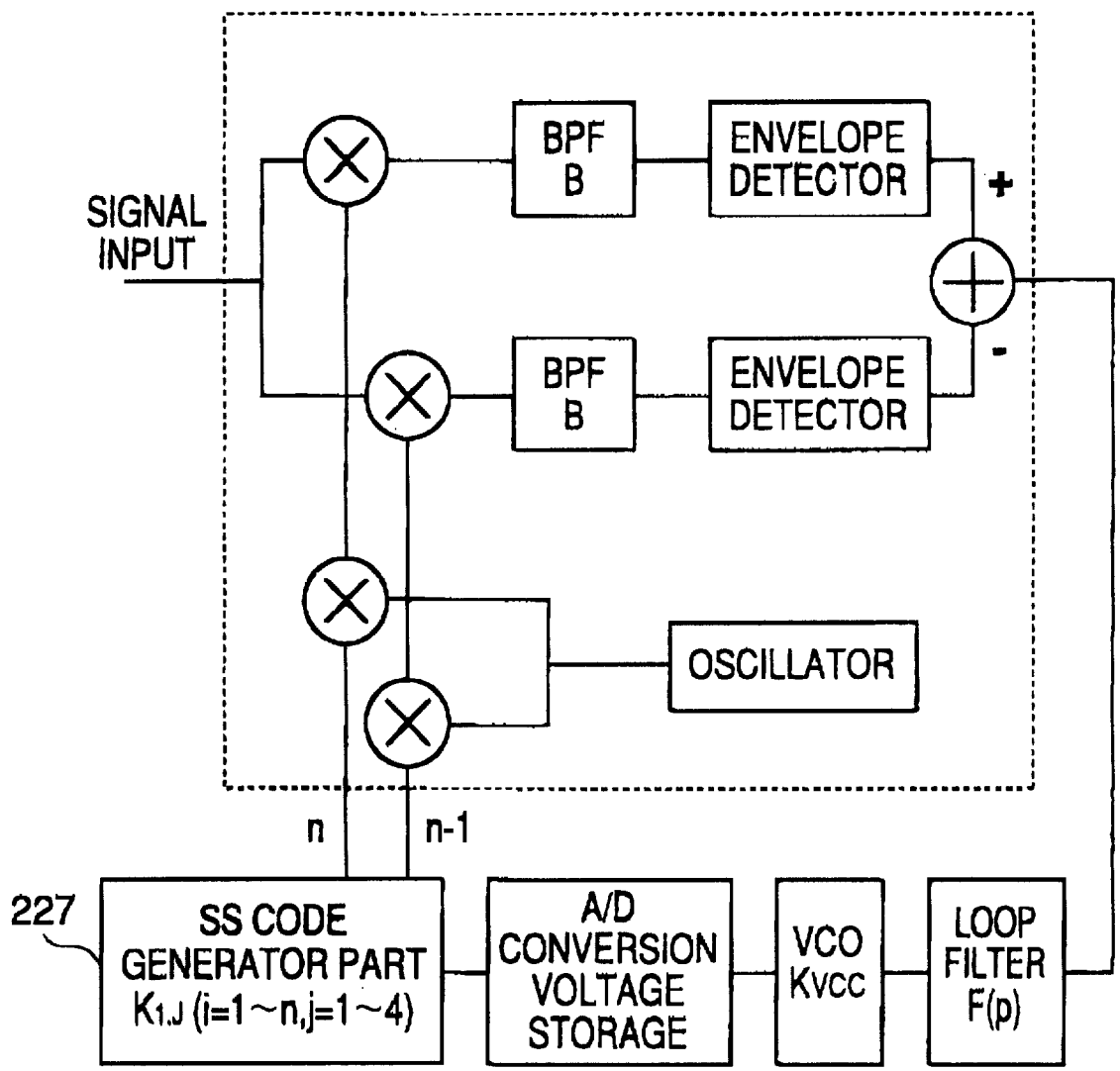
FIG. 24 is a block diagram showing a noncoherent delay-lock loop in the first embodiment.
Figure 25:
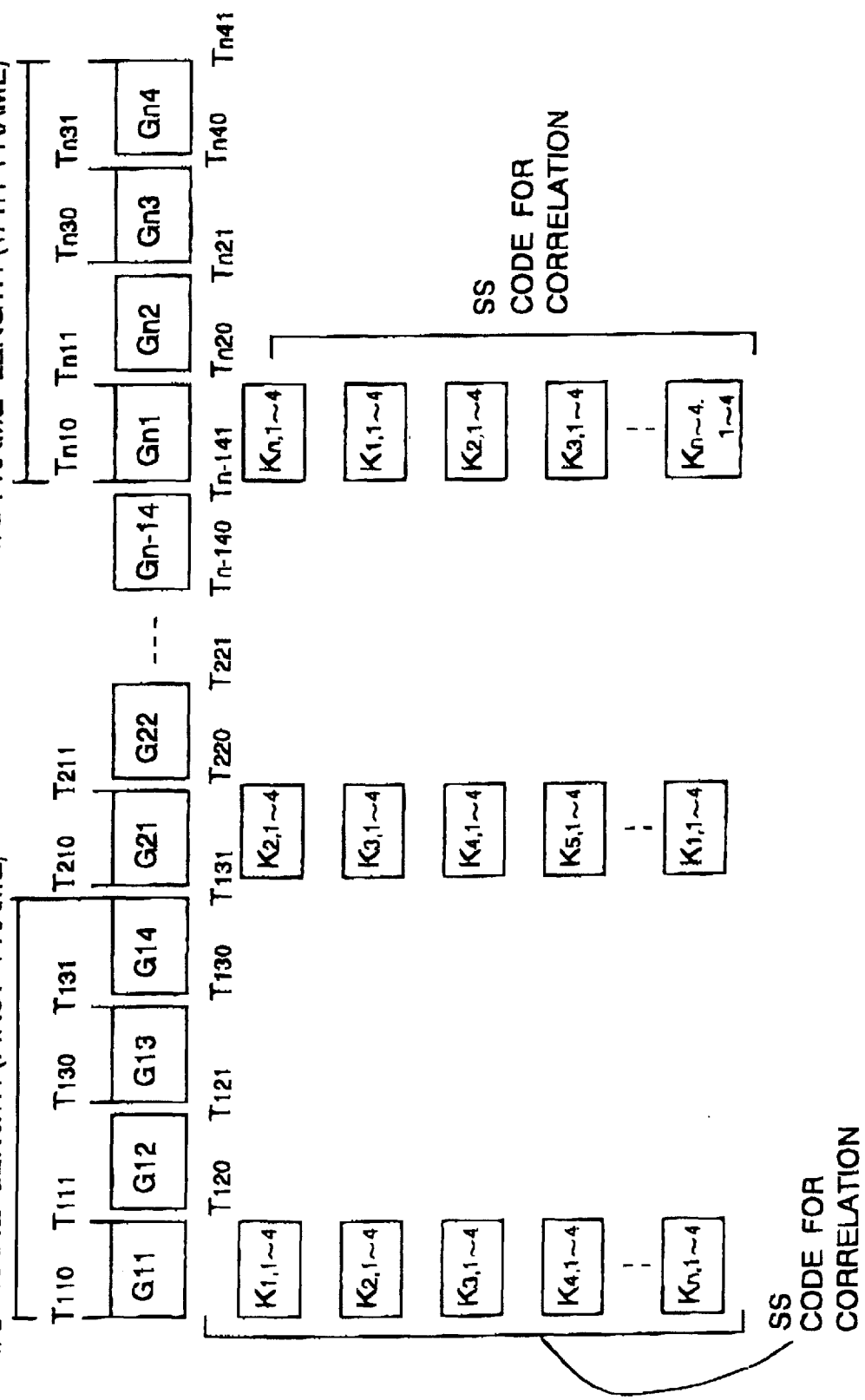
FIG. 25 is a diagram showing the manner of synchronous supplement of the noncoherent delay-lock loop of FIG. 24.

FIG. 24 shows a noncoherent delay-lock loop for synchronization of spread-spectrum codes of CDMA method. A spread-spectrum code generator 227 is a spread-spectrum code generating means which may generate n×4 kinds of spread-spectrum codes as shown in FIG. 25 and which is realized by hardware in this embodiment. In this case, the setting of generating polynomials and initial values of the spread-spectrum code generator 227 is realized by the above-mentioned spread-spectrum code setting unit and the initial value setting unit. The entire circuit of FIG. 24 may be realized by software by digitizing input signals. Of course, the spread-spectrum code generator 227 has a function of generating spread-spectrum codes that are shifted from one another by 1 bit in order to make the usual synchronous tracing. This shifting may be realized by varying the timing of outputs of an analog-digital converter 228, and this function is represented by "n" and "n−1" in FIG. 24.

Figure 130:
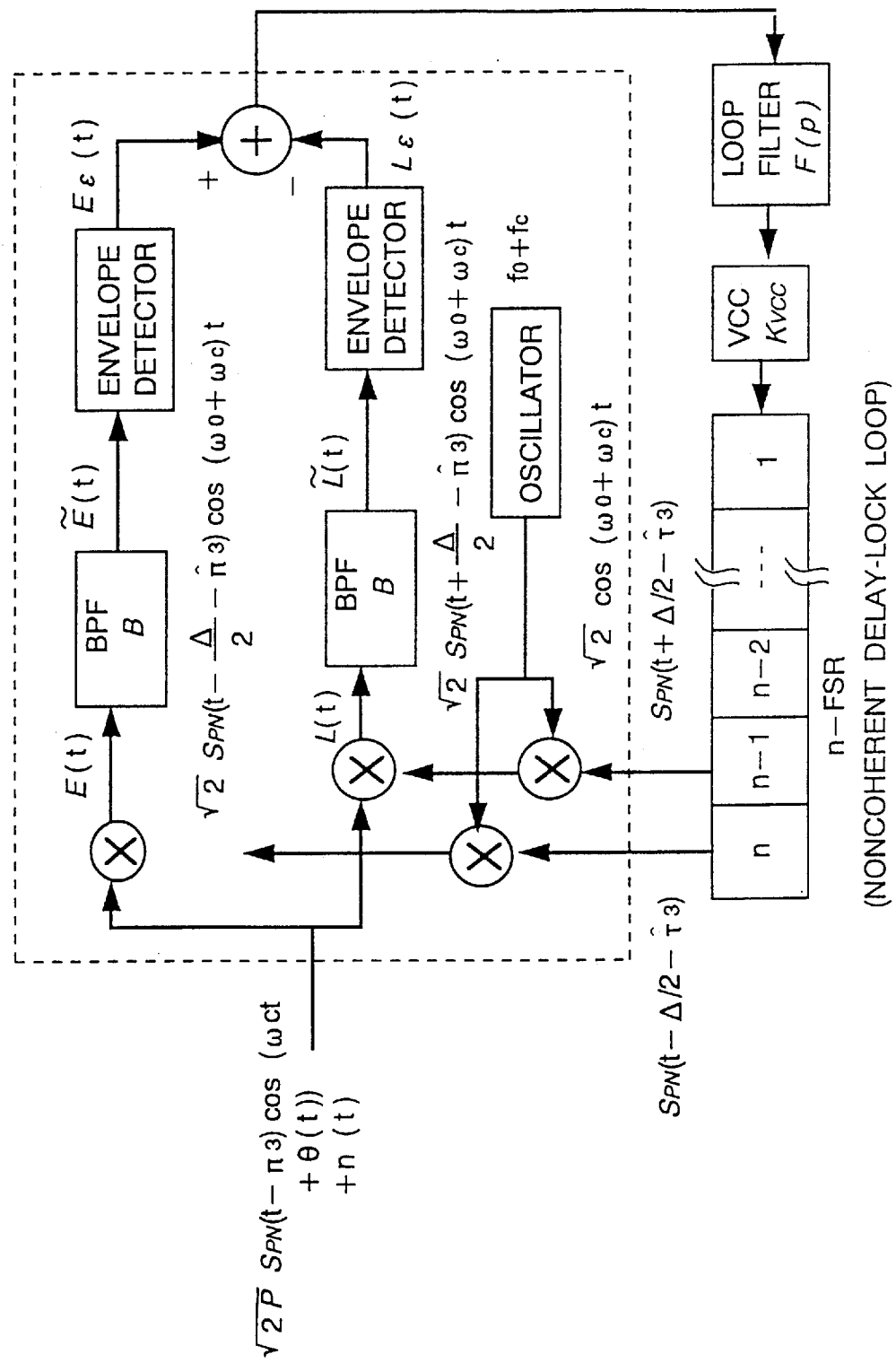

A correlator having a single noncoherent delay-lock loop as a conventional CDMA spread-spectrum code correlator is shown in FIG. 130.

The action of the noncoherent delay-lock loop for continuous supplementing will now be described using FIG. 25.

In FIG. 25, regarding a single information channel in the case of 4 slots/1 frame and n frames/1 multi frame, the channels of the first slot are represented by G11, G21, . . . ,Gn1; the channels of the second slot, G12, G22, . . . ,Gn2; the channels of the third slot, G13, G23, . . . ,Gn3; and the channels of the fourth slot, G14, G24, . . . ,Gn4. The spread-spectrum code of the first slot channel has 1 code length, which is the sum of G11+G21+. . . +Gn1, and arithmetic operation of correlation in the case of reverse spread-spectrum is performed for the sum of G11+G21+ . . . +Gn1.

K1,1 through Kn,4 shown below the time slot G11 in FIG. 25 are all of candidate correlation code strings that are able to establish a correlation with G11, and the whole of the correlation code can be expressed in matrix like the following first equation:

$$\begin{bmatrix} K_{1,1(t)} & K_{2,1(t)} & K_{3,1(t)} & \cdots & K_{n,1(t)} \\ K_{1,2(t)} & K_{2,2(t)} & K_{3,2(t)} & \cdots & K_{n,2(t)} \\ K_{1,3(t)} & K_{2,3(t)} & K_{3,3(t)} & \cdots & K_{n,3(t)} \\ K_{1,4(t)} & K_{2,4(t)} & K_{3,4(t)} & \cdots & K_{n,4(t)} \end{bmatrix}$$

Assuming that a receiving code string of the time slot Gi1 is expressed by Gi1(t), the result of correlation arithmetic of spread-spectrum code is obtained from a matrix of the following second equation:

$$\sum_{i=1}^{n} \sum_{t=t_{i10}}^{T_{i11}} Gi1(t) \begin{bmatrix} K_{1,1(t)} & K_{2,1(t)} & K_{3,1(t)} & \cdots & K_{n,1(t)} \\ K_{1,2(t)} & K_{2,2(t)} & K_{3,2(t)} & \cdots & K_{n,2(t)} \\ K_{1,3(t)} & K_{2,3(t)} & K_{3,3(t)} & \cdots & K_{n,3(t)} \\ K_{1,4(t)} & K_{2,4(t)} & K_{3,4(t)} & \cdots & K_{n,4(t)} \end{bmatrix}$$

Ki,j representing a maximum value of n×4 elements of the above matrix is a correlation code to be detected. In this case, n×4 arithmetic operations have to be performed simultaneously, and this arithmetic may be performed by 1 multi frame length of data Gi,j(t) and may be realized alternatively by a combination of CPU and software.

The length of spread-spectrum codes to be used may be relatively longer than that of the frame and may be substantially equal to 1 data symbol length. Such relatively short code is used for identification of information channel and is decoded using a matched filter or an SAW convolver device; however, the relatively short codes are already well known in the art, so their detailed description is omitted in this embodiment. Although, in the mobile communication system of this embodiment, these relatively short codes are used, the invention is not limited to the use of such relatively short codes. Various modifications or substitutions are possible for those skilled in the art without departing from the scope of the invention.

Another correlator for performing correlation arithmetic of spread-spectrum code of CDMA method for a plurality of time slots will now be described.

Figure 26:
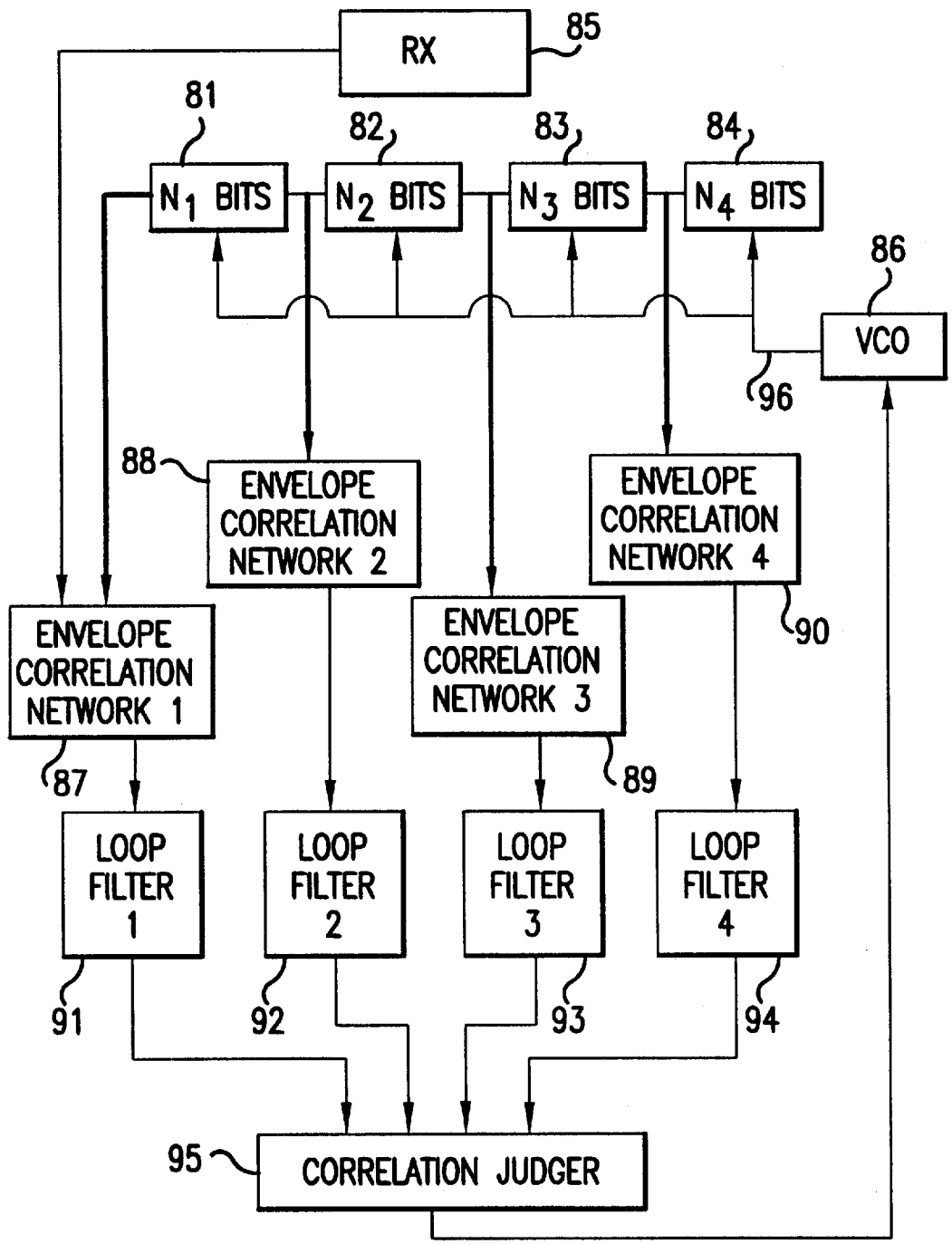
FIG. 26 is a block diagram showing a plurality of correlator having a plurality of envelope relation networks in the first embodiment.

The correlator described below is characterized by having a plurality of noncoherent delay-lock loops, i.e., a plurality of envelope correlation network. FIG. 26 is a block diagram showing an example of correlator. This correlator makes synchronization with spread-spectrum codes of the CDMA method.

Figure 27:
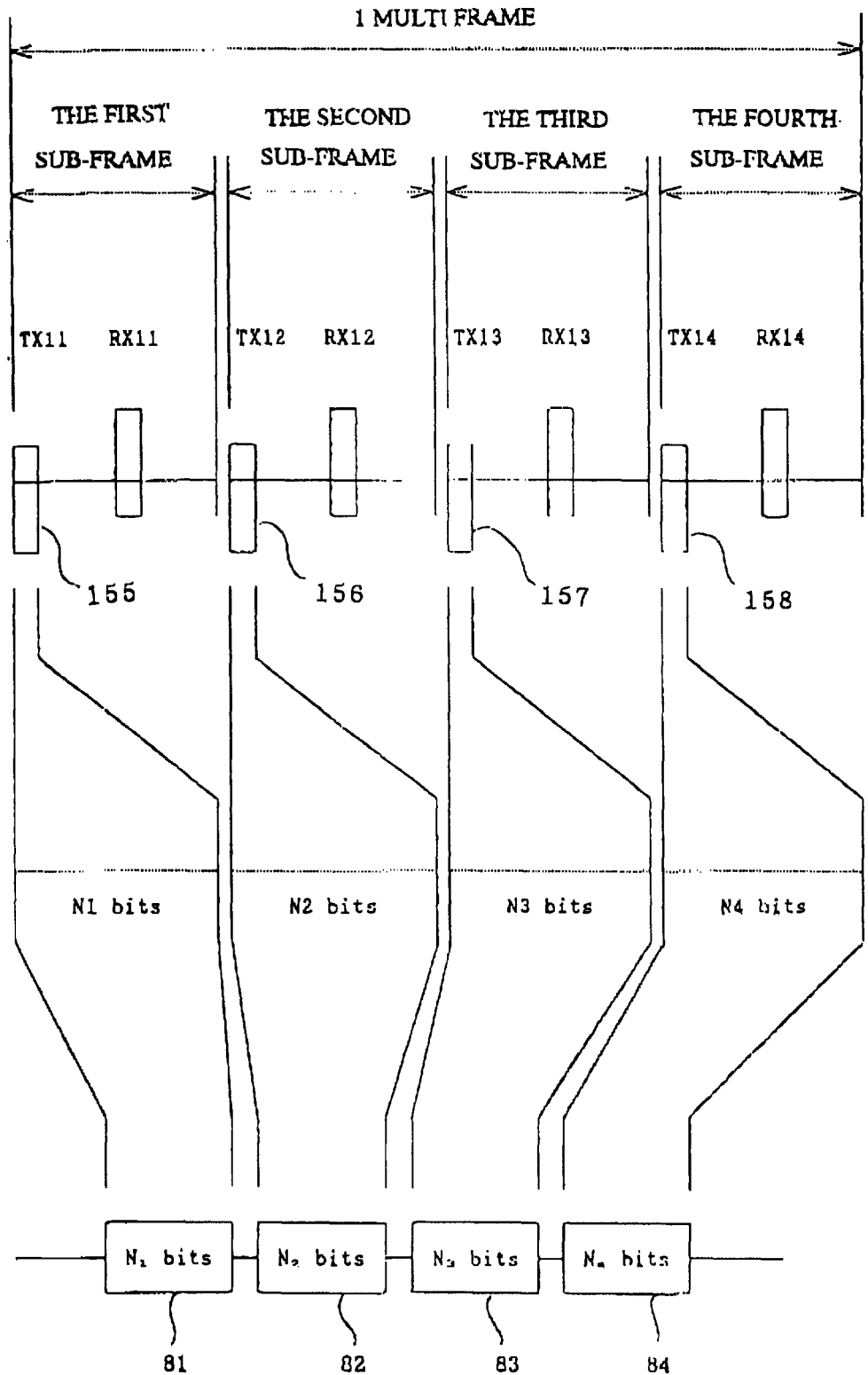
FIG. 27 is a diagram showing time slots on the transmitting side in a multi frame in the first embodiment.

The envelope correlation network 87, 88, 89, 90 of FIG. 26 is a circuit that is functionally equivalent to a portion surrounded by dotted lines in FIG. 130, which shows the prior art. Built-in spread-spectrum code generators 81–84 of the receiving section of the communication station generate a string of spread-spectrum codes (N1+N2+N3+N4), and loop filters 91–94 outputs only when the spread-spectrum code string approaches the output signal of a receiver 85, i.e., the received signal. Thus the correlator performs synchronous supplementing. A correlation discriminator 95 detects a output voltage of the correlator and supplies a detection signal to a voltage control oscillator 86. The correlator in this embodiment forms a loop by the spread-spectrum code generators 81–84, the envelope correlation networks 87–90, the loop filters 91–94, the correlation discriminator 95 and the voltage control oscillator 86, and makes synchronization with the CDMA spread-spectrum codes received by the receiver 85, thus reproducing data. The voltage control oscillator 86 generates a clock signal 96 to the spread-spectrum code generators 81–84. The clock signal 96 is set so as to be outputted only at a portion of the first time slot 155–158 of each sub-frame as shown in FIG. 27 and so as to be stopped at the remaining time slots of the sub-frame. In the correlator of FIG. 26, the spread-spectrum codes are correlated with four time lags in order to compress the whole synchronizing time.

The receiving section in this embodiment may be composed of only a single set of the foregoing components, so each communication station may not have the receiving section for every information channel.

Though they constitutes a part of the receiving section in each communication station, the spread-spectrum code generators may serve also as those contained in the transmitting section of FIG. 20.

Simultaneous Use of Access Method & Change of Access Method for Time Slot

This embodiment is characterized by that the CDMA signal divided timewise as described above is assigned to the time slot of TDMA method.

In the example of FIGS. 11 and 12, the TDMA signal is assigned to the third time slot 134. This embodiment is characterized not only by that the time-divided CDMA signal is assigned to the time slot of the TDMA method but by that the TDMA signal and the CDMA signal are assigned to the time slot for continuous transmission. Thus in this embodiment, it is possible to transmit signals of different methods simultaneously in a mixed form. In this case, The controller 54 of FIG. 6 serves as a control means for controlling the TDMA communication unit and the CDMA communication unit to assign the TDMA signal or the CDMA signal to each time slot. In this embodiment, by assigning the CDMA signal to the time slot of the TDMA method, it is possible to transmit only the CDMA signal different in spread-spectrum codes, to transmit the CDMA signal and the TDMA signal in a mixed form, and to transmit only the TDMA signal like the prior art.

The transmission of the time slot in which the CDMA and TDMA signals different from each other in access method will be described. Also the selection of the access method to assign the time slot will be described with reference to an example.

(CDMA Communication Unit in Radio base station)

Figure 28:
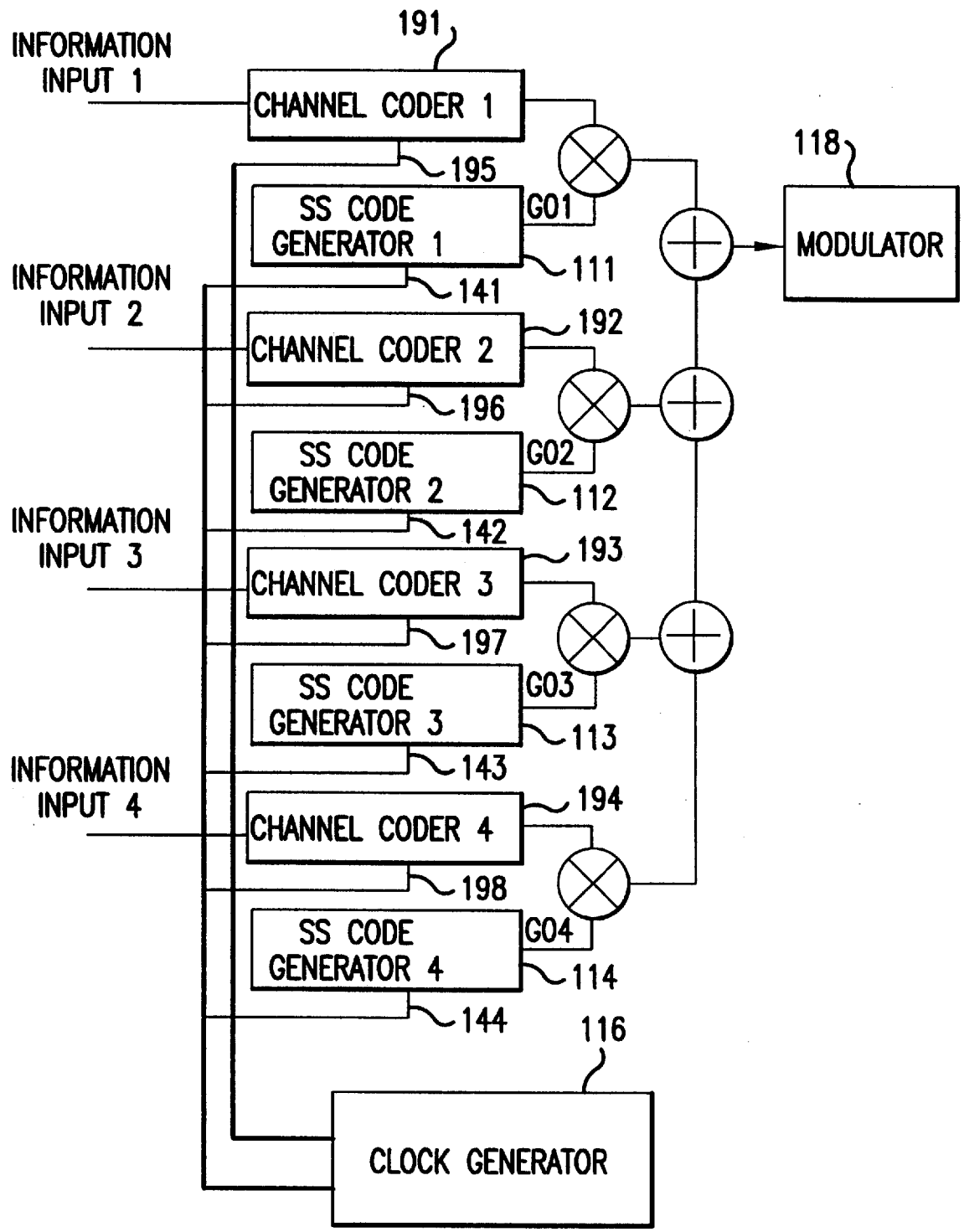
FIG. 28 is a fragmentary block diagram showing the transmitter of the CDMA communication unit of the radio base station in the first embodiment.
Figure 29:
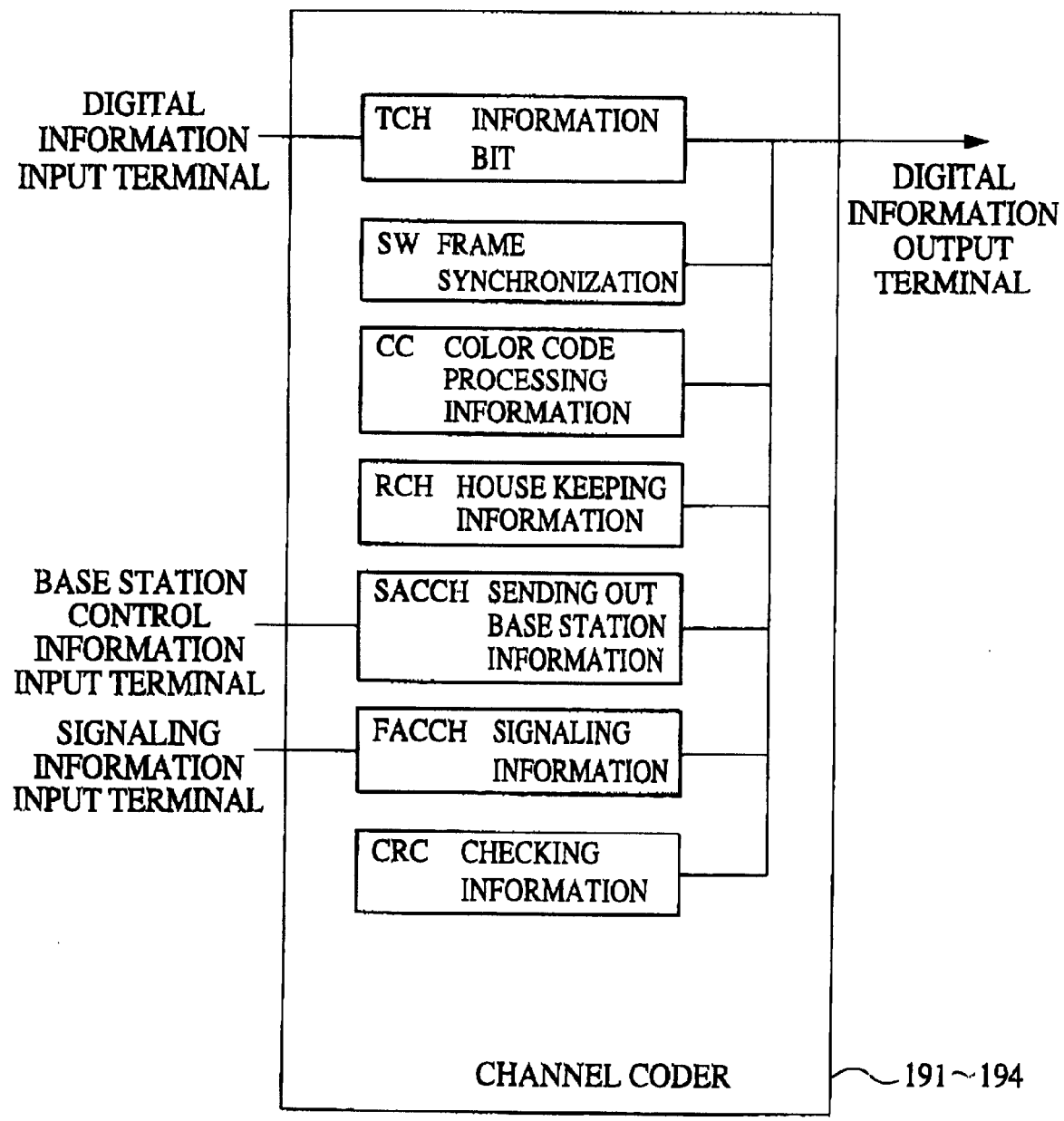
FIG. 29 is a diagram showing the structure of a channel coder of FIG. 28.

FIG. 28 is a fragmentary block diagram showing a transmitting section of the CDMA communication unit in the radio base station. The transmitting section includes channel coders 191–194 for performing primary modulation on information inputs 1–4 from the TDMA communication unit, and a mechanism for multiplying the information code, which is outputted from each channel coder 191–194, by the spread-spectrum code and for adding the resulting outputs to supply to the modulator 118. FIG. 29 shows each of the channel coders 191–194 of FIG. 28. The channel coder of this embodiment may be a conventional type. This invention is characterized by that the controller assigns to each time slot the CDMA signals generated based on product information of the output of the channel coder 191–194 corresponding to each time slot and the spread-spectrum code.

FIG. 30 is a diagram showing the contents of output of the CDMA communication unit of FIG. 28. Specifically, FIG. 30 shows the contents of the first time slot in the first frame; this is, the contents of this time slot can be referred to without being encoded by the spread-spectrum code. On the other hand, the contents of the second through fourth time slots in the first frame cannot be referred to. FIG. 30 shows an example of information bit when the spread-spectrum code generator 111 corresponding to the first time slot is out of operation. If the spread-spectrum code generator 111 is in operation, the information of FIG. 30 is scrambled by the spread-spectrum code so that information bit cannot be directly looked at. In other words, The information bit string of FIG. 30 should be regarded as the information in which the TDMA signal is not encoded with CDMA; when the first time slot is used for the TDMA signal, the spread-spectrum code generator 111 is rendered inoperative. Accordingly the information input 1 is transmitted as the TDMA signal without being encoded with CDMA.

Thus, by controlling the operation of the spread-spectrum code generators, it is possible to change an arbitrary time slot into a new form for use with the CDMA signal or the TDMA signal. Further, by controlling each spread-spectrum code generator 111–114 associated with the corresponding time slot, it is possible that the TDMA signal and the CDMA signal exist in a common frame.

The channel coder of FIG. 29 may be realized not only by hardware but by software.

(CDMA Communication Unit in Mobile Station)

Figure 31:
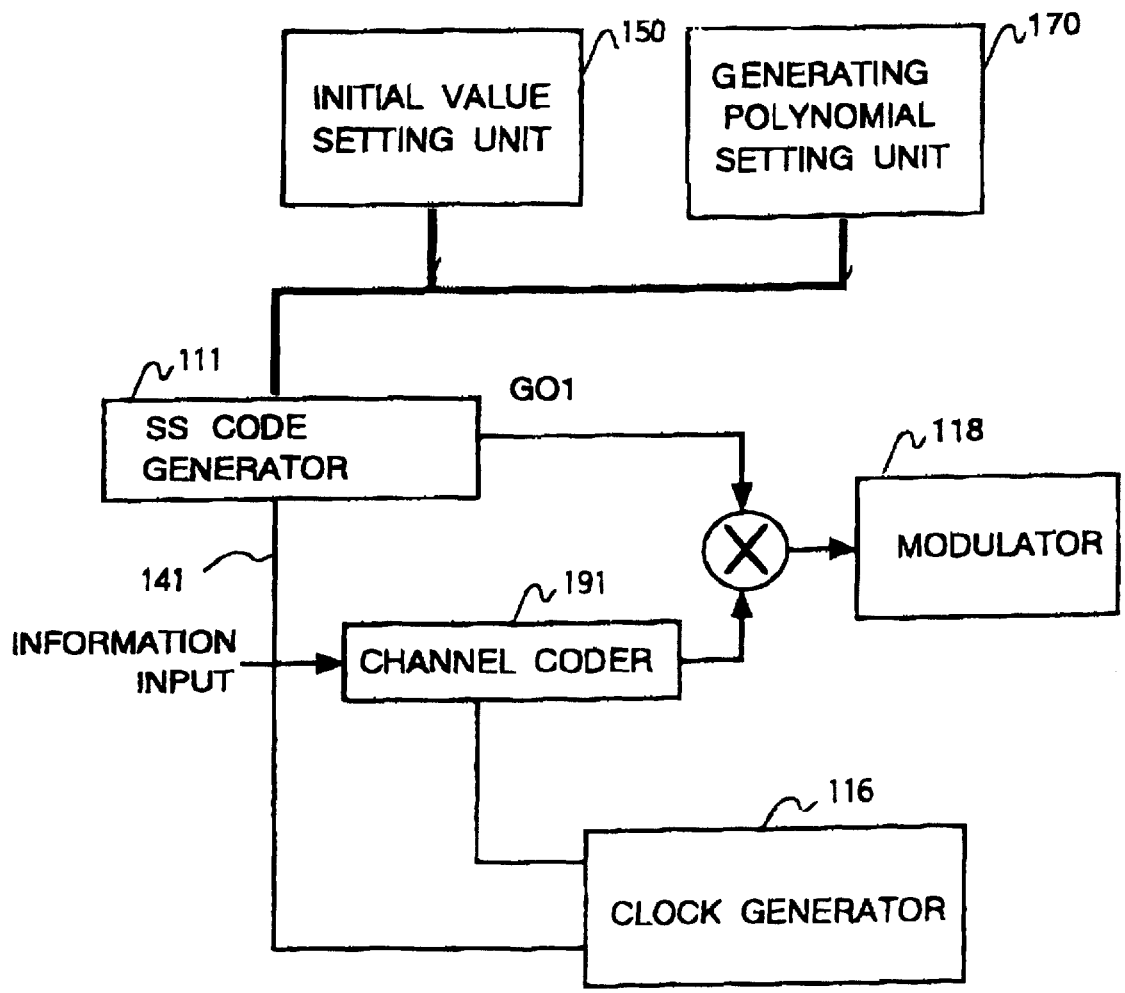
FIG. 31 is a fragmentary block diagram showing the transmitter of the CDMA communication unit of the mobile station having only a single system of information input, in the first embodiment.
Figure 32:
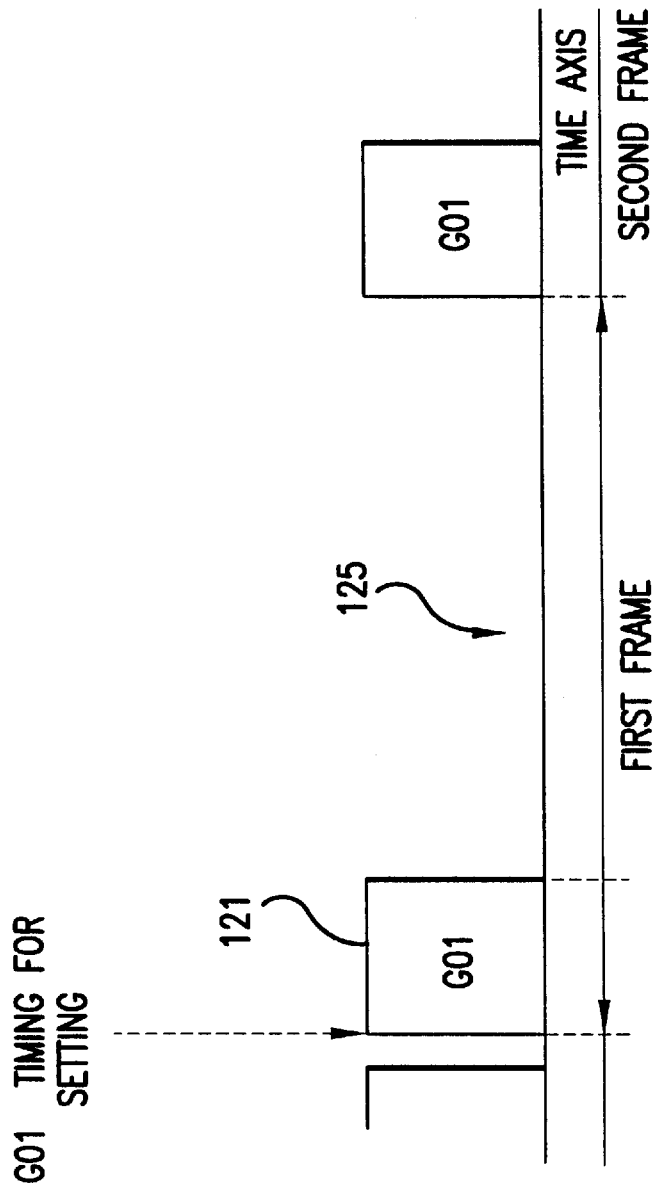
FIG. 32 is a diagram showing an example of time slot to be transmitted from a modulator of FIG. 31.

FIG. 31 is a fragmentary block diagram showing the transmitting section of the CDMA communication in the mobile station having only a single system of information input. FIG. 32 shows an example of time slot to be transmitted from the modulator 118; as is apparent from this view, only a single burst is generated. Therefore, between other three bursts in FIG. 32, no spread-spectrum code would happen to occur as the transmission of clock from the clock generator 116 via the signal line 141 is stopped. Further, since the initial value after the three bursts may be used, without any change, as the final value of the previously used burst, it is unnecessary to temporarily store the information of the final value. The spread-spectrum code might be changed every time each frame is transmitted from the generating polynomial setting unit 170.

It is also possible to assign the TDMA signal by rendering the spread-spectrum code generator 111 inoperative.

Figure 33:
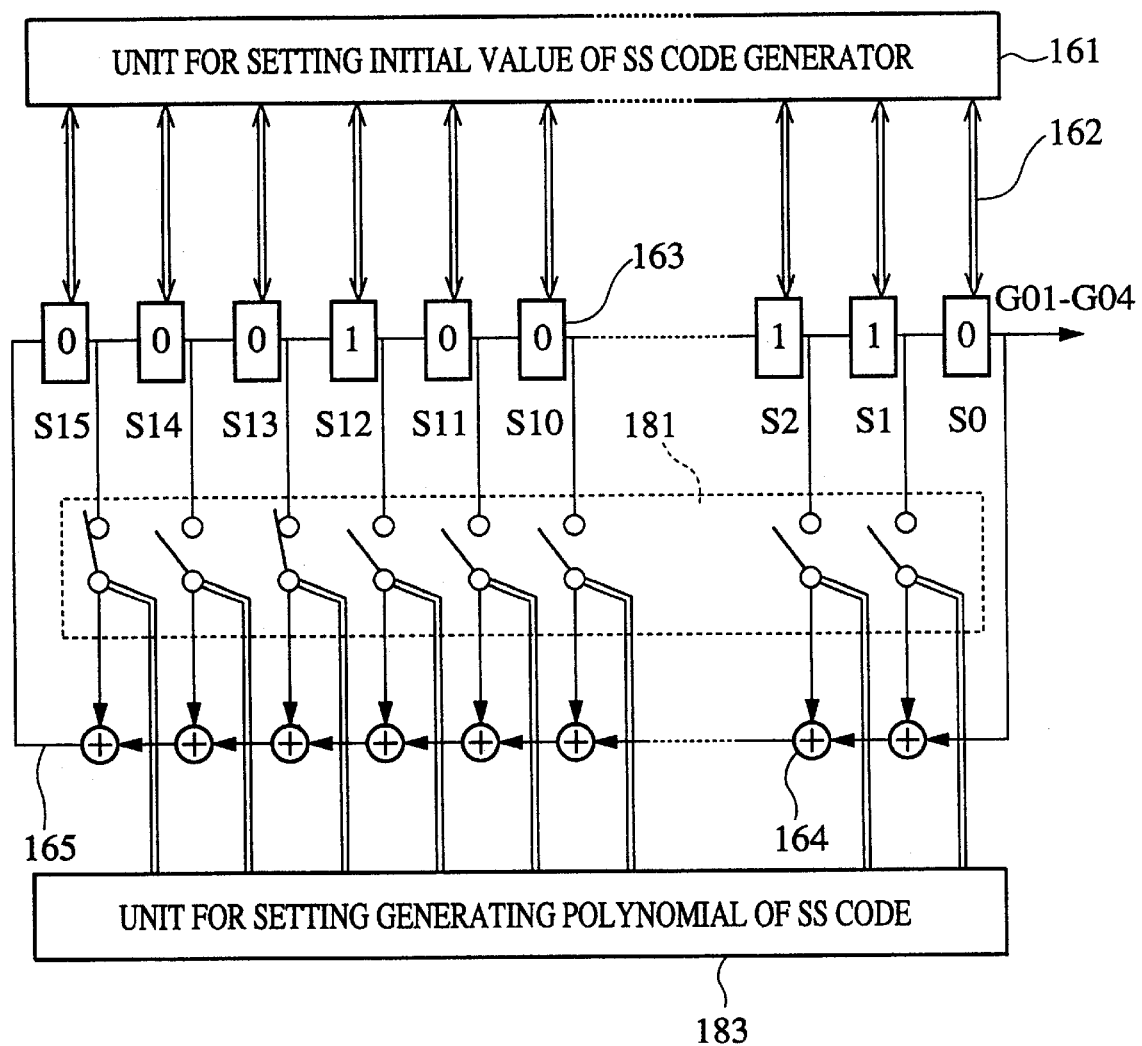
FIG. 33 is a diagram showing an interior structure of a spread-spectrum code generator of FIG. 31.

FIG. 33 shows a mechanism for setting a spread-spectrum code of the spread-spectrum code generator 111 of FIG. 31.
(Assignment of Synchronizing and Control Channels To Time Slot)

Although a time slot may be used as only a synchronizing channel or a control channel, the following description is referred to an example in which the same time slot is used both the synchronizing channel and the control channel in either the CDMA method or the TDMA method.

Figure 36:
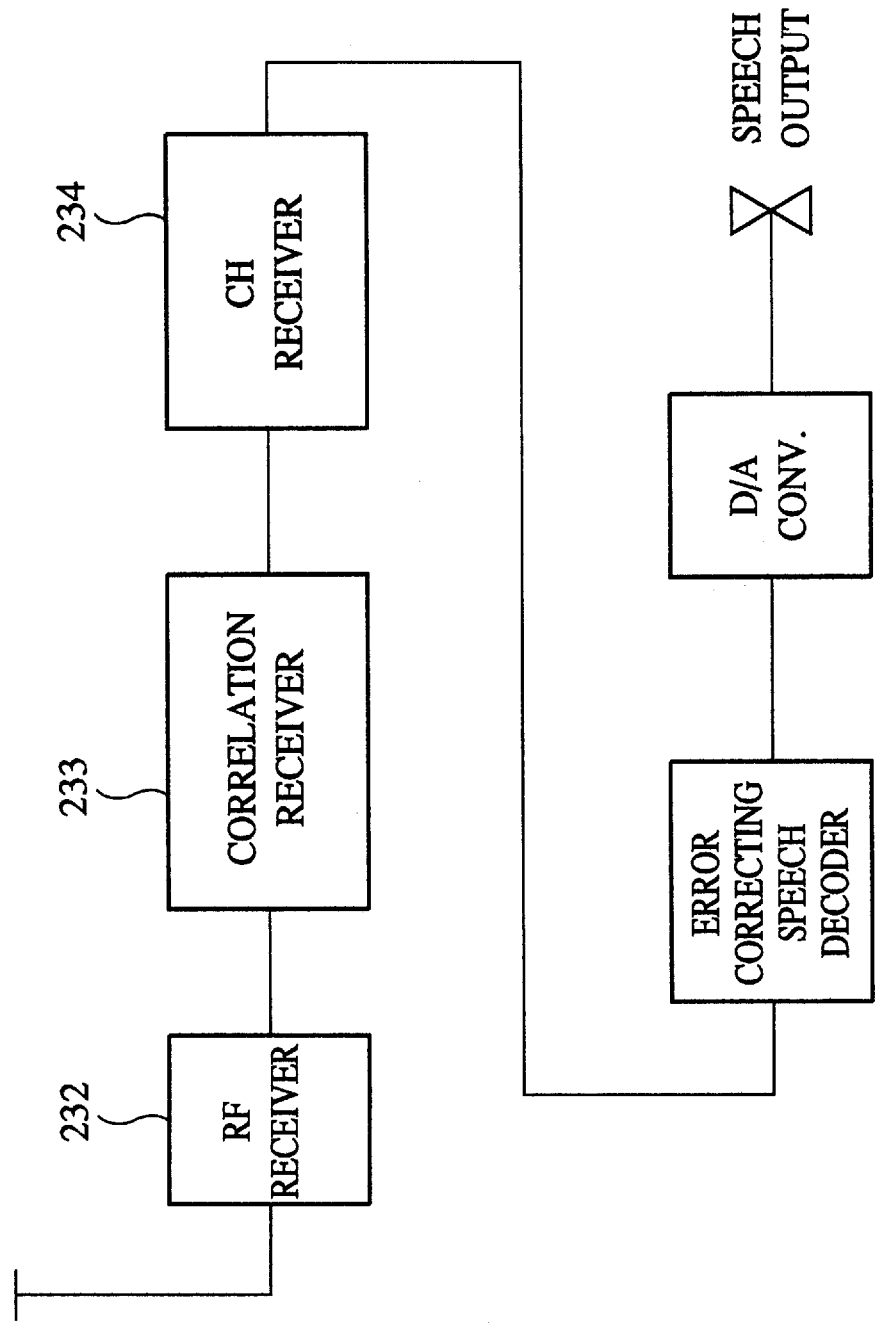
FIG. 36 is a block diagram showing a main part of a transmitter of the mobile station in the first embodiment.

FIG. 34 shows the example in which the first time slot of a transmitting frame is used as a common control channel for both the CDMA method and the TDMA method. FIG. 35 shows a frame in which the TDMA signal and the CDMA signal are assigned to the first time slot 251 and the second time slot 252, respectively. FIG. 36 is a fragmentary block diagram of the transmitting section of the mobile station.

Figure 37:
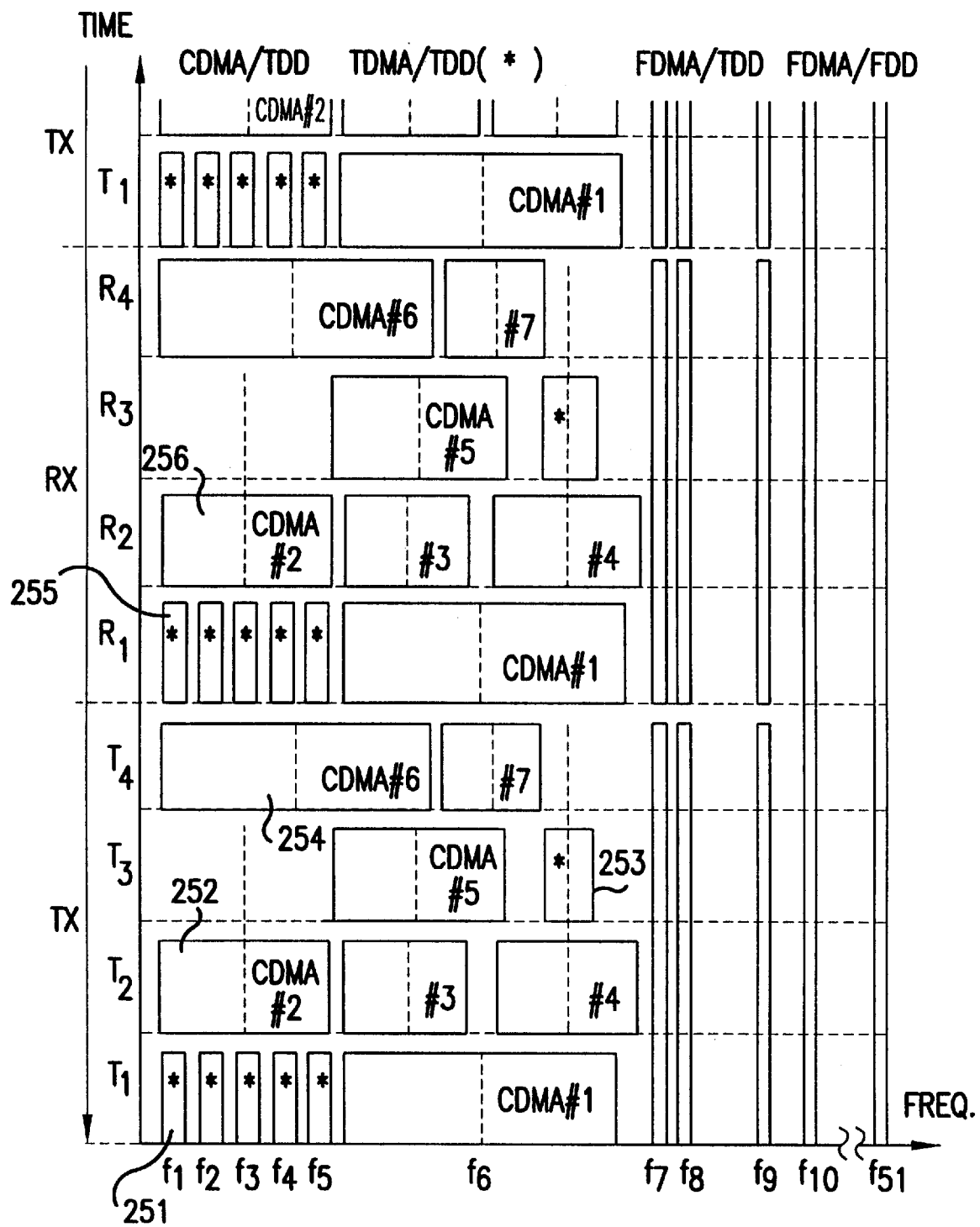
FIG. 37 is a diagram showing the relationship between each time slot and the occupied frequency in the first embodiment.

FIG. 37 shows a relationship between each time slot 251–256 and the occupied frequency.

The mobile station of FIG. 36 includes an RF receiver 232 for receiving a telephone call, a correlation receiver 233 for performing reverse spread-spectrum on the CDMA signal, and a CH receiver 234 for detecting information contained in the TDMA signal. The mobile station, which serves usually as the CDMA receiver, can serve also as the TDMA receiver when the correlation receiver 233 is rendered inoperative, namely, if the information of the RF receiver 232 is directly inputted to the CH receiver 234.

Therefore, when the mobile station receives the frame of FIG. 35, it is possible to receive the TDMA signal in a normal form by rendering the correlation receiver 233 inoperative, even if the first channel of the first time slot is, for example, a control channel in the TDMA method.

Further, the mobile station renders the correlation receiver 233 operative to perform reverse spread-spectrum on the second time slot so that the CDMA bit information contained in the second time slot 252 as shown in FIG. 35 can be obtained.

Thus the same time slot can be used either for the TDMA signal or for the CDMA signal. Even if the same time slot is used for different methods, it is possible to recognize a signal of any of the different methods so that reliable reception can be achieved.

Construction for Simultaneous Use of Access Methods & Change of Access Method

As mentioned above, in this embodiment, the mobile communication system can be used with both the TDMA signal and the CDMA signal existing in the time slots contained in the same frame. The mobile communication system can be used also if the access method of a single time slot is changed into another.

In order to produce the foregoing results, the controller controls the spread-spectrum code generators to generate the spread-spectrum codes. For example, in a communication station, in which the spread-spectrum code generators are associated with the respective time slots, assuming the TDMA signal is to be transmitted, the controller renders the object spread-spectrum code generator inoperative to stop generating a spread-spectrum code so that the input information is transmitted as the TDMA signals.

Various parts or elements essential to perform this control will now be described.

Figure 38:
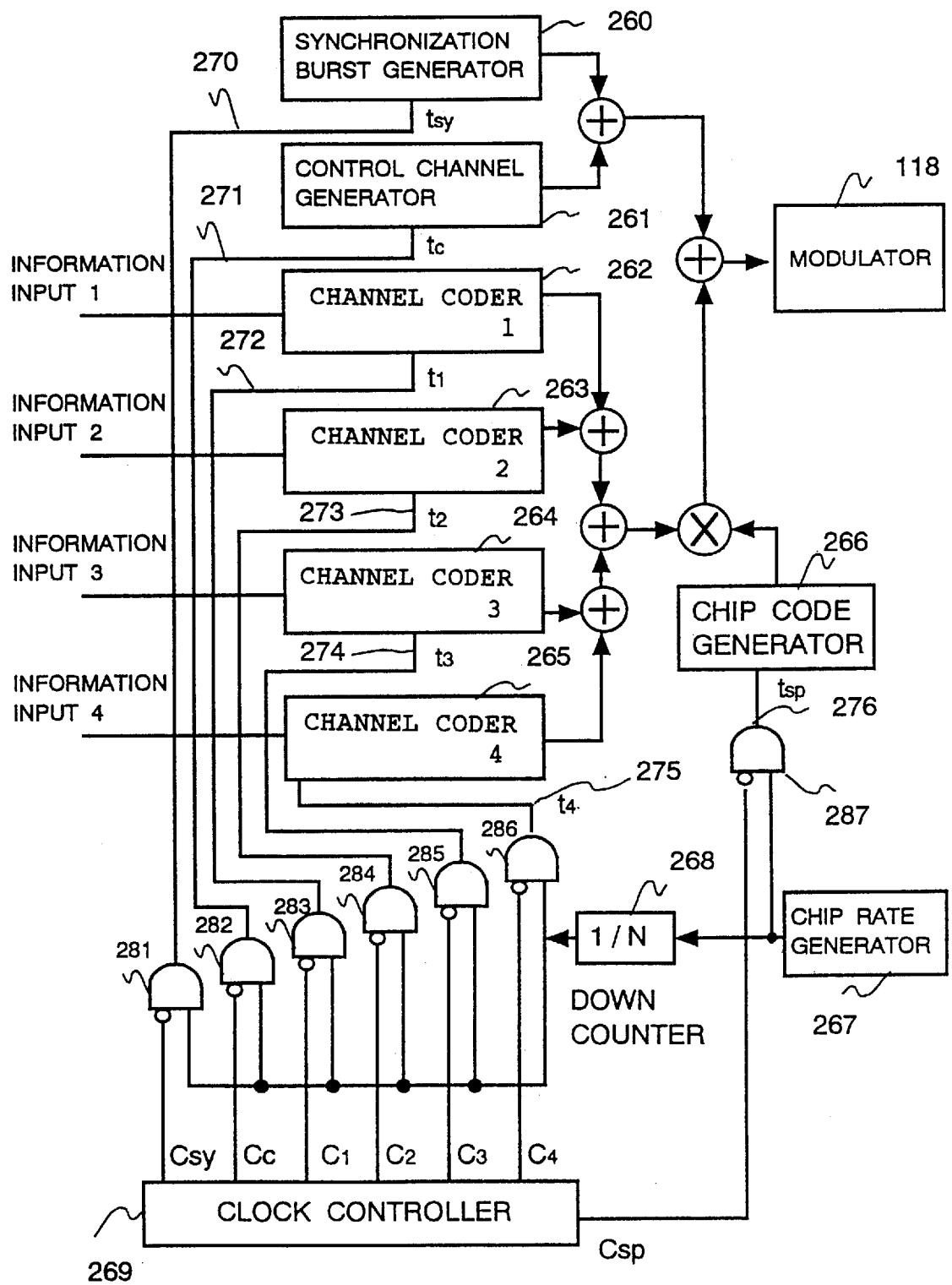
FIG. 38 is a block diagram showing a main part of the transmitter of the CDMA communication unit of the radio base station in the first embodiment.

FIG. 38 is a block diagram showing the transmitting section of the CDMA communication unit in the radio base station. In FIG. 38, the first time slot in the TDMA method can be allocated to a synchronization burst or a control channel, and the second, third and fourth slots can select any of the TDMA method and the CDMA method. The CDMA communication unit of FIG. 38 includes a chip rate generator 266 for generating a predetermined chip rate, a down counter 268 for counting the generated chip rate down to ½, ⅓, . . . 1/N, and a clock controller 269 for sending control signals to clock control gates 281–287 to control the supply of clocks to a synchronization burst generator 260, a control channel generator 261, information channel coders 262–265 and a chip code generator 266. Although the information channel coders 262–265 are elements identical with the channel coders 191–194 of FIG. 28, they are named differently to be identified from the control channel code generators. Further, the chip code generator 226 of FIG. 38 is identical in construction with the spread-spectrum code generator of FIG. 21 and an element identical with the above-mentioned spread-spectrum code generator. As is understood from FIG. 38, the chip code generator 266 generates a plurality of different spread-spectrum codes.

Figure 39:
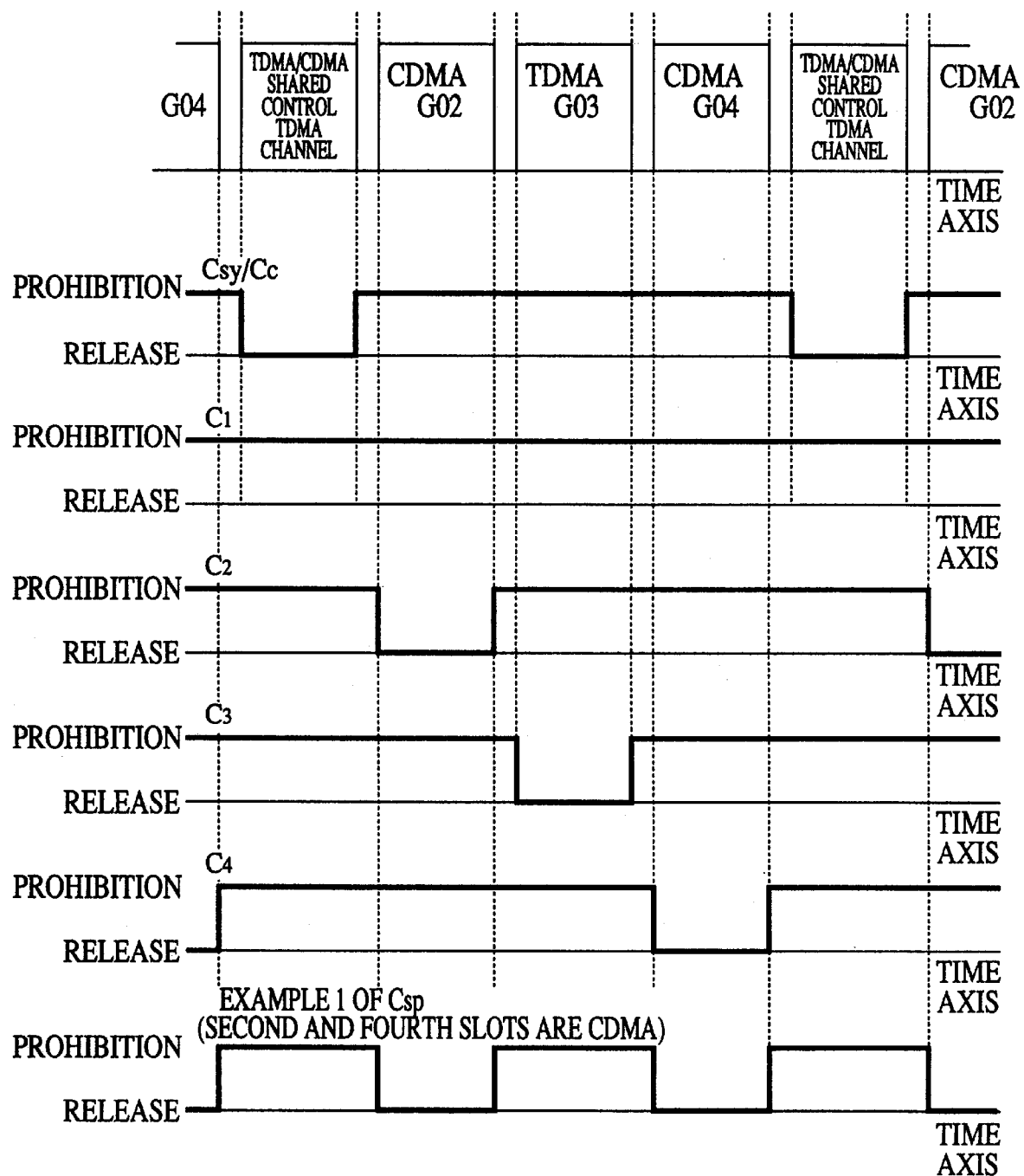
FIG. 39 is a timing chart of a control signal to be transmitted from a clock controller of FIG. 38.
Figure 40:
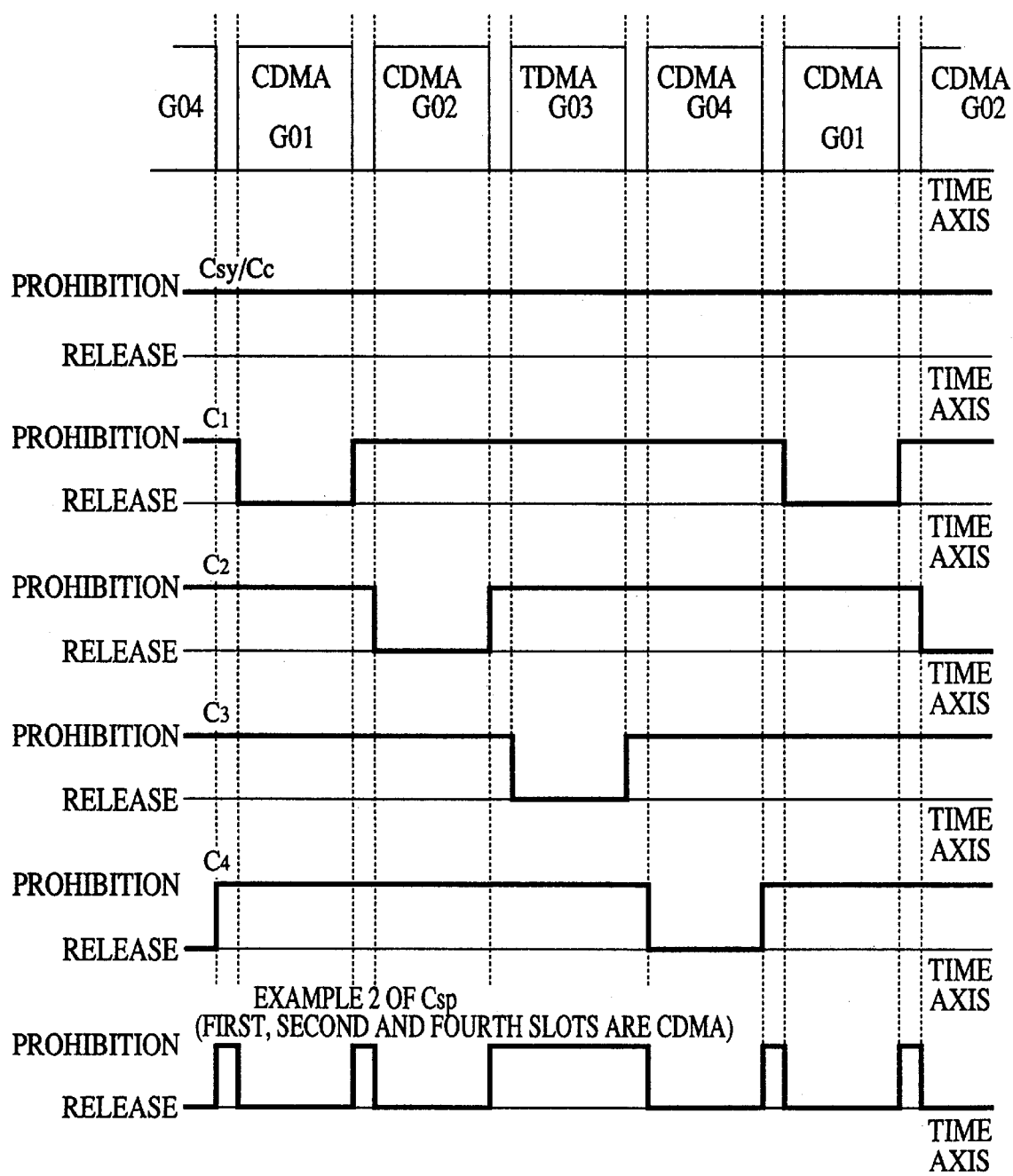
FIG. 40 is a timing chart of another control signal to be transmitted from the clock controller of FIG. 38.

FIGS. 39 and 40 are timing charts of control signals to be sent from the clock generator 269, showing an example of control of the clock controller 269. The action of a chip clock controlling unit including the clock control gates 281–286 and the clock controller 269 will now be described using FIGS. 39 and 40.

Firstly, in FIG. 39, an example is shown in which the first and third time slots are in the TDMA method and the second and fourth time slots are in the CDMA method. The clock control gates 281, 282 associated with the synchronization burst generator 260 and the control channel generator 261 releases the clock only in the first time slot and prohibits the clock in the other time slots by control signals Csy and Cc. Since the first time slot is thus allocated in order to send the synchronization burst or the control channel, the supplying a clock t1 to the information channel coder 262 to output the information input 1 is normally prohibited in the clock control gate 283 by the control signal C1. Namely, in this example, the information channel coder 262 normally does not make the output. In this case, since the first time slot is used by the TDMA method, the chip code generator 266 may not perform spread-spectrum. Accordingly, the control signal Csp is set to prohibit the clock in the first time slot. In other words, the output of the chip clock tsp is prohibited by the clock control gate 287, and the operation of the chip code generator 266 is stopped also in this third time slot so that the electric wave of TDMA signal is emitted in the third time slot.

In FIG. 40, an example is shown in which the first time slot is allocated to the information channel. In this case, the clock control gates 281, 282, which are associated with the synchronization burst generator 260 and the control channel generator 261, of FIG. 38 prohibit the clock by the control signals Csy and Cc so that the electric wave of the synchronization burst or control channel is not emitted from the controlled radio base station as shown in FIG. 40. This is because, in the absence of emitted electric wave of the synchronization burst or control channel, another radio base station, which emits the electric wave of the synchronization burst or control channel, is located in the same position. In this example of FIG. 40, the first, second and fourth time slots are used by the CDMA method. Since only the third time slot is used by the TDMA method, the chip code generator 266 may not perform spread-spectrum. Accordingly, the operation of the chip code generator 266 is stopped in this time slot in the same manner as described above.

As mentioned above, by controlling the generation of chip clocks, it is possible to change the signal to be assigned to the time slot.

The controlling of the chip rate will now be described.

Figure 41:
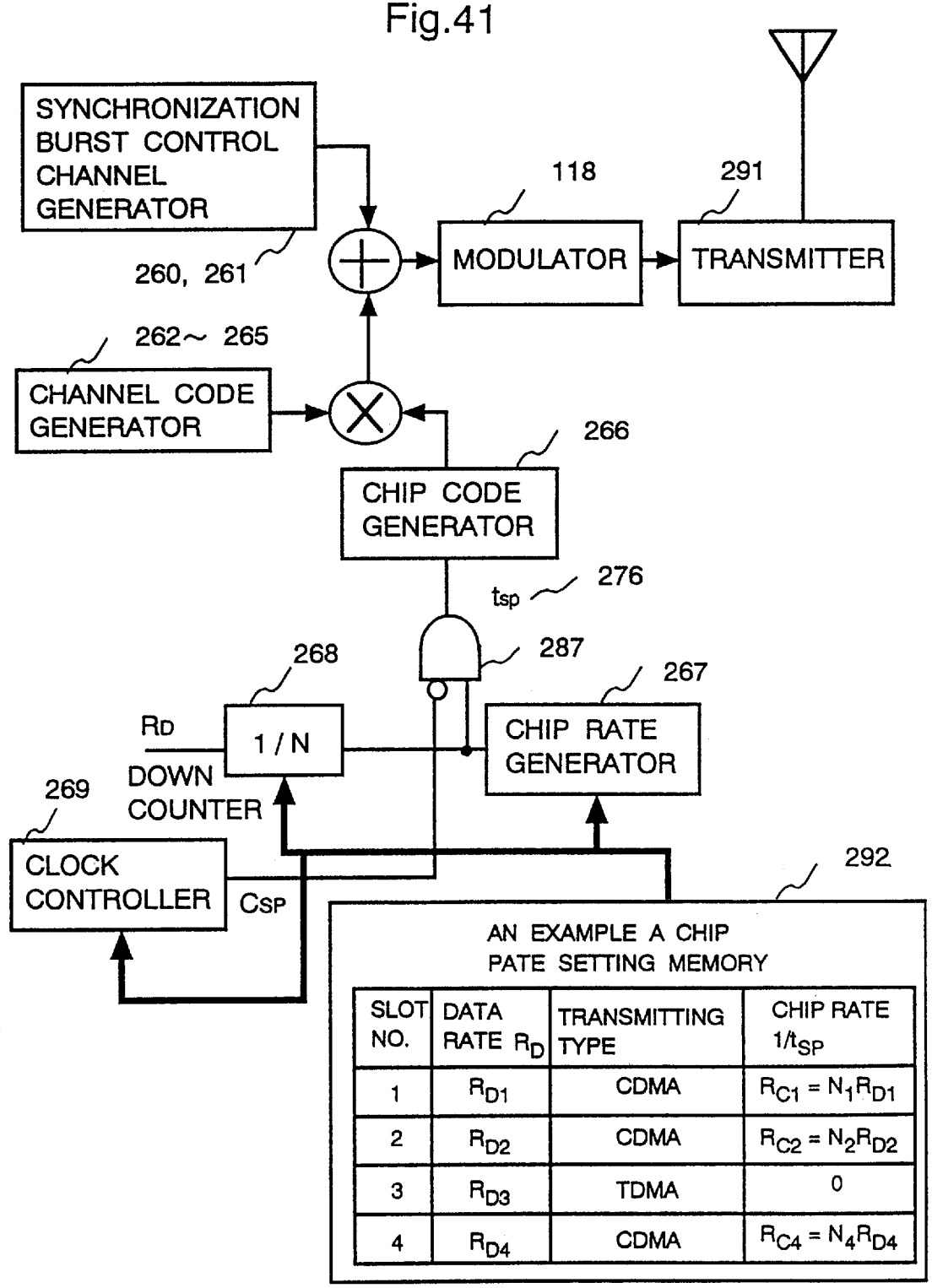
FIG. 41 is a block diagram showing a main part of the transmitter of a communication station in the first embodiment.
Figure 43:
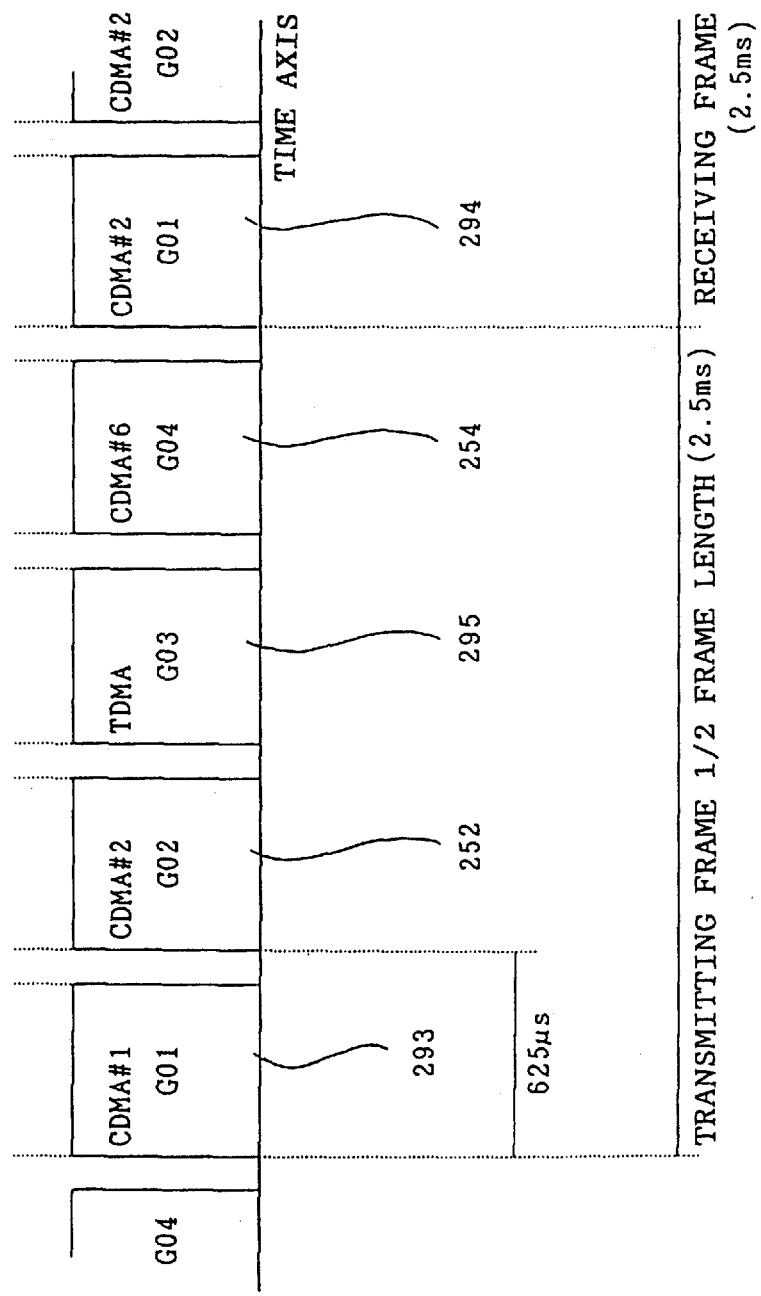
FIG. 43 is a diagram showing the structure of a transmitting frame in the first embodiment.

FIG. 41 is a fragmentary block diagram of the transmitting section of the communication station. As shown in FIG. 41, this transmitting section is characterized by a chip rate control unit 292 having a chip rate setting memory for previously storing chip rates in association with the time slots. In the chip rate setting memory, "data rate" setting a transmission speed for every time slot, "transmitting type" designating the access method and "chip rate" are stored. An example of setting of chip rates is shown in FIG. 42. In the construction of FIG. 38, though the chip rate of every signal to be transmitted as assigned to each time slot is uniform, a different chip rate can be set for every time slot. Further, when the slot No. 3 is to be transmitted in the TDMA method, no chip rate is used as no spread-spectrum takes place. Strictly the chip rate generator 267 generates some chip rates; however, by the control of the clock controller 269, the clock control gate 287 prohibits the transmission of a clock tsp. Namely, in this case, the chip rate tsp is set to zero. Accordingly, as shown in FIG. 43, the TDMA signal is assigned to the third time slot for transmission. The CDMA signals assigned to the first, second and fourth time slots are generated at the respective chip rates of 12.288 Mcps, 6.14 Mcps and 12.288 Mcps.

The control of the clock control gate 287 is performed by the clock controller 269, while the control of the clock controller 269 is accomplished as the chip rate control unit 292 sends spread-spectrum prohibition information of the time slot. The down counter 268 sets a frequency division rate from the chip rate giving a data rate designated to the time slot of the information channel; the control of the down counter 268 is performed also by the chip rate control unit 292.

Figure 44:
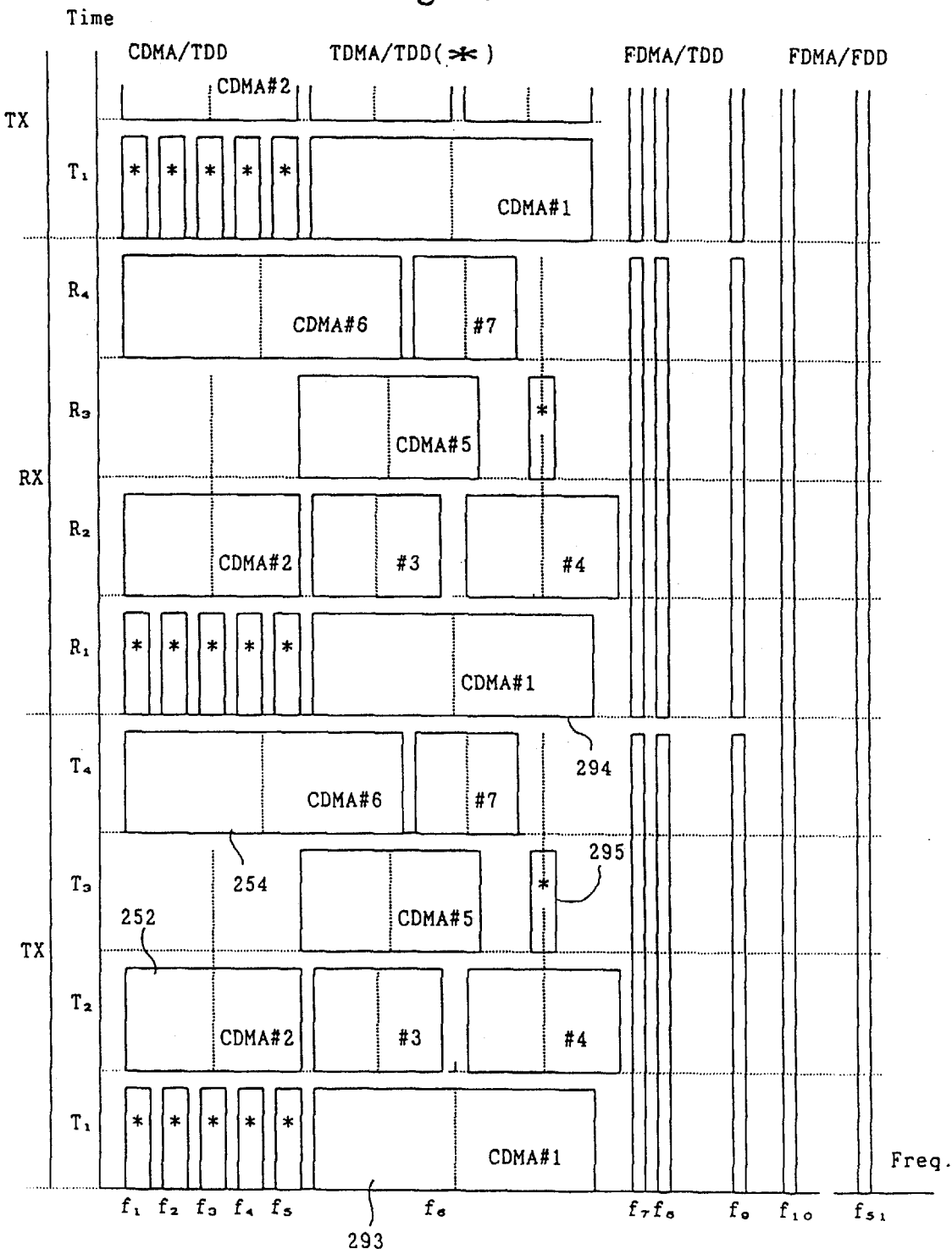
FIG. 44 is a diagram showing an example of the occupied frequency width associated with the respective chip rate in the first embodiment.

FIG. 44 shows an example of occupied frequency width corresponding to the respective chip rate. Since the chip rate of the first time slot is two times the chip rate of the second time slot, the occupied frequency width of CDMA#1 is two times the occupied frequency width of CDMA #2. Theoretically, if the spread-spectrum width is increased by double, the SN rate is reduced to a half so that possible noises as reproduced can be reduced to a half.

The control of carrier frequency will now be described.

Figure 45:
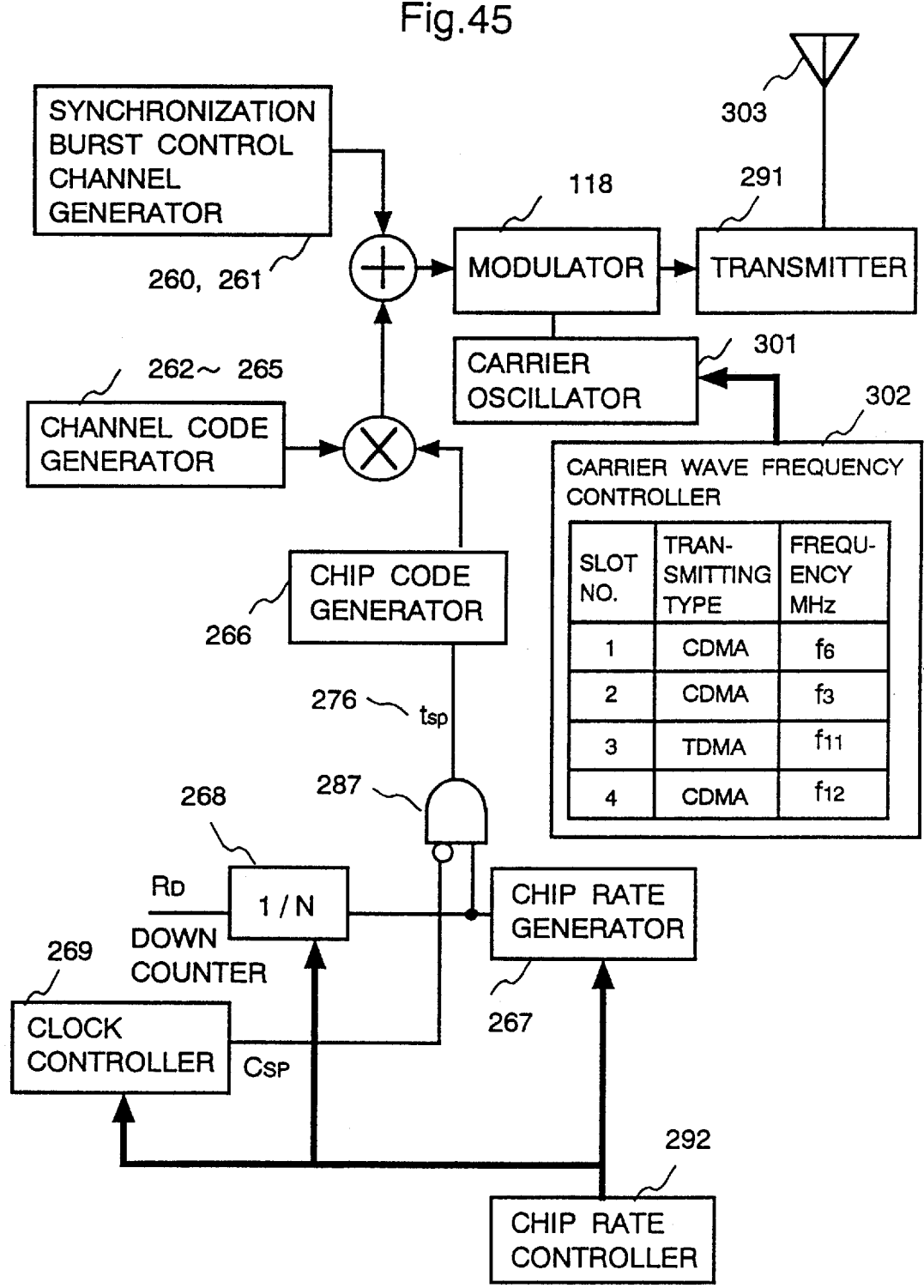
FIG. 45 is a block diagram showing a main part of the transmitter of the radio base station or the mobile station in the first embodiment.

FIG. 45 is a fragmentary block diagram showing the transmitting section in the radio base station or the mobile station. As shown in FIG. 45, the transmitting section is characterized by a carrier frequency controller 302 having a carrier frequency control memory for previously storing carrier frequencies in association with the time slots. In the carrier frequency control memory, "transmitting type" and "frequency", which designate the access method for every time slot, are stored. The carrier frequency controller 302 controls a carrier oscillator 301 in such a manner that the carrier wave oscillator 301 oscillates a carrier wave at a carrier frequency designated for every time slot. The oscillated carrier wave is modulated by the modulator 118 and is then emitted into air via an antenna 303 by the transmitter 291.

Figure 46:
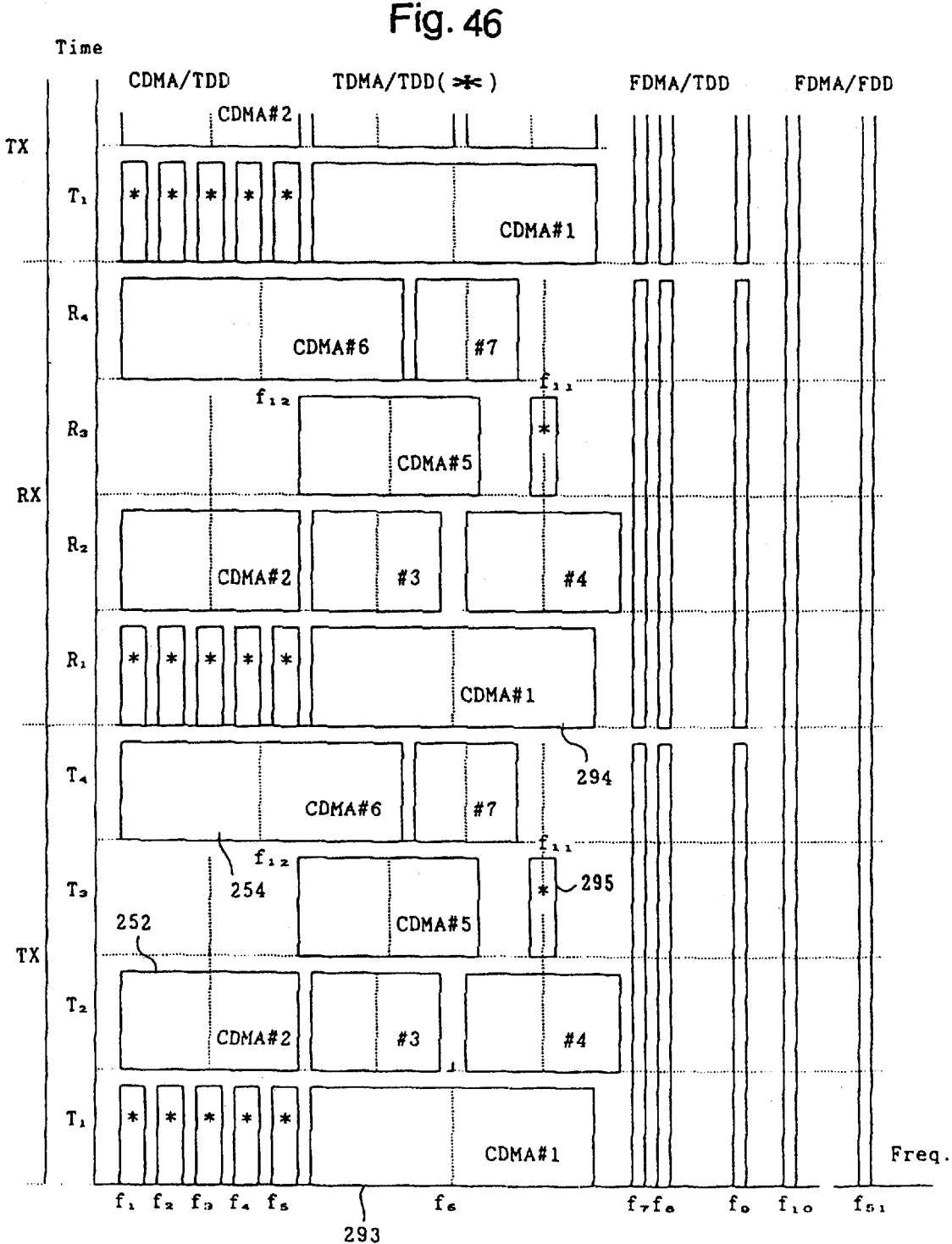
FIG. 46 is a diagram showing an example of variation of carrier frequency controlled according to a carrier frequency controller in the first embodiment.

FIG. 46 shows an example of variation of frequency of carrier waves which are for each of time slots of a constant time interval rather than a random time interval and which are controlled according to the carrier frequency controller 302. As is apparent from FIG. 46, variation of carrier wave frequency occurs at constant time intervals.

As mentioned above, according to this embodiment, since the carrier frequency can be controlled, it is possible to set a different carrier frequency for every time slot.

Selective Use of Access Method

In this embodiment, it is possible to assign the time-divided CDMA signal to the time slot of the TDMA method. It is also possible to assign the TDMA signal and the CDMA signal to the same frame in a mixed form.

However, as shown in FIG. 7, the communication station is equipped with the FDMA communication unit 46, and any method can be selected from a plurality of multi access methods, i.e. TDMA, CDMA and FDMA. Accordingly this communication station can act in the same way as the conventional art communication station. The communication process by selecting any access method will now be described by explaining the action of the radio processor 30 of FIG. 7.

Digital signals as input information are inputted to the time slot multiplier 44b where the signals in the form of successive digital information are converted into a high-speed bit rate and are compressed into a predetermined time slot. If it is necessary, the time slot multiplier 44b forms a lump waveform, i.e. standing up and down, of the time slot. Namely, all waveform process necessary for the TDMA/TDD method is carried out by the TDMA time slot controller 44a and the time slot multiplier 44b.

Necessary process with respect to the CDMA method is performed by the CDMA code generator 45a and the code multiplier 45b. The code multiplier 45b outputs a base band signal. The base band signal is inputted to the modulator 47 where it is modulated into a signal having an intermedium frequency. The intermedium frequency signal is mixed with the output signal of the FDMA frequency synthesizer 46a, which acts as a local oscillator, by the converter 46b. The mixed signal is amplified by the high-frequency power amplifier 48 and is then emitted into air via the switch 51 (or a duplexes) and the antenna 50.

The controller 54 recognizes the mobile station accommodating the radio processor 30 or the access method to be used by the radio base station. For example, If the access method to be used is the TDMA method, the controller 54 renders the TDMA time slot controller 44a and the time slot multiplier 44b operative. On the other hand, the controller 54 does not render the CDMA code generator 45a and the FM (frequency modulation) function of the FDMA frequency synthesizer 46a operative.

Thus the signal in the TDMA method is emitted into air from the antenna 50. When the controller 54 does not render the CDMA code generator 45a and the FM function of the FDMA frequency synthesizer 46a operative, the code multiplier 45b and the converter 46b convert the frequency of the input signal without any other process and output the frequency-converted signal.

The process of the received signal is basically similar to the above-mentioned process of the transmitting signal. When receiving signals in the TDMA method, the controller 54 does not render the CDMA code generator 45a and the FM function of the FDMA frequency synthesizer 46a operative. The received signal is frequency-converted by the converter 46c and then pass through the code multiplier 45c. The controller 54 renders the TDMA time slot controller 44a operative and converts the received TDMA signal by the time slot multiplier 44c into a digital signal and demodulates the digital signal by the demodulator 53.

Thus the radio processor 30 of this embodiment has a function of selectively carrying out three different multi access methods of TDMA, CDMA and FDMA. For communication, the controller 54 selects one from these three multi access methods according to need, communication capacity of data or given communication environment. Of course, more than one access methods may be selected for communication. For example, composite communication of the TDMA method and the CDMA method may be carried out, or composite communication of the TDMA method and FDMA method may be carried out. Accordingly, by combining different access methods, it is possible to realize composite communication without canceling the original advantages of the individual access methods.

In this embodiment, the radio processor 30 for carrying out three multi access methods is illustrated. Alternatively, it may be a radio processor having two of the three multi access methods, or any other radio process having four or five multi access methods.

The mobile station in this embodiment operates according to the frequency division multi access (FDMA) method, the time division multi access (TDMA) method and the code division multi access (CDMA) method individually or in combination. Namely, the radio processor 30 carried by the mobile station is equipped with the controller for controlling the radio frequency of used radio wave and varying the output radio wave, and a modem for dealing with various transmission methods and various modulation methods, i.e. digital modulation methods (e.g., a Gaussian Minimum Shift Keying (GMSK), a π/4-quarter differential phase shift keying (π/4-QDPSK), a 16-value quadrature amplitude modulation (16QAM), and a multi-subcarrier 16-value quadrature amplitude modulation (M16QAM)) and analog modulation methods (e.g., an FM modulation method).

Specifically, the mobile station of this mobile communication system comprises the radio processor able to cope with one or more multi access methods and one or more modulation methods, the protocol processor able to cope with the signal methods of the private system and public system, a voice data processor, a handset, and data input-output device, thus enabling various communication methods.

Further, the radio base station of the mobile communication system comprises the radio processor able to cope with one or more multi access methods and one or more modulation methods, and the protocol processor able to cope with the signal methods of the private system and public system, thus enabling various communication methods. In the case of private system, the radio base station is also equipped with a network interface processor for performing an interface function with an electric public branch exchange (EPBX) in the case of private system or for performing an interface function with an exchange in the case of the public system.

Each of the mobile station and the radio base station has the radio signal processor in order cope with various communication methods.

The public branch exchange (PBX) 3 in this embodiment, as shown in FIG. 5, comprises a radio system controller 41, a position registration calling unit 42 for making a position registration even in a different system and for processing a roaming function, and a system recognition unit 55. The radio system controller 41 performs a handover sequence process, a receiving level query process, and a transmitting power control information process, and manages various access methods, various modulation systems, data transmitting speed, etc. If the mobile station having system information individually for the private system, the public system and the satellite system and being in communication within in this mobile communication system is moved out of the mobile communication system, namely, if the mobile station makes a handover between different communication systems, the radio base station receives a signal from the mobile station. The system recognition unit 55 judges, from the intensity of the received signal, the system to which the radio base station belongs. Upon receipt of a handover request information from the radio base station, the system recognition unit 55 transmits handover information to a handover destination system, including the satellite channel, other than the mobile communication system.

(Simultaneous Use of Plural Access Methods in Radio base station)

Figure 47:
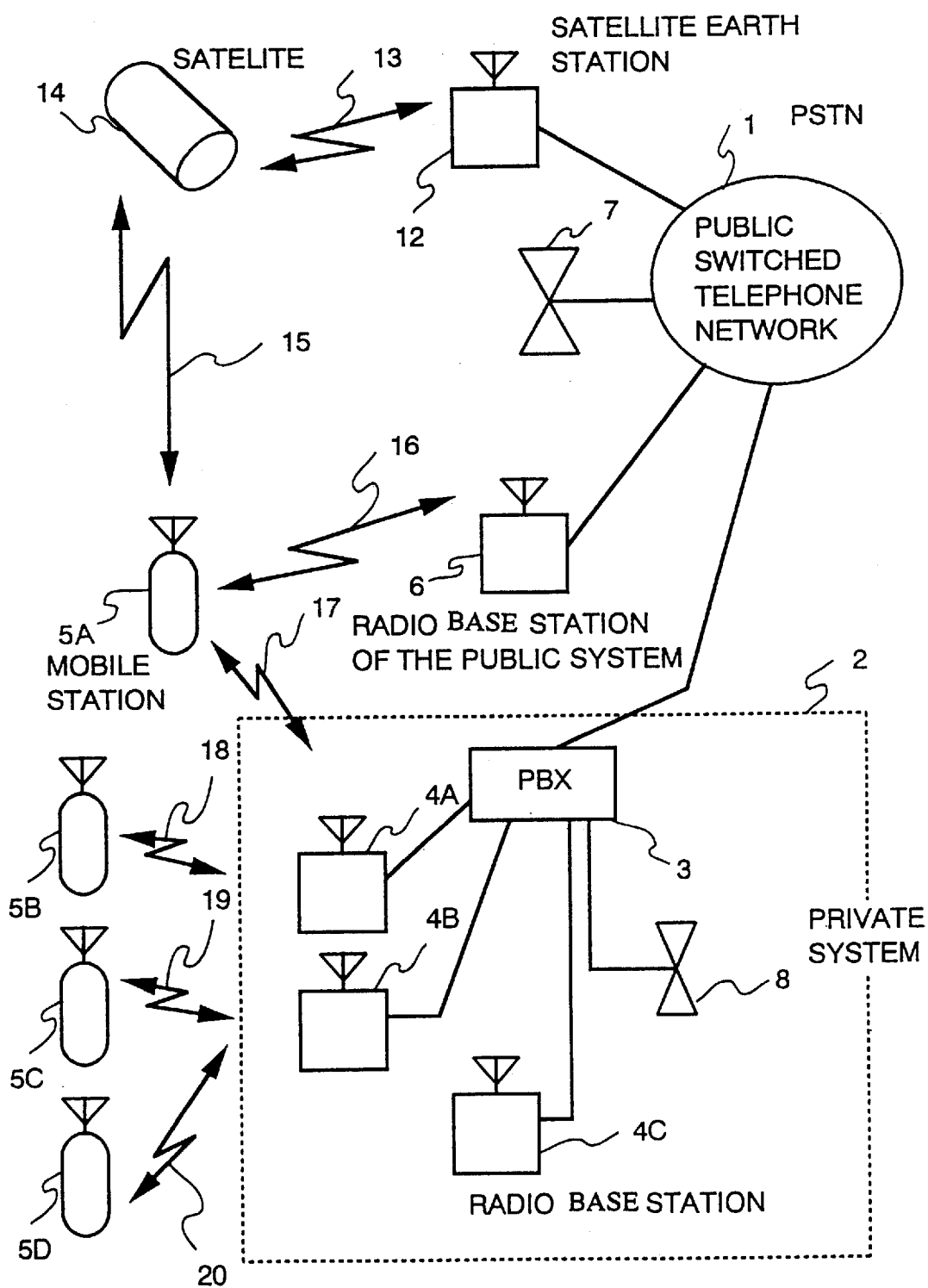
FIG. 47 is a diagram showing a different mode of use of the whole mobile communication system of the first embodiment.
Figure 48:
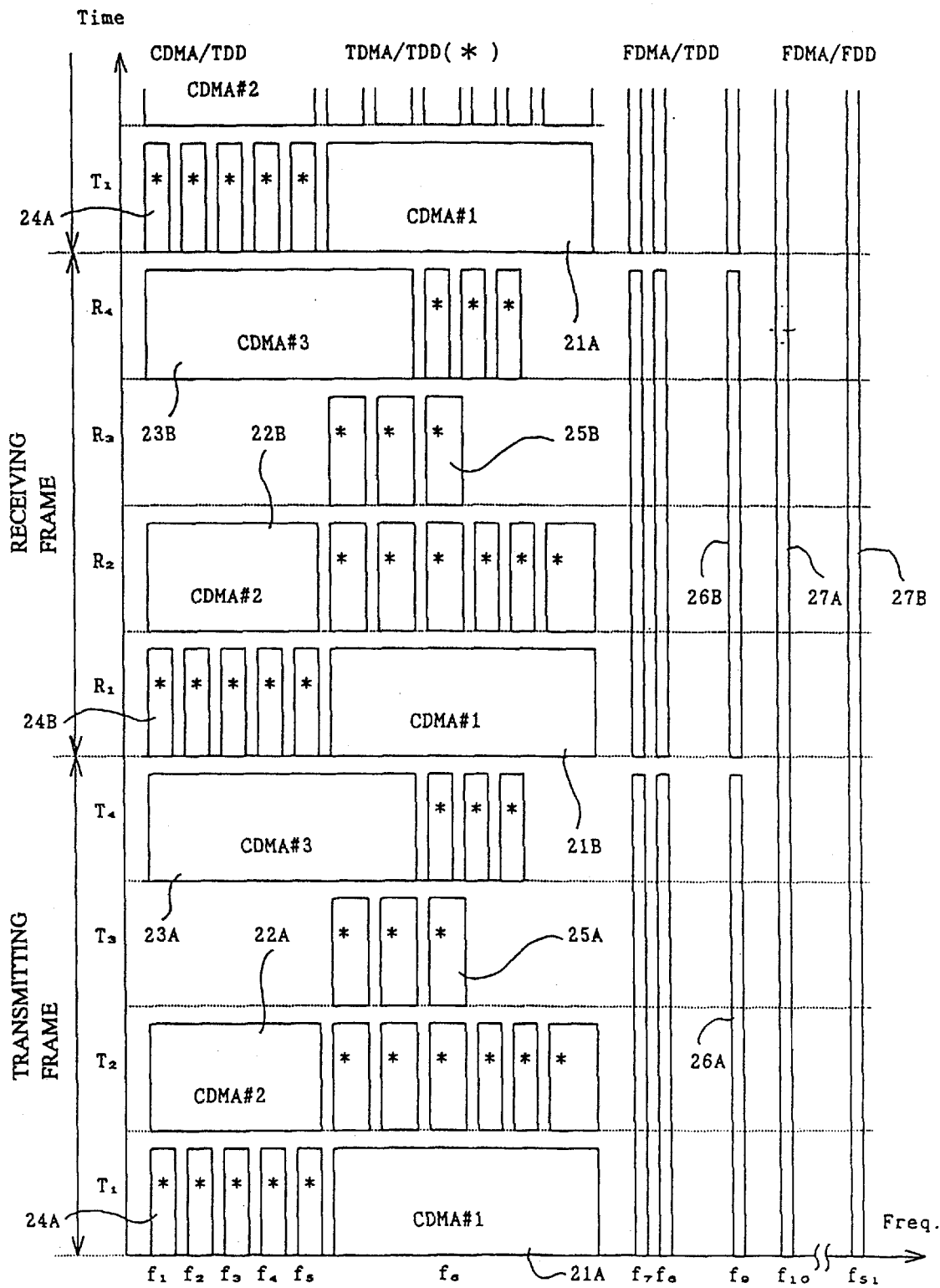
FIG. 48 is a diagram showing an example of manner in which TDD frequencies are employed in wireless connection of various multiple access methods between the mobile station and the radio base station in the first embodiment.
Figure 49:
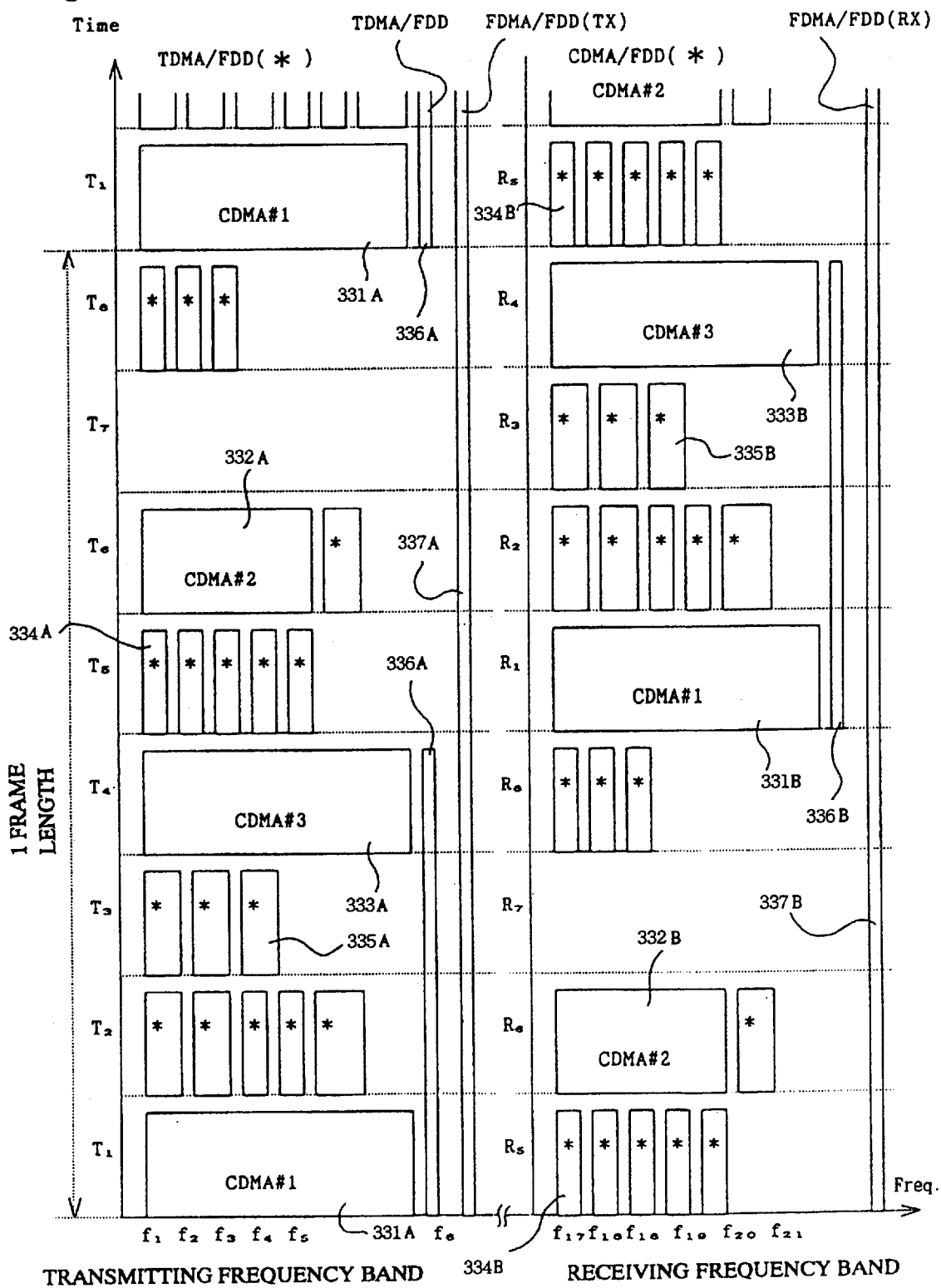
FIG. 49 is a diagram showing another example of manner in which FDD frequencies are employed in wireless connection of various multiple access methods between the mobile station and the radio base station in the first embodiment.

A plurality of radio base stations 4A, 4B, 4C, 6, 12 and a plurality of mobile stations 5A, 5B, 5C in FIG. 47 each have the function of cope with a plurality of multi access methods of FDMA, TDMA and CDMA. One example of multi access method on a radio channel 17 between the mobile station 5A and the radio base station 4A is shown in FIGS. 48 and 49. Following is the explanation of examples in which (1) the mobile station 5A and the radio base station 4A are in communication according to the CDMA method, (2) the mobile station 5B and radio base station 4A are in communication using the TDMA method, (3) the mobile station 5C and the radio base station 4B are in communication using the TDMA method, and (4) the mobile station 5D and the radio base station 4B are in communication using the CDMA method.

In the case shown in FIG. 48, Time Division Duplex (TDD) is used. In the case of FIG. 49, Frequency Division Duplex (FDD) is used.

In FIG. 48, a slot 21A is a frequency time slot on the transmitting side in the case of TDD of the CDMA method. A slot 21B is a time slot on the receiving side.

In FIG. 49, a slot 331A is a time slot on the transmitting side in the case of FDD of the CDMA method. A slot 331B is a time slot on the receiving side in the case of the FDD of the CDMA method.

One example of multi access method on a radio channel 18 between the mobile station 5B and the radio base station 4A is shown in FIGS. 48 and 49.

In FIG. 48, a slot 25A is a time slot on the transmitting side in the case of TDD of the TDMA method. A slot 25B is a time slot on the receiving side in the case of TDD of the TDMA method.

In FIG. 49, a slot 335A is a time slot on the transmitting side in the case of FDD of the TDMA method. A slot 335B is a time slot on the receiving side in the case of FDD of the TDMA method.

One example of multi access method on a radio channel 19 between the mobile station 5C and the radio base station 4A is shown in FIGS. 48 and 49. A slot 24A is a time slot on the transmitting side in the case of TDD of the TDMA method. A slot 24B is a time slot on the receiving side in the case of TDD of the TDMA method.

In FIG. 49, a slot 334A is a time slot on the transmitting side in the case of FDD of the TDMA method. A slot 334B is a time slot on the receiving side in the case of FDD of the TDMA method.

In the case of FDD, if the line of the slots 334A/334B is unable to use for any reason, another time slot, e.g., the slot 336A/336B may be used.

One example of multi access method on a radio channel 20 between the mobile station 5D and the radio base station 4B is shown in FIGS. 48 and 49.

In FIG. 48, a slot 22A is a time slot on the transmitting side in the case of TDD of the CDMA method. A slot 22B is a time slot on the receiving side in the case of TDD of the CDMA method.

In FIG. 49, a slot 332A is a time slot on the transmitting side in the case of FDD of the CDMA method. A slot 332B is a time slot on the receiving side in the case of FDD of the CDMA method.

As mentioned above, in this embodiment, in the case of TDD, each of the TDMA method, the FDMA method and the CDMA method is synchronized with the TDD method. Further, this embodiment is characterized in that the CDMA signal is slot-divided in synchronism with the time slot time-divided using the TDMA method.

Also in the case of FDD, the signals according to the TDMA method and the CDMA method are time-divided using the same time slot as the case of TDD.

With this mobile communication system, it is possible to realize flexible communication compatible with a plurality of modulation methods.

Communication in TDD Method

Figure 50:
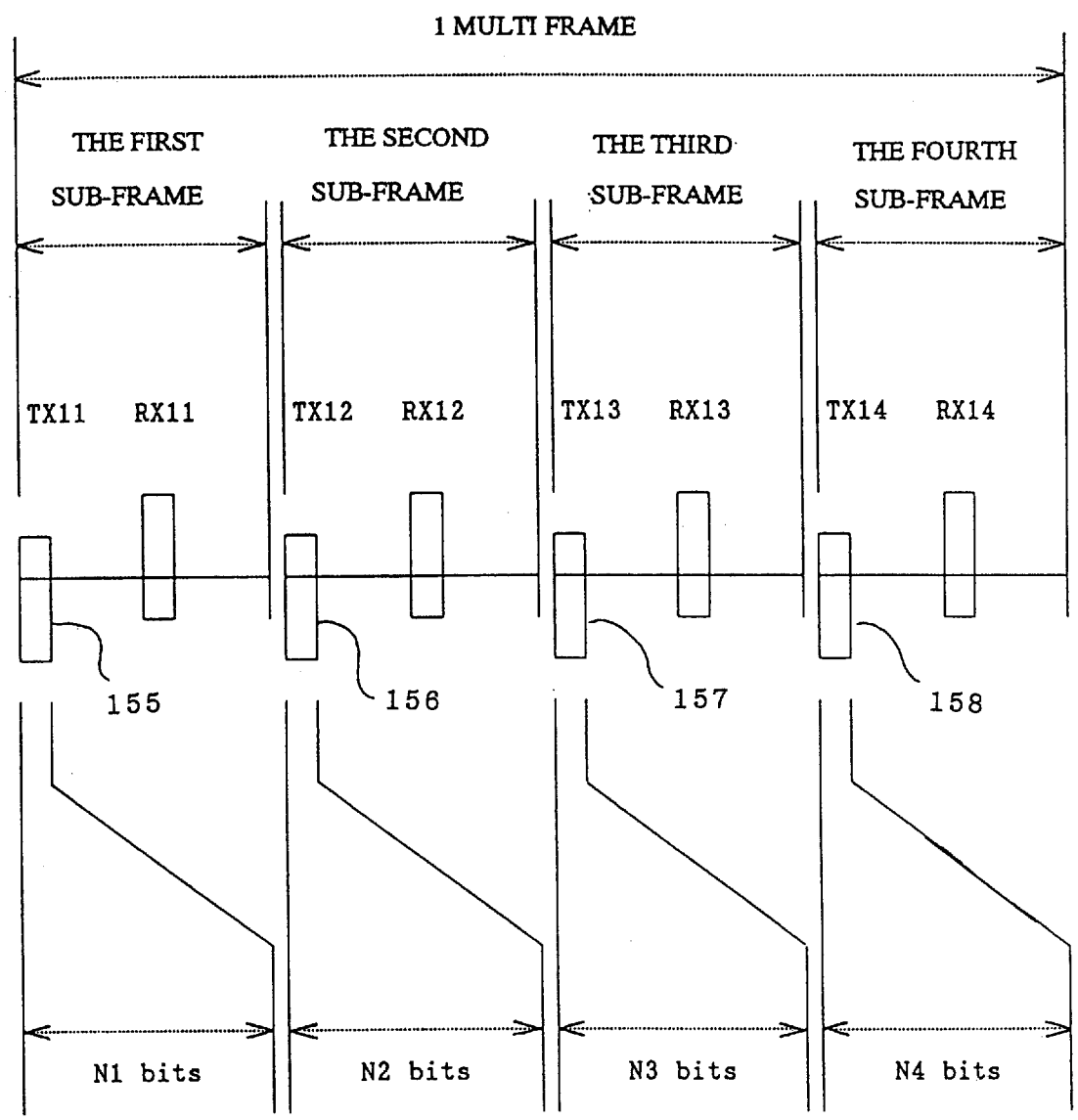
FIG. 50 is a diagram showing a relationship between time slots in a multi frame, in the case of TDD, on the transmitting side of the radio base station in the first embodiment.
Figure 51:
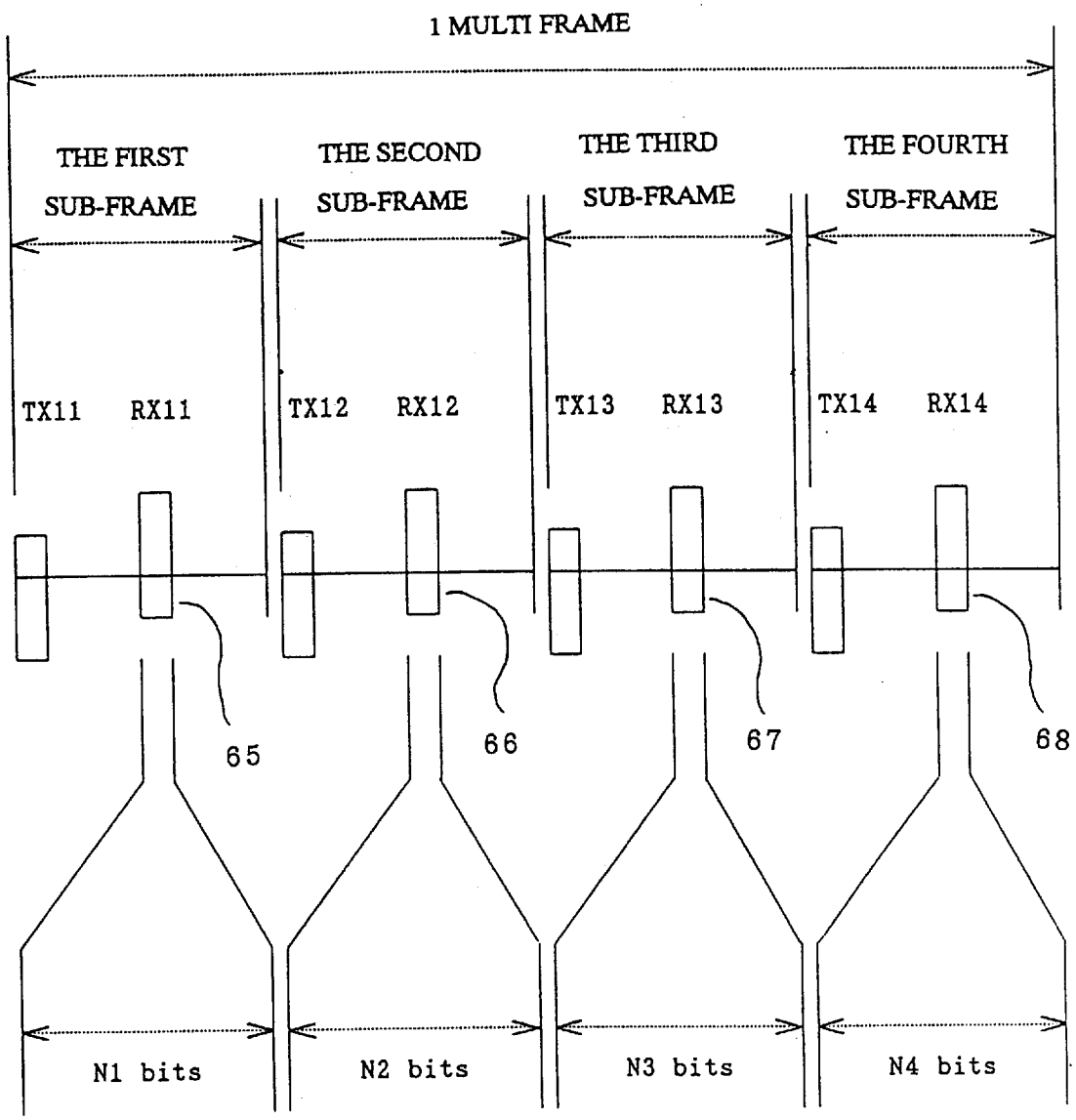
FIG. 51 is a diagram showing a relationship between time slots in a multi frame, in the case of TDD, on the receiving side of the radio base station in the first embodiment.

In FIG. 48, the transmission of spread-spectrum codes in the case of TDD of the CDMA method is illustrated. In communication using the CDMA method, spread-spectrum codes are transmitted; however, when using the time division method along with the CDMA method as shown in FIG. 48, the transmitting signal is divided into time slots for transmission. The transmission method of CDMA spread-spectrum codes in this case will now be described using FIGS. 50 and 51. FIGS. 50 and 51 show a multi frame composed of four sub-frames.

FIG. 50 shows a relationship between time slots in a multi frame on the transmitting side in the radio base station. FIG. 51 shows a relationship between time slots in a multi frame on the receiving side in the radio base station.

In FIG. 50, portions TX11(155), TX12(156), TX13(157), TX14(158) of the individual sub-frames as a whole constitute a single CDMA transmitting signal.

In FIG. 51, portions of RX11(65), RX12(66), RX13(67), RX14(68) of the individual sub-frames as a whole constitute a single CDMA receiving signal. Reserve spread-spectrum of spread-spectrum codes according to the CDMA method is achieved by the correlation arithmetic of the spread-spectrum codes per bit with respect to the bits (N1+N2+N3+N4) of the related portions in the four sub-frames. This correlation arithmetic is carried out when receiving. The receiving process is described above.

In this embodiment, a single time frame is divided into halves according to the TDD method, and is then divided into 2x according to the TDMA method, forming x channels. In the CDMA method using m multi frames each constituted by 2x time slots, correlation arithmetic of spread-spectrum codes of the CDMA method over a plurality of time frames in the multi frame.

Thus also in the case of TDD method, a plurality of access methods can be used in combination.

Communication in FDD Method

Figure 52:
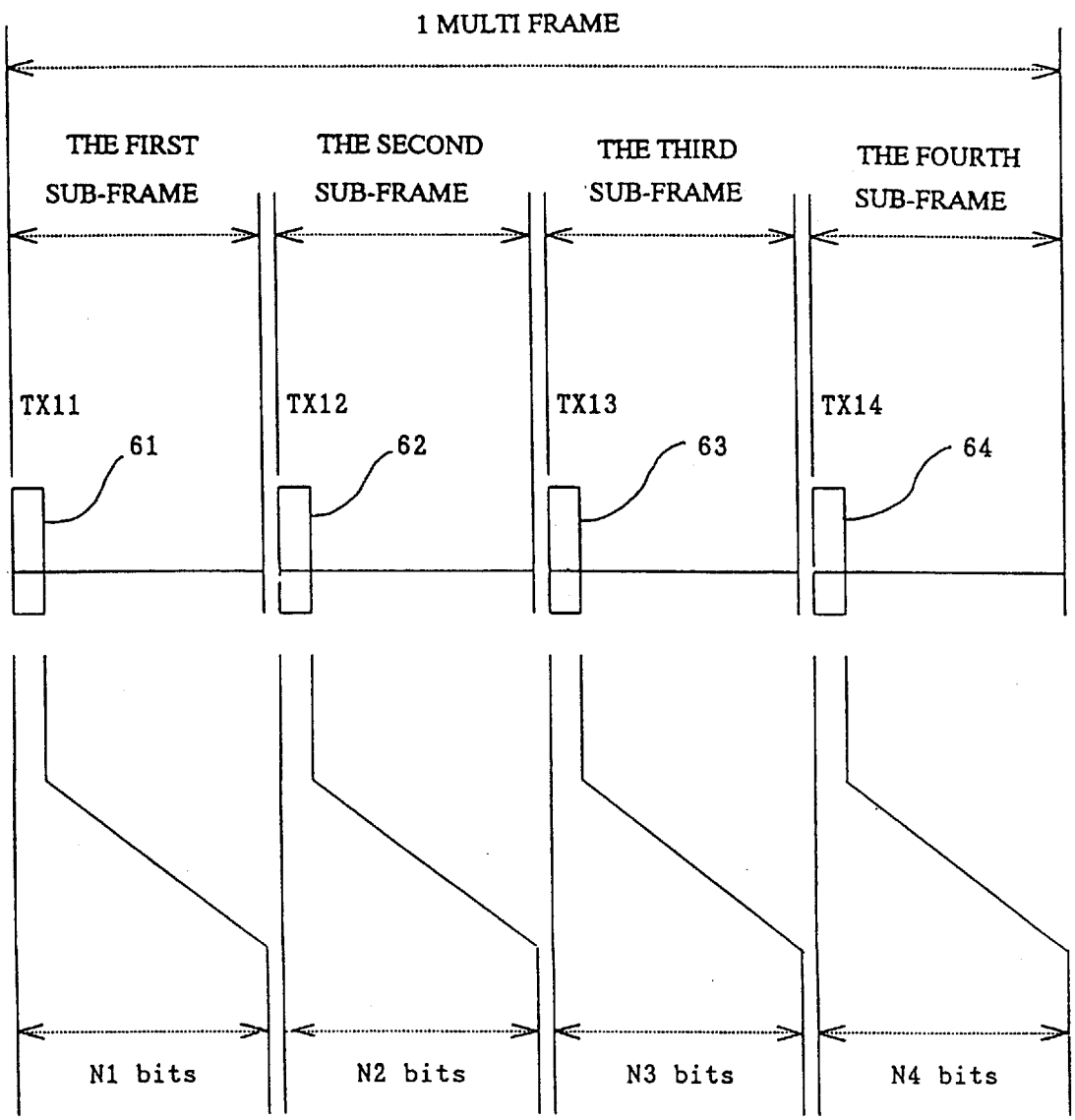
FIG. 52 is a diagram showing a relationship between time slots in a multi frame, in the case of FDD, on the transmitting side of the radio base station in the first embodiment.
Figure 53:
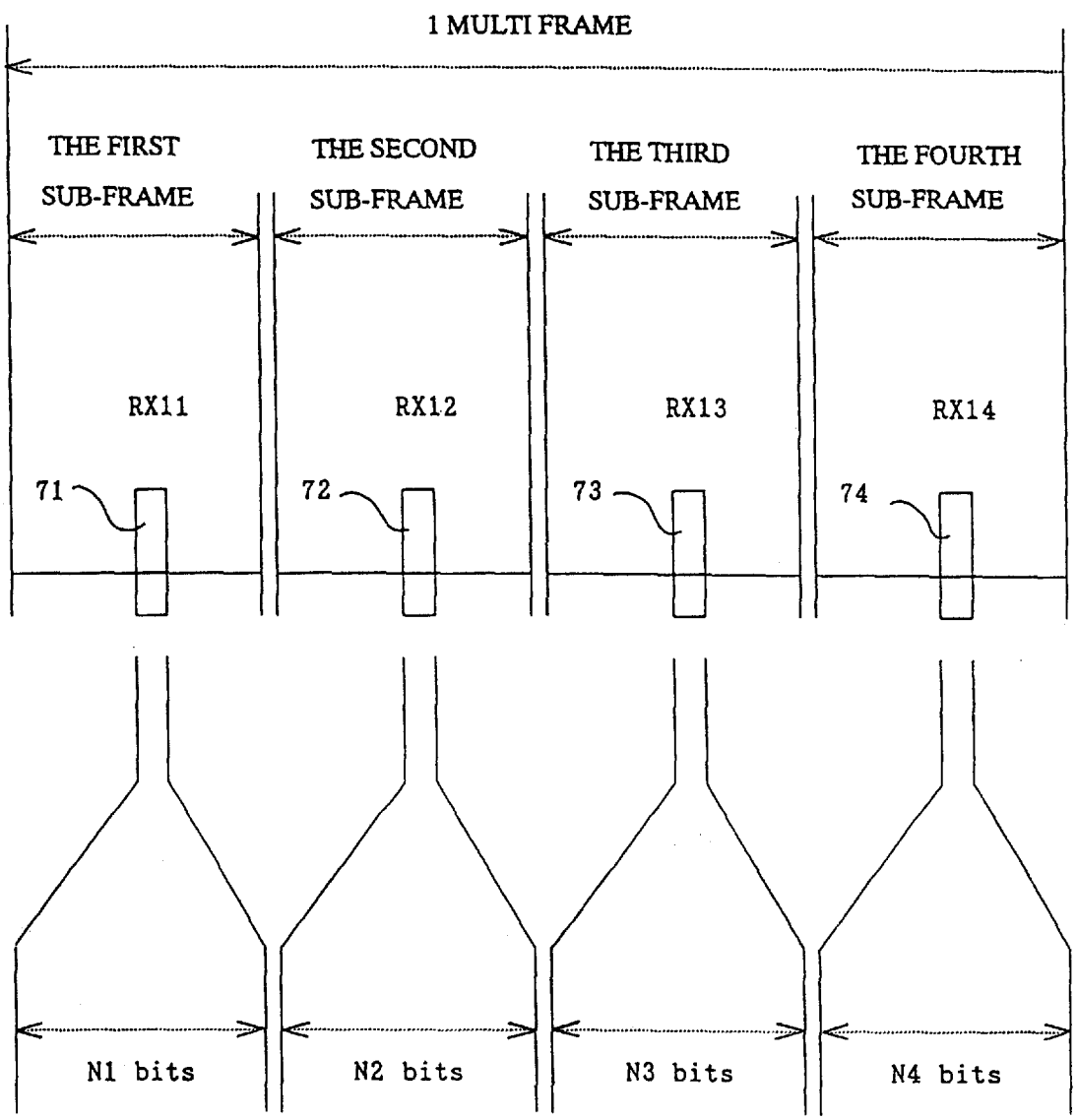
FIG. 53 is a diagram showing a relationship between time slots in a multi frame, in the case of FDD, on the receiving side of the radio base station in the first embodiment.

In FIG. 49, the transmission of spread-spectrum codes in the case of FDD of the CDMA method is illustrated. FIGS. 52 and 53 show a multi frame composed of four sub-frames in the case of FDD method.

FIG. 52 shows a relationship between time slots in a multi frame on the transmitting side in the radio base station. FIG. 53 shows a relationship between time slots in a multi frame on the receiving side in the radio base station. Portions TX11(61), TX12(62), TX13(63), TX14(64) of the individual sub-frames as a whole constitute a single CDMA transmitting signal. Portions of RX11(71), RX12(72), RX13(73), RX14(74) of the individual sub-frames as a whole constitute a single CDMA receiving signal. Reserve spread-spectrum of spread-spectrum codes according to the CDMA method is achieved by the correlation arithmetic of the spread-spectrum codes per bit with respect to the bits (N1+N2+N3+N4) of the related portions in the four sub-frames. This correlation arithmetic is carried out when receiving.

In this embodiment, a single time frame is divided by 2x according to the FDD method and the TDMA method, forming 2x channels. In the CDMA method using m multi frames each constituted by 2x time slots, correlation arithmetic of spread-spectrum codes of the CDMA method over a plurality of time frames in the multi frame.

Thus also in the case of FDD method, a plurality of access methods can be used in combination.

Use of Successive Time Slots of One Signal (CDMA)

Figure 54:
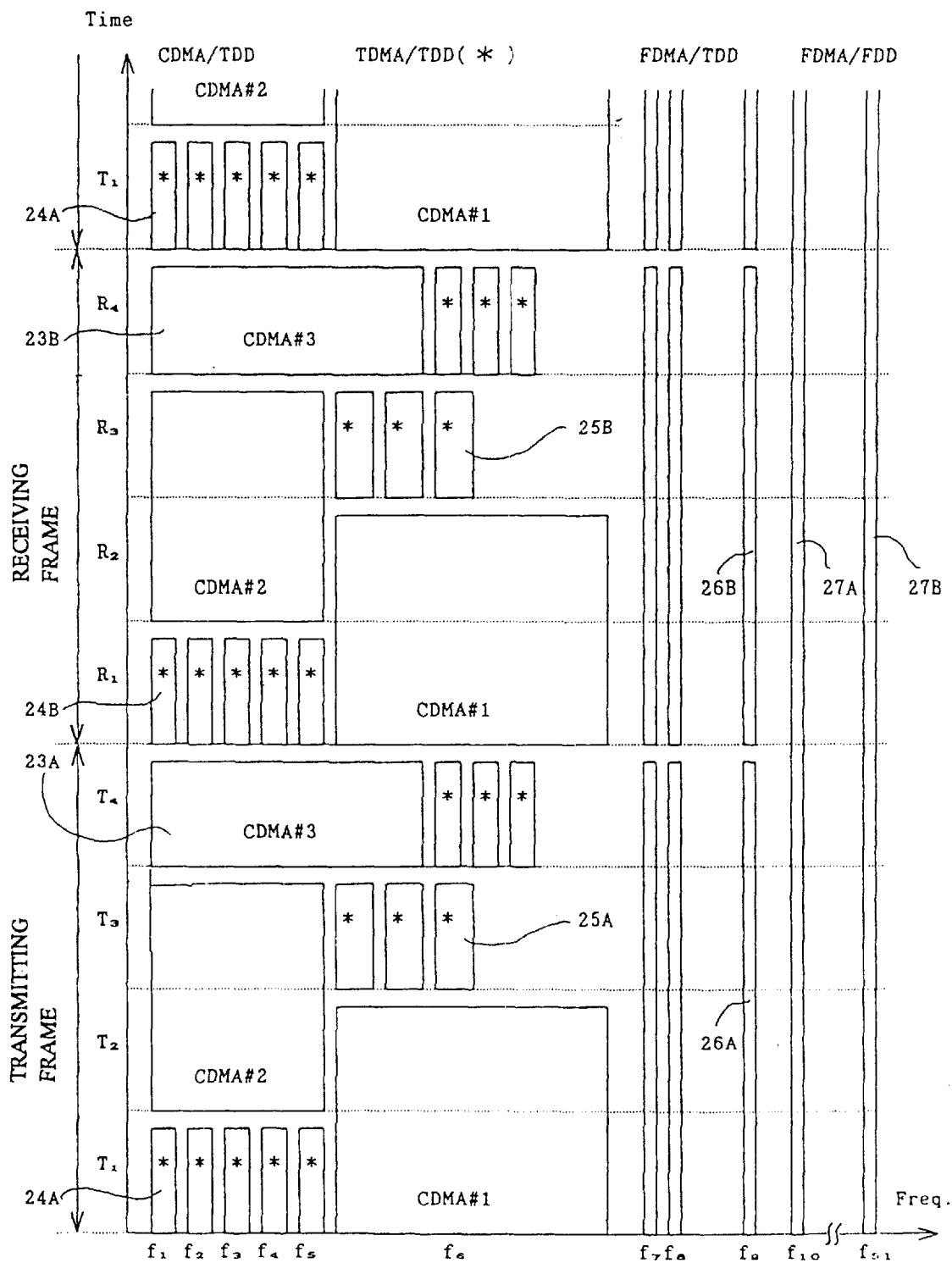
FIG. 54 is a diagram showing an example in which a signal of CDMA/TDD method employs two time slots in the first embodiment.
Figure 55:
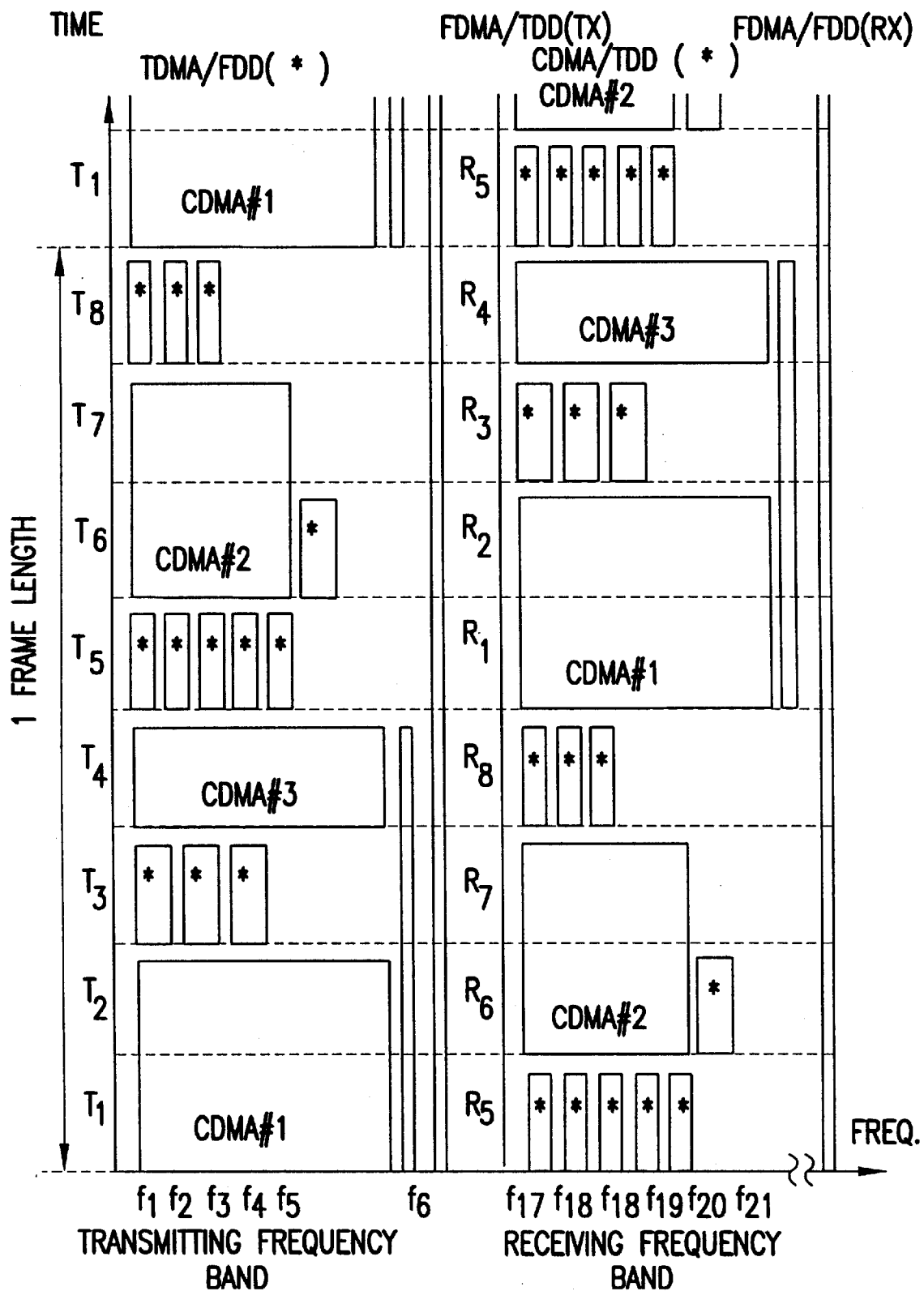
FIG. 55 is a diagram showing an example in which a signal of CDMA/FDD method employs two time slots in the first embodiment.

FIGS. 54 and 55 show an example in which the signal of the CDMA method uses two time slots in each of CDMA#1 and CDMA#2; FIG. 54 shows the case of TDD, and FIG. 55 shows the case of FDD. The time to start using two time slots may be at the beginning of communication or anytime during communication. Assuming that communication using two time slots is identical in data rate with communication using one time slot, it is possible to transmit a double volume of information. If the data rate of communication using two time slots is reduced to a half the data rate of communication using one time slot in order to transmit the same information volume as that of the one-time-slot communication, the peak transmitting power can be reduced to a half. For example, in CDMA#1, two time slots T1 and T2 are used on the transmitting side while two time slots R1 and R2 are used on the receiving side.

If the mobile station in communication in CDMA#3 is short of peak transmitting power, CDMA#3 using one time slot is changed to CDMA#1 using two time slots, and communication at a half of the bit rate of CDMA#3 is selected, thus enabling continuous talking without interruption. In the mobile communication, in which originally the transmitting power is strictly limited, it is possible to select the two-time-slot-occupied type, like CDMA#1 or CDMA#2 of FIGS. 54 and 55, from the beginning of either a calling process or a paging process.

Thus by making the transfer rate of signals of the CDMA method multiple by an integer, i.e. 2, 3 as much as the transfer rate of signal of the TDMA method, it is possible to perform transmission control such as by increasing the transmitting information volume or supplementing the transmitting power shortage.

Use of Successive Time Slots of One Signal (TDMA)

Figure 56:
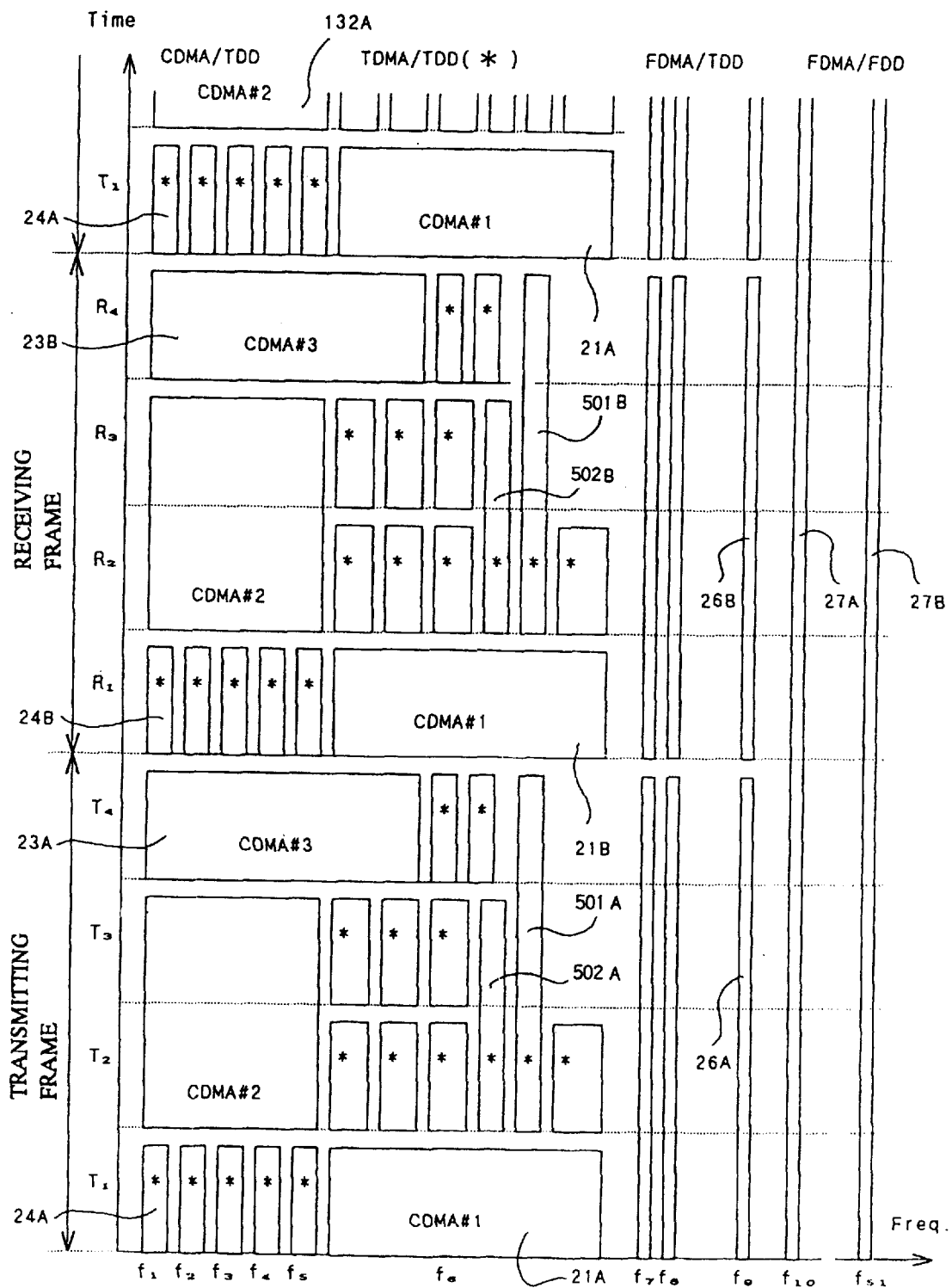
FIG. 56 is a diagram showing an example in which a signal of TDMA/TDD method employs three or two time slots in the first embodiment.
Figure 57:
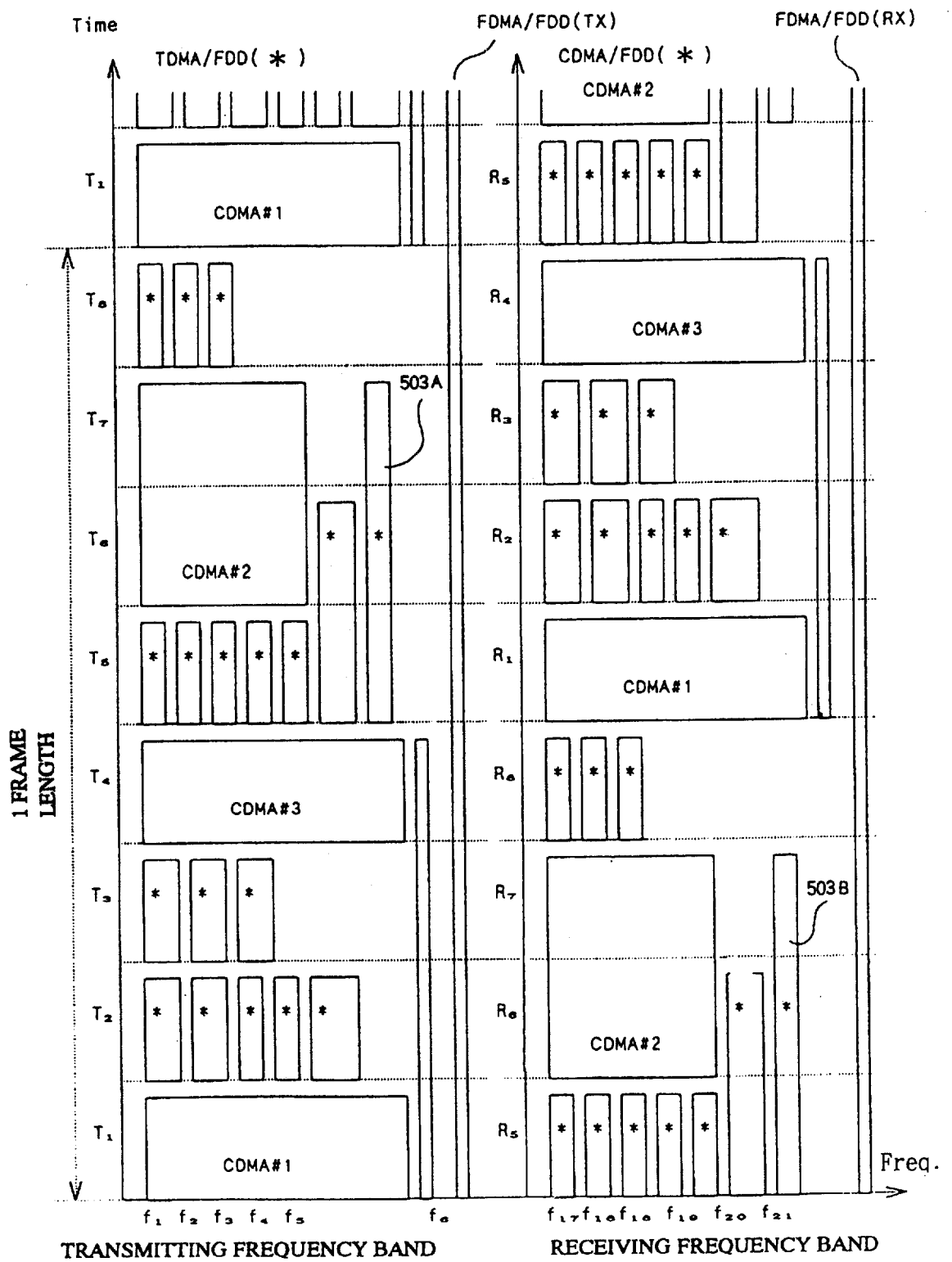
FIG. 57 is a diagram showing an example in which a signal of TDMA/FDD method employs three or two time slots in the first embodiment.

FIGS. 56 and 57 show an example in which the signal of the TDMA method uses three time slots or two time slots in each of the slot 501A/501B of the TDMA method or 502A/502B of the TDMA method; FIG. 56 shows the case of TDD, and FIG. 57 shows the case of FDD. Assuming that each time slot employs the same data rate as the communication using one time slot, it is possible to transmit a triple or double volume of information. If two time slots or three time slots are used, the peak transmitting power may be reduced to ½ or ⅓ so that the same information volume as one-time-slot information volume can be transmitted at a data rate reduced to ½ or ⅓. If the mobile station in communication in the time slot 24A/24B of the TDMA is short of peak transmitting power, communication at a half of the bit rate of the time slot 502A/502B of the TDMA method is selected, thus enabling continuous talking without interruption. In the mobile communication, in which originally the transmitting power is strictly limited, it is possible to select the two-time-slot-occupied type or the three-time-slot-occupied type, like the slot 502A/502B of the TDD method or the slot 503A/503B of the FDD method in FIGS. 56 and 57, from the beginning of either a calling process or a paging process.

Thus by making the transfer rate of signals of the TDMA method multiple by an integer, i.e. 2, 3, as much as the transfer rate of signal of the TDMA method, it is possible to perform transmission control such as by increasing the transmitting information volume or supplementing the transmitting power shortage.

Communication Between Mobile Station & Radio base station within Common System or between Different Systems Following is the explanation of an example in which the mobile station independent of a private system is in access to the radio base station of the private system.

Figure 58:
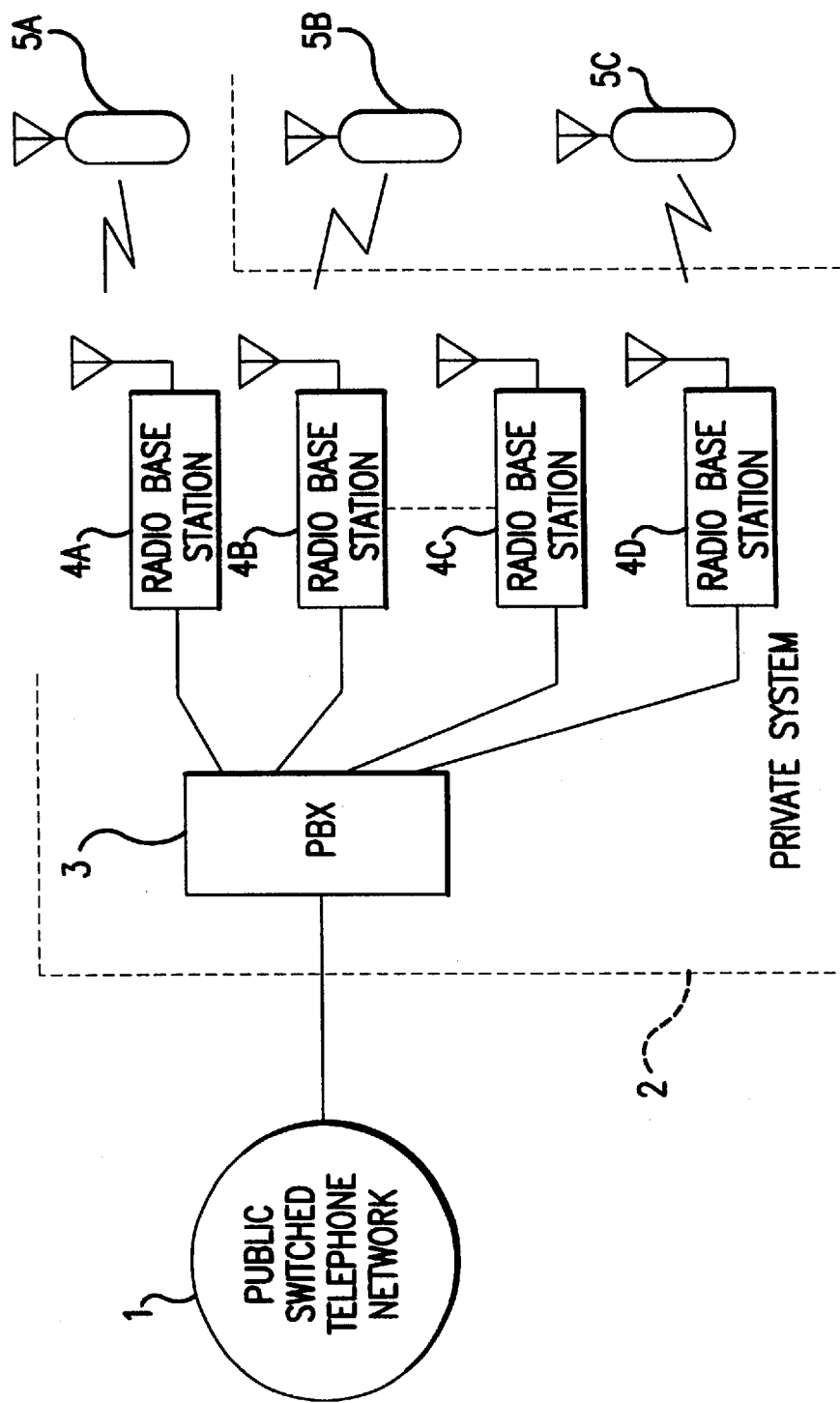
FIG. 58 is a diagram showing another different mode of use of the whole mobile communication system in the first embodiment.

FIG. 58 shows the whole construction of a mobile communication system; radio base stations 4A, 4B, 4C, 4D belong to a private system 2, and mobile stations 5B, 5C do not belong to the private system 2.

Figure 59:
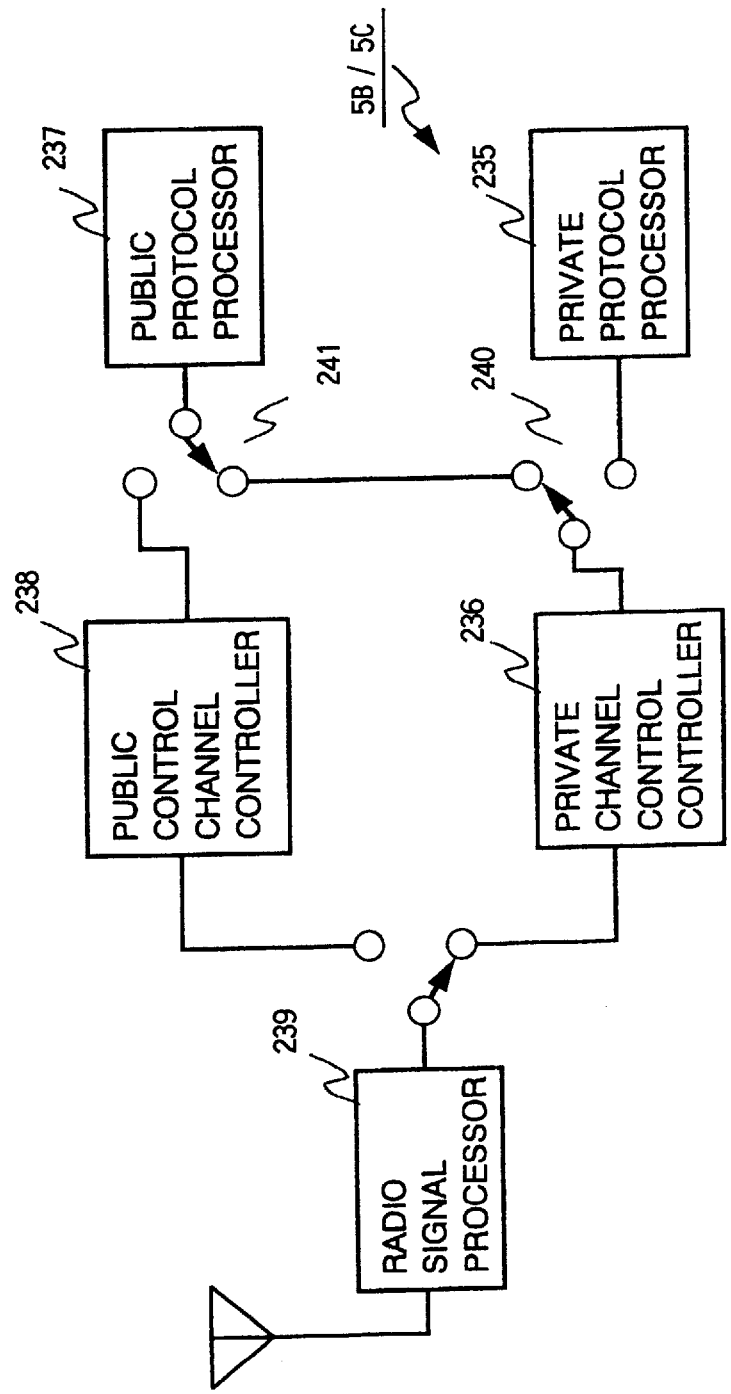
FIG. 59 is a block diagram showing the structure of a mobile station in the first embodiment.

FIG. 59 is a block diagram showing the function of each mobile station 5B, 5C. The mobile station 5B, 5C comprises a private protocol processor 235 for processing private protocols of the private system, a private control channel controller 236 for controlling private control channels for transmitting the private protocols, a public protocol processor 237 for processing public protocols to the public switched telephone network 1, a public control channel controller 238 for controlling public control channels for transmitting public protocols, and a radio signal processor 239 to be used in the private control channel controller 236 and the public control channel controller 238. A switch 240 is a switch for connecting the private protocol processor 235, which outputs private protocols, to the private control channel controller 236, which controls private control channels for transmitting private protocols, and also for connecting the public protocol processor 237, which processes public protocols to the public switched telephone exchange 1, to the private control channel processor 236 via a switch 241. The switch 241 is able to connect the public protocol processor 237 also to the public control channel controller 238.

Figure 60:
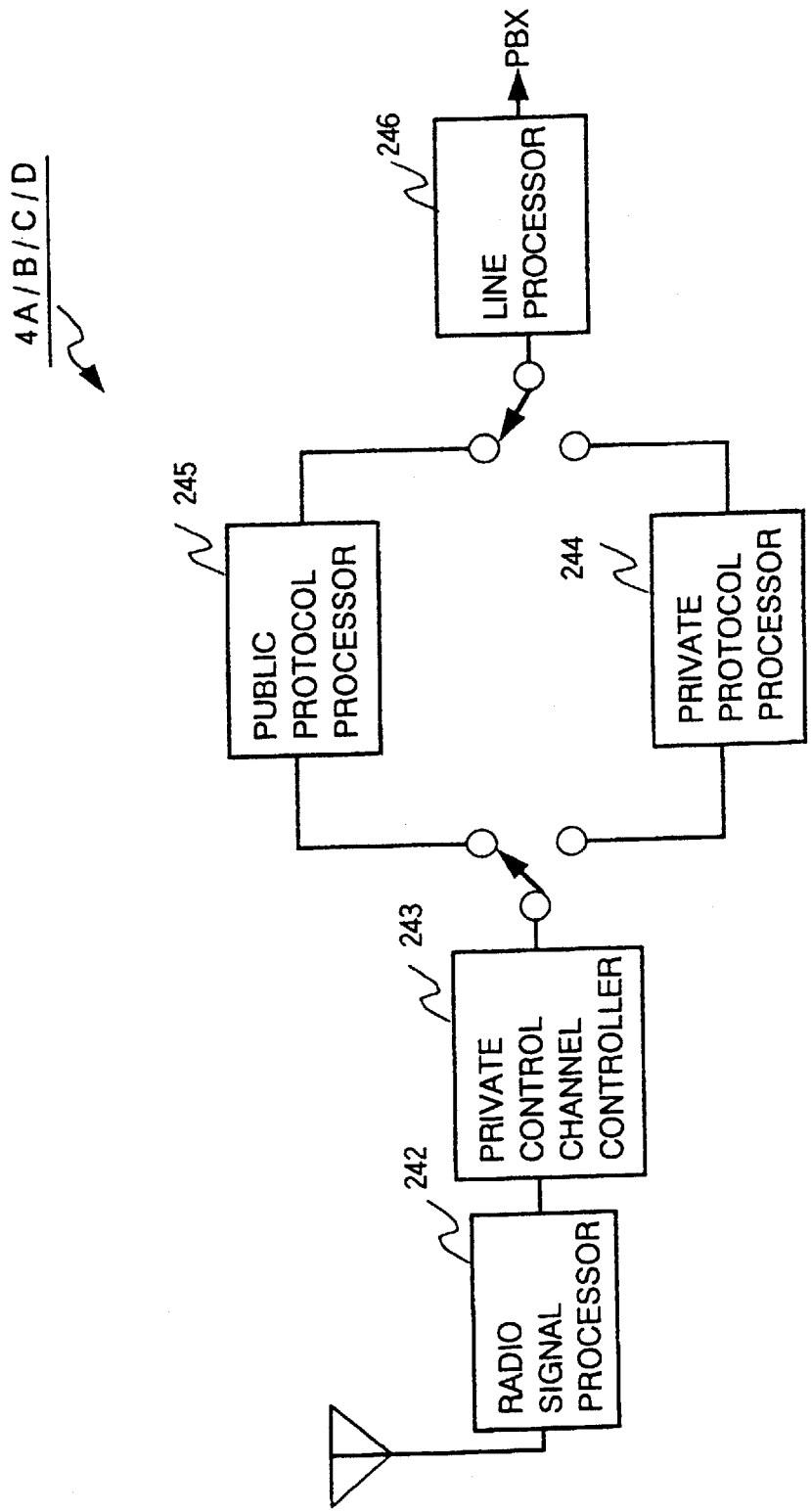
FIG. 60 is a block diagram showing a radio base station of the private system in the first embodiment.

FIG. 60 is a block diagram showing the function of each radio base station of the private system. The radio base station 4 is used in the mobile communication system that is equipped with an exchange for delivering related information of the mobile station 5B, 5C, which does not belong to the private system, directly to the public switched telephone exchange 1.

The radio base station 4 comprises a radio signal processor 242 to be wirelessly connected to the radio signal processor 239 of the mobile station 5B, 5C, a private control channel controller 243 for controlling private control channels, a private protocol processor 244 for processing private protocols, a public protocol processor 245 for processing public protocols, and a line processor 246 for performing connection with the PBX 3. The radio signal processor 239 of the mobile station 5B, 5C of FIG. 59 has the same function as that of the radio processor of FIG. 7.

In the embodiment, the private control channel controller 236 is used to establish a link level in accordance with the flow chart in FIG. 61. After the link level is set, the mobile stations 5B and 5C become able to communicate the protocol information with the PBX3, via the radio stations 4B and 4D, respectively.

Figure 62:
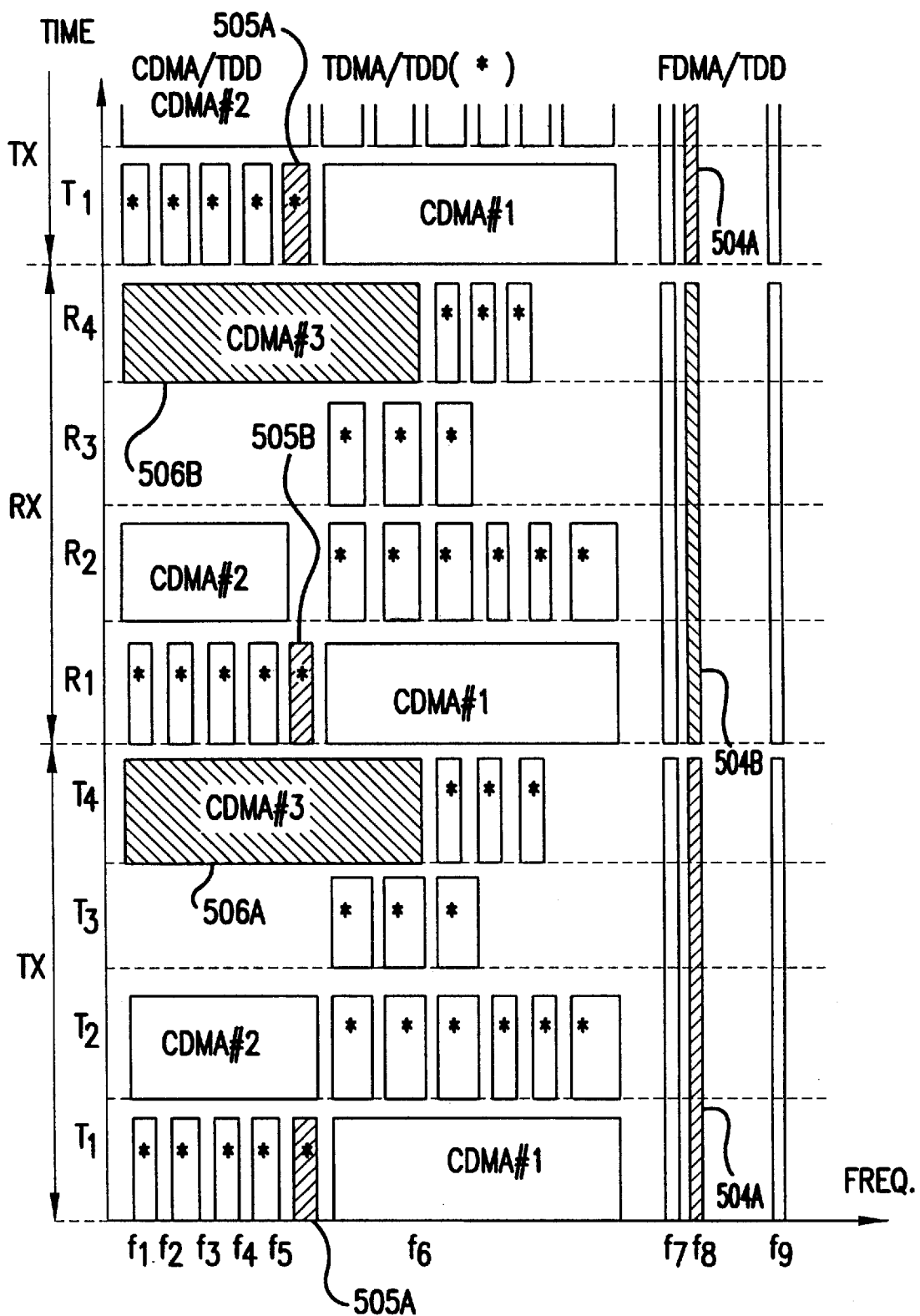
FIG. 62 is a diagram showing an example of arrangement of control channels of the private system in the first embodiment.

FIG. 62 shows an example of arrangement of control channels of the private system. Time slots 504A, 504B represent control channels in the FDMA/TDD access method; time slots 505A, 505B, control channels of the TDMA method; and time slots 506A, 506B, control channels of the CDMA method. These control channels are those to be used in the private system. The procedure for securing a link level in the private system of FIG. 61 is characterized in that the control channels to be used by control channels dedicated for private system and previously defined in the private system as shown in FIG. 62. Accordingly in the private system, communication able to cope with a plurality of access methods can be realized.

Setting of Access Method of Adjacent Cell

In a mobile communication system in which at least one radio base station is located centrally in each cell, the attribute of the first cell, i.e. the access method (FDMA, TDMA, CDMA), the modulation method (GMSK, p/4-QPSK, 16QAM, M16QAM) and the voice coding method (32KADPCM, VSELP, RPE-LPT, etc.), is preferably different from the attribute of the second cell adjacent to the first cell if necessary communication capacity is not satisfied by the same attribute. It is also preferable that a plurality of cells are different in attribute from a plurality of adjacent cells. Further, the exchange preferably has a memory for storing attribute information of each of cells having different attributes.

The individual radio base stations of cells having different attributes transmits their own attribute information by a common control channel (broadcast channel) according to at least one access method (FDMA, TDMA, CDMA) and at least one modulation method (GMSK, p/4-QPSK, 16QAM, M16QAM). If communication in access and modulation methods other than those in which the radio base station transmits is possible, the radio base station transmits its attribute as well. Further, the radio base station of each of cells having different attributes transmits attribute information of cells adjacent to the radio base station itself. If the radio base station of each of cells having different attributes transmits all attribute information including attribute information of other methods and also if there exists a common control channel other than the access and modulation methods in which the radio base station transmits currently, it transmits information of the common control channel of the other methods as well as all common control channel information of all cells adjacent to its own cell.

Thus with different access and modulation methods between adjacent cells, it is possible to eliminate mutual interference.

Embodiment 2

Simultaneous Use of Access Methods & Change of Access Method for Time Slot

Figure 63:
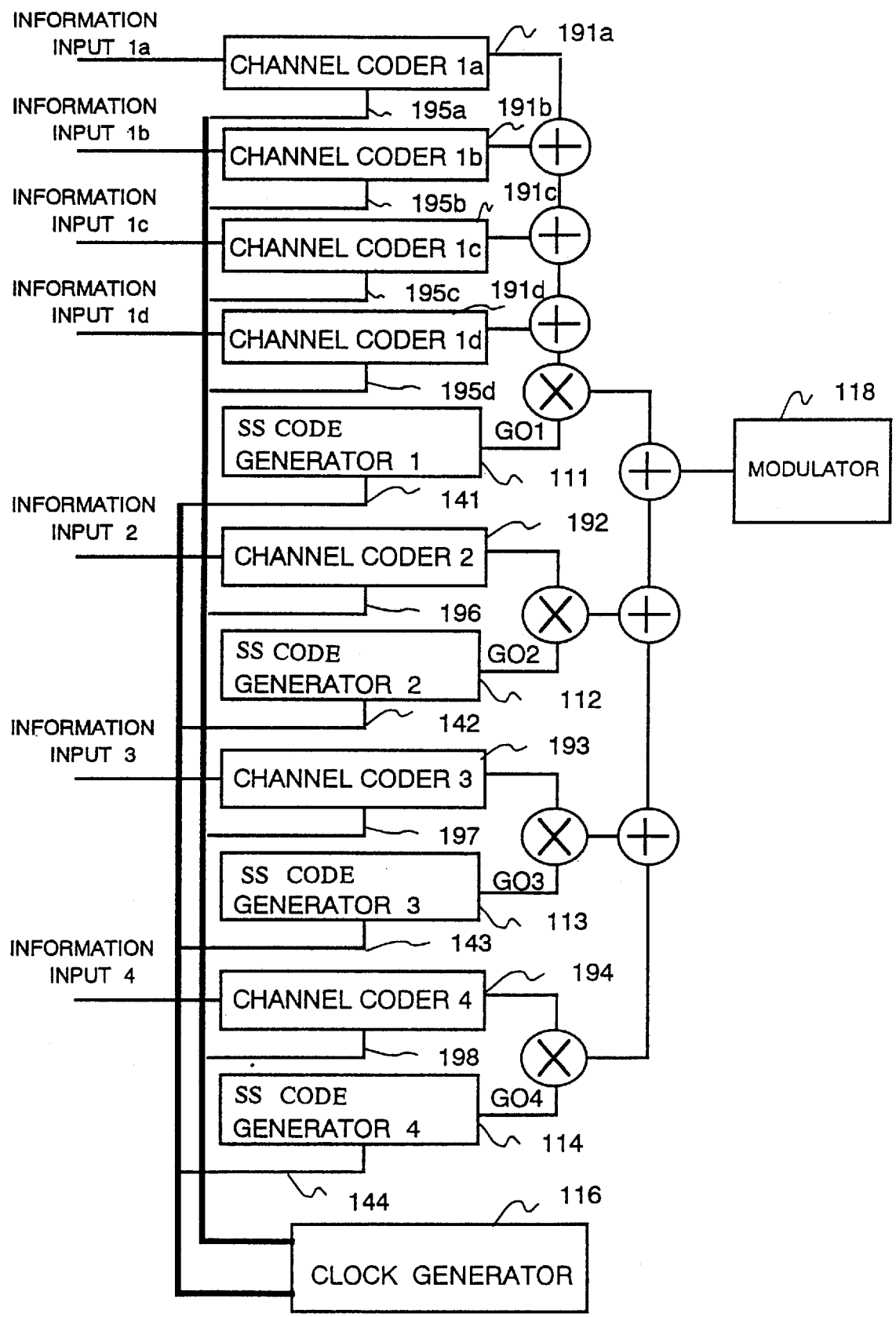
FIG. 63 is a fragmentary block diagram showing a transmitter of a CDMA communication unit in a modified mobile communication system according to a second embodiment of the invention.

FIG. 63 is a fragmentary block diagram showing a transmitting section of the CDMA communication unit in the radio base station. The transmitting section of this embodiment corresponds to that of FIG. 28 in the first embodiment. In this embodiment, the transmitting section includes channel coders 191a–194d in association with a single slot (the first time slot in this example). A spread-spectrum code generator 111 is associated with these channel coders 191a–191d. This embodiment is characterized in that the CDMA signals generated based on product information of the information codes, which are outputted from the channel coders 191a–191d, and the spread-spectrum codes outputted from the spread-spectrum code generator 111 is assigned to the first time slot. This process is accomplished by the controller. It is accordingly possible to assign a plurality of channels to the first time slot.

According to this embodiment, since each channel coder 191a–191d outputs an information code for every four frames, the speed of information inputs 1a, 1b, 1c, 1d is a quarter the information inputs 2, 3, 4. Namely, the information code from the channel coder 191a is outputted to the first frame of the four successive frames. Likewise, the information code from the channel coder 191b is inputted to the second frame of the four frames; the information code from the channel coder 191c is outputted to the third frame; and the information code from the channel coder 191d is outputted to the fourth frame. And to the first frame of the next four frames, the information code of the channel coder 191a is outputted. As this process is repeated, the output of any of the channel coders 191a–191d is assigned to the first time slot. The outputs of the channel coders 192–194 are assigned to all of the second, third and fourth time slots of the four frames.

Thus a plurality of channels are formed in a single time slot. In this case, the transfer rate is a quarter of the transfer rate when a single channel is formed. Accordingly it is particularly useful when many channels are to be formed though not requesting a high transfer rate.

On the receiving side, by looking the information of the channel coders of FIG. 30, it is possible to identify the output of the channel coder 191a–191d.

Embodiment 3

Figure 64:
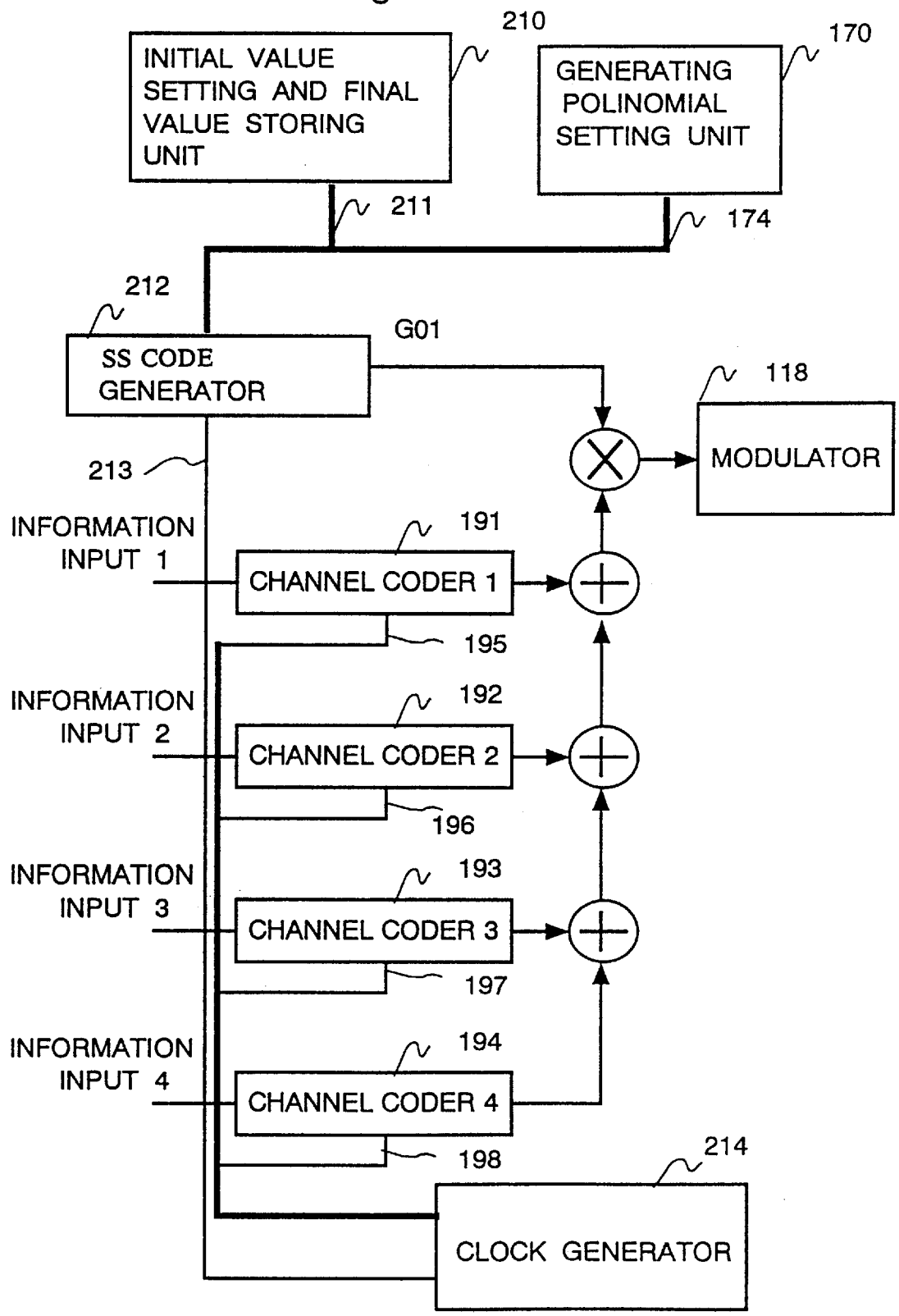
FIG. 64 is a fragmentary block diagram showing a transmitter of a CDMA communication unit in a modified mobile communication system according to a third embodiment of the invention.

FIG. 64 is a fragmentary block diagram of a transmitting section of the CDMA communication unit in the radio base station. The CDMA communication unit FIG. 64 comprises a spread-spectrum code generator 212, channel coders 191–194 in association with the respective information inputs 1–4, a generating polynomial setting unit 170 for setting a spread-spectrum code value by a given generating polynomial, and an initial value setting and final value storing unit 210 for setting an initial value of the spread-spectrum code and for temporarily storing a final value of the spread-spectrum code generated by the spread-spectrum code generator 212.

Figure 65:
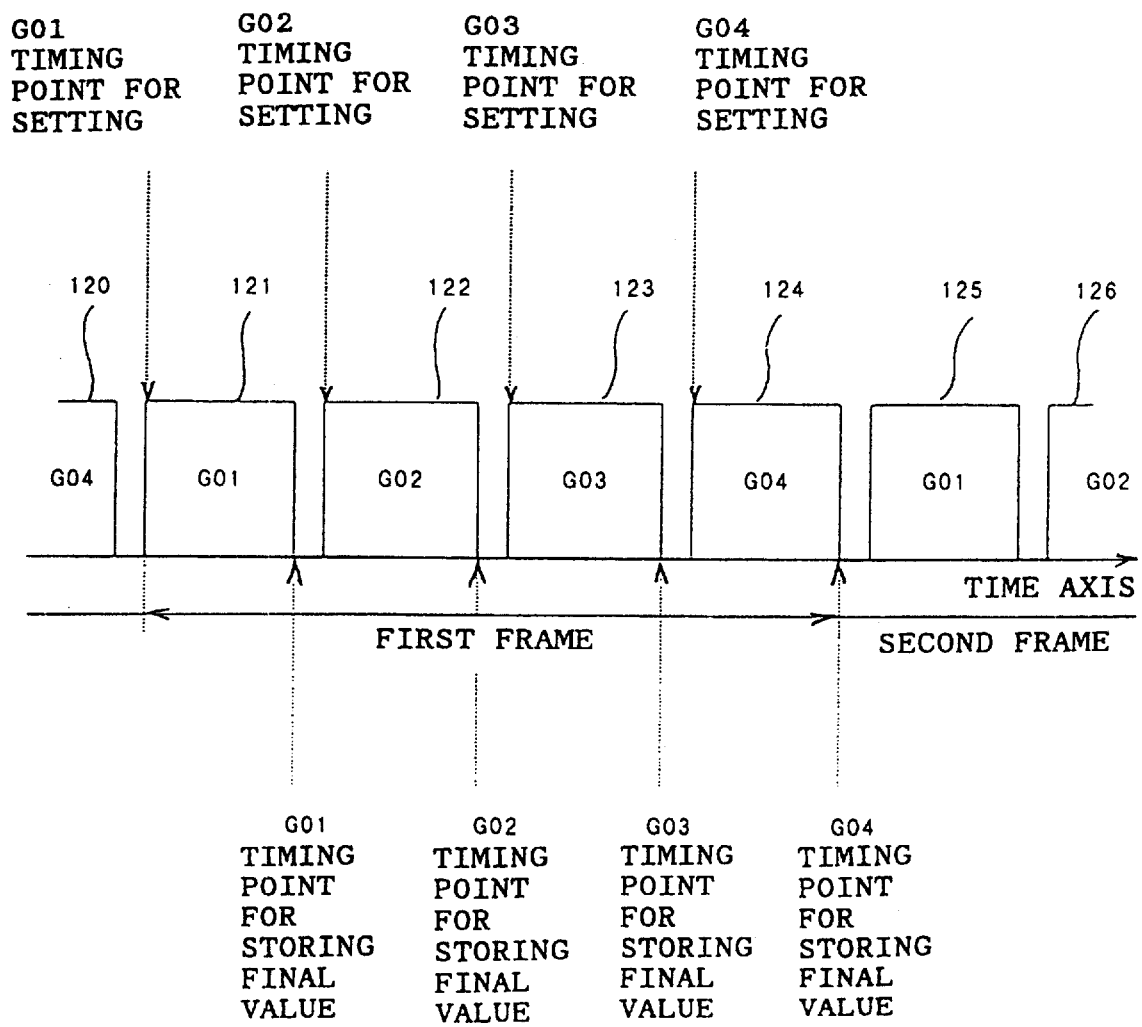
FIG. 65 is a diagram showing a timing for setting a spread-spectrum code value to each time slot and for storing the final value in an initial value setting unit and a final value storing section in the third embodiment.
Figure 66:
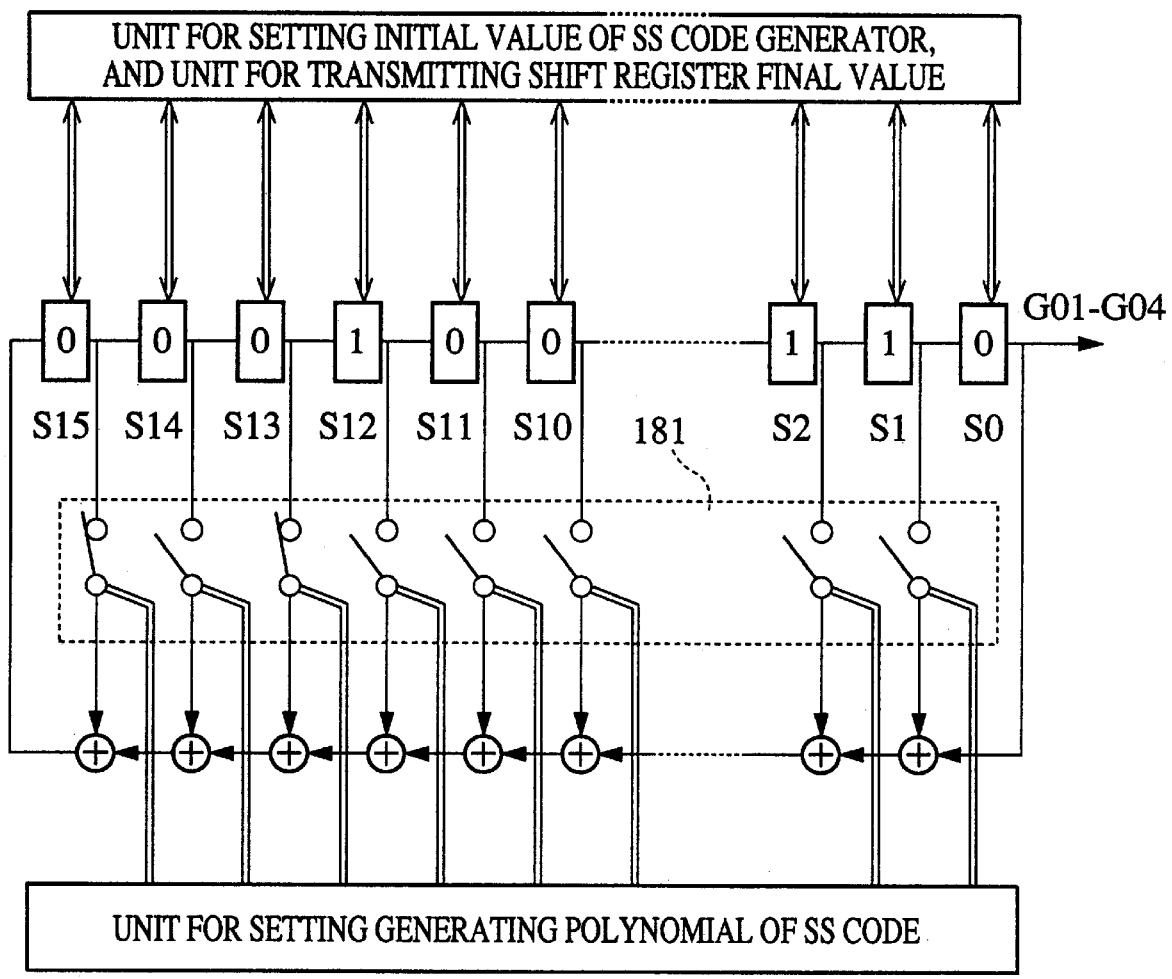
FIG. 66 is a diagram showing an interior structure of a spread-spectrum code generator in the third embodiment.

FIG. 65 shows a timing for setting a spread-spectrum code in each time slot and for storing the final value in the initial value setting and final value storing unit 210. FIG. 66 shows the interior structure of the spread-spectrum code generator 212, which is basically identical with the structure of FIG. 21 except that it transfers the final value to the initial value setting and final value storing unit 210.

This embodiment is characterized in that the single spread-spectrum code generator 212 supplies spread-spectrum codes to the channel coders 191–194 assigned to different time slots. Namely, the spread-spectrum code generator 212 has to generate different spread-spectrum codes to the respective channel coders 191–194. Therefore, as shown in FIG. 65, at the end of each burst, the final value of the spread-spectrum code generator 212 at that time is fetched, and at the same time, a generating nomial and an initial value are set at the beginning of each burst. The setting of generating nomial and initial value is already explained above in connection with the first embodiment, so any repetition of description is omitted here. The final value to be fetched from the spread-spectrum code generator 212 is each value of the respective shift register 163 in FIG. 66. This final value is temporarily stored via the information channel 211.

As mentioned above, according to this embodiment, the single spread-spectrum code generator can supply different codes to the channel coders corresponding to the respective time slots. It is accordingly to assign the CDMA signal or the TDMA signal to the time slots, which are contained in the same frame, by the spread-spectrum code controller. The controller acts in such a manner that both the CDMA signal and the TDMA signal exist in the same frame.

Embodiment 4
Setting Plural Channels in One Time Slot

Figure 67:
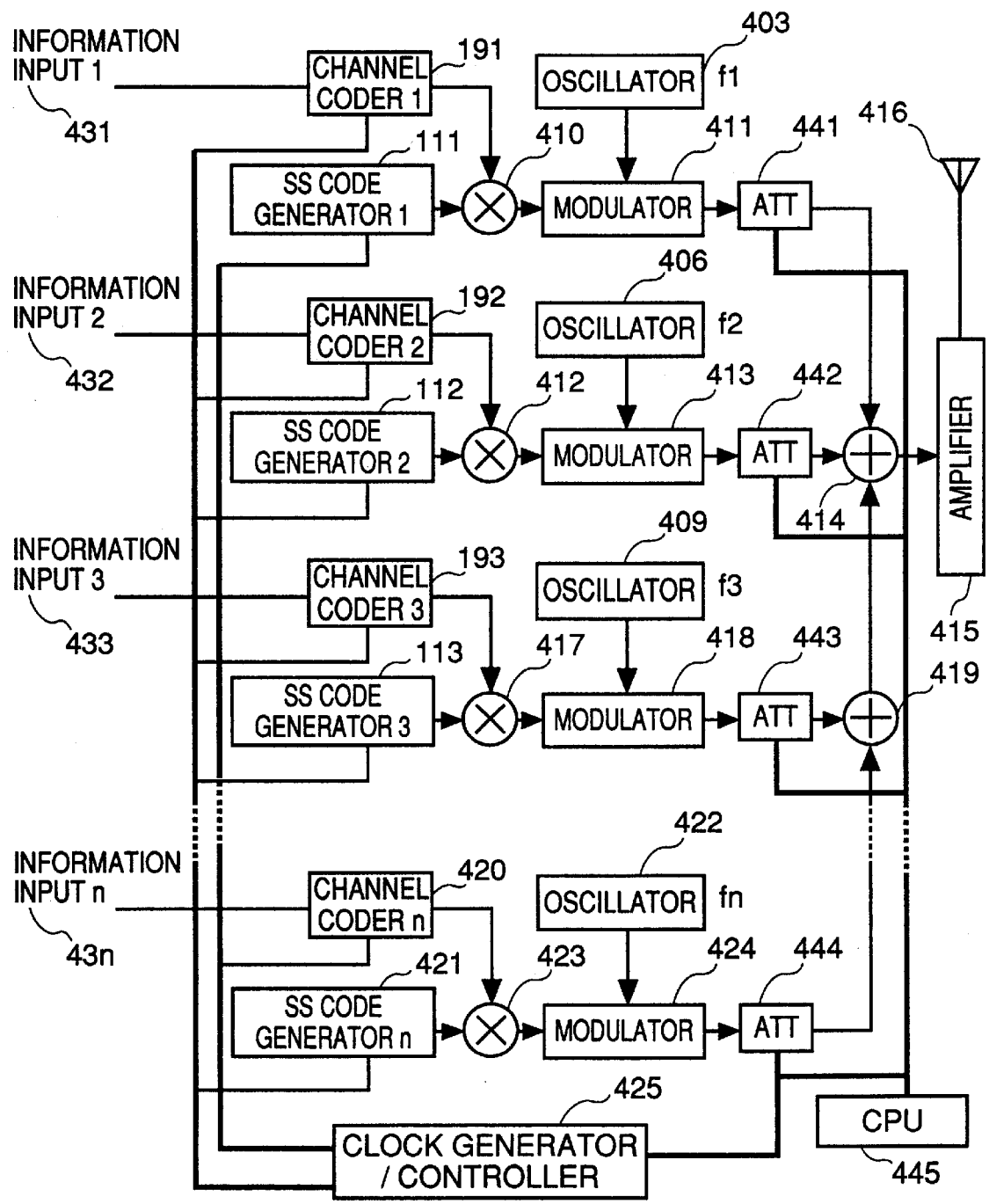
FIG. 67 is a fragmentary block diagram showing a transmitter of a CDMA communication unit in a radio base station in a mobile communication system according to a fourth embodiment of the invention.

FIG. 67 is a fragmentary block diagram showing a transmitting section of the CDMA communication unit in the radio base station. In this embodiment, like the foregoing embodiment, the transmitting section includes channels 191–193, 420 and spread-spectrum code generators 111–113, 421 in n sets. In the foregoing embodiment, as shown in FIG. 45, different carrier frequencies are assigned to the respective time slots by the carrier frequency controller. This embodiment is characterized by oscillators 403, 406, 409, 422 for controlling the carrier frequencies of outputs of the respective sets of the channel coders and the spread-spectrum code generators so that a different carrier frequency can be supplied to each time slot.

Also in this embodiment, the spread-spectrum code generators in association with the time slots for transmitting the TDMA signals are rendered inoperative by the controller. Product arithmetic units 410, 412, 417, 423 in association with the stopped spread-spectrum code generators performs product arithmetic in such a manner that the stopping of the spread-spectrum code generators does not give influence on the action of the channel coders. This product arithmetic is used either in the mobile station or in the radio base station.

For each information channel, an attenuator 441–444 is provided for adjusting an RF signal intensity. These attenuators 441–444 are controlled by a CPU 445, which is control means, according to the receiving electric field strength information from the mobile station. In this embodiment, the transmitting power control process is made on either the TDMA signal or the CDMA signal. The CPU 445 serves also as the controller of the radio processor of FIG. 6.

The signals whose transmitting wave intensity is suitably set by the attenuators are summed by adders 414, 419 and are then amplified by a radio frequency amplifier 415 for emission into air from an antenna 416.

FIG. 68 shows an example in which each of the TDMA signal and the CDMA signal to be transmitted from the transmitting section of FIG. 67 is assigned to each time slot. In the example of FIG. 68, fifty-two information inputs are made. Accordingly this transmitting section includes 52 sets of the channel coders and the spread-spectrum code generators. Additionally, the transmitting section includes the same number of sets of associated parts such as attenuators and oscillators.

The table of FIG. 68 shows that the first and third time slots output the TDMA signal, from which it is understood that the spread-spectrum code generators corresponding to these time slots are rendered inoperative. Meanwhile the second and fourth time slots are used for outputting the CDMA signal. This embodiment is characterized in that a plurality of information channels of the same access method are associated with a single time slot. According to the table of FIG. 68, thirty-six channels and fourteen channels can be simultaneously set in the second and fourth time slots, respectively.

Figure 69:
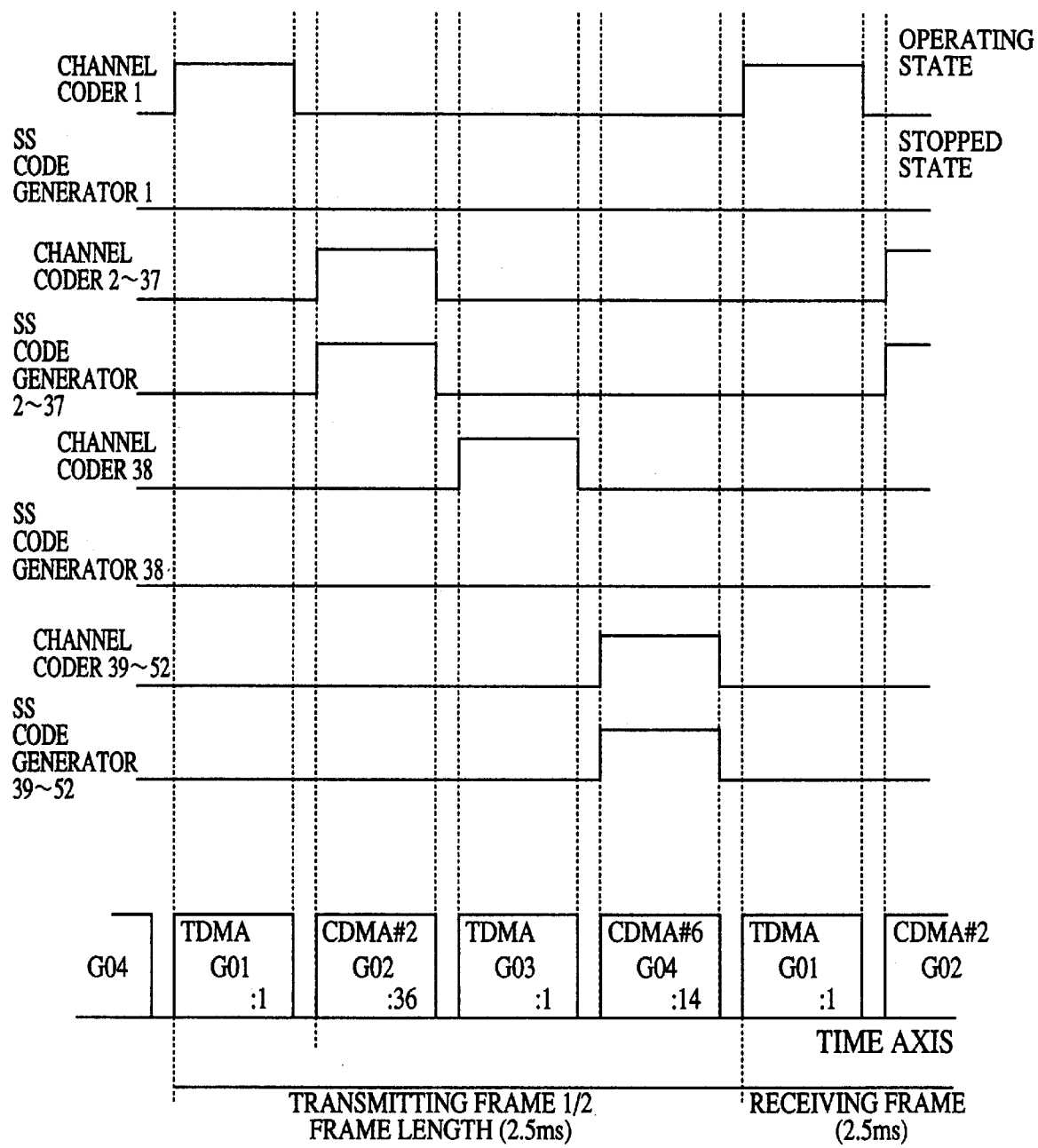
FIG. 69 is a diagram showing an example of the timing clock action state in each time slot between the channel coder and the spread-spectrum code generator in the fourth embodiment.

FIG. 69 is a timing chart showing the action of timing clocks with respect to the channel coders and the spread-spectrum code generators for every time slot. In FIG. 68, since the information channel 1 is a TDMA signal, the channel coder 1 for this information channel is rendered operative while the spread-spectrum code generator 1 is rendered inoperative. Since the radio wave of the information channel 2–37 is a CDMA signal, thirty-six channel coders 2–37 corresponding to these channels are rendered operative while thirty-six spread-spectrum code generators 2–37 also are rendered operative. Since the information channel 38 is a TDMA signal, the channel coder 38 for this information channel is rendered operative, while the spread-spectrum code generator 38 is rendered inoperative. Since the radio wave of the channels 39–52 is a CDMA signal, fourteen channel coders 39–52 corresponding to these channels are rendered operative while fourteen spread-spectrum code generators 39–52 also are rendered operative. In FIG. 69, ":1", ":36", ":1", ":14" described in the respective time slots are the number of channels that can be set simultaneously in each time slot.

As mentioned above, according to this embodiment, it is possible to set a plurality of channels in the same time slot within a transmitting frame.

Embodiment 5
Setting Plural Channels in 1 Time Slot

Figure 70:
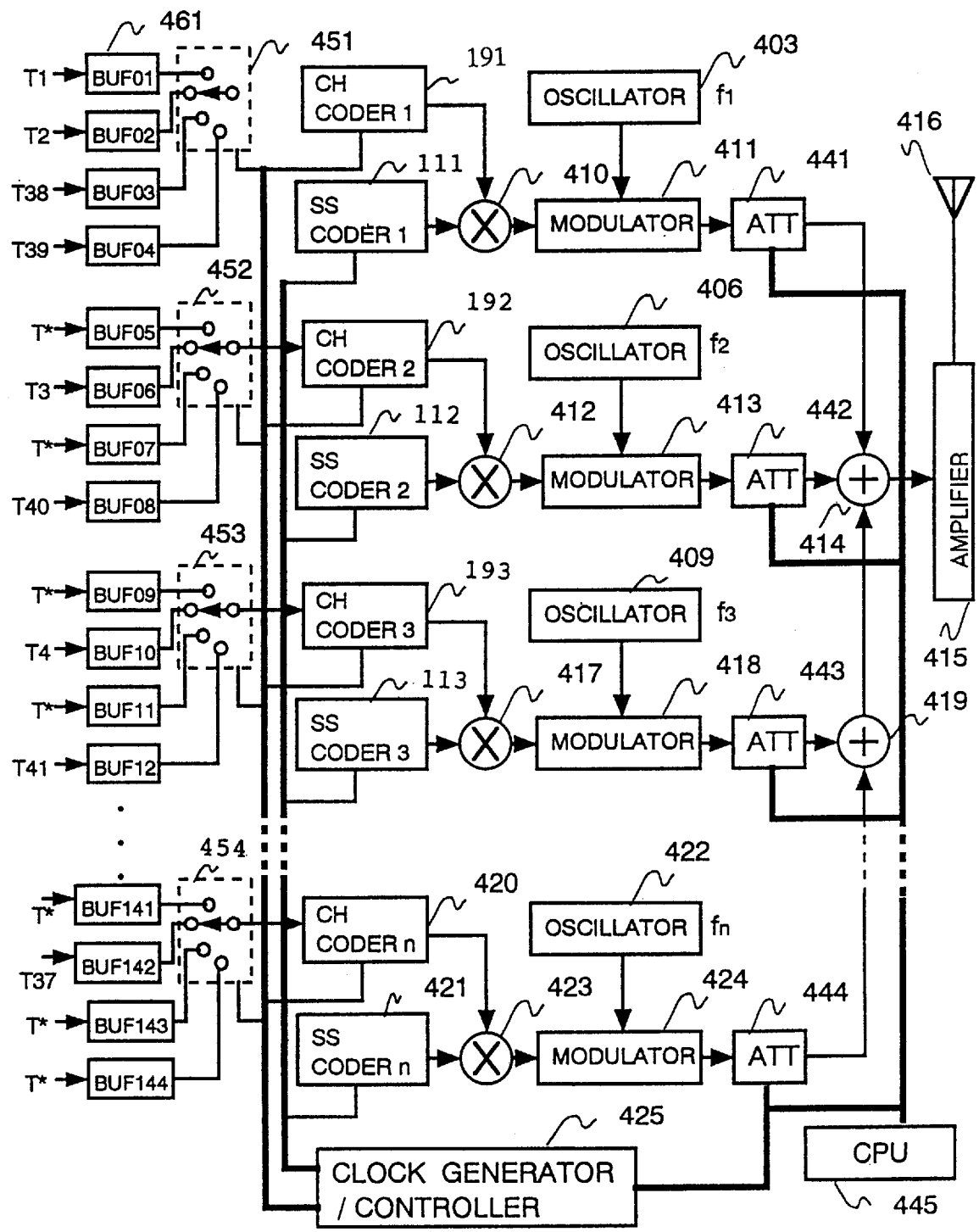
FIG. 70 is a fragmentary block diagram showing a transmitter of a CDMA communication unit in a radio base station of a mobile communication system according to a fifth embodiment of the invention.

FIG. 70 is a fragmentary block diagram showing a transmitting section of the CDMA communication station in the radio base station. This embodiment is a modification of the fourth embodiment. In this embodiment, switches 451, 452, 453, 454 are connected to the input sides of the respective channel (CH) coders 191–193. To these switches 451–454, buffer memories 461(BUF01–BUF144) corresponding to the respective channels T141–T144 are connected. In FIG. 70, "T*" indicates that no input information is given from there. In the case of this embodiment, since a transmitting frame is composed of four time slots, four channels are connected to each switch 451–454. This means that fifty-two channel coders are loaded in the radio base station of FIG. 70. Each switch 451–454 is controlled by the clock generator/controller 425 so that each input information is fetched in the designated time slot. The clock generator/controller 425 is an element having a composite function of the clock generator and the clock controller. Each switch 451–454 selects the connection to four buffer memories in ½ frame length. Accordingly, the bit rate of output of the buffer memories (BUF01–BUF144) is equal to the product of the input bit rate and the number of time slots (four times in this embodiment). In the case of TDD method, it is further two times the result, namely, eight times (4×2=8).

FIGS. 71A and 71B are a table showing examples of combination of information input No., buffer memory No., channel coder/spread-spectrum code generator No., time slot No., information transmitting rate, transmitting type and chip rate in the radio base station of FIG. 70. It is understood from the table that the input to a set of the channel coder 1 and the spread-spectrum code generator 1 is allocated to four channels, i.e., information input Nos. T1, T2, T38, T39. It is also understood that the first and third time slots are for transmission of TDMA signals while second and fourth time slots are for transmission of CDMA signals. Accordingly, if the switch 451 receives information input from the buffer memory BUF01, the other switch 452–454 do not receive information from the buffer memories BUF05, BUF09, BUF141 located in a position corresponding to the first time slot. This is the reason why information input No. is represented by "T*" in FIG. 70.

Figure 72:
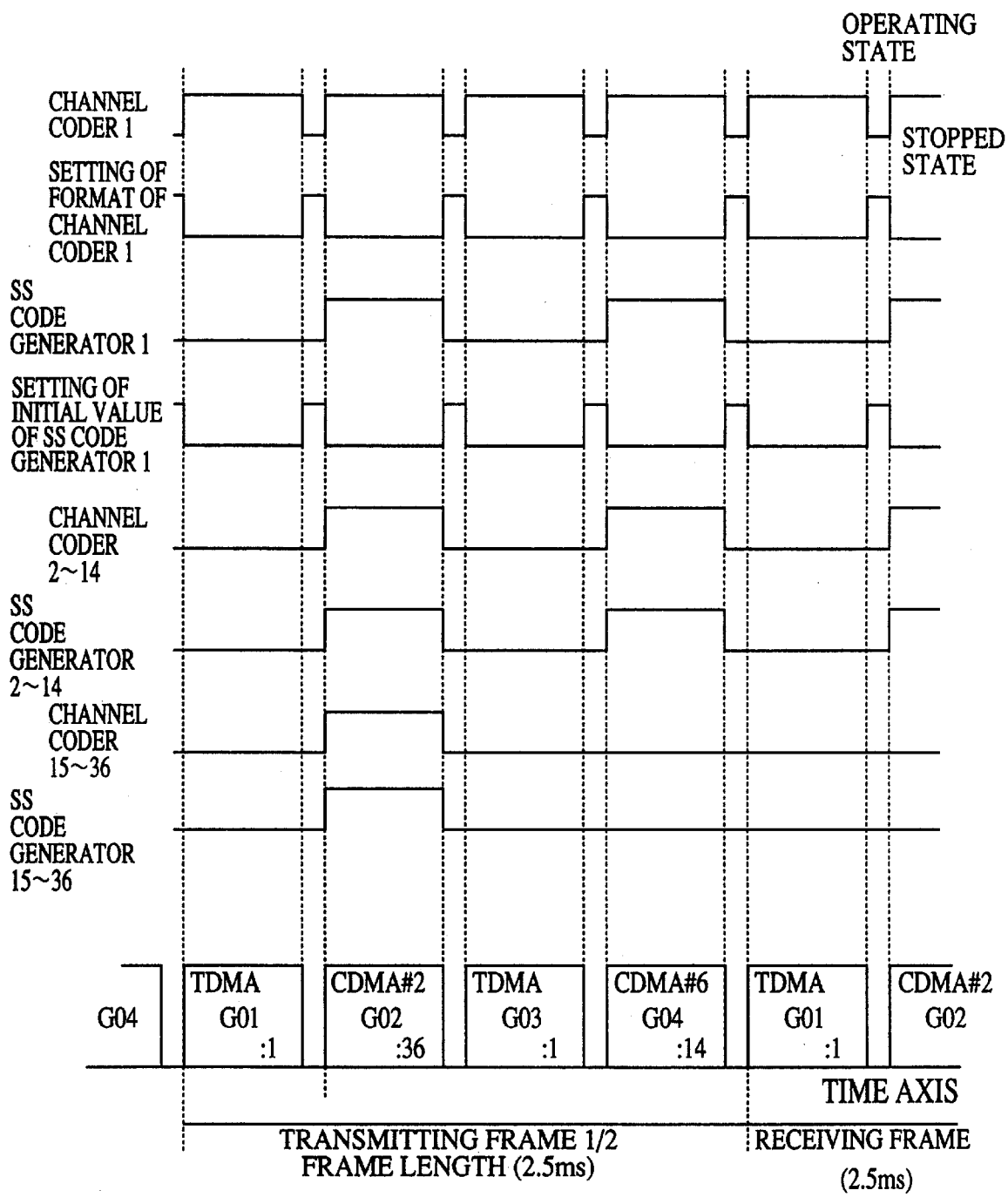
FIG. 72 is a diagram showing an example of the timing clock action state in each time slot between the channel coder and the spread-spectrum code generator in the fifth embodiment.

FIG. 72 is a timing chart showing the action of timing clocks with respect to the channel coders and the spread-spectrum code generators for every time slot. As it sends signals to all time slots one after another, the channel coder 1 is successively rendered operative. In the meantime, the spread-spectrum code generator (SS code generator) 1 is rendered operative only for the second and fourth time slots to generate CDMA signals. As is apparent from FIG. 70, the channel coders 2–14 and the spread-spectrum code generators 2–14 are rendered operative only for the second and fourth time slots, while the channel coders 15–36 and the spread-spectrum code generators 15–36 are rendered operative only for the second time slot. The setting of format to the channel coder and the setting of initial value to the spread-spectrum code generator take place within each time slot.

As mentioned above, as the CPU 445, which is control means, controls the action of the switch and the spread-spectrum code generator, it is possible to create a plurality of channels in a common time slot contained in the same transmitting frame.

Embodiment 6
Setting Plural Channels in One Time Slot

Figure 73:
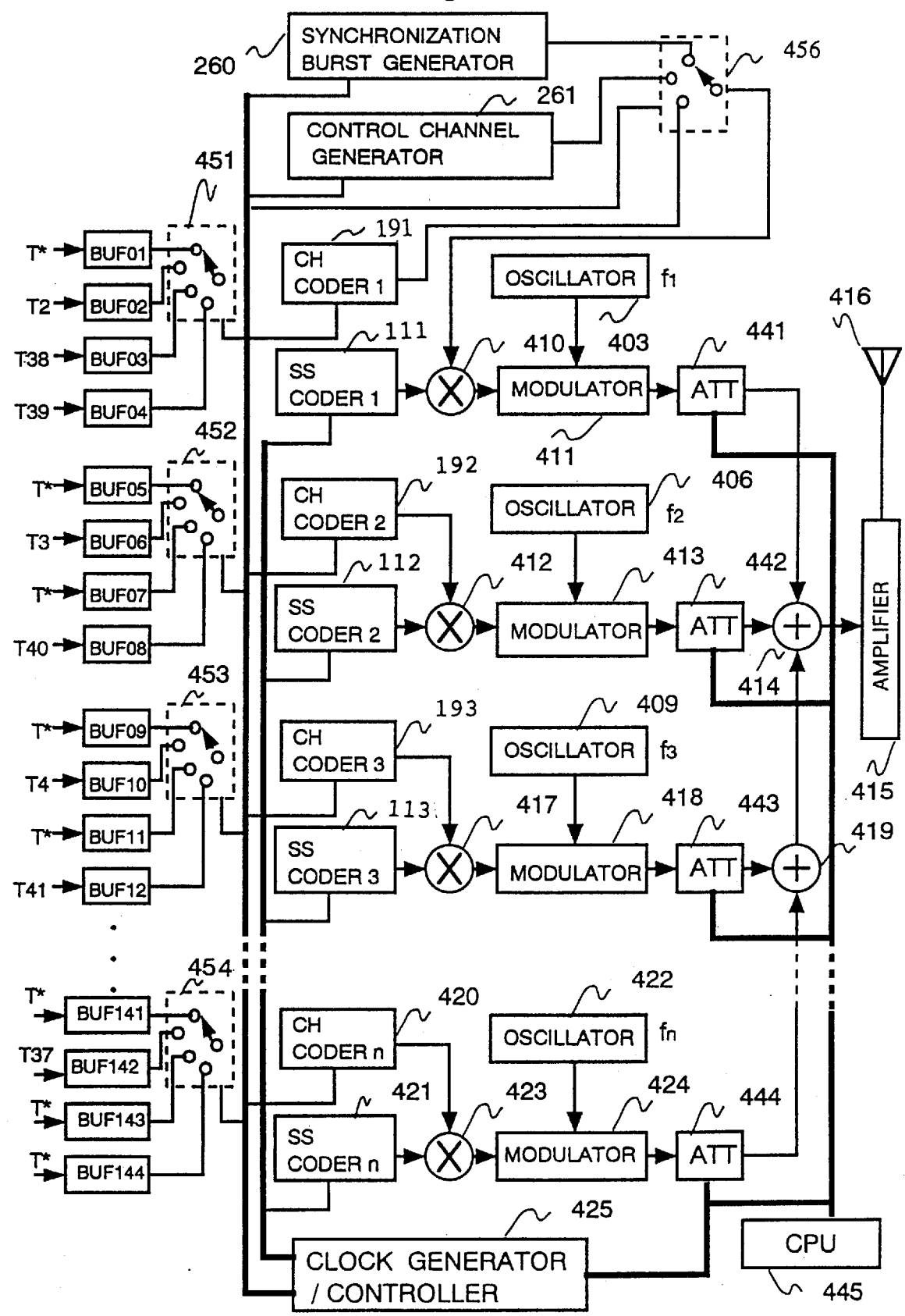
FIG. 73 is a fragmentary block diagram showing a transmitter of a CDMA communication unit in a radio base station of a mobile communication system according to a sixth embodiment of the invention.

FIG. 73 is a fragmentary block diagram showing a transmitting section of the CDMA communication station in the radio base station. This embodiment is similar to the fifth embodiment except that switching-over between the output of the channel (CH) coder 191, the output of the synchronization burst generator 260 and the output of the control channel generator 261 is accomplished by a switch 456. Namely, this embodiment is a composite form combining the construction of the synchronization burst generators and the control channel generators in FIG. 38 with the construction of the fifth embodiment so that the first time slot of FIG. 34 is used as the control channel. The action of the switch 456 is controlled by the CPU 445.

FIGS. 74A and 74B are a table showing examples of combination of information input No., buffer memory No., channel coder/spread-spectrum code generator No., time slot No., information transmitting rate, transmitting type and chip rate in the radio base station of FIG. 73. It is understood from the table that the first time slot is used as the synchronization control channel in the TDMA method.

Figure 75:
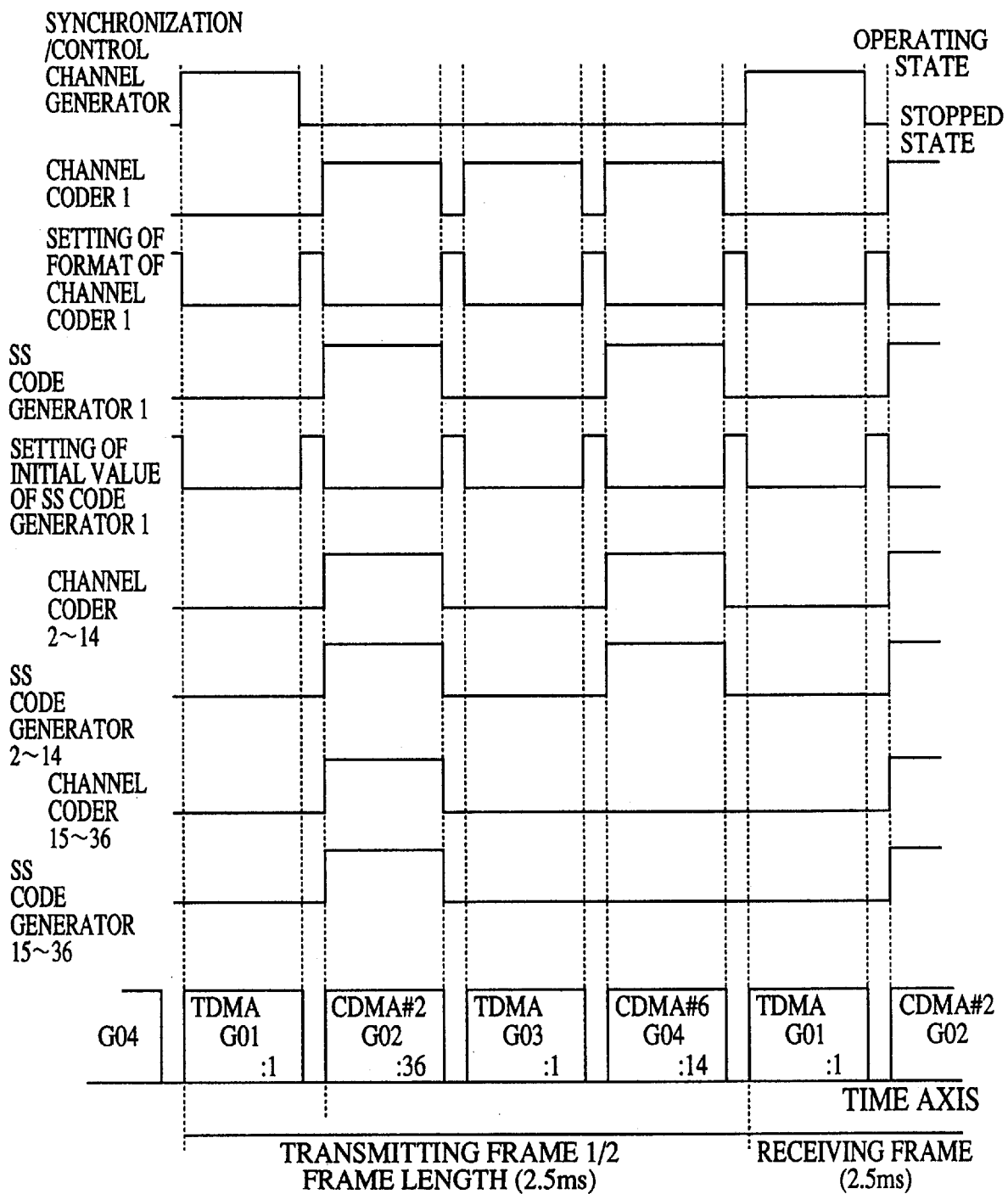
FIG. 75 is a diagram showing an example of the timing clock action state in each time slot between the channel coder and the spread-spectrum code generator in the sixth embodiment.

FIG. 75 is a timing chart showing the action of timing clocks with respect to the channel coders and the spread-spectrum code generators for every time slot. As shown in FIG. 75, according to this embodiment, the switch 456 selects the output of the synchronization burst generator 260 or the output of the control channel generator 261 for assignment to the first time slot. Also the switch 456 selects the channel coder 191 for assignment to the second, third and fourth times slots. Even if the switch 451 selects the buffer memory BUF01 at the time of the first time slot, the switch 456 does not select the output of the channel coder 191 so that no output is made.

On the other hand, FIG. 76 shows the transmitting section similar to that of FIG. 73, while FIGS. 77A and 77B shows an examples in which the synchronization burst/control channel assigned to the first time slot is a CDMA signal. In the CDMA method, since a plurality of channels can be created in the same common time slot in a transmitting frame, one or more other information channels in addition to the control channel can be set simultaneously in the first time slot. Accordingly, information input Nos. "T3", "T5", "T35" using the most significant buffer memories BUF05, BUF09 and BUF65 connected to the switches 452–454 are defined to be different from the case of TDMA signal indicated by "T*".

Figure 78:
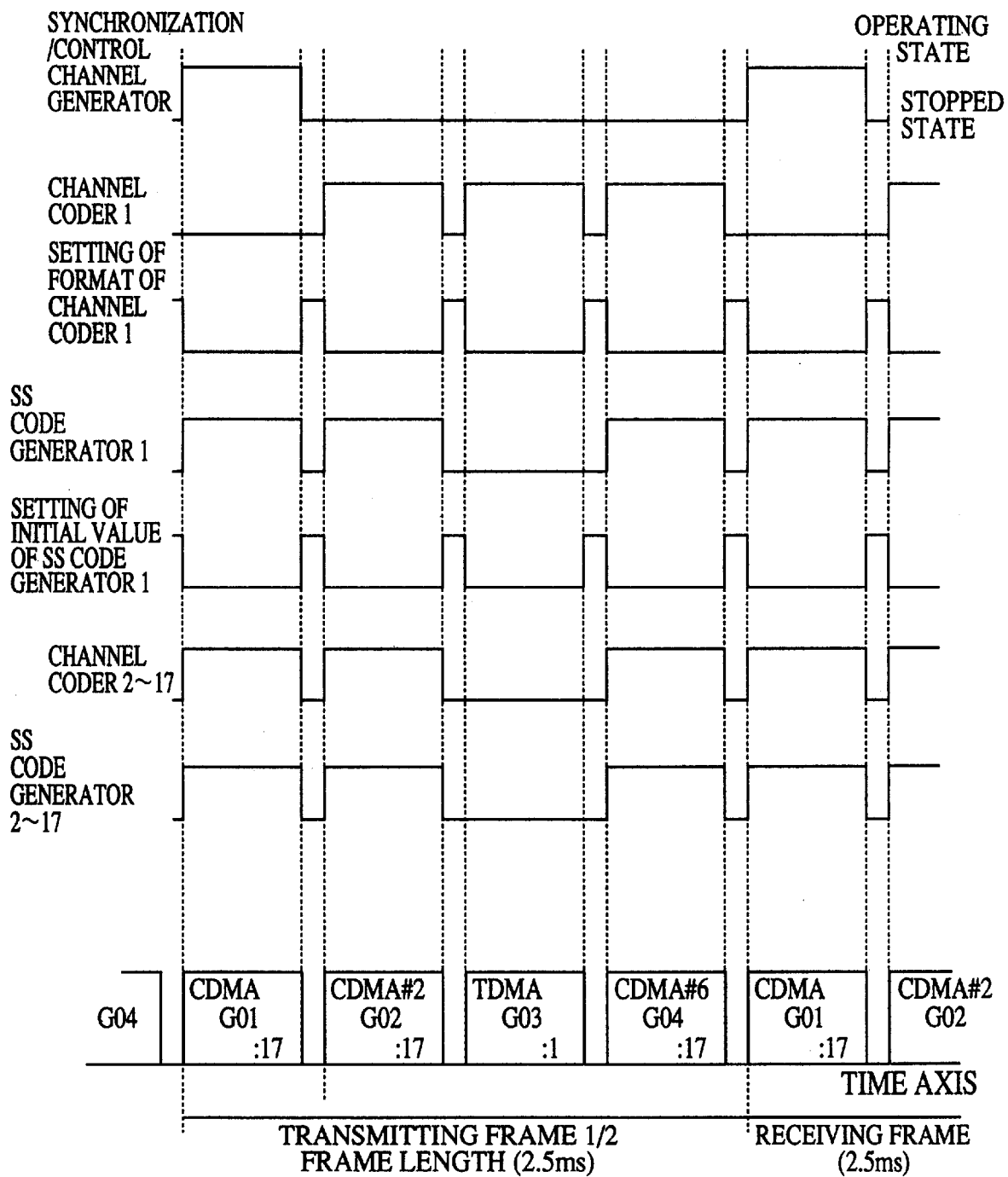
FIG. 78 is a diagram showing an example of the timing clock action state in each time slot between the channel coder and the spread-spectrum code generator in the seventh embodiment.

FIG. 78 is a timing chart showing the action of timing clocks with respect to the channel coders and the spread-spectrum code generators for every time slot. In FIG. 78, unlike the case of the TDMA signal shown in FIG. 75, it is illustrated that all of the spread-spectrum code generators are rendered operative by the first time slot.

Thus it is possible to add the other CDMA signal in the first slot is set for transmission of the CDMA signal. As shown in FIGS. 77A and 77B, as all of seventeen sets of the channel coders and the spread-spectrum code generators are used, it is possible to create fifty-two information channels in the single locus of frequency. Of course, the number of channel coders and the number of channels enabling synchronous communication should by no means limited to the illustrated example. The same thing can be said also in the following embodiments.

Figure 79:
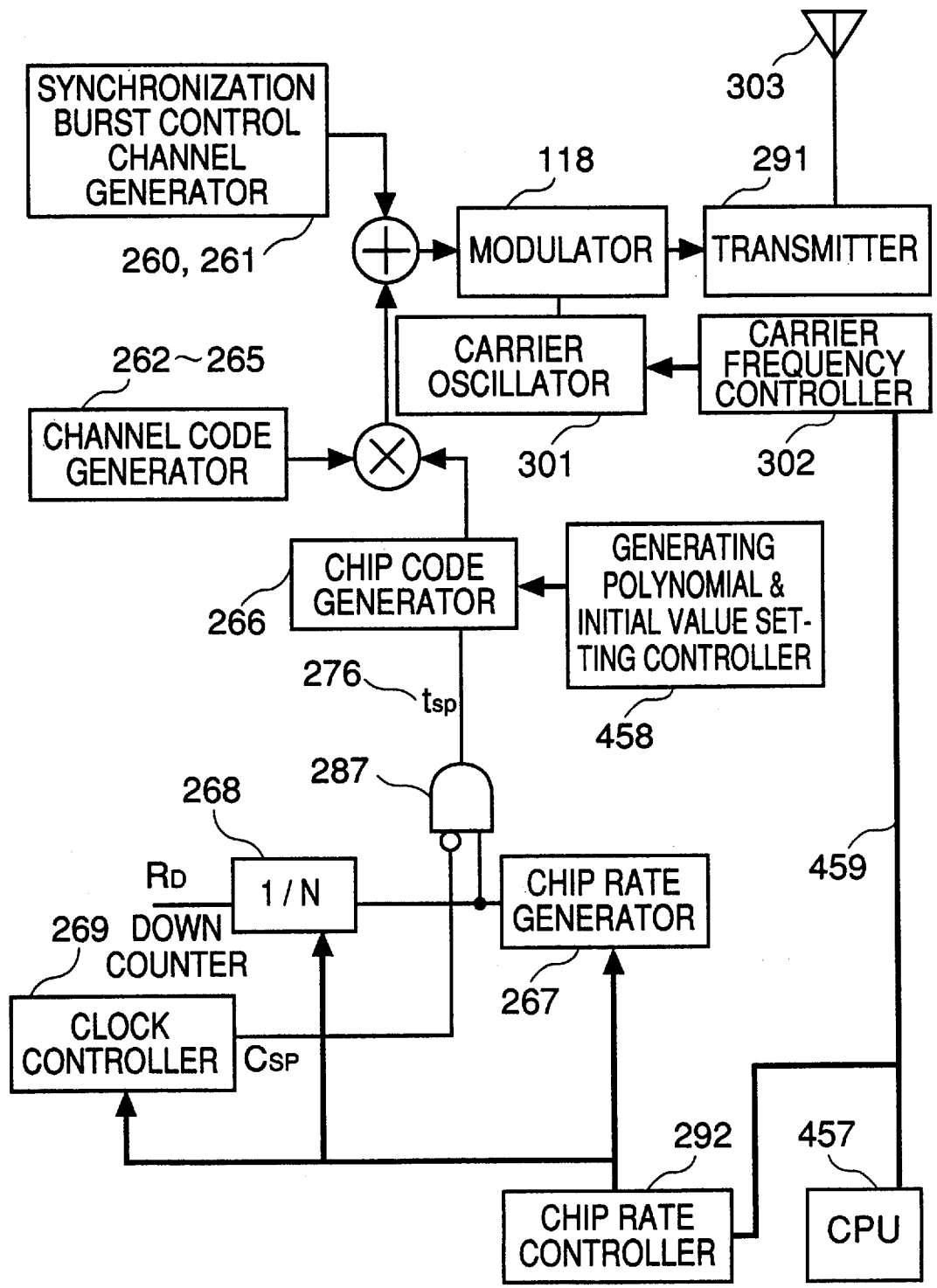
FIG. 79 is a fragmentary block diagram showing a transmitter of a CDMA communication unit in a radio base station of a mobile communication system according to an eighth embodiment of the invention.

Embodiment 7
Construction for Simultaneous Use of Access Method & for Switching Access Method to be Used in Time Slot FIG. 79 is a fragmentary block diagram showing a transmitting section in the radio base station. The first embodiment shows various parts or elements for simultaneously transmitting signals of different access methods and switching over the access method by controlling the generation of spread-spectrum codes with provision of a chip clock controller, a chip rate controller and a carrier frequency controller and by assigning the TDMA signal or the CDMA signal to the time slot.

Whereas this embodiment is characterized in that a universal control of the individual parts or elements by a CPU 457. Consequently the CPU 457 universally manages directly or indirectly a carrier frequency controller 302, a generating polynomial and initial value setting unit 458 and a chip rate controller 292 as these individual parts or elements are all loaded on the transmitting section by connecting them by a bus 459. The generating polynomial and initial value setting unit 458 is a composite unit having the function of the above-mentioned generating polynomial setting unit and the function of the initial value setting unit.

FIG. 80 is a table showing control information to be used in assigning the TDMA signal and the CDMA signal to the time slot by universally controlling the above-listed parts or elements. In the first embodiment, the individual parts or elements are stored separately. Whereas in this embodiment, they are managed as a whole. The transmission and reception of predetermined information take place through the bus 459.

The control information of FIG. 80 is set for each time slot upon every transmission and every reception of 1 frame. As mentioned in connection with the third embodiment, different channels are created in the same time slot in a different frame. The purpose of this embodiment is to cope with that case.

Figure 81:
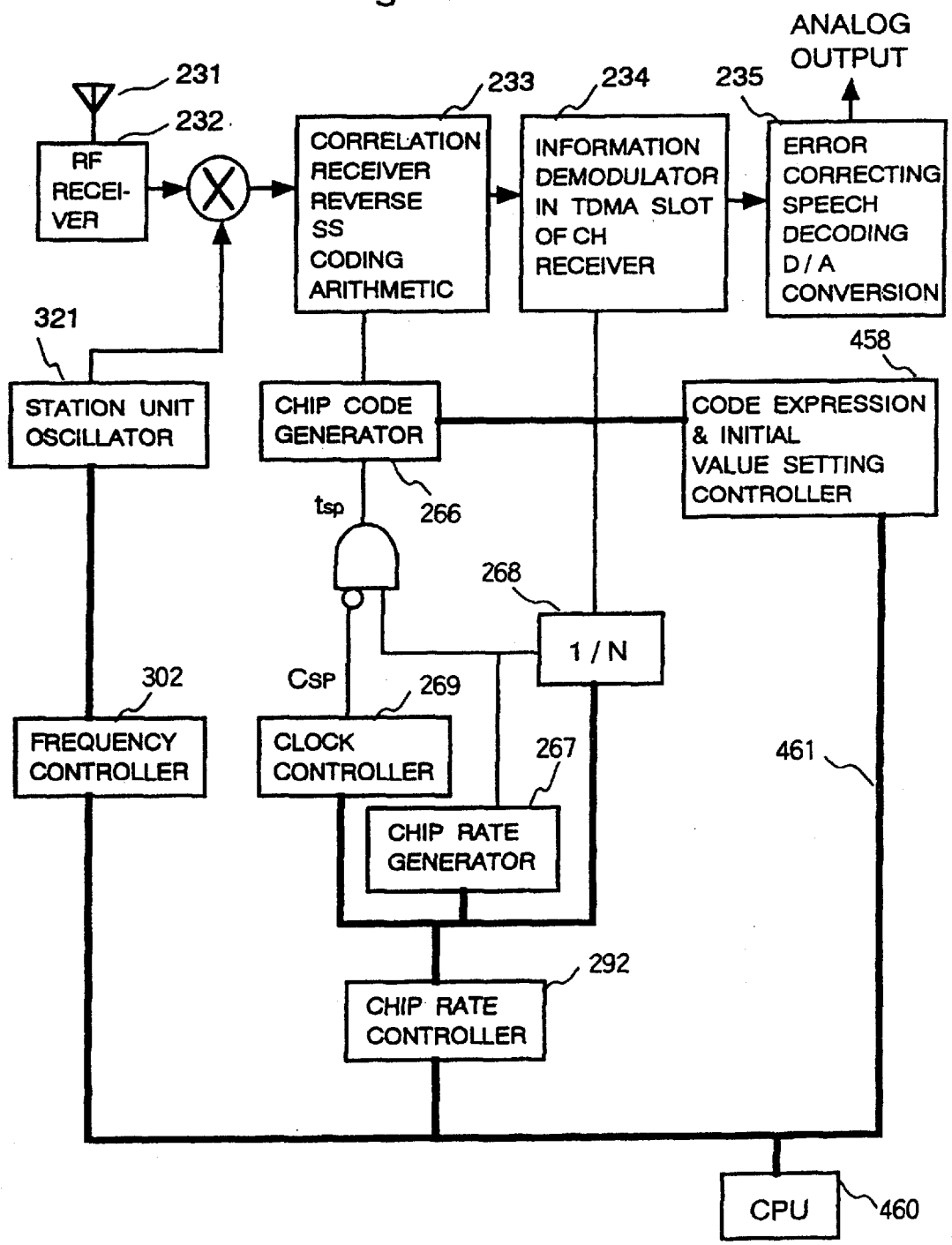
FIG. 81 is a fragmentary block diagram showing a transmitter of a CDMA communication unit in a mobile station of a mobile communication system according to a ninth embodiment of the invention.
Figure 83:
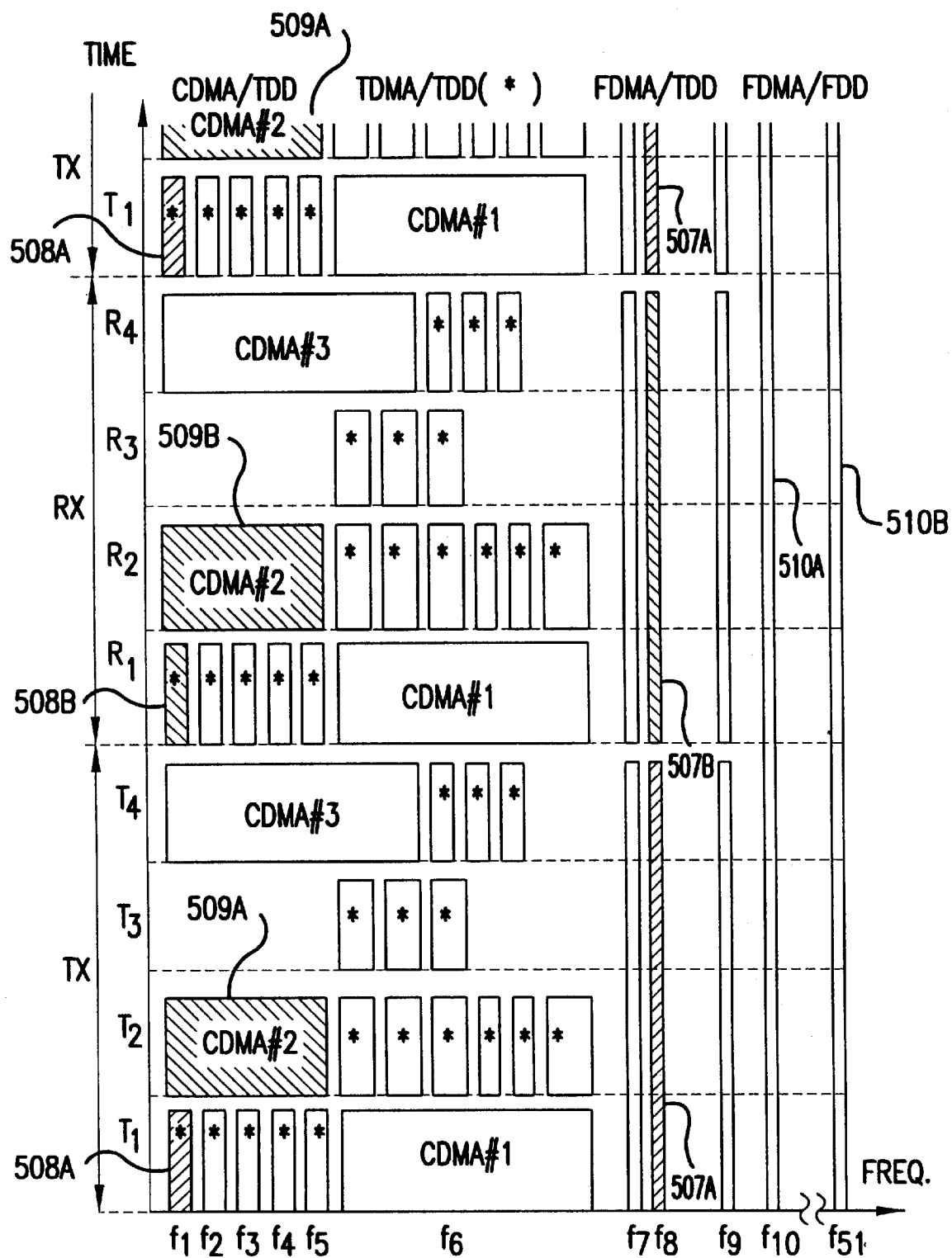
FIG. 83 is a diagram showing the manner in which frequencies are employed in various multiple access methods in a mobile communication system according to a tenth embodiment.

Embodiment 8
Construction for Simultaneous Use of Access Method & for Switching Access Method to be Used in Time Slot FIG. 81 is a fragmentary block diagram showing a receiving section in the mobile station. The first embodiment shows various parts or elements for simultaneously transmitting signals of different access methods and switching over the access method by controlling the generation of spread-spectrum codes with provision of a chip clock controller, a chip rate controller and a carrier frequency controller and by assigning the TDMA signal or the CDMA signal to the time slot.

Whereas this embodiment is characterized in that a universal control of the individual parts or elements by a CPU 460. Consequently the CPU 460 universally manages directly or indirectly a carrier frequency controller 302, a generating polynomial and initial value setting unit 458 and a chip rate controller 292 as these individual parts or elements are all loaded on the transmitting section by connecting them by a bus 461. The generating polynomial and initial value setting unit 458 is a composite unit having the function of the above-mentioned generating polynomial setting unit and the function of the initial value setting unit.

FIG. 82 is a table showing control information to be used in assigning the TDMA signal and the CDMA signal to the time slot by universally controlling the above-listed parts or elements. In the first embodiment, the individual parts or elements are stored separately. Whereas in this embodiment, they are managed as a whole. The transmission and reception of predetermined information take place through the bus 461.

The control information of FIG. 82 is set only once immediately before the time slot to be used in the case of mobile station, not repeatedly set.

Further, when using two slots simultaneously such as at the time of handover, the control information is set at every time for each time slot to be used. In such case, according to this embodiment, in spite of the CDMA method, it is possible to create a plurality of communication channels by only one receiving section.

Embodiment 9
Change of Access Method Based on Access Deciding Conditions

In each of the foregoing embodiments, the mobile communication system can transmit and receive both the CDMA signal and the TDMA signal existed in one frame of the TDMA method. Also it can transmit by creating a plurality of information channels in the same time slot within a single transmitting frame.

The mobile communication system of this embodiment can change the access method, which is to be used between the mobile station and the radio base station, based on predetermined access deciding conditions, by utilizing the individual functions shown in connection with each of the foregoing embodiments or by using additional parts or elements. The controller 54 of FIG. 6 changes the access method by switching over the loaded communication sections in various multi access methods or by using the loaded communication sections in various multi access methods simultaneously.

In connection with this embodiment and the following embodiments down to Embodiment 17, there are described about the changing of the access method, based on predetermined access deciding conditions, and about the setting and obtaining of necessary information for such changing.
Change of Channel based on Communication Efficiency within the Same Cell In this embodiment, the mobile station and the radio base station, which can perform various multi access methods, shift the information channel during communication. In the illustrated example, the communication channel of the FDMA/FDD method is shifted to the TDMA/TDD method or the CDMA/TDD method. More specifically, while communication using the transmitting frequency slot 510A and the receiving frequency slot 510B in the FDMA/FDD method, PBX shifts the information channel to the TDMA/TDD method (time slots 508A, 508B) or the CDMA/TDD method (time slots 509A, 509B), which are higher in communication efficiency. This shifting procedure will now be described using FIGS. 84 and 85. The time slot in the CDMA method means a time slot which the CDMA signal is assigned to time slots of the TDMA method.

Figure 84:
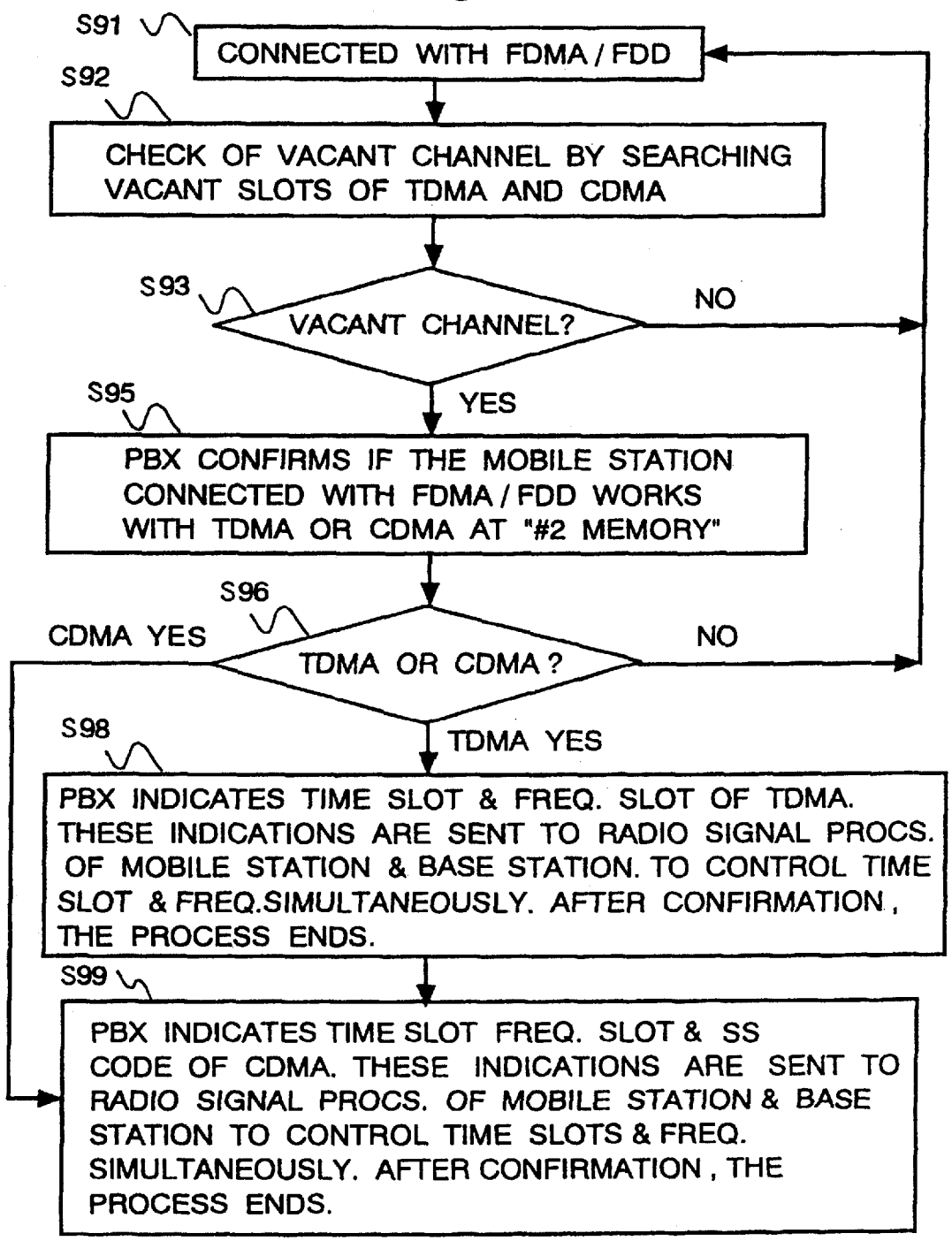
FIG. 84 is a flowchart showing the access method changing procedure in the tenth embodiment.
Figure 85:
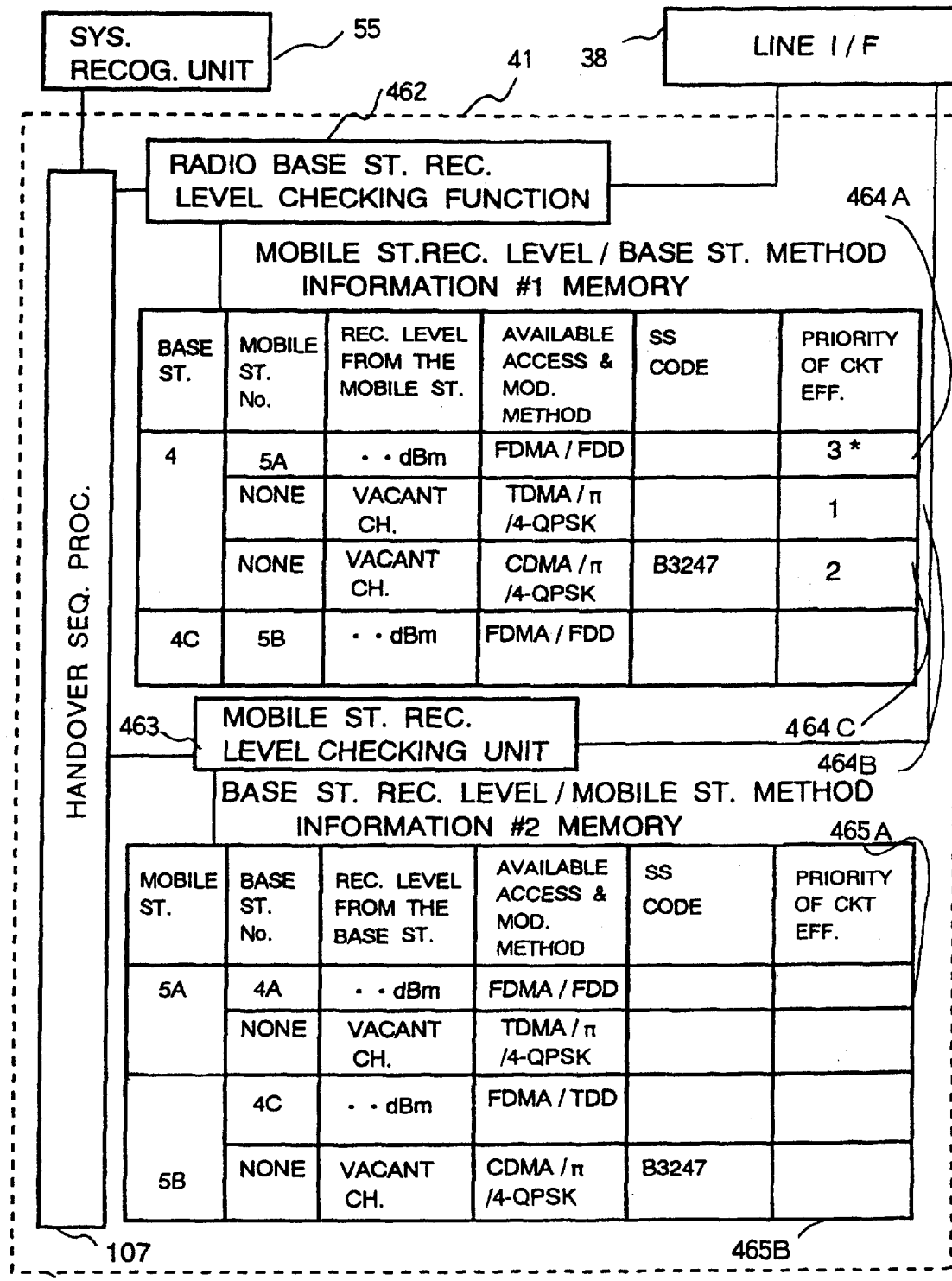
FIG. 85 is a block diagram showing a radio system controller in the tenth embodiment.

FIG. 84 is a flowchart showing the procedure of changing the access method. FIG. 85 is a block diagram of a radio system controller 41 in PBX 3. In the radio system controller 41, there are provided two memories for storing the access method deciding condition. The first memory is "mobile station's receiving level/radio base station's method information #1 memory" for storing levels of receiving radio waves from the mobile stations and for storing access methods usable between the radio base station and the mobile station. The second memory is "radio station's receiving level/mobile station's method information #2 memory" for storing levels of receiving radio waves from the radio base stations and for storing access methods usable between the mobile station and the radio base station. The radio system controller 41 is equipped with a radio base station's receiving level checking unit 462 for inquiring the information stored in the #1 memory and a mobile station's receiving level checking unit 463 for inquiring the information stored in the #2 memory.

The access and modulation methods usable for the mobile station are previously stored in PSTN (public switched telephone network), or the private system, in which the mobile station is registered. If the mobile station can use the CDMA method, a spread-spectrum code also is previously stored in PSTN or the private system.

The mobile station's "usable access method & modulation method" information in the #2 memory of FIG. 85 is the information which PBX 3 requested for and received for transmission from PSTN or the private system, in which the mobile station is registered, when the mobile station makes a call and makes a position registration.

Further, when shifting to the CDMA/TDD method, it is necessary to transmit not only the frequency slot and the time slot but also a spread-spectrum code (B3247 in the example of the mobile station 5B), as indicated by the second line 465B of the mobile station 5B in "#2 memory" of FIG. 85.

The procedure of changing the information channel will now be described using the flowchart of FIG. 84.

In step 91, assume that the radio base station 4A and the mobile station 5 are talking based on the FDMA/FDD method. In this state, as indicated by the first line 464A in the first memory of FIG. 85, it is stored the fact that the radio base station 4A and the mobile station 5A are in communication using the FDMA/FDD method. Although it is able to get communication with the radio base station 4A using either the TDMA method or the CDMA method, the mobile station 5A can learn from the second and third lines 464B and 464C that they are currently in communication using that method. The radio base station 4A checks, at step 92, a vacant slot among the TDMA slots and the CDMA slots, checking whether or not a vacant channel exists. The second and third lines 464B and 464C in "#1 memory" of FIG. 85 indicate an example of results of empty channel checking. "Confirm whether or not any vacant channel exists" at step 93 becomes "vacant channel exists", and the process goes to step 95. PBX confirms from "#2 memory" of FIG. 85 as to whether or not the mobile station 5A currently in talking has a communication function with the TDMA method (hereinafter called "TDMA function") or a communication function with the CDMA method (hereinafter called "CDMA function").

In this embodiment, the mobile station 5A does not have, as indicated by the second 465A in "#2 memory", the CDMA function and can work only with the TDMA method. In step 96, if the judgment "TDMA exists" is made, the process goes to step 98. In step 98, PBX 3 designates the time slot of TDMA and gives to the controller 54 of the radio signal processor 30 at the radio base station 4A and the mobile station 5A instructions that their access methods be simultaneously shifted from the FDMA/FDD method to the TDMA method. Then PBX 3 recognizes that the access method has been shifted to the TDMA method, terminating the channel shifting process.

In step 96, if the judgment "CDMA exists" is made, the process goes to step 99. In step 99, the time slot of CDMA, the frequency slot and the code in use are designated, and the mobile station 5A and the radio base station 4A change the information channel using the designated information.

Embodiment 10
Change of Access Method with Priority to Access Method

In this embodiment, priorities are assigned to a plurality of kinds of applicable access methods, the access method is changed from a lower priority method to a higher priority method.

Figure 86:
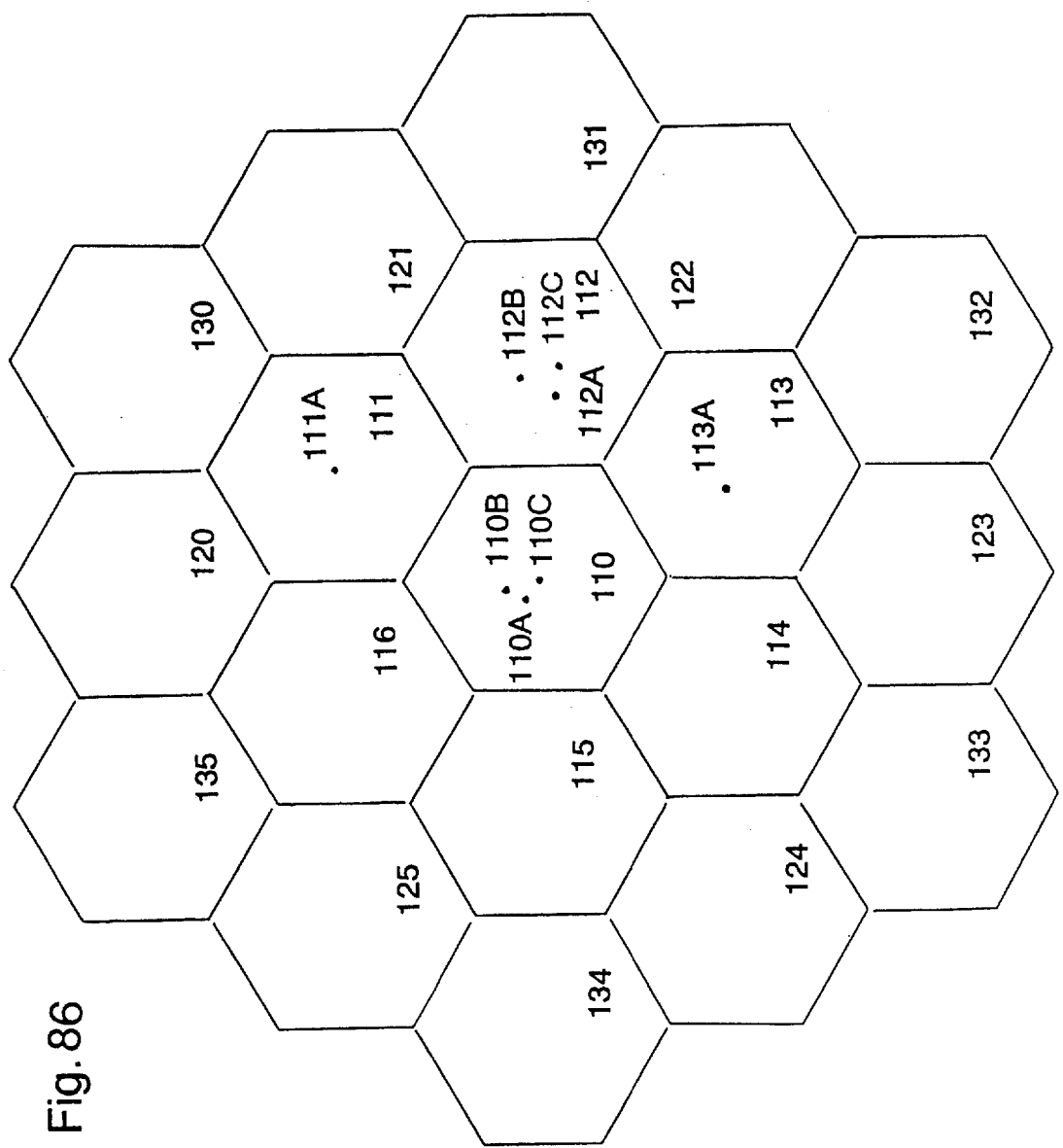
FIG. 86 is a diagram showing an example of setting cells in a mobile communication system according to an eleventh embodiment of the invention.

FIG. 86 shows an example of cells of this mobile communication system; cell Nos. 111–132 designate the individual cells. In a single cell, one or more radio base station exists. For example, in the cell 110, three radio base stations 110A, 110B, 110C exist. In the meantime, in the cell 113, a single radio base station 113A exists. FIG. 87 is Table 1 showing an example in which priorities are assigned to usable access methods corresponding to the cells of FIG. 86 based on the efficiency, which is the information stored, as the access method deciding condition, in a memory of a system recognizing unit 55 in PBX 3 of this system. As this information indicates, the mobile station can work also in the case in which a plurality of radio base stations exist in a single cell. FIG. 88 is Table 2 showing an example in which the priorities are assigned to mobile stations corresponding to the cells of FIG. 86 and also to access methods usable by the mobile stations, based on the efficiency, which is the information stored, as the access method deciding condition, in the memory of the system recognizing unit 55 in PBX 3. For example, in the cell 110, the mobile station (automobile communication apparatus) 2111 is registered, and priorities to access methods based on the efficiency are stored in the following order:

1. CDMA/TDD
2. TDMA/TDD
3. FDMA/TDD
4. FDMA/FDD

Figure 89:
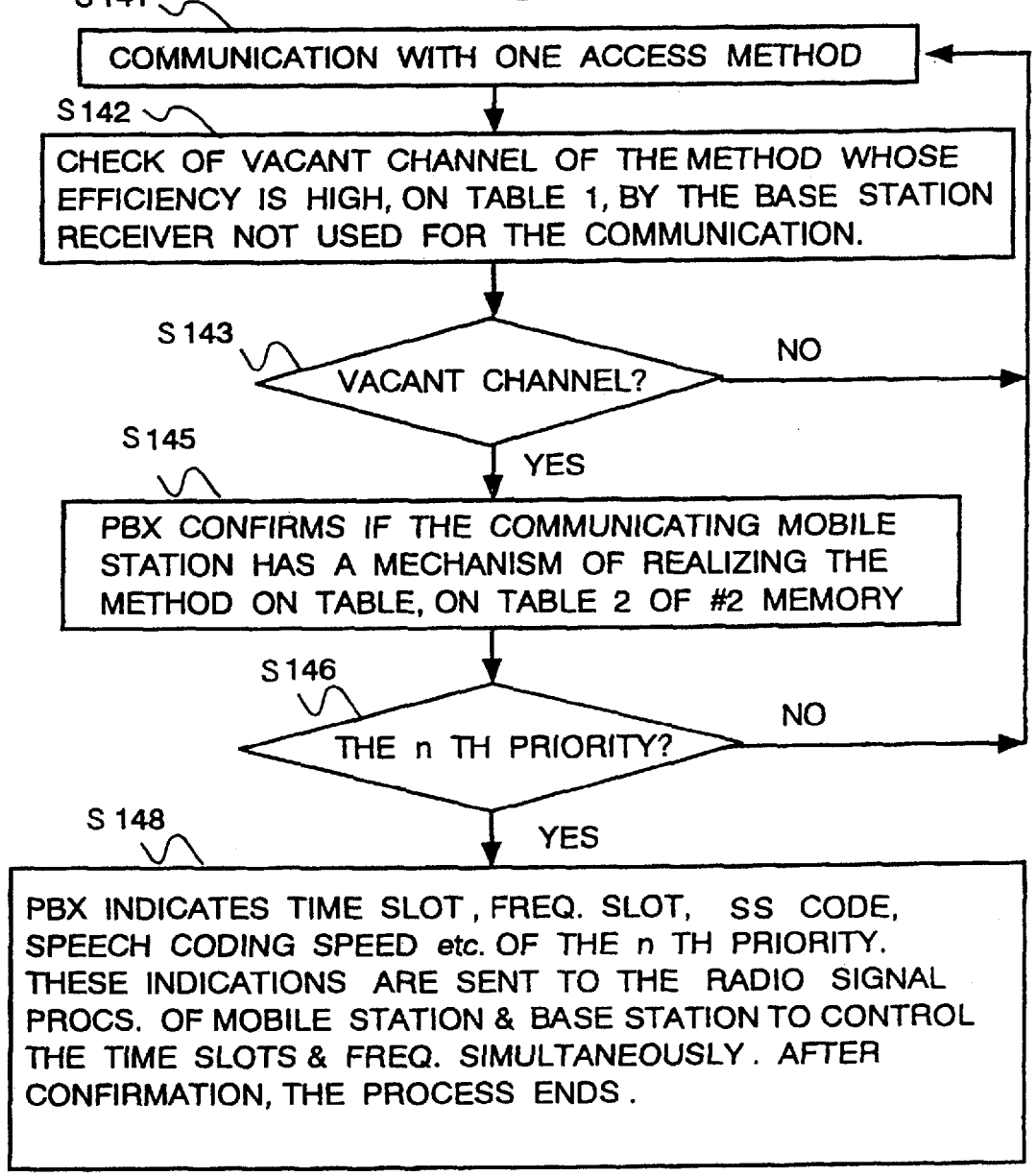
FIG. 89 is a flowchart showing the access method changing procedure in the eleventh embodiment.

FIG. 89 is a flowchart showing the procedure of changing the access method based on the priority.

Firstly, in step 141, it is assumed that the mobile station 2111 is existed in the cell 110 and is in communication with a method FDMA/FDD (analog). As indicated by the access method of the cell 110 in Table 1 of FIG. 87, the priority of the communication status FDMA/FDD of the mobile station 2111 is 4, so the receiver of any of the plural radio base stations 110A, 110B, 110C existed in the cell 110 searches vacant channels of the first to third priority methods in step 142. As the result of this searching, if it turns out that at least one vacant channel exists among the priorities 1, 2 and 3 in the cell 110 of Table 1, the judgment "vacant channel exists" is made in step 143 and then the process goes to step 145. In step 145, whether or not the mobile station 2111 is workable with that access method is recognized from the column of the mobile station 2111 in Table 2 of FIG. 88. In step 146, "n-th priority function exists" is recognized, that access method is employed in step 148.

In steps 142 and 143, if vacant channels of plural access methods are detected, a higher priority method is selected among these access methods in steps 145 and 146. For example, in steps 142 and 143, if it turns out that vacant channels of CDMA method and TDMA method exist, the mobile station 2111 selects the CDMA method, in steps 145 and 146, because its priority is higher than the TDMA method as is apparent from Table 2.

As mentioned above, according to this embodiment, it is possible to change the access method based on the priority so that the subscriber can select an access method as desired.

Embodiment 11
Method of Reception of Information for Use in Changing Access Method The method of receiving information concerning usable access methods of the other end station when changing the access method during communication will now be described. The information concerning the usable access methods of the station on the other end is received using control channels, which will now be explained.

Figure 90:
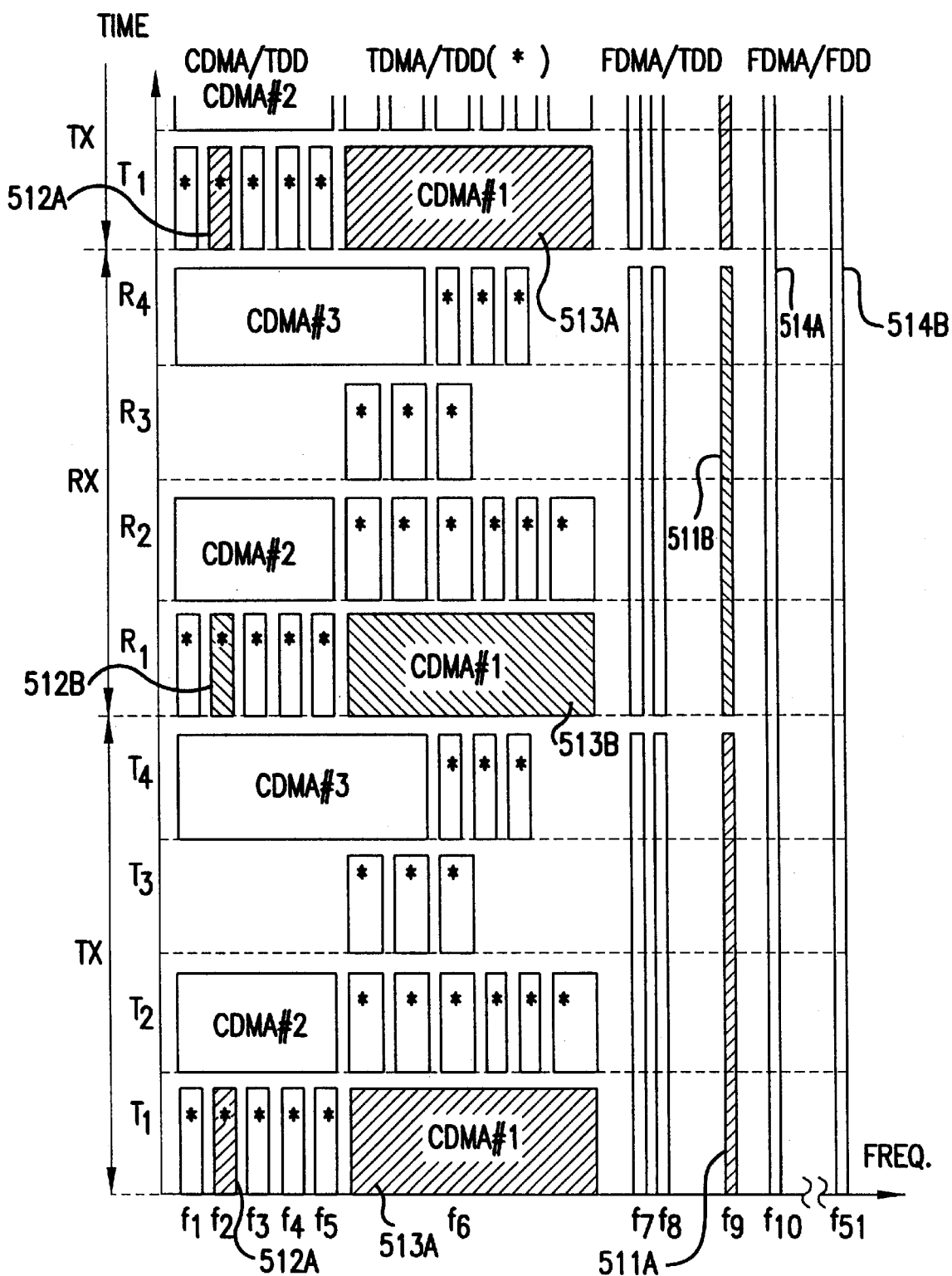
FIG. 90 is a diagram showing an example of control channels in a relationship between the time slot and the occupied frequency in a mobile communication system according to a twelfth embodiment of the invention.

FIG. 90 shows examples of the control channel in the relationship with the time slot and the occupied frequency. The slots 511A, 511B represent the control channel with the FDMA/TDD method; the slots 512A, 512B, the control channel with the TDMA method; and the slots 513A, 513B, the control channel with the CDMA method. And the slots 514A, 514B represent the control channel with the FDMA/FDD (FM) method. FIG. 91 is Table 3 of control channel information to be notified to the mobile station from the radio base station via the control channel. Table 3 of FIG. 91 shows the relationship between the access method, and the modulation method and the frequency for use in each cell. For example, in the cell 110, communication takes place with the access method of TDMA/TDD and the modulation method of $\pi/4$-QPSK using the frequency of f1. The control channel notifies such information. The information can be universally used when the working control channel is any of FDMA, TDMA and CDMA.

FIG. 92 is Table 4 showing information channel information to be notified to the mobile station from the radio base station using the control channel. Table 4 of FIG. 92 shows the relationship between the access method, the modulation method and the frequency for use as a information channel in each cell. Such information is notified using the control channel. The information to be notified from the conventional control channel are frequencies to be used merely as control channels and those to be used as information channels. Whereas this embodiment is characterized in that, in addition to the frequency to be used as the control channel and the information channel, the access method and modulation method associated with that frequency are notified. Thus, in this embodiment, the mobile station having received information in response to notification of access and modulation methods corresponding to each frequency can learn of the access and modulation methods in association of the frequency. For example, if it exists in the cell No. 110 and uses the frequency $f_5$ from FIG. 91 regarding the control channel, the mobile station works with the access method of CDMA/TDD and the modulation method of GMSK and can obtain information from the control channel by carrying out an access method such that the code in use is B3654-7. Further, if it exists in the cell 110 and uses the frequency $f_{18}$ as the information channel, the mobile station works with the access method of CDMA/TDD and the modulation method of GMSK and can learn that the using code of B4654-7 needs to take access by reffering to FIG. 92.

In changing the access method during talking, the mobile station and the radio base station must obtain, via the control channel of FDMA/TDMA/CDMA, information concerning the on-the-other-end station's usable access method other than the access method currently in use for talking. The digital TDMA/CDMA method is easy to create a slow associated control channel (SACCH) through which either the mobile station or the radio base station can obtain, during talking, the information concerning usable access methods of the station on the other end via SACCH. Even in the case of FDMA/FDD (FM), it is possible to obtain, during talking, the information concerning usable access methods of the station on the other end in out-of-voice-band tone FSK (e.g., 150 Hz/200 Hz of tone FSK).

This embodiment relates to a mobile communication system workable with a plurality of access methods and is equipped with control channels dedicated one for each access method. However, in this embodiment, if the mobile station makes a call to the radio base station using an access method, linking is accomplished in that access method. Otherwise, if none of the channels usable with the called access method is vacant, linking is accomplished using an empty channel of another multi access method.

Embodiment 12
Process for Registering Position of Mobile Station

The process of registering the position of the mobile station according to this embodiment will now be described.

Figure 94:
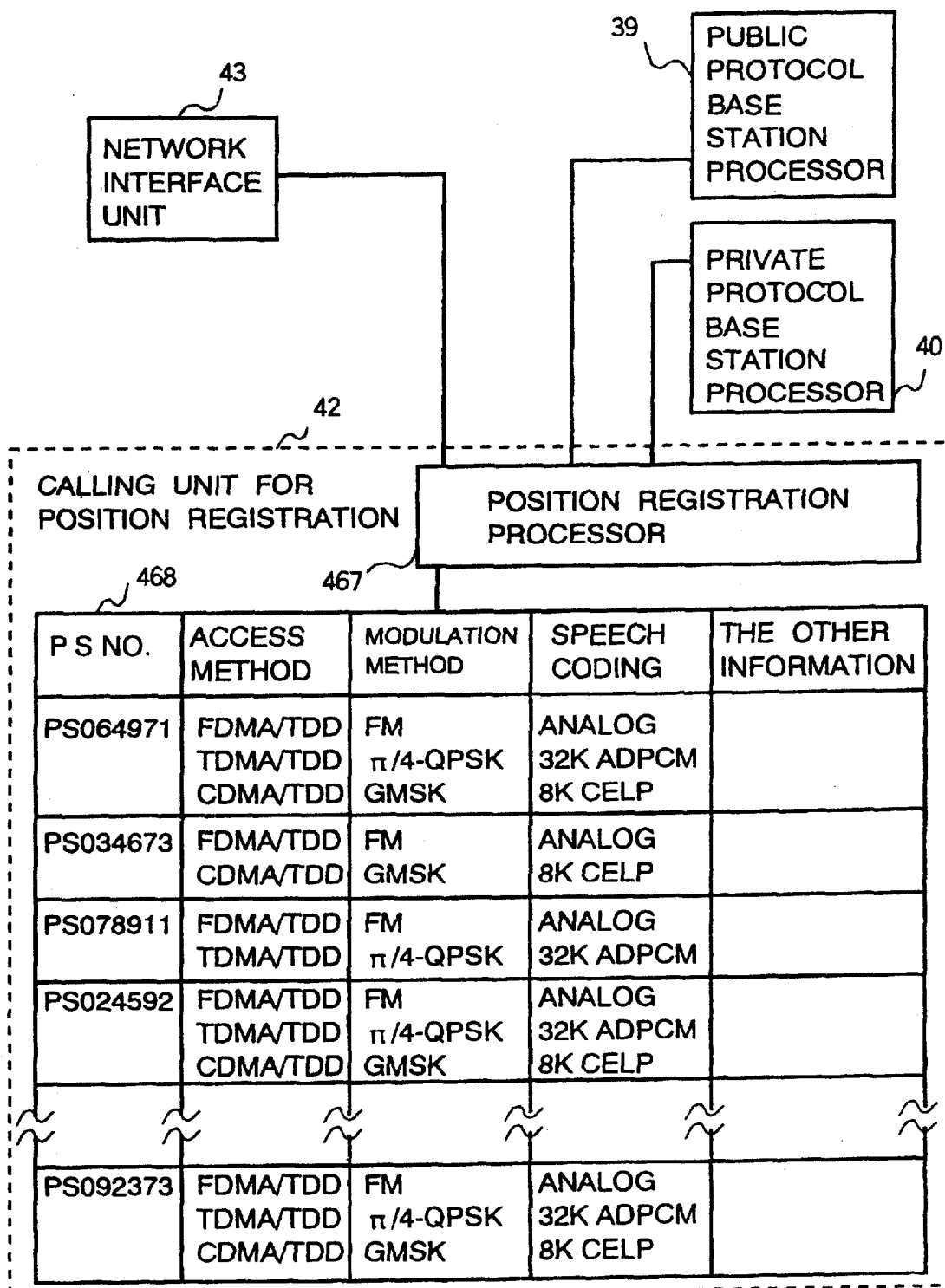
FIG. 94 is a block diagram showing a position registration calling unit of FIG. 93.

FIG. 93 is a block diagram showing the mobile communication system when a request for position registration is made. A mobile station information center 466 is connected to PSTN 1. The mobile station information center 466 previously stores a personal system No. (PS No.) for identifying the mobile station 5B and usable access and modulation methods of the mobile station 5B. In PBX 3, a position registration calling unit 42 is located as shown in FIG. 5. The position registration calling unit 42 is equipped with a position registration processor 467, and a memory 468 for storing information of the mobile station. The memory 468 of FIG. 94 is a storage for storing access method deciding conditions and stores information of the mobile station which requests position registration. For example, if the mobile station 5B of FIG. 93 makes a request for position registration, PBX 3 requests the mobile station information center 466 for the mobile station information, based on the mobile station's PS No. PS064971. This information is stored in PBX 3 in the format of FIG. 94. With the information previously stored in PBX 3, if the mobile station has made a calling-out, or if the mobile station has received a paging from another mobile station within PSTN or the private system, it is possible to save time to inquire to the mobile station information center 466 connected again to the PSTN, thus avoiding temporary overlay of inquiries. If either the mobile station or the radio base station can selectively use a plurality of kinds of access methods, it is necessary to learn what access methods are usable with the station on the other end. In this example, by registering the access and modulation methods of the mobile station previously in the mobile station information center 466 and downloading the information concerning the mobile station's access and modulation methods from the mobile station information center 466 during the process of registering the mobile station in each PBX 3, it is possible to anticipate the information concerning possible mobile stations that are connectable to the PBX 3.

Accordingly, in this embodiment, since usable access methods are previously stored in a memory 468, it is possible to effectively decide an access method between the mobile station and the radio base station, based on the registered information.

Embodiment 13
Deciding Communication channel

Figure 95:
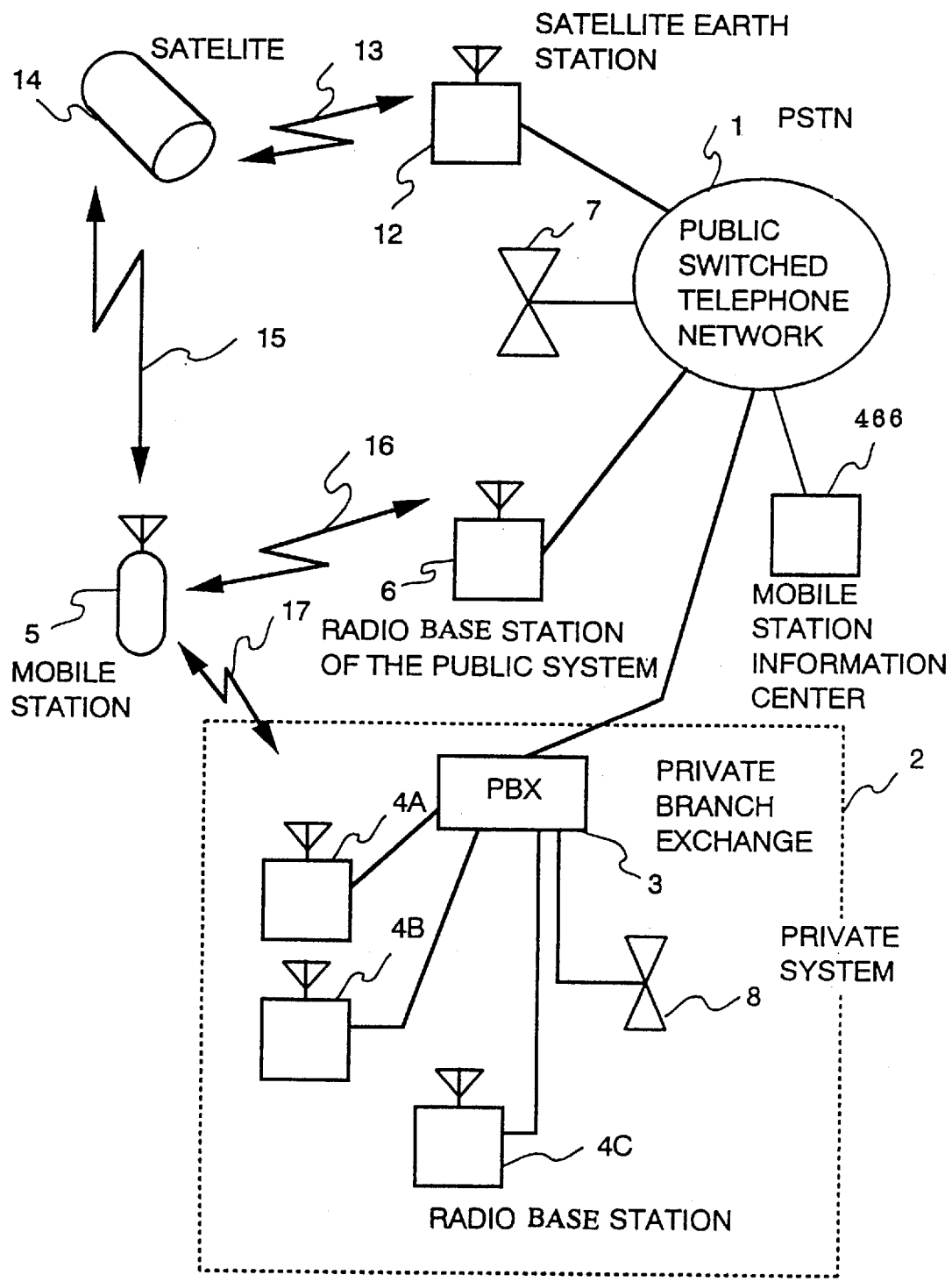
FIG. 95 is a block diagram of a mobile communication system according to a fourteenth embodiment of the invention, showing the system when a position registration request is made from the mobile station to the radio base station.
Figure 96:
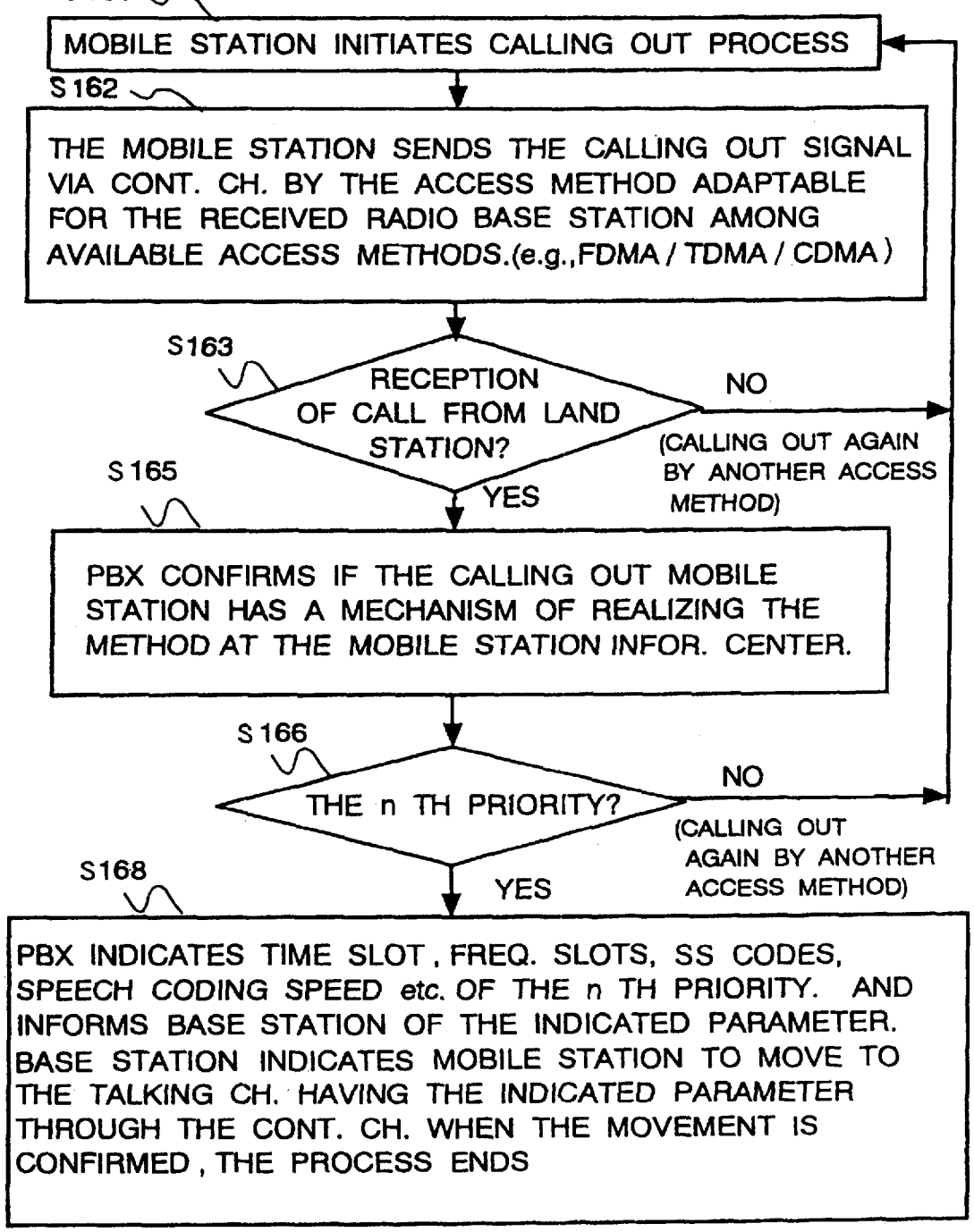
FIG. 96 is a flowchart showing the link level procedure in the fourteenth embodiment.

The procedure for establishing a link between the mobile station and the radio base station according to this embodiment will now be explained. FIG. 95 shows a mobile communication system of the thirteenth embodiment which, like the previous embodiment, is equipped with a mobile station information center 466. FIG. 96 is a flowchart of link level procedure, showing a paging process from the mobile station in the mobile communication system in which the control channels of various access methods exist as shown in FIG. 90.

If in step 161 the mobile station starts calling out, in step 162 the same mobile station selects one acceptable control channel among control channel information (one example is shown in FIG. 91), of which the radio base station installed in the cell to which the mobile station belongs is notified, and calls a PS No. using the selected control channel to transmit a call-out signal to the radio base station. In step 163, upon receipt of a request for calling out, the radio base station confirms having received the calling-out request. Then PBX 3 sends an inquiry to the mobile station information center 466, based on the mobile station's PS No., as to what parameters in information channel the mobile station having requested for calling out is communicable with. The mobile station information center 466 stores the mobile station's usable access and modulation methods in association with the mobile station's PS No. PBX 3 confirms, based on the information stored in the mobile station information center 466, that the mobile station in question can be shifted from the control channel to the information channel. For example, if the mobile station exists in the cell 110 and if it has been confirmed, from the information stored in the mobile station information center 466, that the mobile station is workable only with the access method of FDMA/ TDD and the modulation method of FSK, the mobile station and the radio base station can get in communication within the cell 110, with the confirmed access and modulation methods using the frequency $f_{31}$. Thus, if a match with respect to the access and modulation methods has been made, it Is possible to get communication using the agreed access and modulation methods.

Meanwhile, PBX sends a message to the radio base station that the mobile station can shift from the control channel to the information channel to get communication, also informing of its parameter to be reported, if any. In step 168, the radio base station having received the message from PBX transmits, to the mobile station via the control channel, the information channel information selected among the information channel information of FIG. 92. Upon receipt of this information, the mobile station immediately shifts to the designated information channel.

Thus, in this embodiment, it is possible to establish a link by deciding, when calling out, an access method for communication between the mobile station and the radio base station.

Embodiment 14

Change of Access Method based on Channel Efficiency

The accounting process when communication channel efficiencies are different between the individual communication channels is explained as follows.

Figure 97:
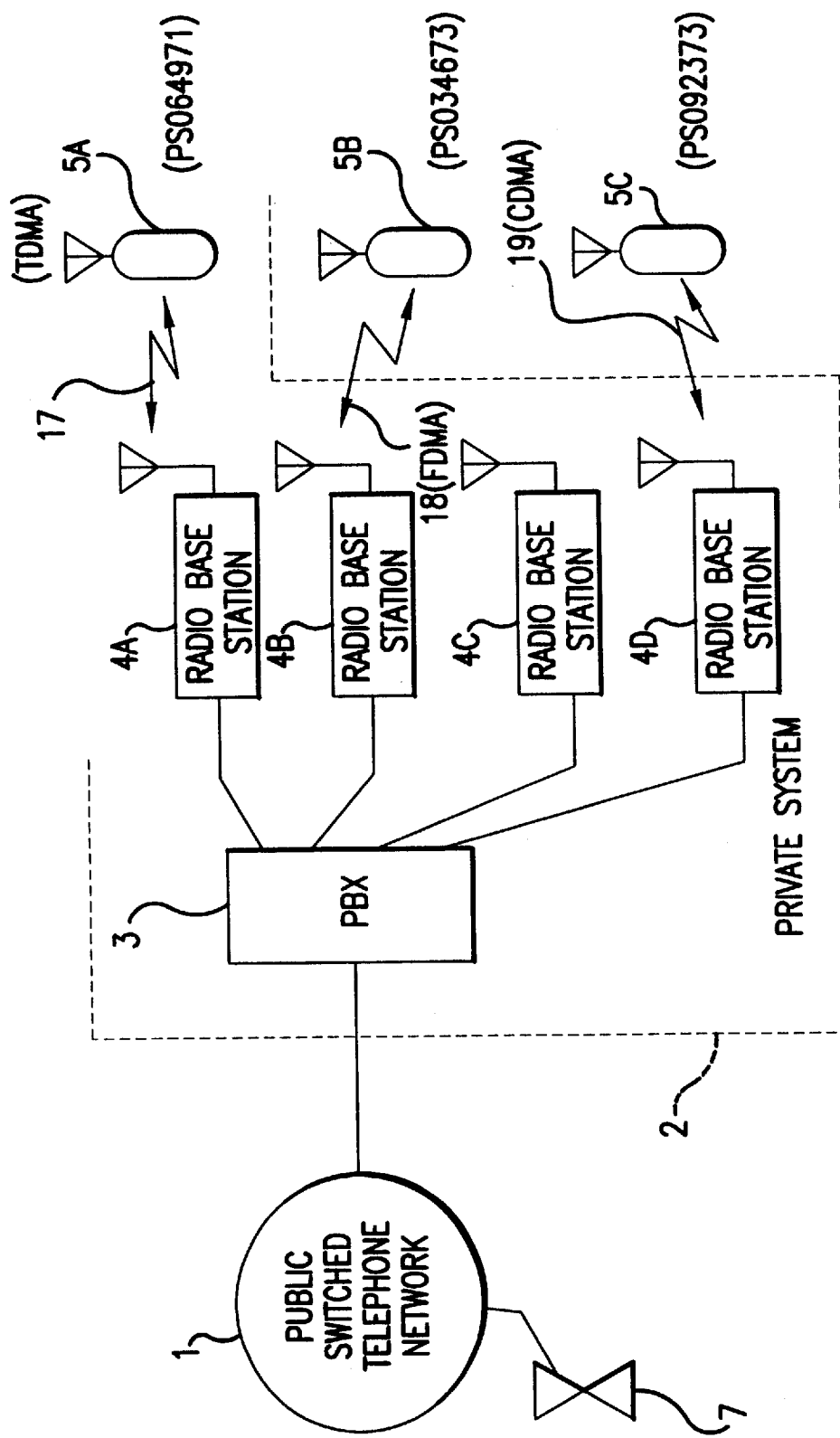
FIG. 97 is a block diagram of a mobile communication system according to a fifteenth embodiment of the invention, showing an example of an accounting system considering channel efficiency.
Figure 98:
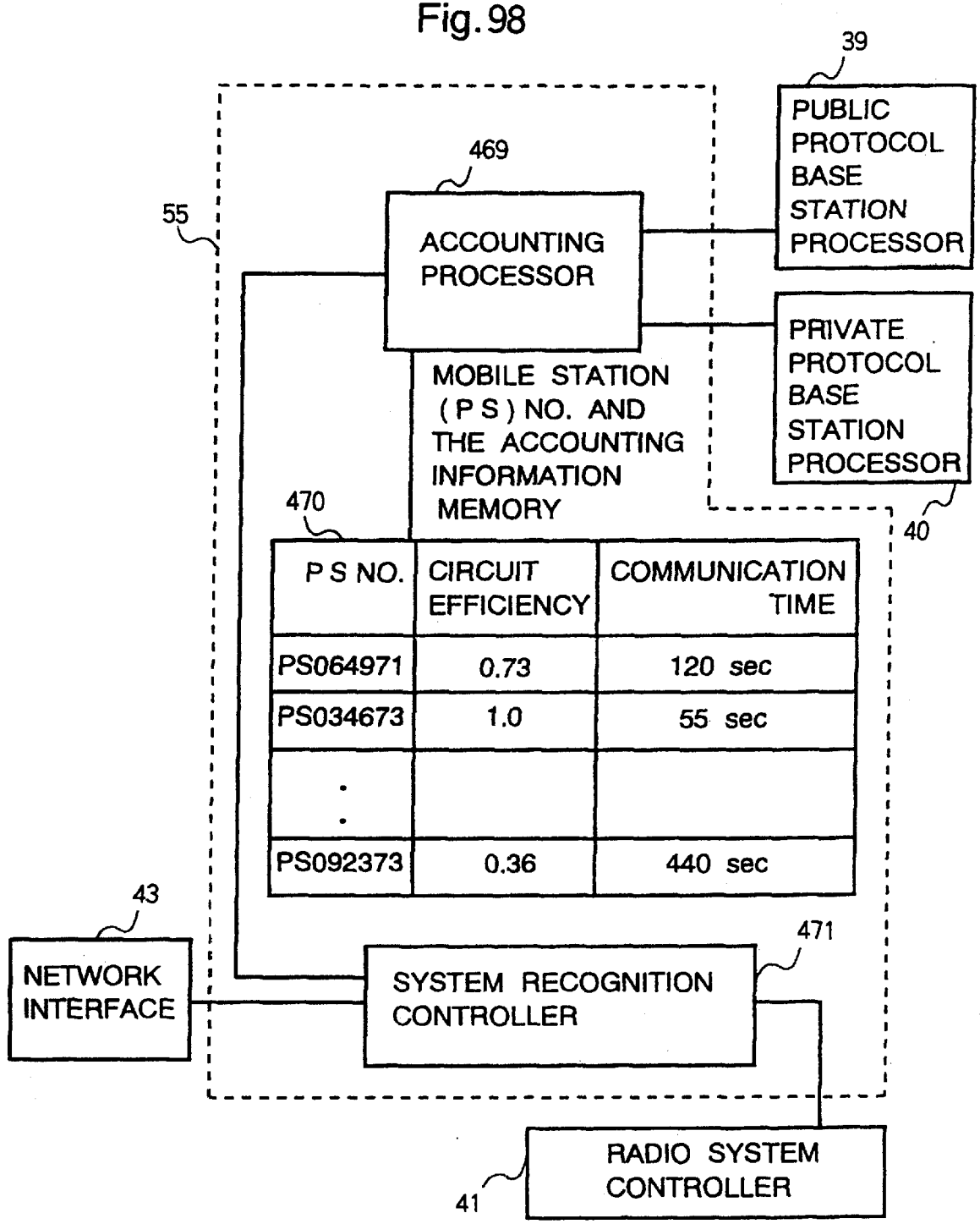
FIG. 98 is a detailed block diagram showing a system discriminating mechanism of the mobile communication system of the fifteenth embodiment.

FIG. 97 shows an example of accounting system with consideration of communication channel efficiency. FIG. 98 is a block diagram showing the details of the system recognition unit 55 in PBX 3. The system recognition unit 55 of FIG. 98 includes an accounting processor 469, an information memory 470 describing mobile station (PS) Nos. and accounting information, and a system recognition controller 471. In the information memory 470, PS No., communication channel efficiency and talking time are stored.

Figure 99:
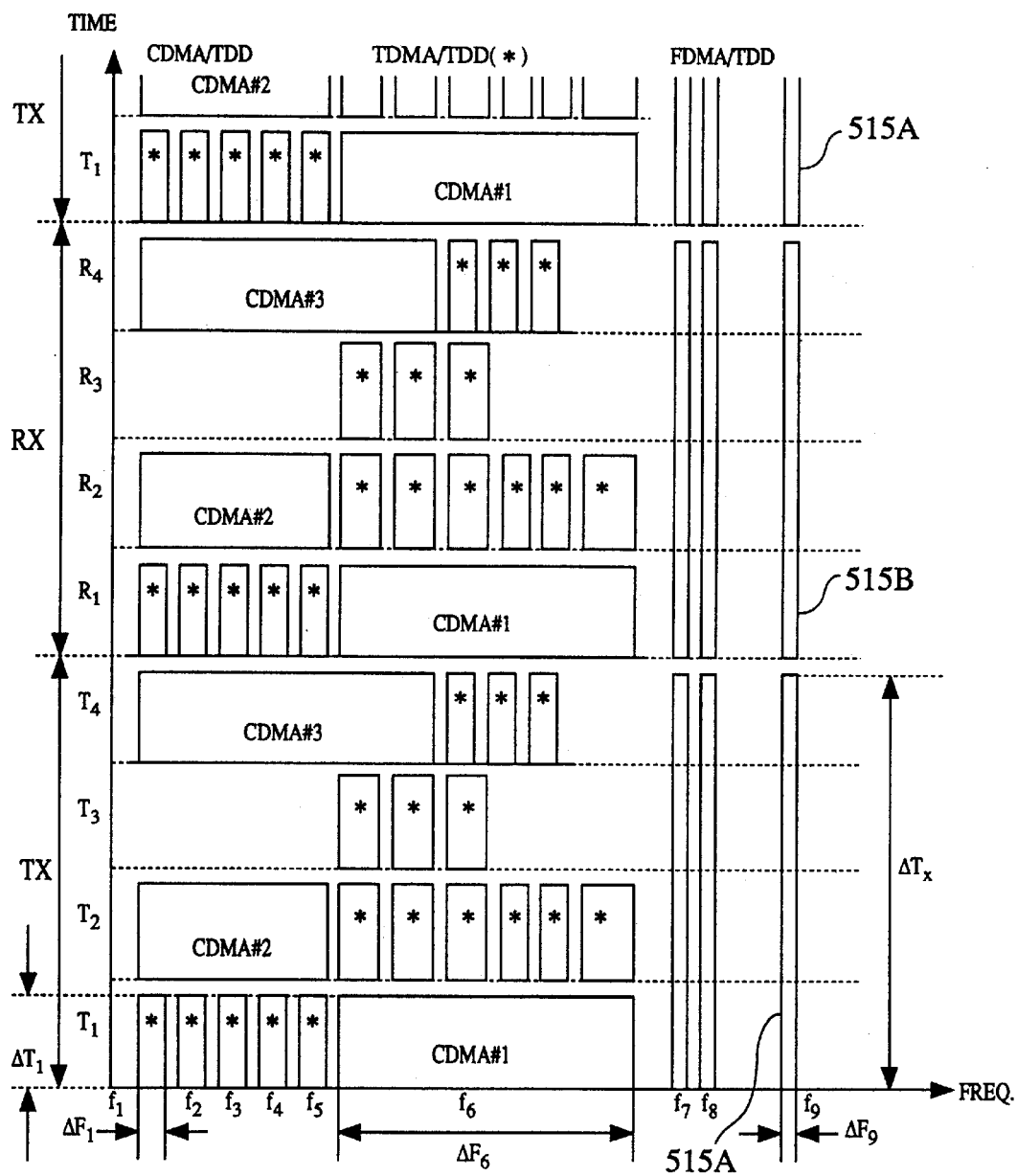
FIG. 99 is a diagram showing an example in which a channel efficiency is set based on the time slot and the occupied frequency in the fifteenth embodiment.

FIG. 99 shows an example in which the channel efficiency is set from the time slot and the occupied frequency. The channel efficiency is calculated in the following manner.

Equation 8.1 expresses a communication channel efficiency value of the line using slots 515A, 515B of FDMA, where $\Delta Fi$ represents a frequency bandwidth of a signal using the frequency fi, and $\Delta TJ$ represents a time width. The value of a numerator of Equation 8.1 is utilized as a reference value of the communication channel efficiency. Namely, assuming that the channel efficiency value of Equation 8.1 is a reference value of 1.0, Equation 8.2 gives a relative value in the case of FDMA method with respect to the channel efficiency value in the case of TDMA method. Equation 8.3 is in the case of CDMA method, in which the channel efficiency value is given as the result of dividing the value of Equation 8.2 by the number N of possible orthogonal codes.

FDMA-f9 (channel efficiency value)=$\Delta F9 \times \Delta TX/$
  ($\Delta F9 \times \Delta TX$)=1.0            (Equation 8.1)

TDMA-f1 (channel efficiency value)=$\Delta F1 \times \Delta T1/$
  ($\Delta F9 \times \Delta TX$)            (Equation 8.2)

CDMA-f6 (channel efficiency value)=$\Delta F6 \times \Delta T1/$
  $N/(\Delta F9 \times \Delta TX)$            (Equation 8.3)

Since the channel efficiency value given by these equations becomes smaller commensurate with the channel efficiency increases, it is an example of definition suitable when the discount rate of the charging usage becomes larger commensurate with the increase of the efficiency. Assuming that this channel efficiency value is used as a channel efficiency for accounting process as shown in FIG. 98, it is possible to set a value, which is the result of multiplying the channel efficiency by the talking time, to be proportional to the charging usage.

The relationship between the communication method, communication channel efficiency, talking time and charging usage (shown in the information memory 470 of FIG. 98) of each of three mobile stations (PS Nos. PS064971, PS034673, PS092373) will now be described using the case shown in FIG. 97. The mobile station 5A (PS064971) of FIG. 97 is wirelessly connected with the radio base station 4A via the communication channel 17 according to the TDMA method. Assuming that the charging usage up to a fixed telephone apparatus 7 with the channel efficiency of 1.0 is yen 1 yen per second, the total charge for the talking time of 120 seconds stored in the information memory 470 is as follows:

Charge of PS064971 for 120 sec.=120×0.73=
  87.6 yen            (Equation 8.4)

Likewise the respective charges for the mobile stations 5B (PS034673) and 5C (PS092373) are as follows:

Charge of PS034673 for 55 sec.=55×1.0=55.0 yen     (Equation 8.5)

Charge of PS092373 for 440 sec.=440×0.36=
  158.4 yen            (Equation 8.6)

In these examples, the charging usage are calculated with consideration of the channel efficiency.

This embodiment is characterized by an exchange having a function of calculating the channel efficiency to be evaluated from various access methods, modulation methods, voice coding rate and spread-spectrum coding rate and to be discriminated from the occupied spectral width on the radio frequency axis and the time slot width on the time axis, with respect to the channel in talking.

The mobile communication system of this embodiment is characterized in that priorities are assigned to the usable access methods based on the channel efficiency.

Namely, while the mobile station and the radio base station are in talking in one multi access method among various multi access methods, it is possible to change the multi access method to a higher-efficiency method, based on the calculated channel efficiency, if a usable vacant channel is detected among the time slot assigned to the multi access method that the mobile station and the radio base station can use within the cell in talking.

Embodiment 15

Calculation of Channel Reliability

Figure 100:
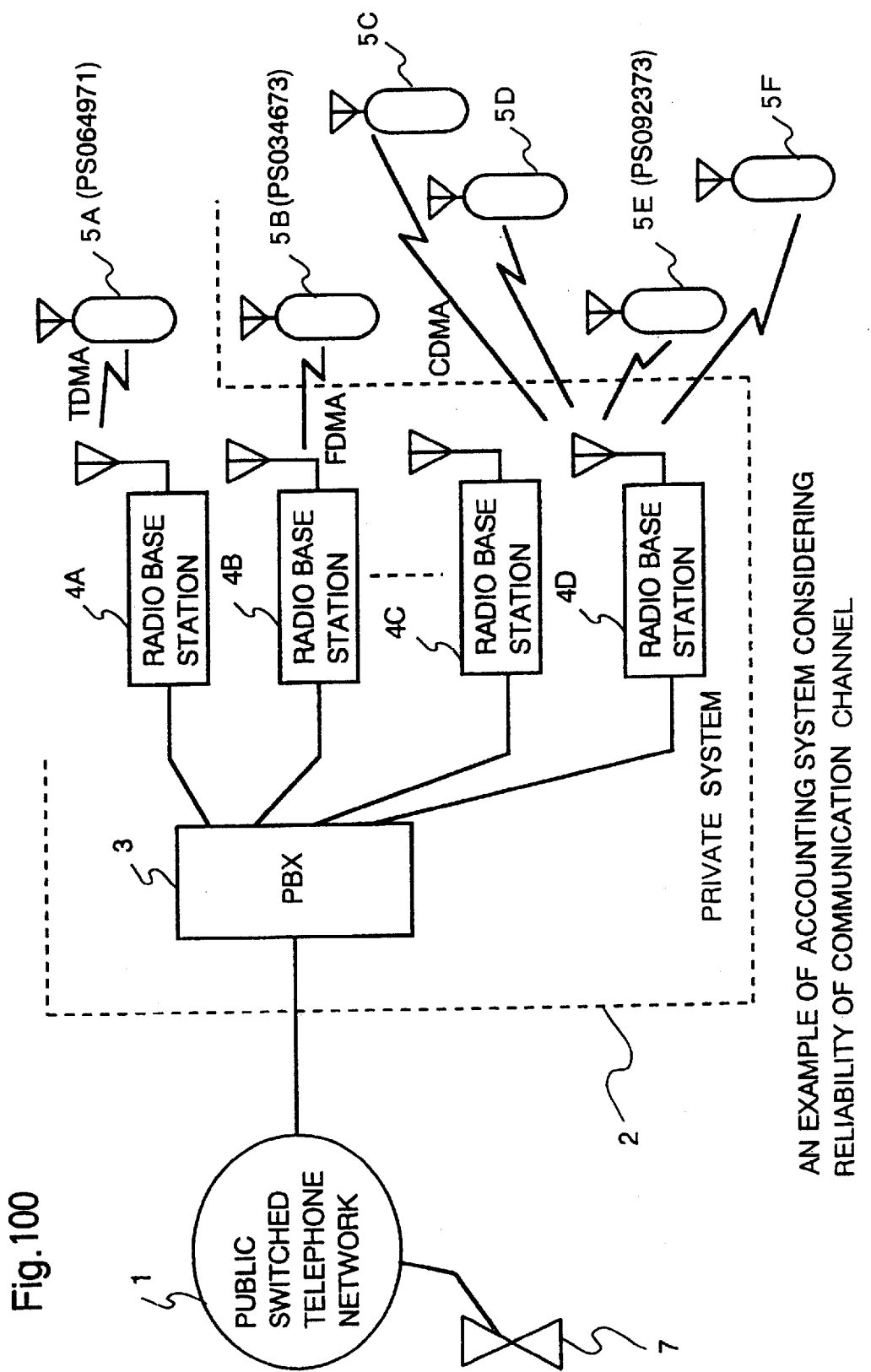
FIG. 100 is a block diagram of a mobile communication system according to a sixteenth embodiment of the invention, showing an example of an accounting system considering channel reliability.
Figure 101:
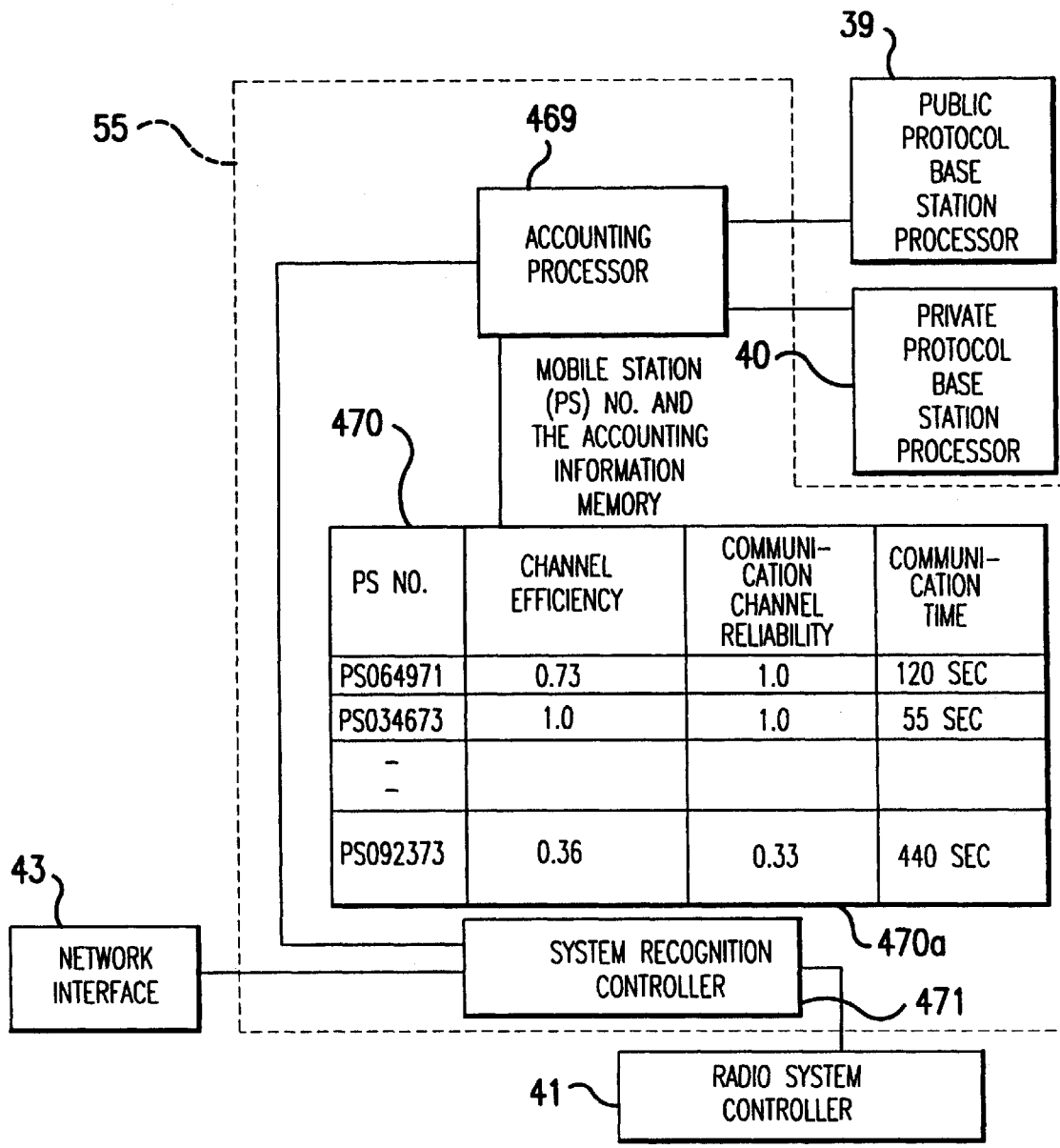
FIG. 101 is a block diagram showing a system discriminating mechanism of the mobile communication system of the sixteenth embodiment.

FIG. 100 shows an example of accounting system with consideration of channel reliability. FIG. 101 is a block diagram showing a system recognition unit 55 of PBX (exchange) 3.

The exchange 3 for the mobile communication system of this embodiment is equipped with a radio channel priority selecting mechanism in order to select the radio channel in association with the channel reliability and the charging usage according to the subscriber's request, for the mobile station and the radio base station corresponding to at least one multi access method and at least one modulation method. Specifically, the exchange 3 includes a private protocol radio base station processor 39 and a public protocol radio base station processor 40 for processing signals in the private and public systems. The exchange 3 further includes the system recognition unit 55 for selecting any one of the systems, a radio system controller 41 for performing a handover sequence process and a receiving level inquiry, a position registration calling unit (not shown), and a network interface processor 43. The construction of PBX 3 is shown in FIG. 5. In FIG. 101, additional information concerning the channel reliability is stored in the information memory 470.

Assuming that the system is in communication using the FDMA method, if the exchange transmits a channel reliability measuring request to the mobile station via the radio base station, the mobile station in voiceless state stops transmitting through part of a voice information section or data section in the transmitting time slot in 1 frame, or stops transmitting throughout 1 frame. The radio base station measures a background noise signal intensity in the frame, i.e. the time slot free of transmitting output from the mobile station, or in part of transmitting stop section of the transmitting section, and reports to the exchange of the measured value and an intensity measured value of the signal being transmitted from the mobile station. The exchange calculates a signal-to-interference-wave-and-noise ratio from these two measured values and also calculates a channel reliability from this ratio.

Assuming that the system is in communication using the TDMA method or the CDMA method, if the exchange transmits a channel reliability measuring request to the mobile station via the radio base station, the mobile station in voiceless state stops transmitting through part of the voice information section or data section in the transmitting time slot in 1 frame, or stops transmitting throughout 1 frame. The radio base station measures a background noise signal intensity in the frame, i.e. the time slot free of transmitting output from the mobile station, or in part of transmitting stop section of the transmitting time slot, and reports to the exchange of the measured value and an intensity measured value of the signal being transmitted from the mobile station. The exchange calculates a signal-to-interference-wave-and-noise ratio from these two measured values and also calculates a transmission error rate of the channel with consideration of the modulation method in use. The larger the interference wave, the higher the transmission error rate becomes increased. Consequently, the exchange of this embodiment is characterized by the function of calculating the channel reliability from the transmission error rate so that the reliability of the channel is set to a high level.

Figure 102:
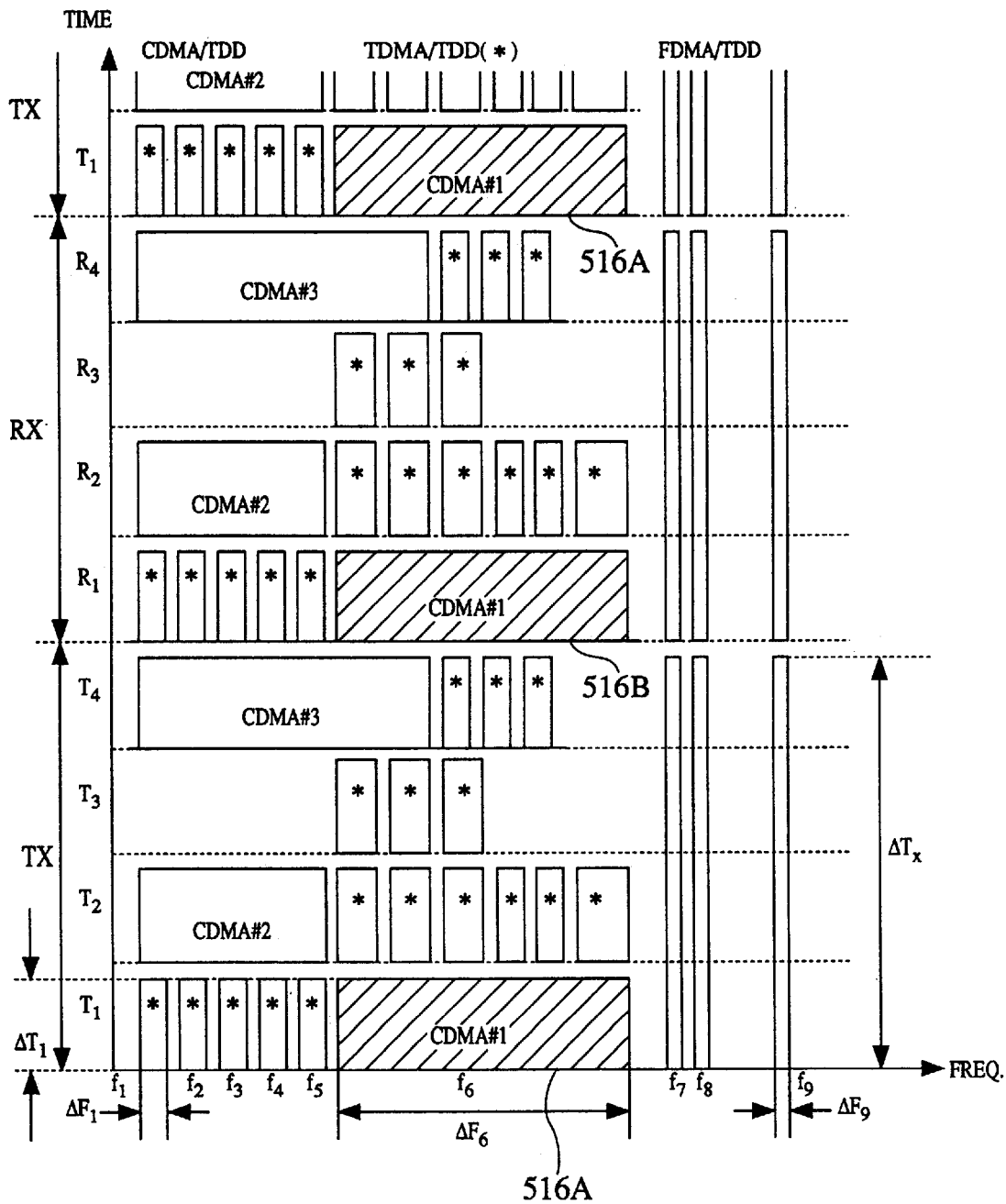
FIG. 102 is a diagram showing an example of setting of channel efficiency and channel reliability in the sixteenth embodiment.
Figure 103:
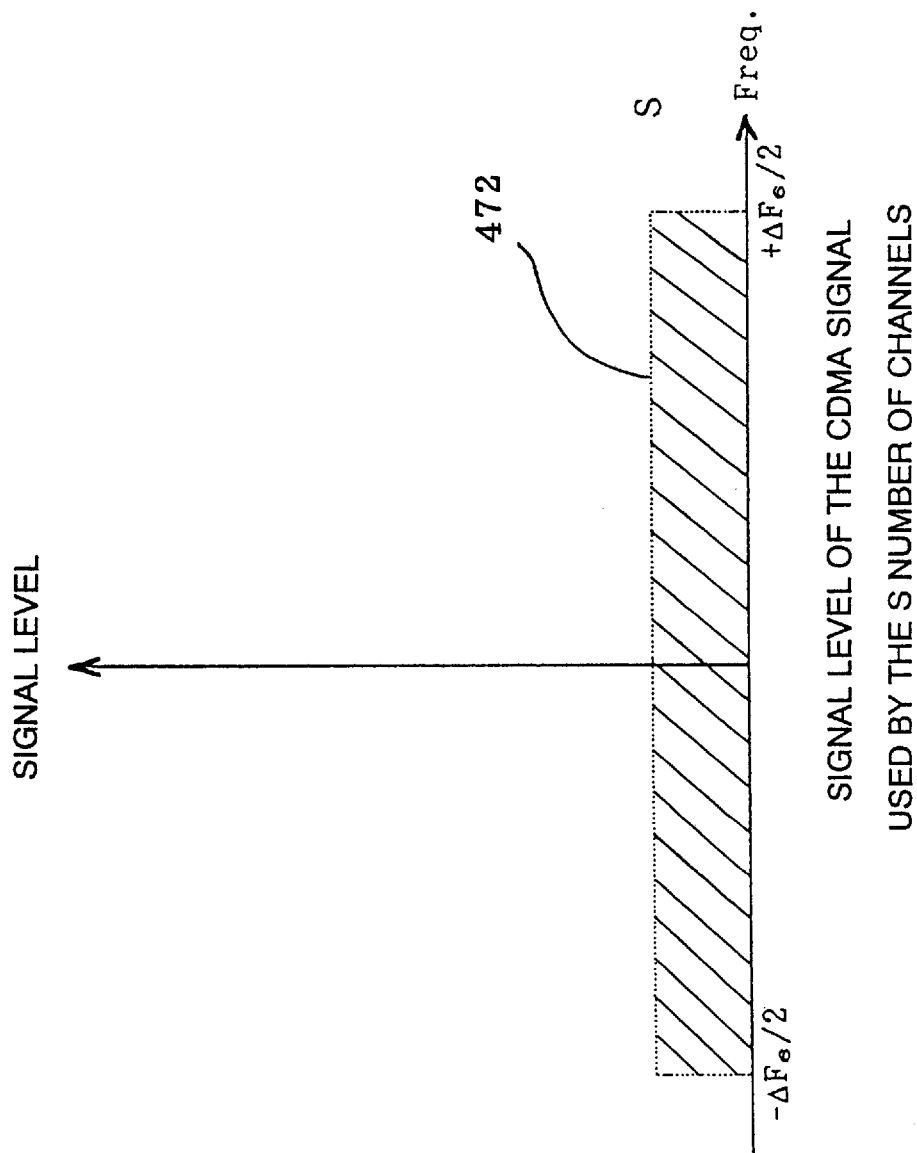
FIG. 103 is a diagram of a spectrum of CDMA wave, as used by s number of channels, in the sixteenth embodiment.
Figure 104:
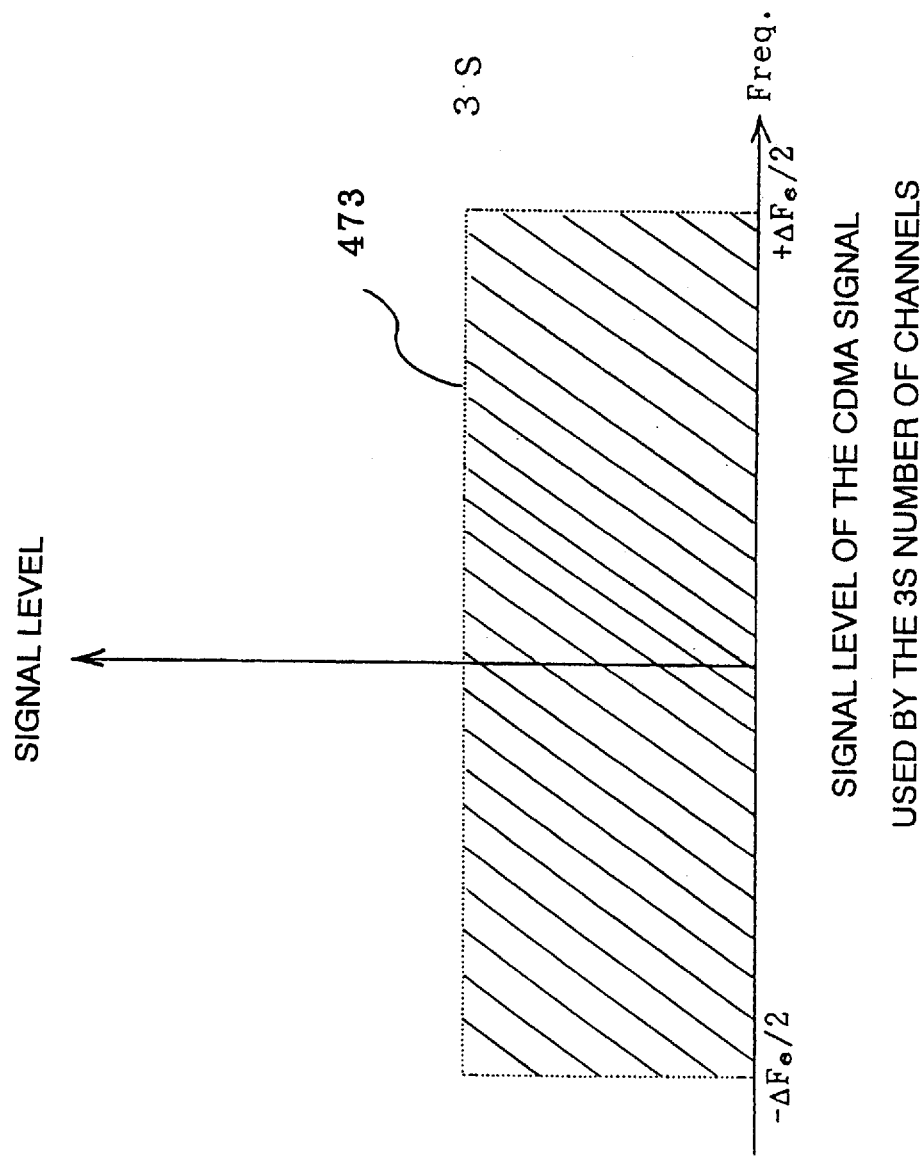
FIG. 104 is a diagram of a spectrum of CDMA wave, as used by 3s number of channels, in the sixteenth embodiment.

FIG. 102 shows an example of setting the channel efficiency and channel reliability. FIG. 103 is a graph showing a signal level of the CDMA signal being used by n channels. FIG. 104 is a graph showing a signal level of the CDMA signal being used by 3n channels.

A spectrum 472 of FIG. 3 is a power spectrum when a standard number S of users are using the slots 516A, 516B of FIG. 102; if the number of users is S, it is possible to provide a channel adequately low in error rate, namely, a high-reliability channel. The spectrum 473 of FIG. 104 shows the state in which users three times in number of those in standard use is using the slots 516A, 516B of FIG. 102. Since the number N of orthogonal codes is large enough, communication is possible but with the background noise three times larger than the case of FIG. 103, thus increasing the code error rate of the decoded signal. Nonetheless the system of this embodiment is usable enough occasionally. The channel reliability of the CDMA channel of FIG. 102 is calculated by Equation 9.1:

$$CDMA \text{ channel reliability}=S/n \quad \text{(Equation 9.1)}$$

where S is the standard number of users of CDMA channel, and n is the current number of users of the CDMA channel.

If the result of Equation 9.1 is larger than 1, it means a high-reliability channel; if it is smaller than 1, it means a low-reliability channel. However, in the case of n<S, by changing the relationship between n and S into n=S, $$CDMA \text{ channel reliability}=S/n=1.0$$

It is possible that the maximum value of the reliability is 1.0.

FIG. 101 shows one example of memory format for accounting, with consideration of this channel reliability. The channel reliability of 0.33 of the channel used by PS No. PS092373 at the bottom line of a channel reliability column 470a in the information memory 470 indicates the case in which the number of current users of FIG. 104 is n=3S. As the capacity is three time the standard number of users, the channel reliability is calculated as follows:

$$\text{Channel reliability}=S/n=S/3S=0.33 \quad \text{(Equation 9.2)}$$

Partly since this channel reliability value is large (maximum value=1.0) when the reliability is high, and partly since the value is small when the reliability is low, the charging usage is set based on the reliability and is expressed by Equation 9.3:

$$\text{Charging usage=talking time} \times \text{channel efficiency} \times \text{channel reliability} \times \text{constant} \quad \text{(Equation 9.3)}$$

In the case of CDMA method, it is possible to use the channel by selecting the channel reliability.

Also in the case of FDMA method and TDMA method, it is possible to define the similar channel reliability for the users allowable for use of the slot receiving great influence from other slots, and it is possible to introduce a discount of the charging usage for the low channel reliability value.

As shown in FIG. 100, many CDMA radio channels are connected to the radio base station 4D, with consideration of the above-mentioned channel reliability. The mobile station 5E (PS0292373) is using the channel with channel reliability=0.33 of Equation 9.2. Further, assuming that the mobile station 5C is workable with two methods, i.e. the CDMA method and FDMA method, the mobile station 5C can be connected also to the radio base station 4B using the FDMA method. However, if the mobile station 5C can select the channel low in charging usage rather than high in channel reliability, it is rather connected to the radio base station 4D to reduce the charge according to Equation 9.3. Consequently, in the illustrated example, the mobile station 5C is connected to the radio base station 4D with intentionally not connecting to the radio base station 4B.

As mentioned above, according to this embodiment, while the mobile station and the radio base station are in talking in one multi access method among various multi access methods, it is possible to change the multi access method to a higher-efficiency method, based on the calculated channel efficiency, if a usable vacant channel is detected among the time slot assigned to the multi access method that the mobile station and the radio base station can use within the cell in talking. Further, the exchange is characterized by the function of calculating the charging usage, for every talking, from the obtained channel reliability, the obtained channel efficiency and the talking time.

Embodiment 16

Selecting Access Method based on Priority Assignment (Channel Discount)

This embodiment deals with the linking for the mobile station hoping the channel whose discount is as large as possible. In this system, by defining the channel efficiency and the channel reliability and changing them in spite of the same distance, the same using time and the same talking time, it is possible to set a discount of the charge. Assuming that the user accepts the low channel reliability, PBX 3 can select the channel, by the information memory 470, in such a manner that the charging usage is reduced to a minimum according to Equation 9.3, by previously registering in a priority assignment column 470b that priority is assigned to the channel discount like the mobile station having PS No. PS092373 of FIG. 105. The mobile station having PS No. PS064971 is registered as "ordinary" 470c in the priority assignment column 470b, not being specially designated to have a priority assignment.

Figure 105:
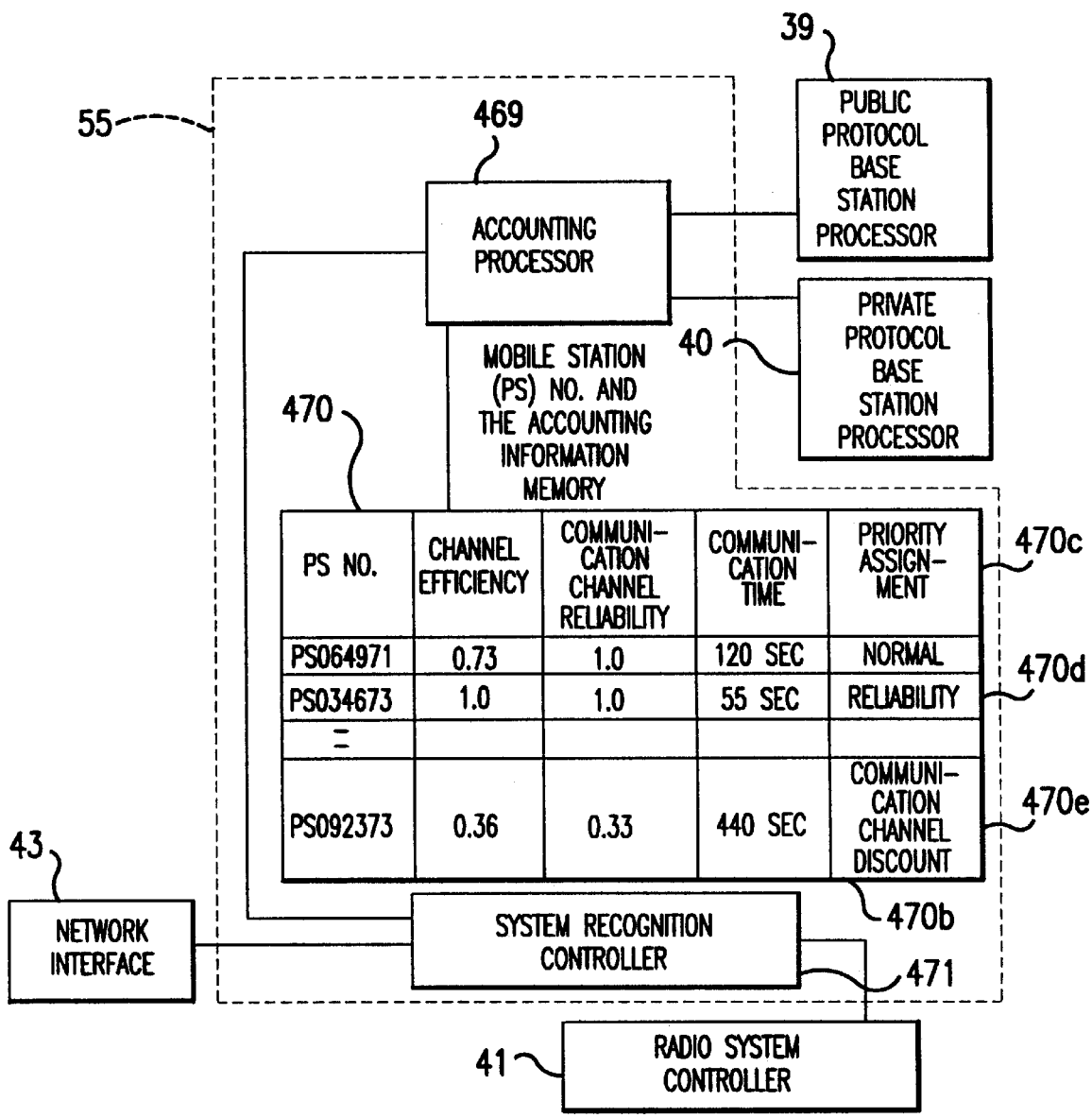
FIG. 105 is a block diagram showing a system discriminating mechanism in a mobile communication system according to a seventeenth embodiment of the invention.

FIG. 106 is Table 5 showing methods selected by three mobile stations of FIG. 105. Table 5 of the FIG. 106 shows a registration list of priorities assigned to the access methods as the result of consideration of priority assignment to each mobile station. The mobile station PS064971 at the first line 470c in FIG. 105 is registered as "ordinary" in priority assignment and therefore selects the TDMA/TDD method of the priority 1 with respect to PS046971 from FIG. 106. The mobile station PS034673 at the second line 470d in FIG. 105 is registered with the top priority assigned to "reliability", and therefore decides the access method based on the value of "channel reliability". In FIG. 106, the FDMA/FDD method is selected. The mobile station PS092373 at the third line 470e in FIG. 105 is registered with the top priority assigned to "channel discount", and therefore selects the access method whose charging usage is reduced to a minimum. In FIG. 106, the CDMA/TDD method is selected.

Figure 107:
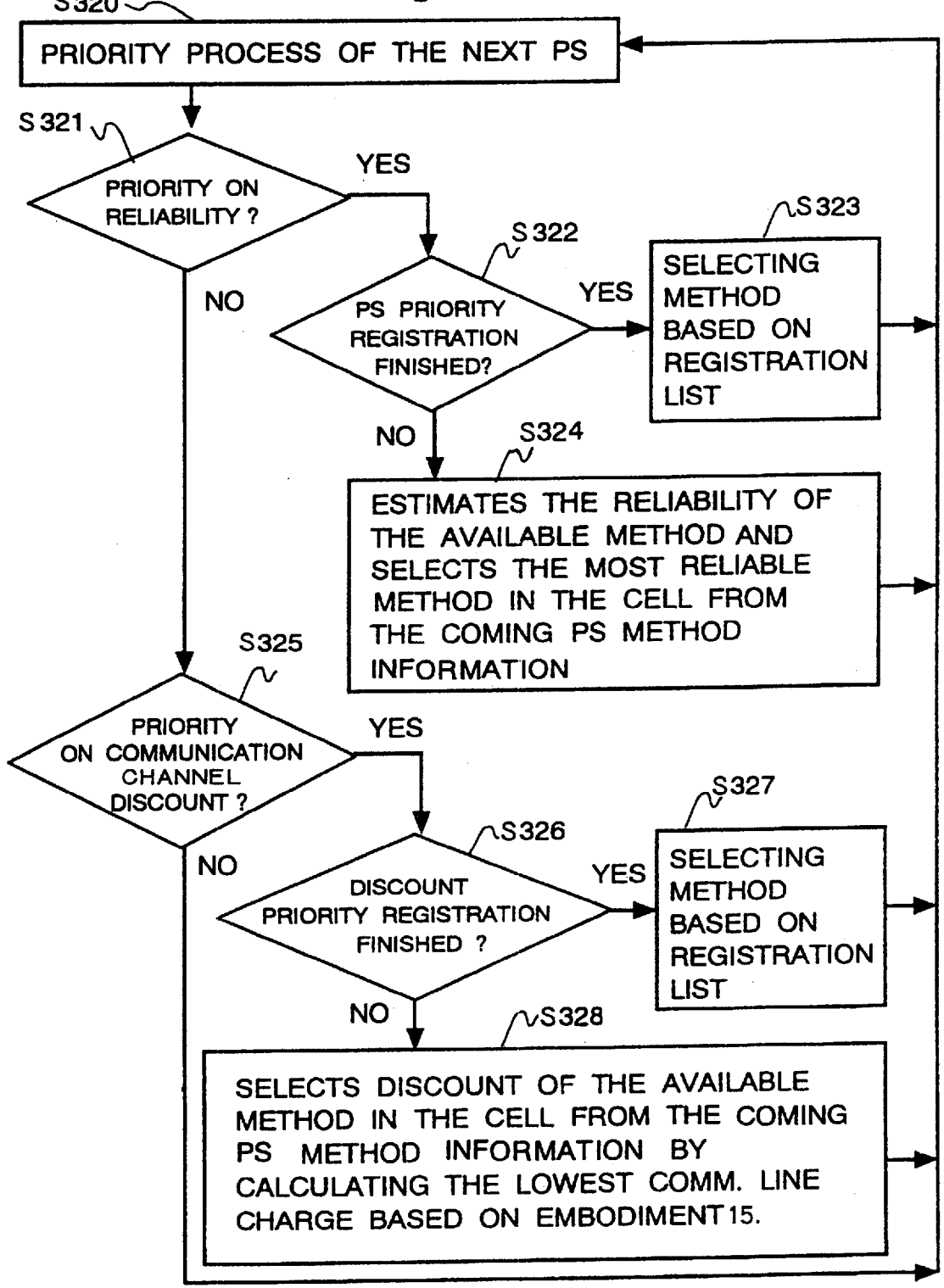
FIG. 107 is a flowchart showing the access method selecting procedure in the seventeenth embodiment.

FIG. 107 is a flowchart showing the above-mentioned selecting procedure. The selecting procedure of FIG. 107 is a process to be performed by the system recognition unit 55 of PBX 3. The system recognition unit 55 performs the priority assignment setting procedure of FIG. 107 for every mobile station according to the information of priority assignment column 470b in the information memory 470. In step 320, the priority process is started. In Step 321, it is discriminated as to whether or not the mobile station has a priority to the reliability. If "YES" as the result of discrimination as to whether or not it is the reliability priority process, discrimination is made, in step 322, as to whether or not the priority has been registered on the registration list of FIG. 106. If it is already registered in the registration list, the method is selected according to the registration list in step 323. In the absence of such registration in the registration list, the reliability of the respective method is estimated and calculated, in step 324, as described in the fifteenth embodiment. In step 324, if the method having the maximum reliability is selected, the said method is previously registered in the registration list such as of Table 5.

Assuming that "channel discount" has a priority over "reliability", if it is judged in step 325 that "channel discount" has a priority, discrimination is made in step 326 as to whether or not the priority to "channel discount" is already registered in the registration list of FIG. 106. If it is already registered in the registration list, the method is selected according to the registration list in step 327. In the absence of such registration in the registration list, the charges of the individual available methods of FIG. 106 are calculated and compared according to Equation 9.3 of the fifteenth embodiment, thus selecting the most inexpensive method.

As mentioned above, according to this embodiment, in the system in which the channel efficiency is evaluated from various access methods, modulation methods, voice coding rate and spread-spectrum coding rate and is judged from the occupied spectrum width on the radio frequency axis and the occupied time slot width on the time axis, the larger the interference wave from the slot other than the frequency slot/time slot of the FDMA method or of the TDMA method, the higher the transmission error rate. Therefore, the reliability of the channel is set to a low value, and a discount rate of the charging usage is decided commensurate with the degree of deterioration of the channel reliability due to the increase of the transmission error rate.

Further, if there are within the same CDMA circuit subscribers using various mutually orthogonal codes, or if subscribers more than the limit get communication within the same CDMA channel, a discount rate of the charging usage commensurate with the degree of deterioration of the channel reliability of the talking.

The subscriber hoping to use the channel with a discount rate as large as possible can be previously registered in a subscriber information memory of the exchange. The exchange is characterized by the function of selecting the channel for use so as to lower the charging usage, using such information in registration. The exchange is also characterized by a channel selection priority assigning function for performing the channel selection with priority to the channel of the subscriber having started talking earlier Embodiment 17

Selection of Access Method Based on Priority Assignment (Channel Quality)

This embodiment deals with the linking for the mobile station hoping the channel whose quality is as high as possible. The priority-to-reliability assigning procedure is carried out in steps 322 and 324 in FIG. 107.

Figure 108:
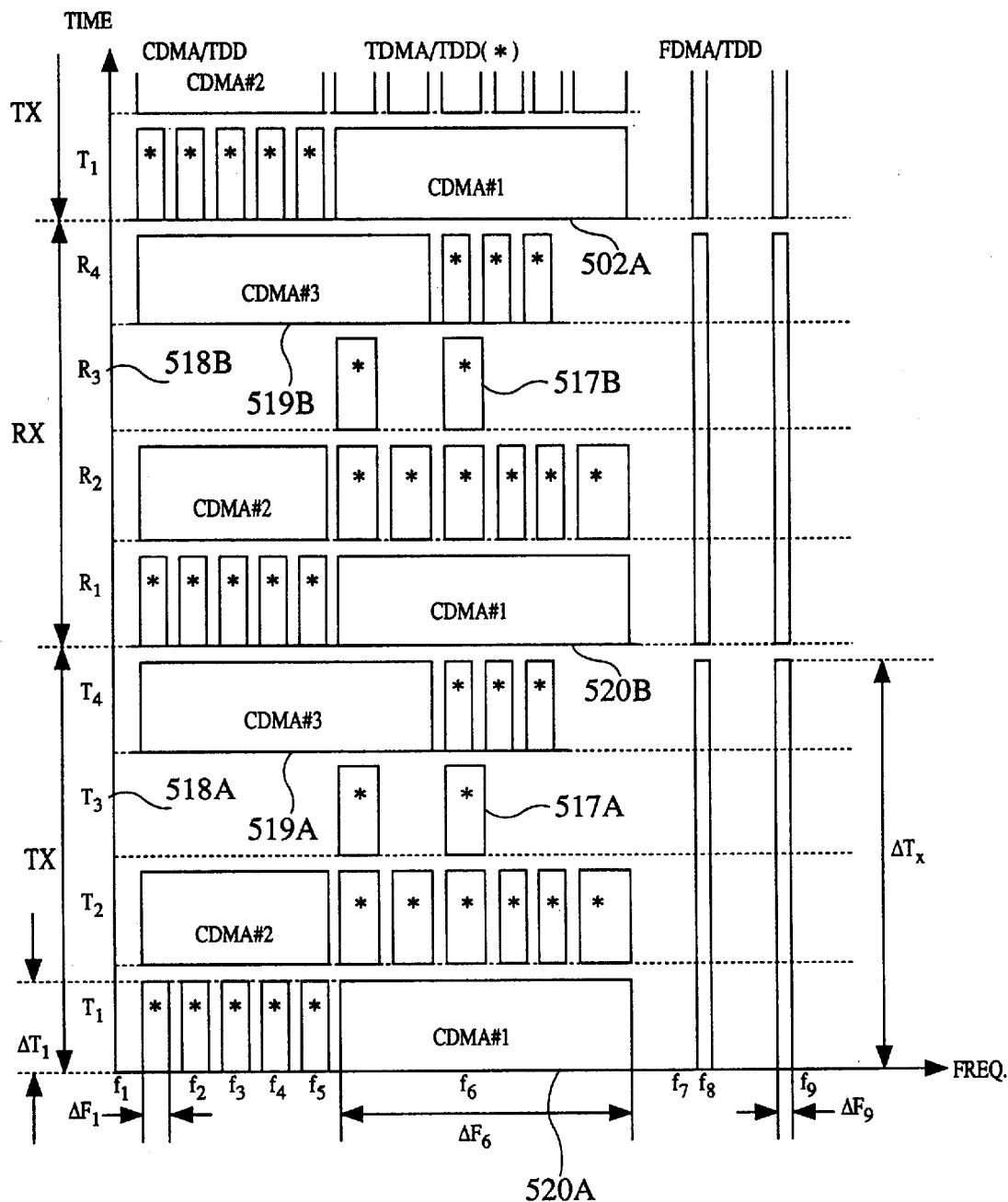
FIG. 108 is a diagram showing the manner in which frequencies are employed in order for PBX to set channel reliability in a mobile communication system according to an eighteenth embodiment.

The mobile station PS034673 of FIG. 105 is an example of user with priority to the channel reliability (hereinafter called "priority-to-reliability user"), and "reliability" 470d is registered in the priority assignment column 470b. FIG. 108 shows an actual example in which PBX sets the channel reliability. When the priority-to-reliability user selects the TDMA method, it selects the time slot, which is small in number of slots occupied, among T3/R3 of the same time slots 518A and 518B, like the slots 517A and 517B of FIG. 108. If the priority-to-reliability user uses the CDMA method, it is possible to set the reliability of the CDMA to a high value, by limiting the number of actually allocated channels to an enough smaller value than the maximum number N of channels, in the slots 519A, 519B.

The exchange is characterized in that the system recognition unit 471 is equipped with a channel efficiency calculating function, a channel reliable calculating function and a priority assignment processing function, all for responding to user's various priority assignment requests.

As mentioned above, according to this invention, the channel reliability in the FDMA method or the TDMA method is defined or determined commensurate with the frequency slot or with the degree of interference wave to the time slot.

Assuming that there is a subscriber using many mutually quadrantal codes within the CDMA circuit, when subscribers more than the limit is to get communication within the same CDMA circuit, the channel reliability is defined or determined commensurate with the degree of deterioration of quality of the talking.

The subscriber hoping to use the channel with a channel reliability as high as possible can previously made a registration in the subscriber information memory of the exchange.

The exchange has a function of selecting the channel with a high channel reliability, using the registered information.

Further, in order to select the channel with a high channel reliability, the exchange has a function of selecting the channel so as to reduce the charge in the case of the same reliability.

Embodiment 18

Hand-off

In each of the foregoing embodiments, the mobile communication system can transmit and receive the CDMA signal and the TDMA signal coexisting in the time slot of the TDMA method. The system can also make transmission with information channels set in the same time slot within a single transmitting frame.

Further, the system of each of the ninth and subsequent embodiments can select a desired access method before talking, based on the access method deciding condition and can change the access method during talking.

Using each function shown in the respective foregoing embodiment or using additional constructions, it is possible to perform a hand-off seamlessly while the mobile station shifts between cells.

In the following embodiments, the hand-off will be described.

Judging Whether or not Hand-off is Necessary (FDMA)

A hand-off judging method during FDMA talking, namely, in communication using the FDMA method according to this embodiment will now be described. More particularly, a hand-off judging method when the mobile station and the radio base station can change the access method between a plurality of kinds of access methods will be described. Hand-off will be explained as the mobile station approaches around the border of cells while the mobile station is wirelessly connected with the radio base station in the FDMA method.

Figure 109:
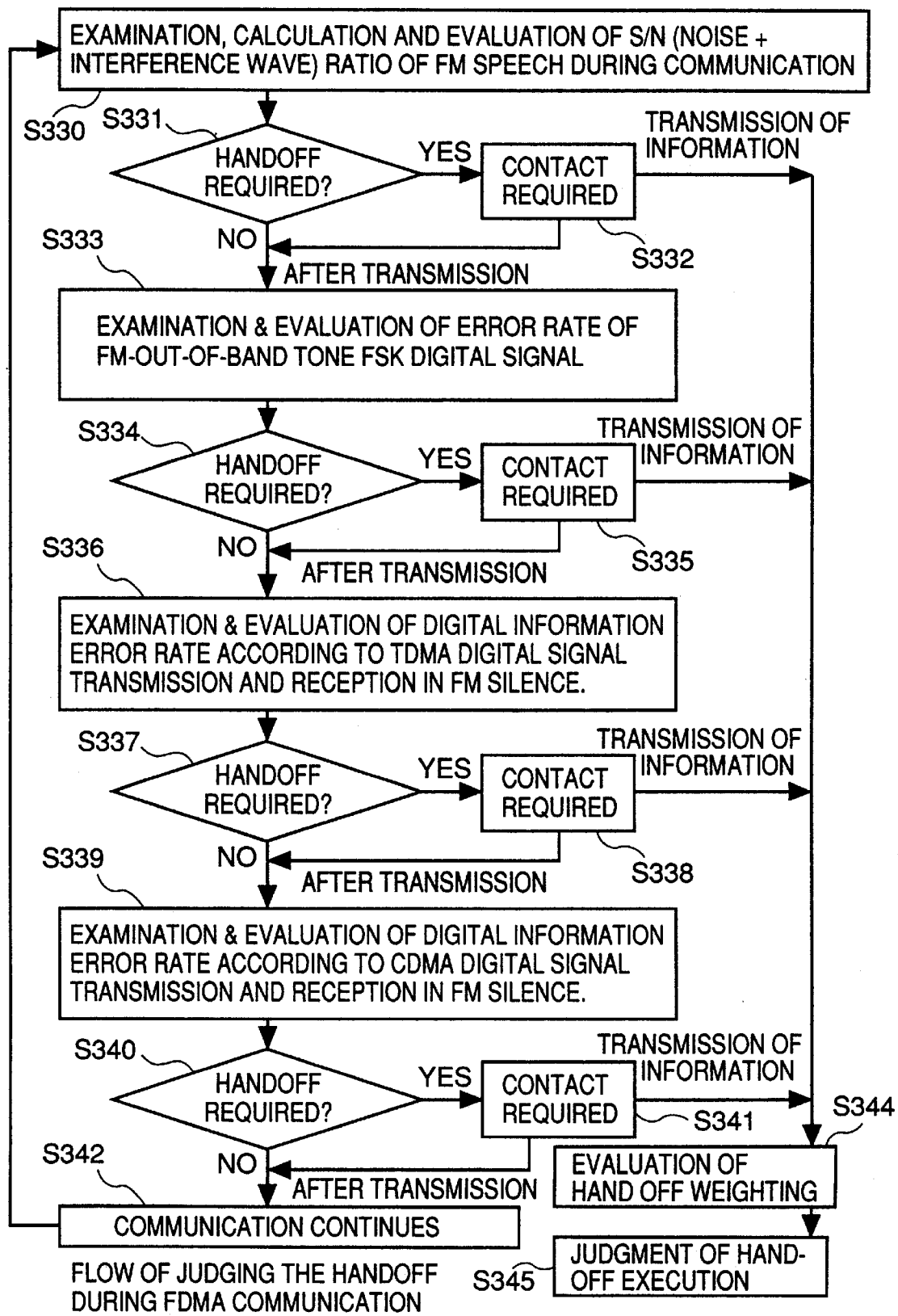
FIG. 109 is a flowchart showing a process for judging hand-off during communication using the FDMA method in a mobile communication system according to a nineteenth embodiment of the invention.

FIG. 109 is a flowchart showing the process for judging a hand-off during talking in the FDMA method. In the flowchart of FIG. 109, firstly with respect to the FDMA wave, such as FM voice wave, used currently in talking, a signal-to-interference-wave-and-noise ratio is measured (step 330), and an judgment is made whether or not hand-off is necessary (step 331). In this case, when measuring the interference-wave-and-noise, a voiceless state of FM voice is necessary. If voice continuing state goes on, an error rate of FM-out-of-band tone FSK digital signal is measured and evaluated (step 333), and a judgment is made whether or not hand-off is needed (step 334).

Further, if talking in the TDMA method within the same cell during FM voiceless, the mobile station and the radio base station transmit and receive signals in the TDMA method, and measure and evaluate the error rate (step 336). Even in the CDMA method, the same measurement and evaluation is possible (step 339).

In FIG. 109, the results of judging as to whether or not four kinds of hand-off in steps 331, 334, 337, 340 are needed are evaluated in step 344. In step 345, an judgment to execute hand-off is made based on the evaluation of step 344. The evaluation of the hand-off judgment result in step 344 may be done, for example, by two weights as follows.

(1) If a message is received that any one or more judgments of the above-mentioned four judgments need hand-off, then soon such hand-off to the adjacent cell (of the present system or of the adjacent system) is done.

(2) Only if a message is received that two or more judgments of the above-mentioned four judgments need hand-off, such hand-off to the adjacent cell (of the present system or of the adjacent system) is done.

The weighting of evaluation to do hand-off may be accomplished by various methods other than the above-mentioned (1) and (2) when a message that every hand-off is needed.

As is mentioned above, in this embodiment, as during communication in the FDMA method the signal using another access method is transmitted and received, it is possible to judge the execution, namely, necessity of hand-off.

According to this embodiment, the mobile station or the radio base station in communication in the FDMA multi access method measures the intensity of signal in talking and measures background noise during voiceless state. By these measured values, then the mobile station or the radio base station calculates a signal-to-noise-and-interference-wave ratio, and judges whether or not the evaluation value is smaller than a predetermined value. Or in a system continuously monitoring the error rate of FM-out-of-band tone (e.g., 150 Hz or 25 Hz) FSK digital information, the mobile station or the radio base station judges whether or not the error rate is smaller than a predetermined value. Or during voiceless state, the mobile station or the radio base station transmits and receives the TDMA signal, measures the error rate and judges whether or not the error rate is smaller than a predetermined value. Or during voiceless state, the mobile station or the radio base station transmits and receives the CDMA signal, measures the error rate and judges whether or not the error rate is smaller than a predetermined value.

Assuming that the exchange used any one of the above-mentioned functions, if it turns out that the error rate is larger than a predetermined value, the exchange judges that hand-off to the adjacent cell is needed. Or assuming that the exchange uses a predetermined number of functions among the above-mentioned functions, if it turns out that the error rate is larger than a predetermined value, the exchange judges the necessity of hand-off to the adjacent cell.

Embodiment 19

Judgment of Whether or not Hand-Off is need (TDMA)

In this embodiment, hand-off judgment during TDMA talking, namely, during communication using the TDMA method will now be described. One example will be explained in which while the mobile station is wirelessly connected with the radio base station in the TDMA method, the mobile station approaches near the border or the cell.

Figure 110:
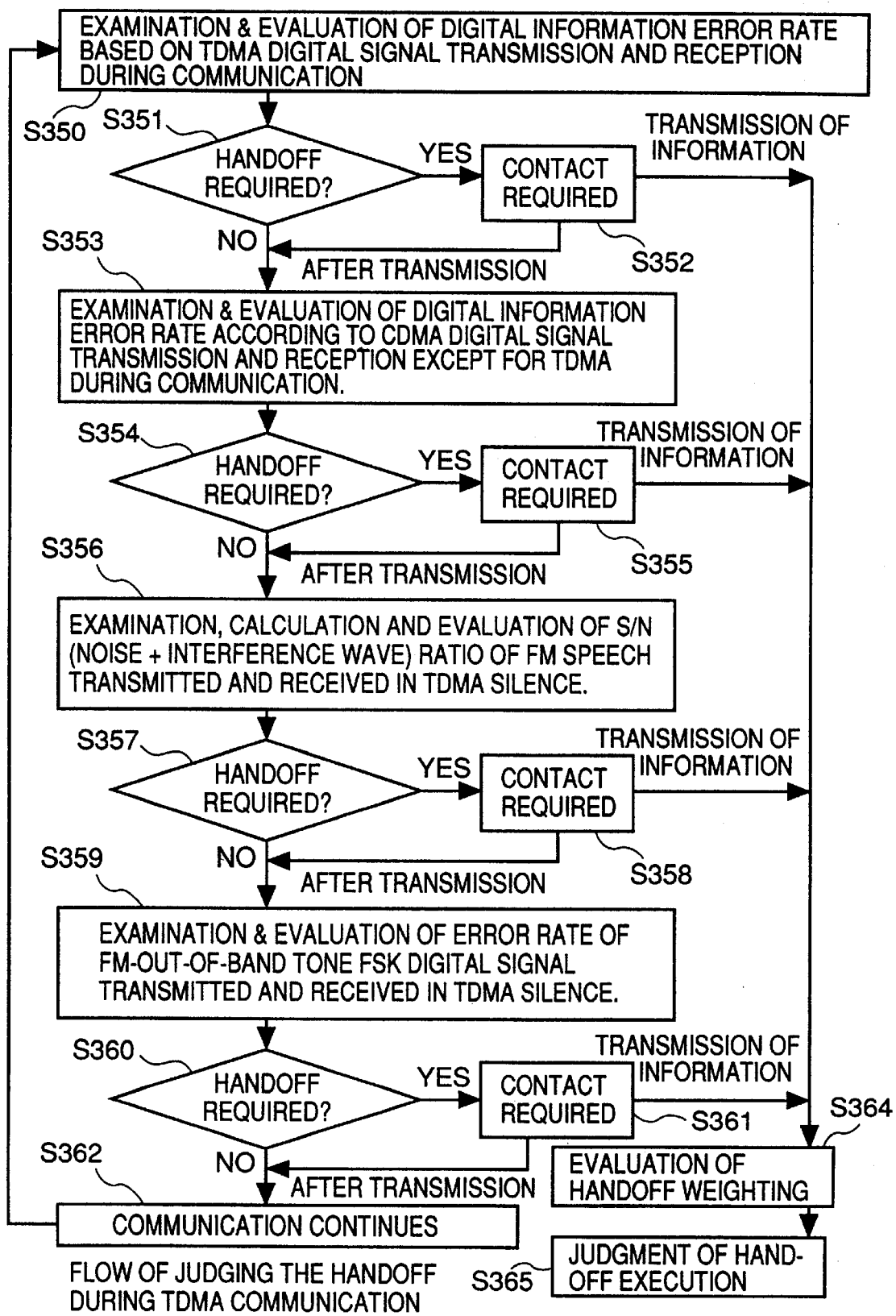
FIG. 110 is a flowchart showing a process for judging hand-off during communication using the CDMA method in a mobile communication system according to a twentieth embodiment of the invention.

FIG. 110 is a flowchart showing the procedure of judging whether or not hand-off is needed during communication according to the TDMA method. In the flowchart of FIG. 110, firstly the error rate of the TDMA digital signal now in talking is measured (step 350). If the measured value is larger than a predetermined value, a judgment is made that hand-off is needed (step 351).

Further, using the time slots (e.g., time slots 520A/520B of the CDMA method in FIG. 108) other than the time slot (e.g., time slot 517A/517B in FIG. 108) according to the TDMA method during talking, CDMA signals are transmitted and received, and an error rate of the digital information is measured and evaluated (step 353), and a judgment of hand-off is done (step 354).

As it assumes a voiceless state during talking according to the TDMA method, the FDMA signal is transmitted while it stops transmitting the TDMA signal, and a signal-to-interference-wave-and-noise ratio of the FM voice wave is measured (step 356), and a judgment is made whether or not hand-off is needed (step 357).

In this case, a voiceless state of FM voice is necessary when measuring the interference-wave-and-noise. If the voice continuous state runs, an error rate of FM-out-of-band tone FSK digital signal is measured and evaluated (step 359), and an judgment is made whether or hand-off is needed (step 360). In FIG. 110, the results of judging as to whether or not four kinds of hand-off in steps 351, 354, 357, 360 are needed are evaluated in step 364. Further, in step 365, an judgment is made whether or not hand-off has to be done.

The evaluation of results of the hand-off judgment in step 364 may be carried out in the following manner:

(1) If a message is received that any one or more judgments of the above-mentioned four judgments need hand-off, then soon such hand-off to the adjacent cell (of the present system or of the adjacent system) is done.

(2) Only if a message is received that two or more judgments of the above-mentioned four judgments need hand-off, such hand-off to the adjacent cell (of the present system or of the adjacent system) is done.

The weighting of evaluation to do hand-off may be accomplished by various methods other than the above-mentioned (1) and (2) when a message that every hand-off is needed.

As is mentioned above, in this embodiment, as during communication in the TDMA method, it is possible to judge, by using another access method, whether or not hand-off is needed.

According to this embodiment, the mobile station or the radio base station in communication in the TDMA multi access method measures the intensity of signal in talking and measures background noise during voiceless state. By these measured values, then the mobile station or the radio base station calculates a signal-to-noise-and-interference-wave ratio, and judges whether or not the evaluation value is smaller than a predetermined value. Or in a system continuously monitoring the error rate of FM-out-of-band tone FSK digital information, the mobile station or the radio base station judges whether or not the error rate is smaller than a predetermined value. Or during voiceless state, the mobile station or the radio base station transmits and receives the TDMA signal, measures the error rate and judges whether or not the error rate is smaller than a predetermined value. Or during voiceless state, the mobile station or the radio base station transmits and receives the CDMA signal, measures the error rate and judges whether or not the error rate is smaller than a predetermined value.

Assuming that the exchange used any one of the above-mentioned functions, if it turns out that the error rate is larger than a predetermined value, the exchange judges that hand-off to the adjacent cell is needed. Or assuming that the exchange uses a predetermined number of functions among the above-mentioned functions, if it turns out that the error rate is larger than a predetermined value, the exchange judges the necessity of hand-off to the adjacent cell.

Embodiment 20
Judgment as to whether or not Hand-off is Needed (CDMA)

In this embodiment, hand-off judgment during CDMA talking, namely, during communication using the CDMA method will now be described. One example will be explained in which while the mobile station is wirelessly connected with the radio base station in the CDMA method, the mobile station approaches near the border of the cell.

Figure 111:
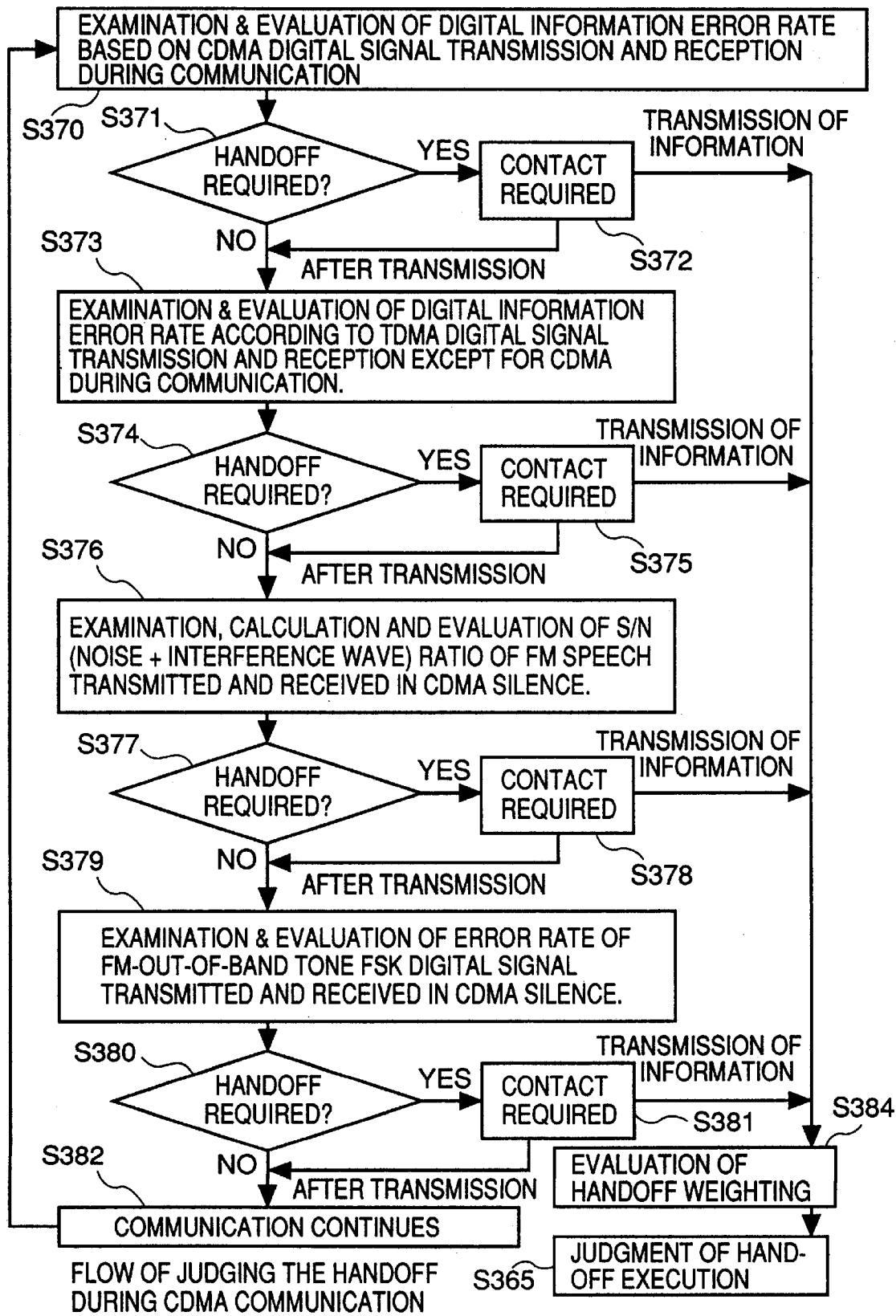
FIG. 111 is a flowchart showing a process for judging hand-off during communication using the FDMA method in a mobile communication system according to a twenty-first embodiment of the invention.

FIG. 111 is a flowchart showing the procedure of judging whether of not hand-off is needed during communication according to the CDMA method. In the flowchart of FIG. 111, firstly the error rate of the CDMA digital signal now in talking is measured (step 370). If the measured value is larger than a predetermined value, a judgment is made that hand-off is needed (step 371).

Further, using the time slots (e.g., time slots 520A/520B of the CDMA method in FIG. 108) other than the time slot (e.g., time slot 517A/517B in FIG. 108) according to the TDMA method during talking, CDMA signals are transmitted and received, and an error rate of the digital information is measured and evaluated (step 373), and a judgment of hand-off is done (step 374).

As it assumes a voiceless state during talking according to the CDMA method, the FDMA signal is transmitted while it stops transmitting the TDMA signal, and a signal-to-interference-wave-and-noise ratio of the FM voice wave is measured (step 376), and a judgment is made whether or not hand-off is needed (step 377).

In this case, a voiceless state of FM voice is necessary when measuring the interference-wave-and-noise. If the voice continuous state runs, an error rate of FM-out-of-band tone FSK digital signal is measured and evaluated (step 379), and an judgment is made whether or hand-off is needed (step 380).

In FIG. 111, the results of judging as to whether or not four kinds of hand-off in steps 371, 374, 377, 380 are needed are evaluated in step 384. Further, in step 385, an judgment is made whether or not hand-off has to be done.

The evaluation of results of the hand-off judgment in step 384 may be carried out in the following manner:

(1) If a message is received that any one or more judgments of the above-mentioned four judgments need hand-off, then soon such hand-off to the adjacent cell (of the present system or of the adjacent system) is done.

(2) Only if a message is received that two or more judgments of the above-mentioned four judgments need hand-off, such hand-off to the adjacent cell (of the present system or of the adjacent system) is done.

The weighting of evaluation to do hand-off may be accomplished by various methods other than the above-mentioned (1) and (2) when a message that every hand-off is needed.

As is mentioned above, in this embodiment, as during communication in the CDMA method, it is possible to judge, by using another access method, whether or not hand-off is needed.

According to this embodiment, the mobile station or the radio base station in communication in the CDMA multi access method measures the intensity of signal in talking and measures background noise during voiceless state. By these measured values, then the mobile station or the radio base station calculates a signal-to-noise-and-interference-wave ratio, and judges whether or not the evaluation value is smaller than a predetermined value. Or in a system continuously monitoring the error rate of FM-out-of-band tone FSK digital information, the mobile station or the radio base station judges whether or not the error rate is smaller than a predetermined value. Or during voiceless state in CDMA, the mobile station or the radio base station transmits and receives the CDMA signal, measures the error rate and judges whether or not the error rate is smaller than a predetermined value. Or during voiceless state in TDMA, the mobile station or the radio base station transmits and receives the TDMA signal, measures the error rate of CDMA signal and judges whether or not the error rate is smaller than a predetermined value.

Assuming that the exchange used any one of the above-mentioned functions, if it turns out that the error rate is larger than a predetermined value, the exchange judges that hand-off to the adjacent cell is needed. Or assuming that the exchange uses a predetermined number of functions among the above-mentioned functions, if it turns out that the error rate is smaller than a predetermined value, the exchange judges the necessity of hand-off to the adjacent cell.

Embodiment 21
Change of Access Method at Hand-off

Figure 112:
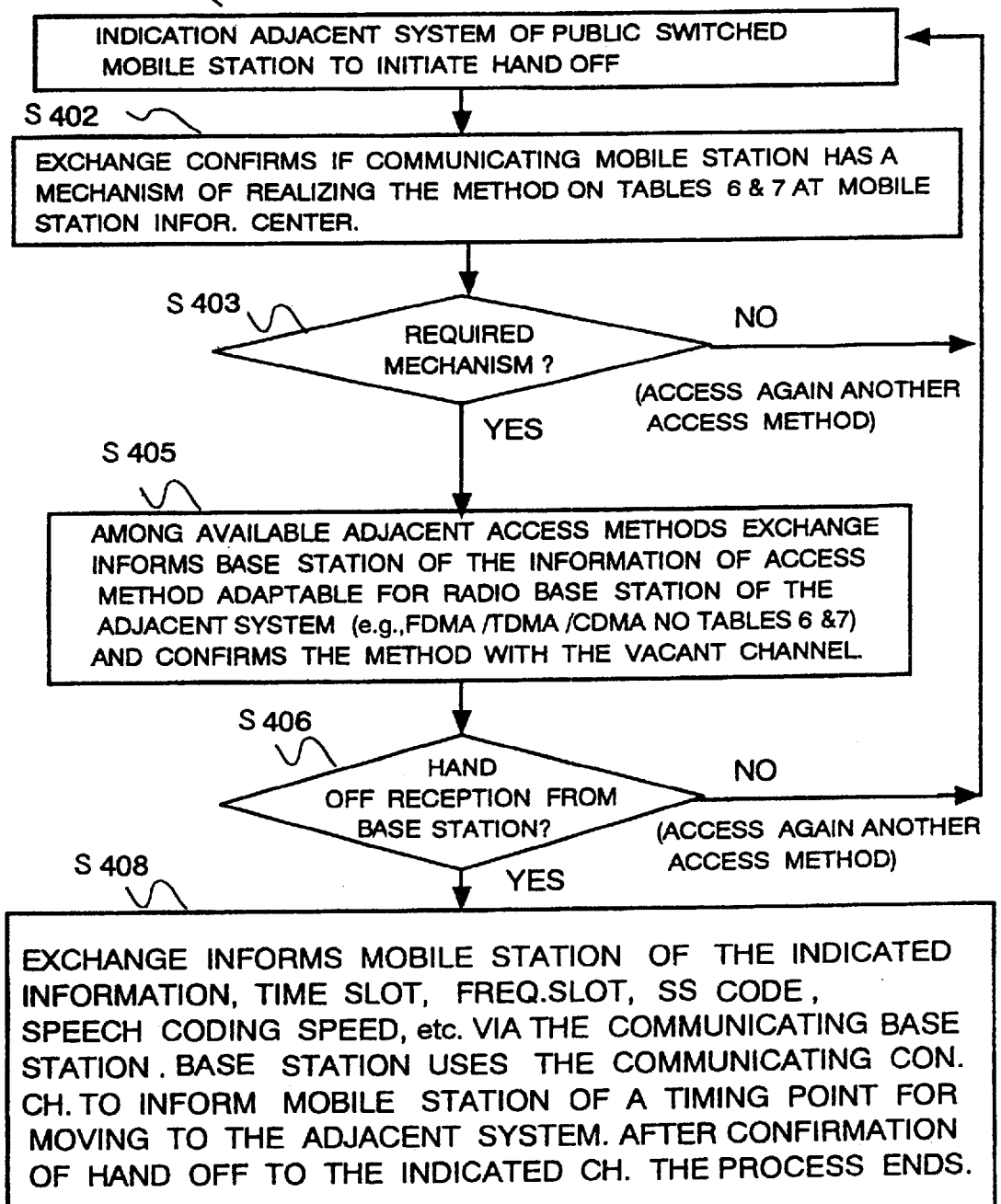
FIG. 112 is a flowchart showing the procedure of hand-off to an adjacent cell in a mobile communication system according to a twenty-second embodiment of the invention.

FIG. 112 is a flowchart showing the procedure of hand-off to the adjacent cell. If a decision is made of the necessity of hand-off to the adjacent system or to the cell adjacent to the system according to the procedure of FIGS. 109, 110 and 111.

Table 6 of FIG. 113 shows control channel information of the adjacent system. Table 7 of FIG. 114 shows information channel information of the adjacent system. The control and information channels of the adjacent cell are stored in the memory of PBX 3 as shown in Tables 6 and 7.

The procedure of hand-off will now be described according to the flowchart of FIG. 112.

In step 401, when hand-off to the adjacent system is designated, it is confirmed in step 402 as to whether or not the mobile station, which performs hand-off, is included in the usable method in the adjacent system. This confirmation is made based on Tables 6 and 7 in the memory of PBX. In step 403, if it is confirmed that the mobile station can perform any one method of the usable methods of the adjacent system, in step 405 PBX notifies the adjacent radio base station that the mobile station will be handed off and designates the acceptance of the access from the mobile station. The adjacent radio base station checks, based on the notification from PBX 3, whether or not the designated method is usable and whether or not a vacant channel of the said method exists. In the adjacent radio base station, if they are confirmed, the result is notified to PBX. In step 406, PBX checks, based on the checking result, as to whether or not the acceptance of hand-off is done. In step 408, PBX reports to the mobile station, via the radio base station in talking, of information such as access and modulation methods to be used in the adjacent radio base station. The radio base station designates the mobile station to shift the talking to the adjacent radio base station at a specified timing, using the control channel. The mobile station shifts the talking to the adjacent radio base station based on the designation.

As mentioned above, according to this embodiment, if it is judged that the mobile station has to be handed off to the adjacent cell within the system or needs roaming to the adjacent cell of the adjacent system while the mobile station and the radio base station are in talking in one multi access method among plural multi access methods, it is possible to inherit the same access method to perform hand-off and at the same time to change the access method to another method at the time of hand-off.

Embodiment 22
Change of Access Method at Hand-Off with Priority

Figure 115:
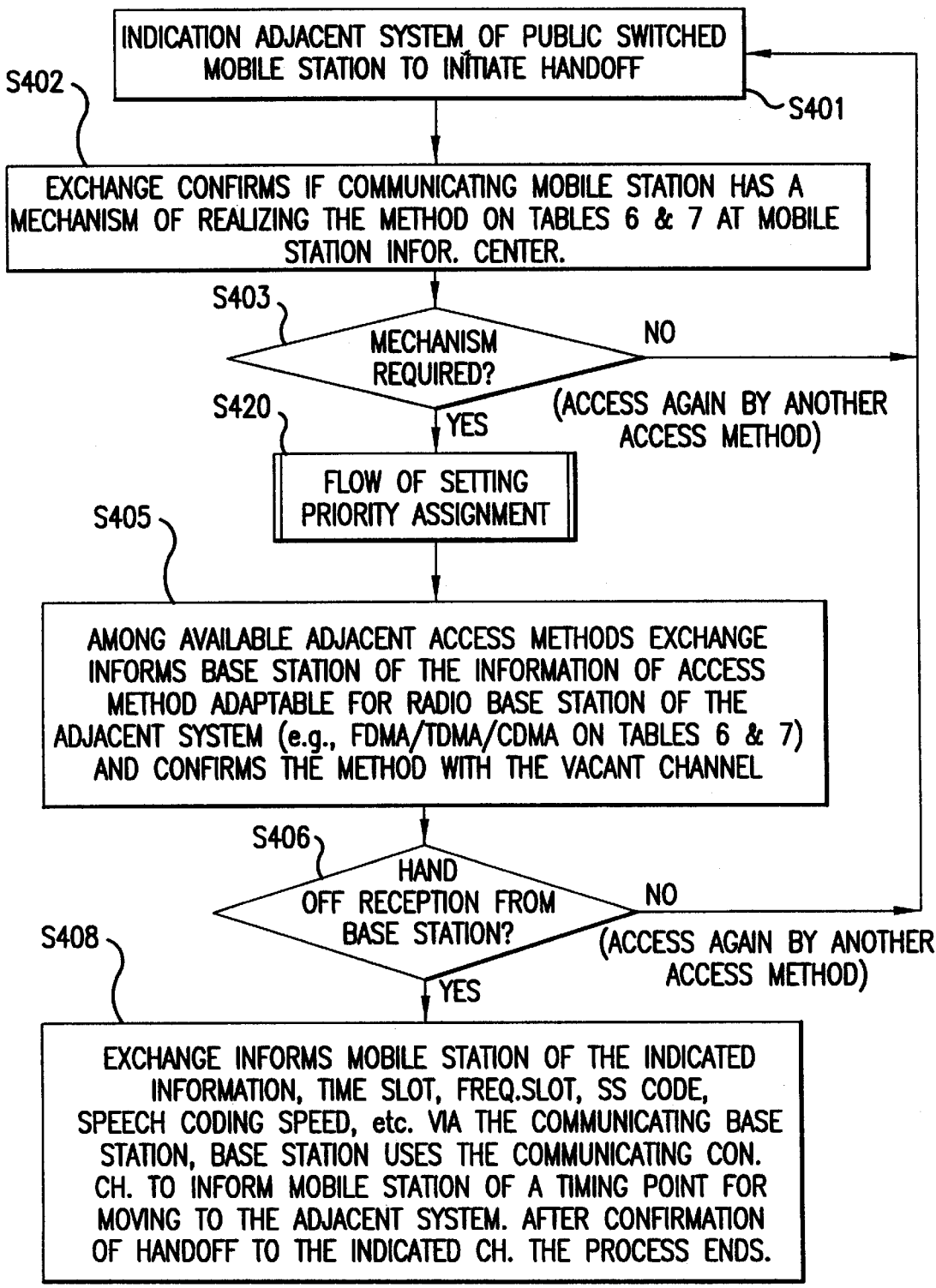
FIG. 115 is a flowchart showing the hand-off procedure in which the priority method is designated to an adjacent cell, in a mobile communication system according to a twenty-third embodiment of the invention.

The hand-off procedure with priority to the adjacent cell, FIG. 115 is a flowchart of the hand-off procedure with priority to the adjacent cell. FIG. 115 is similar to FIG. 112 except that step 420 is added. The details of step 420 is shown in FIG. 116.

Figure 116:
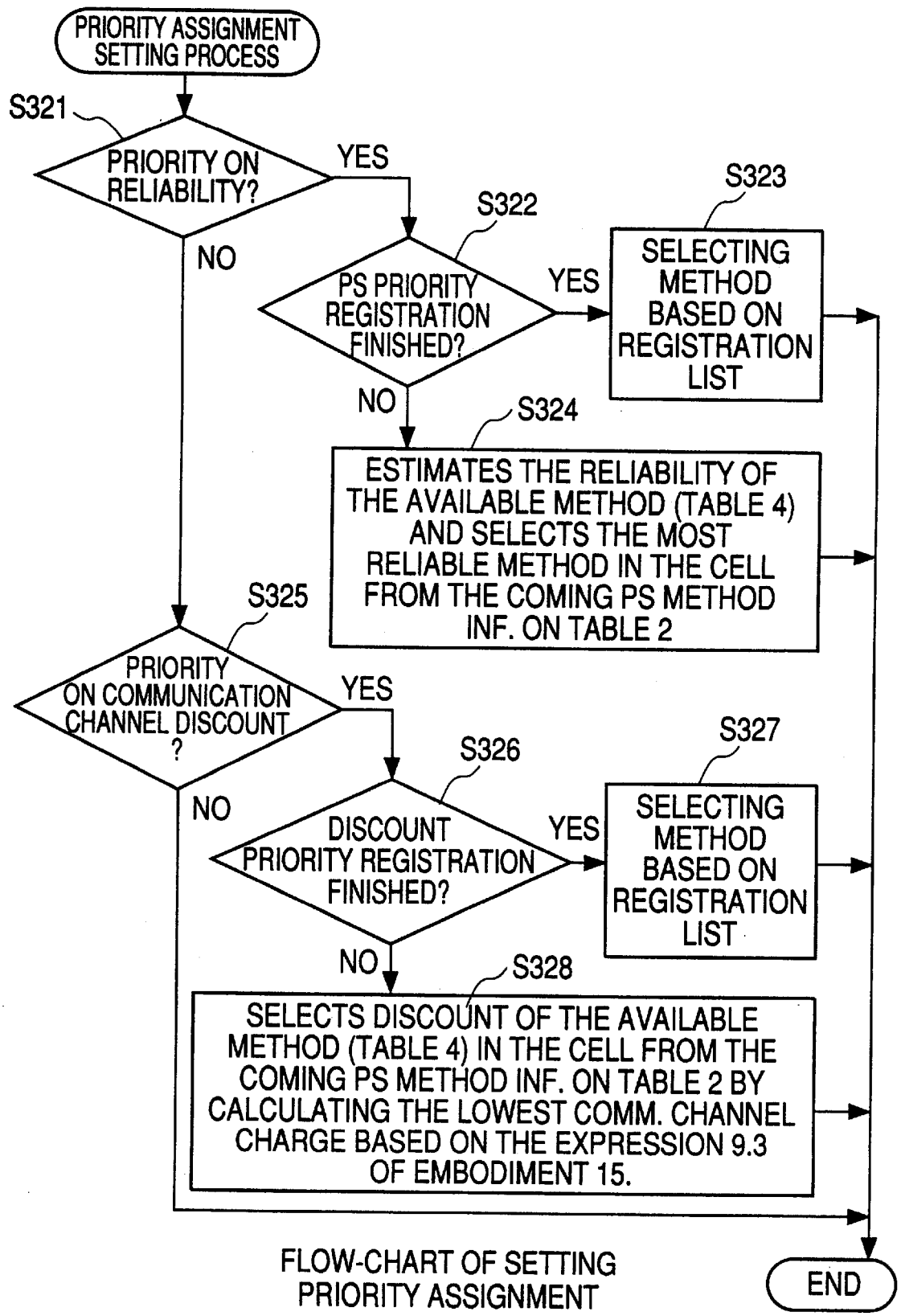
FIG. 116 is a flowchart showing the priority assignment setting process of FIG. 115.

FIG. 116 is a flowchart of the priority assigning process of FIG. 115, showing the procedure in which a single access method among a plurality of access methods is set, with the priorities assigned, in the same manner of FIG. 107. As shown in FIG. 116, the priority is exemplified by two cases: (1) priority is assigned to the reliability; and (2) priority is assigned to the channel discount. In the example (1), an access method such that the channel reliability will be maximal is selected as shown in steps 321–324. On the other hand, in the example (2), an access method such that the charging usage will be minimal is selected as shown in steps 325–328.

Thus, even when the mobile station is handed off to the adjacent system, it is possible to select an access method, among a plurality of access methods with priorities assigned to them, to meet its priority.

This embodiment is applicable to a system in which a channel efficiency is discriminated from the occupied spectrum width on the radio frequency axis and the occupied time slot width on the time axis and is also evaluated from the access methods, modulation methods, voice coding rate and spread-spectrum coding rate. The larger the interference wave from the slot other than the frequency slot/time slot of the FDMA method or the TDMA method, the higher the transmission error rate. Consequently, in this embodiment, the channel reliability is set to low so that a discount rate of the charging usage is decided or determined commensurate with the degree of deterioration of channel reliability due to the increase of the transmission error rate.

Further, if there are subscribers currently using many mutually orthogonal codes within the same CDMA circuit, and if subscribers exceeding a limited number are got in communication within the same CDMA channel, a discount rate of the charging usage is decided or determined commensurate with the degree of deterioration of the channel reliability of the talking.

As mentioned above, since the access method is changed according to the priority, it is possible to perform a quick and exact hand-off.

When handing off to the adjacent cell, the subscriber hoping to use the channel with a discount rate as high as possible can be previously registered in a subscriber information memory of the exchange. The exchange of this embodiment is characterized by a function of selecting the channel, based on the registered information, in such a manner that the charging usage will be lower after hand-off.

In this embodiment, a quick hand-off is realized by deciding the priority by a single deciding condition. Alternatively, an access method may be selected by a total judgment with weighting to the individual deciding conditions.

Embodiment 23
Apparatus Construction for Hand-Off

Figure 117:
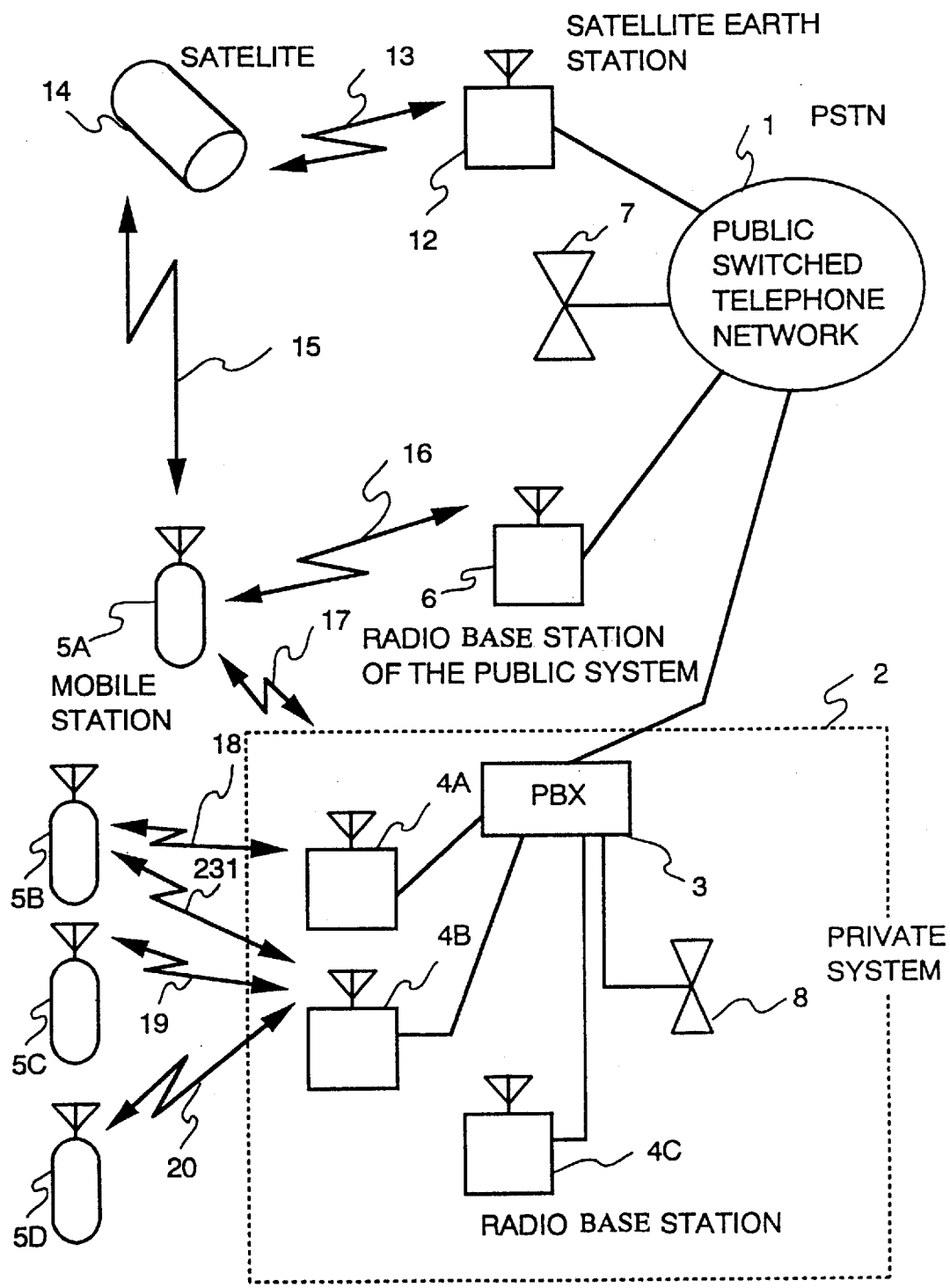
FIG. 117 is a diagram showing a whole construction of a mobile communication system according to a twenty-fourth embodiment of the invention.
Figure 118:
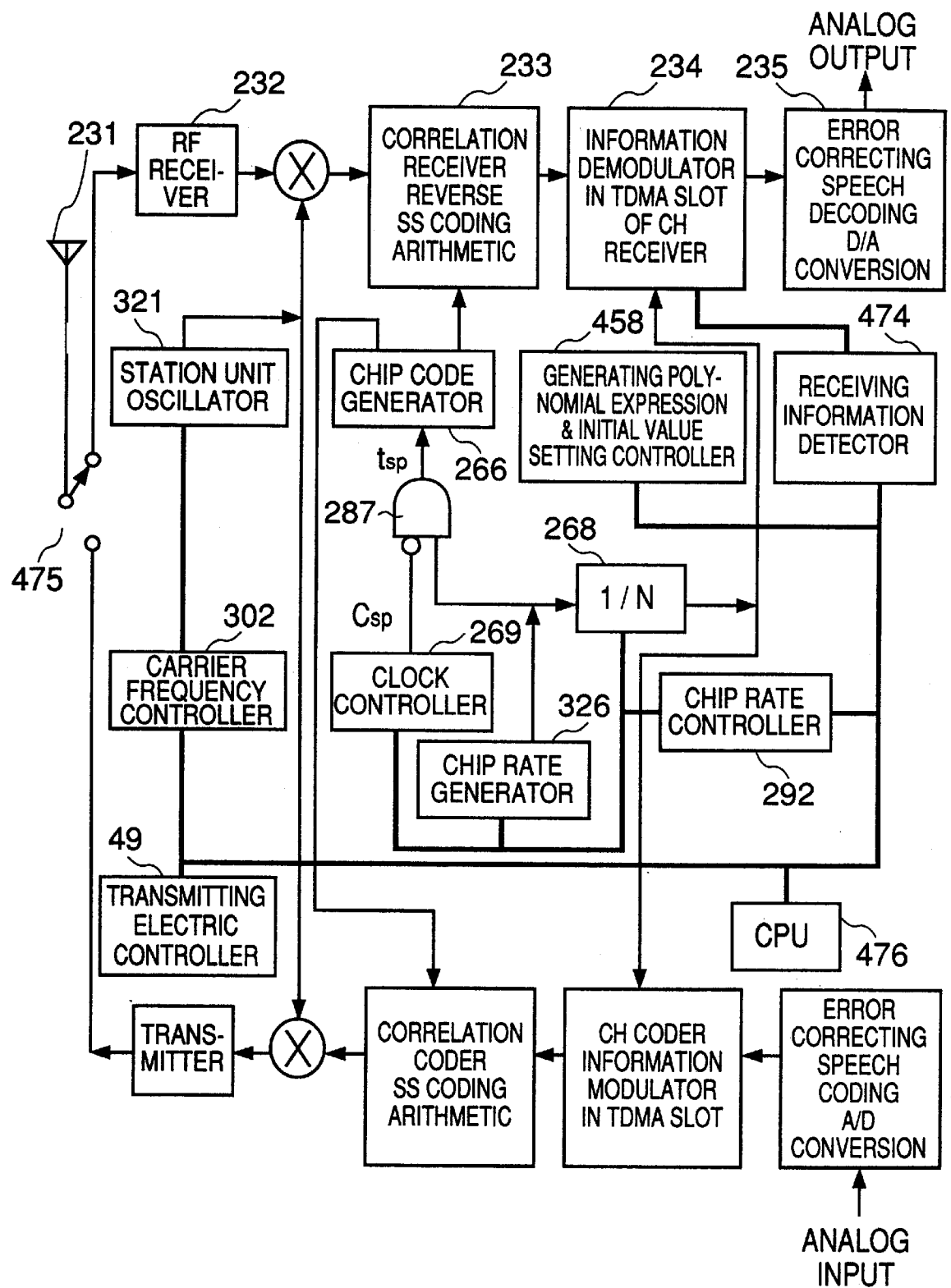
FIG. 118 is a block diagram showing a wireless processor equipped with a receiving electric power detecting function and a transmitting electric power controlling function, in the twenty-fourth embodiment.

FIG. 117 shows a mobile communication system according to this embodiment. FIG. 118 is a block diagram showing a radio processor equipped with the function for detecting the receiving power of and controlling the transmitting power of the mobile station. The mobile station in this embodiment has a receiving information detector 474 for detecting the state of signals received from a plurality of radio base stations. Although other parts or elements are designated by different reference numerals, they are substantially equivalent to those of FIG. 6.

The transmitting power from a radio base stations 4A, 4B, 4C, 4D is received by an antenna 231 of a mobile station 5A–5D. The receiving power is sent to an RF receiver 232 from an antenna switch 475 where it is amplified. A correlation receiver 233 demodulates the amplified signal into the TDMA format. The signal intensity is detected and measured by channel receiver/information demodulator 234 in TDMA time slot. The detected receiving power information is transmitted to CPU 476 via a receiving information detector 474. FIG. 119 is a table showing control information that CPU 476 holds for controlling various parts or elements.

This embodiment is characterized in that a channel is created between the mobile station and another radio base station using a time slot different from the time slot currently set with the present channel, based on the receiving state detected by CPU 476.

Figure 121:
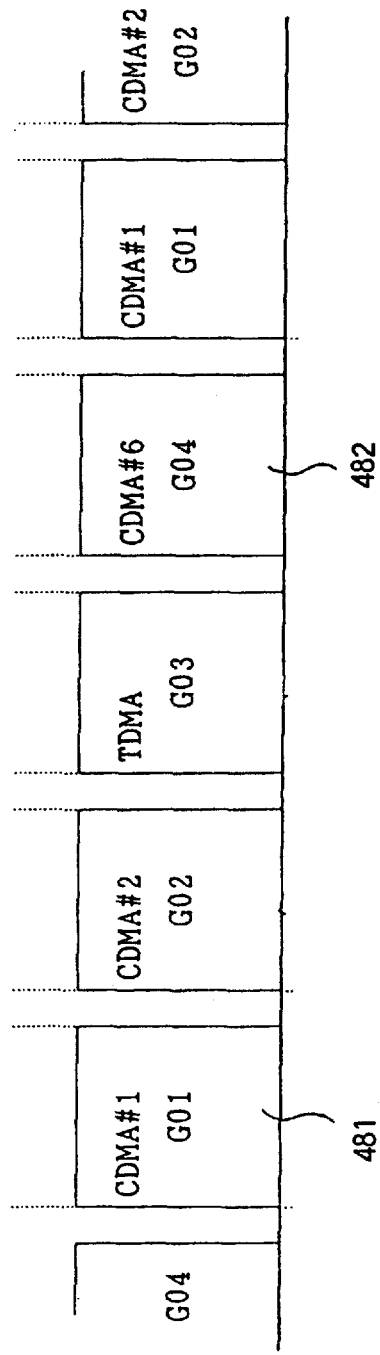
Figure 122:
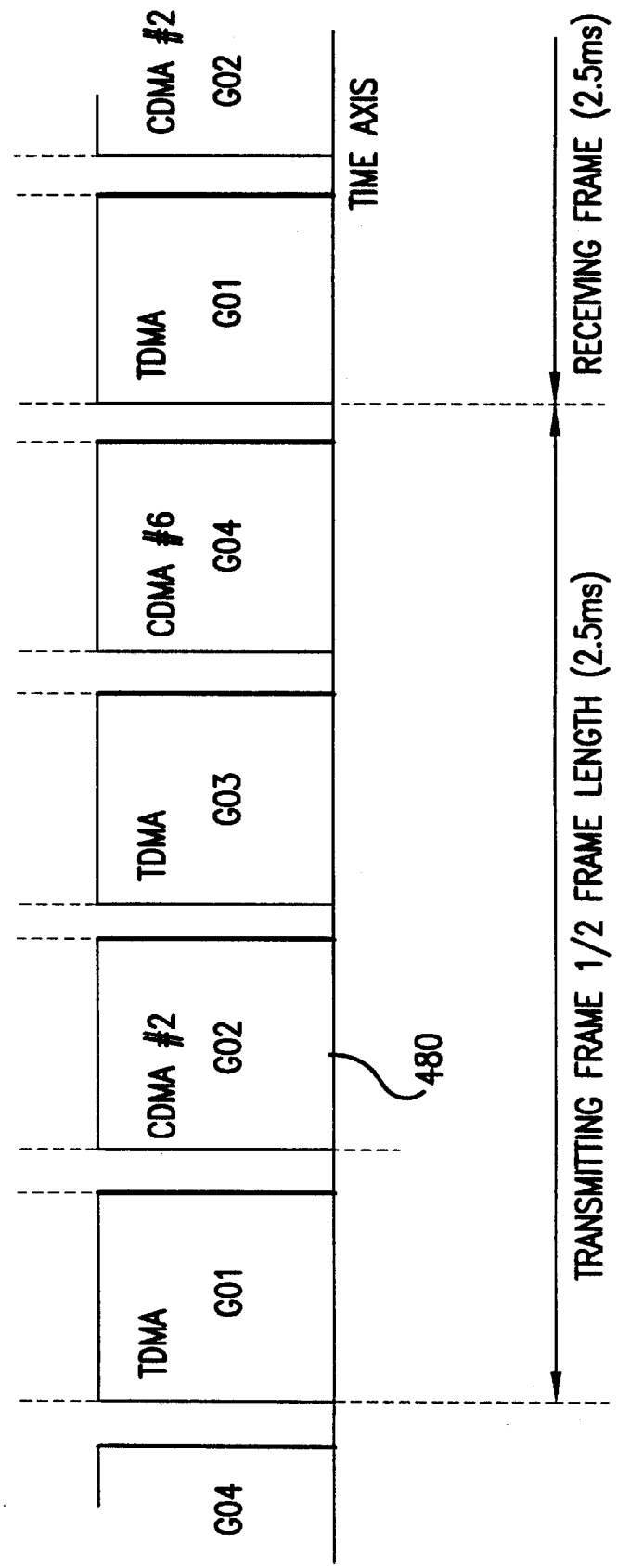

FIG. 120 is a table showing examples of data rate, transmitting type and chip rate, all for each time slot to be used in communication with a private system and an adjacent public system. FIGS. 121 and 122 show examples of time slots to be used in communication with a private system and an adjacent publish system. The action of hand-off will now be described using FIGS. 120, 121 and 122.

When the mobile station 5A is in communication firstly with a radio base station 6 of the public system by a slot No. 2 (477) of FIG. 120, assume that the mobile station 5A goes gradually away from the coverage of the radio base station 6 and then enters the coverage of another radio base station 4A of the private system. In this case, the mobile station 5A is able to be connected with a first slot 478 or a fourth slot 479 of FIG. 120.

This indicates that a second time slot 480 of FIG. 122 is connected with the first time slot 481 or the fourth time slot 482 of the radio base station 4A in the private system. In this case, since the time slots are arranged in different positions in spite of the same CDMA method, as described in connection with the foregoing embodiment, even a single mobile station can use a plurality of time slots within a transmitting frame. Accordingly, the mobile station 5A can perform hand-off without interrupting the talking, namely, seamlessly.

As mentioned above, according to this embodiment, since it is possible to switch the time slot over another even when the receiving state becomes bad, a seamless hand-off can be realized. Particularly, as shown in FIG. 118, it is realized only with a single transmitting and receiving system.

Embodiment 24
Method of Deciding Time Slot Shifting during Hand-Off

In the previous embodiment, when the mobile station 5A goes gradually away from the coverage of a communicating radio base station 6 of the public system and enters the coverage of the radio base station of the private system, it is possible to switch the time slot over the first time slot 481 or the fourth time slot 482.

The characteristic feature of this embodiment is that the destination-of-switchover time slot is decided consulting the number of simultaneous information channels in each time slot, which is a destination-of-switchover deciding condition.

Figure 124:
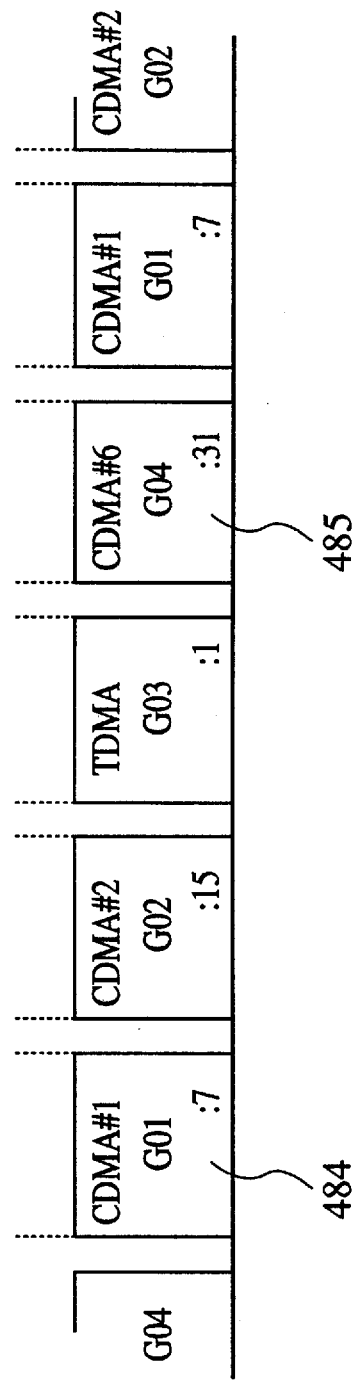
Figure 125:
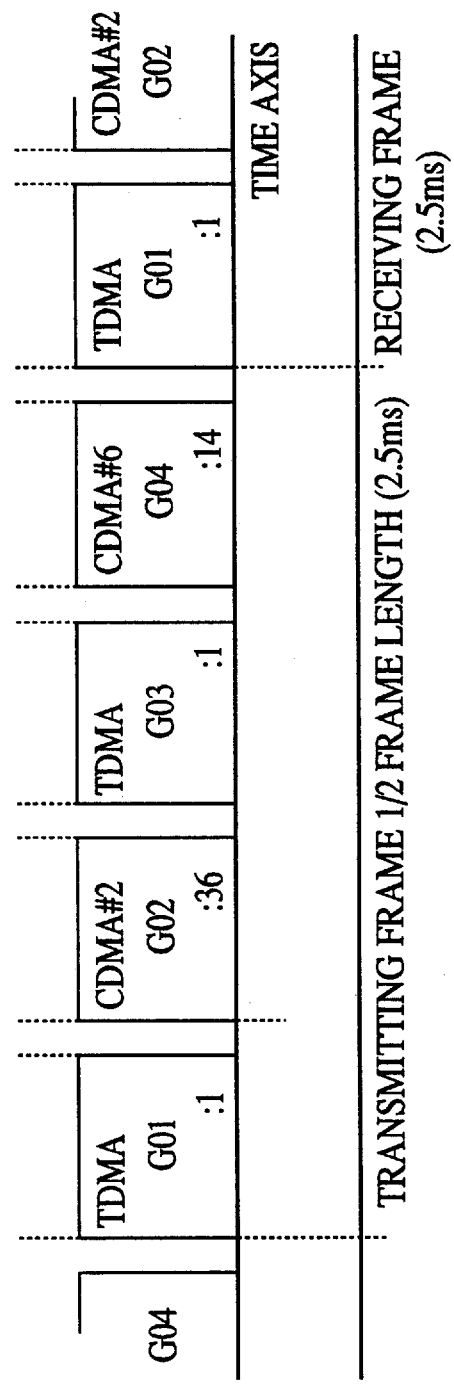
Figure 126:
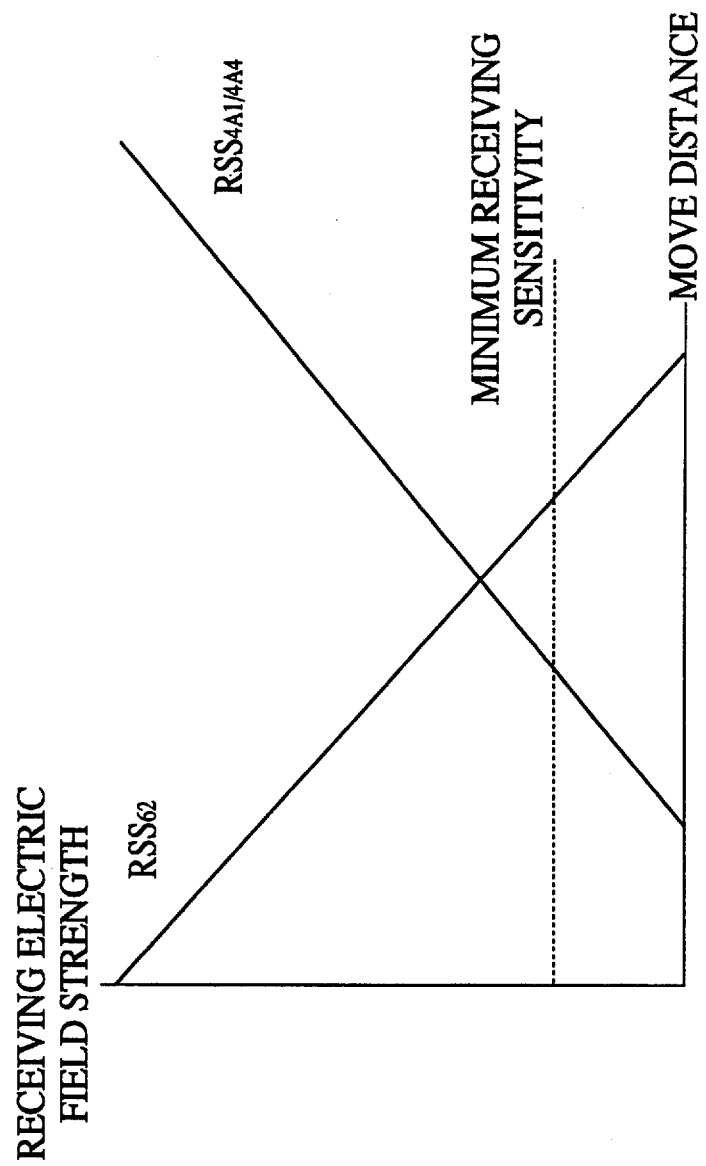
Figure 129:
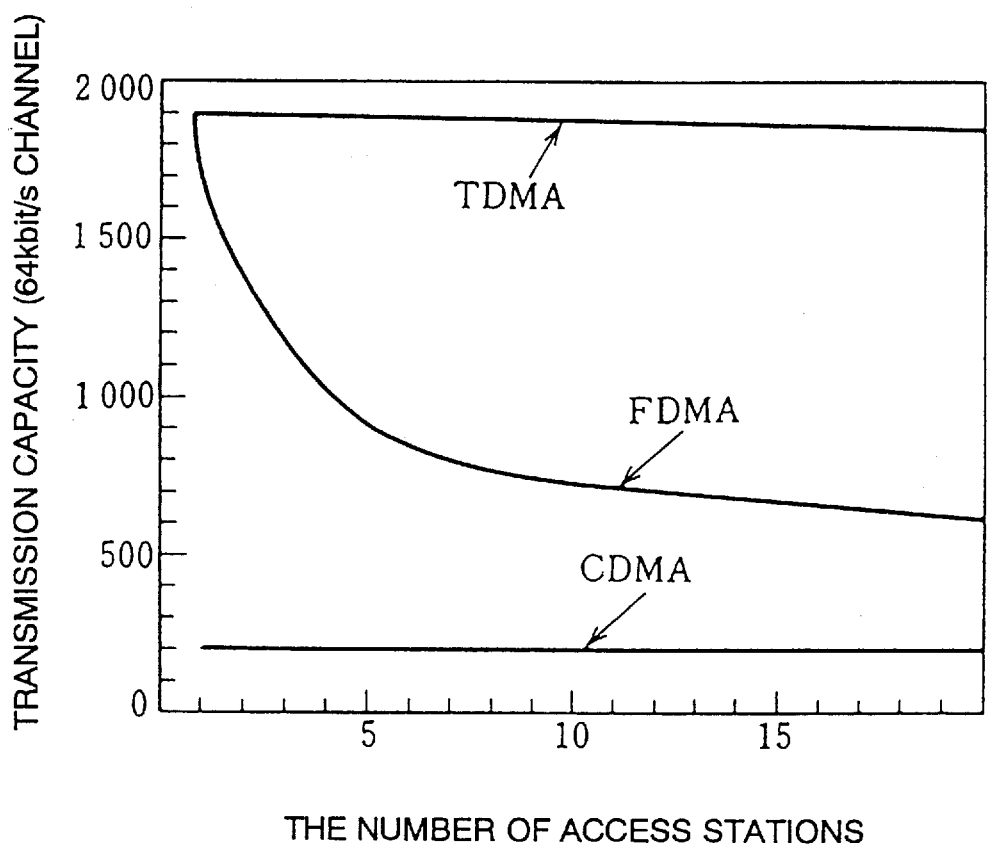

FIG. 123 is a table showing examples of setting of data rate, transmitting type, chip rate, receiving electric field strength and number of simultaneous information channels, all for each time slot to be used in communication with the private system and adjacent public system. In the CDMA method, it is possible to a plurality of information channels can be created in a single time slot. The mobile station No. "101" in FIG. 123 represents a single mobile station in the connected channel in the slot No. 2. FIGS. 124 and 125 shows structural examples of time slots to be used in communication with the private system and adjacent public system. FIG. 126 is a graph showing an example of variation of electric intensity of radio wave received by the mobile station from the radio base station of the adjacent cell. The whole construction of the mobile communication system of FIG. 117 is the same also in this embodiment, so the action of hand-off will be described using FIG. 117.

Assume that the mobile station 5A goes gradually away from the coverage of the radio station 6 and enters the coverage of the radio base station 4A of the private system while communicating firstly with the radio base station 6 of the public system by the slot No. 2 (483) in FIG. 123. In this case, the mobile station 5A is able to be connected with the first slot 484 or the fourth slot 485, which are communicable in a predetermined access method, i.e. in this case the same CDMA method. The timing point for switchover connection is illustrated in FIG. 126.

Any of the first and fourth time slots has to be decided as the destination-of-switchover time slot. In this embodiment, it is decided based on "number of simultaneous talking CHS" of FIG. 123. Namely, in FIG. 124, since the slot No. 1 (484) has 7 channels occupied while the slot No. 4 (485) has 31 channels occupies, it is preferably to use the first time slot whose number of occupies channels is smaller. Accordingly, the mobile station 5A (mobile station No. 101) continues talking with the radio base station 4A, using the first slot.

Thus, according to this embodiment, a channel may be created with consideration of the load of additional radio base station to be connected, consulting the number continuous channels in each time slot.

In this embodiment, the destination-of-switchover deciding condition is the number of simultaneous channels; however, this invention should by no means be limited to this illustrated example.

As mentioned above, in the foregoing embodiments, various mobile communication systems are shown. Some of these embodiments deal with a combined construction of the individual embodiments. Various other combination may be suggested without departing from the spirit of this invention.

We claim:

1. A mobile communication system which includes a plurality of mobile and/or portable radio stations, and radio base stations for performing wireless communication between said mobile stations and said base stations using a predetermined method selected from a number of multiple access methods, wherein each of said mobile and/or portable radio stations and radio base stations comprises:

(a) TDMA communication means for assigning TDMA signals to time slots, which are contained in a frame, to perform communication based on TDMA method;
    (b) time-divided CDMA communication means having at least one spread-spectrum code generator and adapted for communication of time-divided CDMA signals based on a time-divided CDMA method;
    (c) said time-divided CDMA communication means being adapted for assigning time-divided spread-spectrum codes, which are generated by said spread-spectrum code generator, to said time slots of said TDMA communication method, whereby communication is carried out in such a manner that both TDMA signals and CDMA signals exist in said time slots; and
    (d) control means for selecting one of said TDMA method and said time-divided CDMA method for carrying out communication.

2. A mobile communication system according to claim 1, wherein said CDMA communication means has means for generating empty time slot.

3. A mobile communication system according to claim 1, wherein said CDMA communication means has a initial value setting unit for arbitrarily setting an initial value of the spread-spectrum code generated by each said spread-spectrum code generator.

4. A mobile communication system according to claim 1, wherein said CDMA communication means has a spread-spectrum code value setting unit for arbitrarily setting a value of the spread-spectrum code, which is generated by said spread-spectrum code generator, by a generating polynomial.

5. A mobile communication system according to claim 4, wherein said spread-spectrum code value setting unit has a group of switches for freely changing a feedback loop including a shift register.

6. A mobile communication system which includes a plurality of mobile and/or portable radio stations, and radio base stations for performing wireless communication between said mobile stations and said base stations using a predetermined method selected from a number of multiple access methods, wherein each of said mobile and/or portable radio stations and radio base stations comprises:
- (a) TDMA communication means for assigning TDMA signals to time slots, which are contained in a frame, to perform communication based on a TDMA method;
- (b) time-divided CDMA communication means having at least one spread-spectrum code generator for generating spread-spectrum codes and adapted for communication of time-divided CDMA signals based on a time-divided CDMA method; and
- (c) control means for controlling each said station to selectively assign said TDMA signal or said time-divided CDMA signal to each of said time slots;
- (d) said time-divided CDMA communication means being adapted for assigning spread-spectrum signals, which are obtained with said spread-spectrum codes generated by said spread-spectrum code generator, to said time slots in such a manner that both said TDMA and time-divided CDMA signals exist in said time slots.

7. A mobile communication system according to claim 6, wherein said control means controls both said communication means in such a manner that both said TDMA and CDMA signals exist in one frame.

8. A mobile communication system according to claim 6, wherein said control means controls the generation of said spread-spectrum codes by said spread-spectrum code generator.

9. A mobile communication system according to claim 6, wherein said control means decides an access method to be used for communication with another station based on an access method deciding condition and assigns signal, which are according to the decided access method, to a predetermined time slot.

10. A mobile communication system according to claim 9, further including, at least an exchange for controlling communications between said mobile station and said radio base stations, said exchange having storage means for storing said access method deciding condition.

11. A mobile communication system according to claim 6, wherein said CDMA communication means at each said radio base station has channel coders located in association with the respective time slots for performing a primary modulation to transmitted information, and said spread-spectrum code generator generates a different spread-spectrum code for each of said time slots, and wherein said CDMA signals are generated based on a product of an output of each said channel coder associated with the respective time slot and the corresponding spread-spectrum code, and said control means assigns said CDMA to said respective time slots.

12. A mobile communication system according to claim 6, wherein said CDMA communication means has a number of channel coders in association with each of said time slots for performing a primary modulation to transmitted information, and said spread-spectrum code generator generates a different spread-spectrum code for each of said time slots, and wherein said control means assigns the CDMA signals generated based on product information of an output of each said channel coder and each said spread-spectrum code to said time slots to assign a number of channels to one of said time slots.

13. A mobile communication system according to claim 12, wherein said control means sets a number of said channels of the same access method for the same time slot.

14. A mobile communication system according to claim 6, wherein said mobile station has receiving-state detecting means for detecting a state of receiving signals from a number of said radio base stations, and said control means sets, based on the detected state of receiving, a separate channel between said mobile station and another radio base station using a time slot different from the time slot presently occupied by said channel.

15. A mobile communication system according to claim 6, wherein said CDMA communication means has a chip clock control unit for controlling a chip clock of said spread-spectrum code generator.

16. A mobile communication system according to claim 6, wherein said CDMA communication means has a chip rate control unit for controlling a chip rate of said spread-spectrum code generator.

17. A mobile communication system according to claim 16, wherein said chip rate control circuit controls the chip rate of said spread-spectrum code generator such that chip rates for time slots in which TDMA signals are transmitted are set to zero.

18. A mobile communication system according to claim 6, wherein each said station has a carrier frequency control unit for controlling a carrier frequency of each time slot.

19. A mobile communication system which includes a plurality of mobile and/or portable radio stations, and radio base stations for performing wireless communication between said mobile stations and said base stations using a predetermined method selected from a number of multiple access methods, each of said mobile and/or portable radio stations and radio base stations comprising:
- (a) TDMA communication means for assigning TDMA signals to time slots, which are contained in a frame, to perform communication based on a TDMA method;
- (b) CDMA communication means having a spread-spectrum code generator, which generates a number of spread-spectrum codes, and adapted for communication of CDMA signals based on a CDMA method;
- (c) said CDMA communication means being adapted for assigning different spread-spectrum signals, which are obtained with said spread-spectrum codes generated by said spread-spectrum code generators, respectively to said time slots of said TDMA communication method, whereby communication is carried out in such a manner that both TDMA signals and CDMA signals exist in said time slots; and
- (d) control means for selecting one of said TDMA method and said CDMA method for carrying out communication.

20. A mobile communication system which includes a plurality of mobile and/or portable radio stations, and radio base stations for performing wireless communication between said mobile stations and said base stations using a predetermined method selected from a number of multiple access methods, each of said mobile and/or portable radio stations and radio base stations comprising:
- (a) TDMA communication means for assigning TDMA signals to time slots which are contained in a frame, based on a TDMA method;
- (b) CDMA communication means having a number of spread-spectrum code generators, which generate different spread-spectrum codes, and adapted for communication of CDMA signals based on a CDMA method;
- (c) said CDMA communication means being adapted for assigning said different spread-spectrum signals, which are obtained with said spread-spectrum codes generated by said spread-spectrum code generators, respectively to said time slots of said TDMA method, whereby communication is carried out in such a manner that both TDMA signals and CDMA signal exist in said time slots; and (d) control means for selecting one of said TDMA method and said CDMA method for carrying out communication.

21. A mobile communication system which includes, a plurality of mobile and/or portable radio stations, and a radio base station for performing wireless communication between said stations using a predetermined method selected from a number of multiple access methods, wherein each of said mobile stations and radio base stations comprises:

(a) TDMA communication means for assigning TDMA signals to time slots, which are contained in a frame, to perform communication based on a TDMA method;

(b) CDMA communication means having a spread-spectrum code generator, which generates a number of spread-spectrum codes, and adapted for communication of CDMA signals based on a CDMA method; and (c) control means for controlling each said station to selectively assign said TDMA signal or said CDMA signal to each of said time slots;

(d) said CDMA communication means being adapted for assigning different spread-spectrum code, which are generated by said spread-spectrum codes generator, respectively to said time slots in such a manner that both said TDMA and CDMA signals exist in said time slot.

22. A mobile communication system which includes a plurality of mobile and/or portable radio stations, and radio base stations for performing wireless communication between said mobile stations and said base stations using a predetermined method selected from a number of multiple access methods, wherein each of said mobile and/or portable radio stations and radio base stations comprises:

(a) TDMA communication means for assigning TDMA signals to time slots, which are contained in a frame, to perform communication based on a TDMA method;

(b) CDMA communication means having a number of spread-spectrum code generators, which generate different spread-spectrum codes, and adapted for communication of CDMA signals based on a CDMA method; and (c) control means for controlling each said station to selectively assign said TDMA signal or said CDMA signal to each of said time slots;

(d) said CDMA communication means being adapted for assigning said different spread-spectrum codes, which are generated by said spread-spectrum code generators, respectively to said time slots in such a manner that both said TDMA and CDMA signals exist in said time slots.

23. A mobile communication system which includes a plurality of mobile and/or portable radio stations, and radio base stations for performing wireless communication between said mobile stations and said base stations using a predetermined method selected from a number of multiple access methods, including a multiple access method in which a CDMA signal is inserted into a time slot of a TDMA communication method, wherein each of said stations is loaded with a spread-spectrum code generator for generating a number of spread-spectrum codes and has a noncoherent delay lock loop for detecting the spread-spectrum code assigned to the CDMA signal contained in each time slot received based on the TDMA method, whereby communication is carried out in such a manner that both TDMA signals and CDMA signals exist in said time slots.

24. A mobile communication system according to claim 23, wherein said CDMA communication means has a spread-spectrum code value setting unit for arbitrarily setting a value of the spread-spectrum code, which is generated by said spread-spectrum code generator, by a generating polynomial.

25. A mobile communication system according to claim 23, wherein said spread-spectrum code value setting unit has a group of switches for freely changing a feedback loop including a shift register.

* * * * *